Dec. 31, 1940.  W. S. GUBELMAN  2,226,919
CASH REGISTER
Filed Jan. 22, 1929  37 Sheets-Sheet 1

INVENTOR
WILLIAM S. GUBELMANN
BY
ATTORNEYS

Dec. 31, 1940.　　　　W. S. GUBELMAN　　　　2,226,919
CASH REGISTER
Filed Jan. 22, 1929　　　37 Sheets-Sheet 3

INVENTOR
WILLIAM S. GUBELMANN
BY
ATTORNEYS

Dec. 31, 1940.  W. S. GUBELMAN  2,226,919
CASH REGISTER
Filed Jan. 22, 1929   37 Sheets-Sheet 4

INVENTOR
WILLIAM S. GUBELMANN
BY
ATTORNEYS

Dec. 31, 1940.　　　W. S. GUBELMAN　　　2,226,919
CASH REGISTER
Filed Jan. 22, 1929　　　37 Sheets-Sheet 5

INVENTOR
WILLIAM S. GUBELMANN
BY
ATTORNEYS

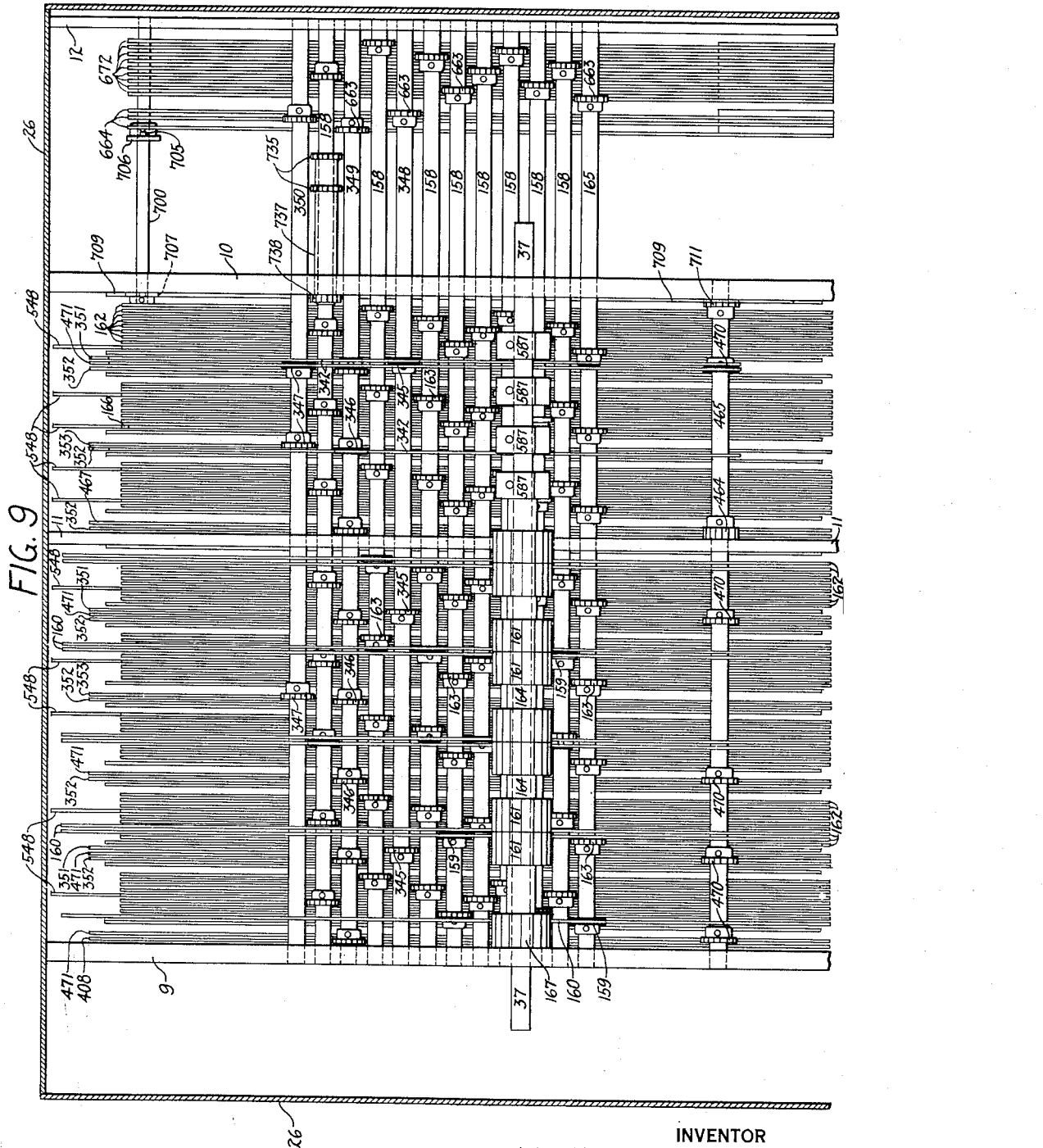

FIG. 10

| M | C.O.D. | C.O.D. PAID GDS. RET. C.O.D. | CASHIER 2 NET CASH | | CASHIER 1 NET CASH | | TOTAL NET CASH | |
|---|---|---|---|---|---|---|---|---|
| TRANSACTION | ☐☐ 365 | | ☐☐ 359 | | ☐ 365 | | ☐☐ | 358 |
| CASHIER | | | 472 | | | | | |
| SELECTOR X | 486 | | | | | | | |
| SELECTOR Y | 496 | | | | | | | |

| N | CASHIER 2 CASH SALES | CASHIER 1 CASH SALES | CASHIER 2 MONEY OUT | CASHIER 1 MONEY OUT | CASHIER 2 MONEY IN | CASHIER 1 MONEY IN | GROUP 1 TOTAL SALES | GROUP 2 TOTAL SALES |
|---|---|---|---|---|---|---|---|---|
| TRANS. | | | 365 | 359 | | | | 358 |
| DEPT. | | | | 359 | | | | |
| SELECTOR Y | 496 | | | | | | | |
| CASHIER | 472 | | | | | | | |
| SELECTOR X | 486 | | | | | | | |

| O | CASHIER 1 TOTAL SALES | C.O.D. PAID | REC. ON ACCT. | CASH | C.O.D. | GDS. RET. CASH | GDS. RET. CHARGE | GDS. RET. C.O.D. | PAID OUT | CHARGE |
|---|---|---|---|---|---|---|---|---|---|---|
| TRANSACTION | | 365 | | 359 | | | | | | |
| CASHIER | 472 | | | | | | | | | |
| SELECTOR X | 486 | | | | | | | | | |
| SELECTOR Y | 496 | | | | | | | | | |

| P | CLERKS TOTAL SALES | L | K | H | A | F | E | D | B | G |
|---|---|---|---|---|---|---|---|---|---|---|
| CLERK | 359 | | 365 | | | | | | | |
| TRANSACTION | 359 | | | | | | | | | |
| SELECTOR X | 486 | | | | | | | | | |
| SELECTOR Y | 496 | | | | | | | | | |

| FRONT OF MACHINE Q | CASHIER 2 TOTAL SALES | TUNING REPAIR | ROLLS | RECORD | PIANO | WIND INST. | STRING INST. | CABINET | VICTROLA | SHEET |
|---|---|---|---|---|---|---|---|---|---|---|
| | | | | | | | GROUP 1 | | | 358 |
| DEPARTMENT | 359 | | | | 365 | | | | | |
| TRANSACTION | 359 | | | | | | | | | |
| CASHIER | 472 | | | | | | | | | |
| SELECTOR X | 486 | | | | | | | | | |
| SELECTOR Y | 496 | | | | | | | | | |

| R | CASHIER 1 COUNTER | C.O.D. PAID | REC. ON ACCT. | CASH | GDS. RET. CASH | C.O.D. | GDS. RET. CHARGE | GDS. RET. C.O.D. | PAID OUT | CHARGE |
|---|---|---|---|---|---|---|---|---|---|---|
| TRANSACTION | 359 | | 365 | | | | | | | |
| CASHIER | 468 | 469 | | | | | | | | |
| SELECTOR X | 486 | | | | | | | | | |

| S | TOTAL SALES COUNTER | L | K | H | A | F | E | D | B | G |
|---|---|---|---|---|---|---|---|---|---|---|
| CLERK | 359 | | | | 365 | | | | | |
| TRANSACTION | 359 | | | | | | | | | |
| SELECTOR X | 486 | | | | | | | | | |
| SELECTOR Y | 496 | | | | | | | | | |

| T | CASHIER 2 COUNTER | TUNING REPAIR | ROLLS | RECORD | PIANO | WIND INST. | STRING INST. | CABINET | VICTROLA | SHEET |
|---|---|---|---|---|---|---|---|---|---|---|
| DEPARTMENT | 359 | | | 365 | | | | | | |
| TRANSACTION | 359 | | | | | | | | | |
| CASHIER | 472 | | | | | | | | | |
| SELECTOR X | 486 | | | | | | | | | |

INVENTOR
WILLIAM S. GUBELMANN
BY
ATTORNEYS

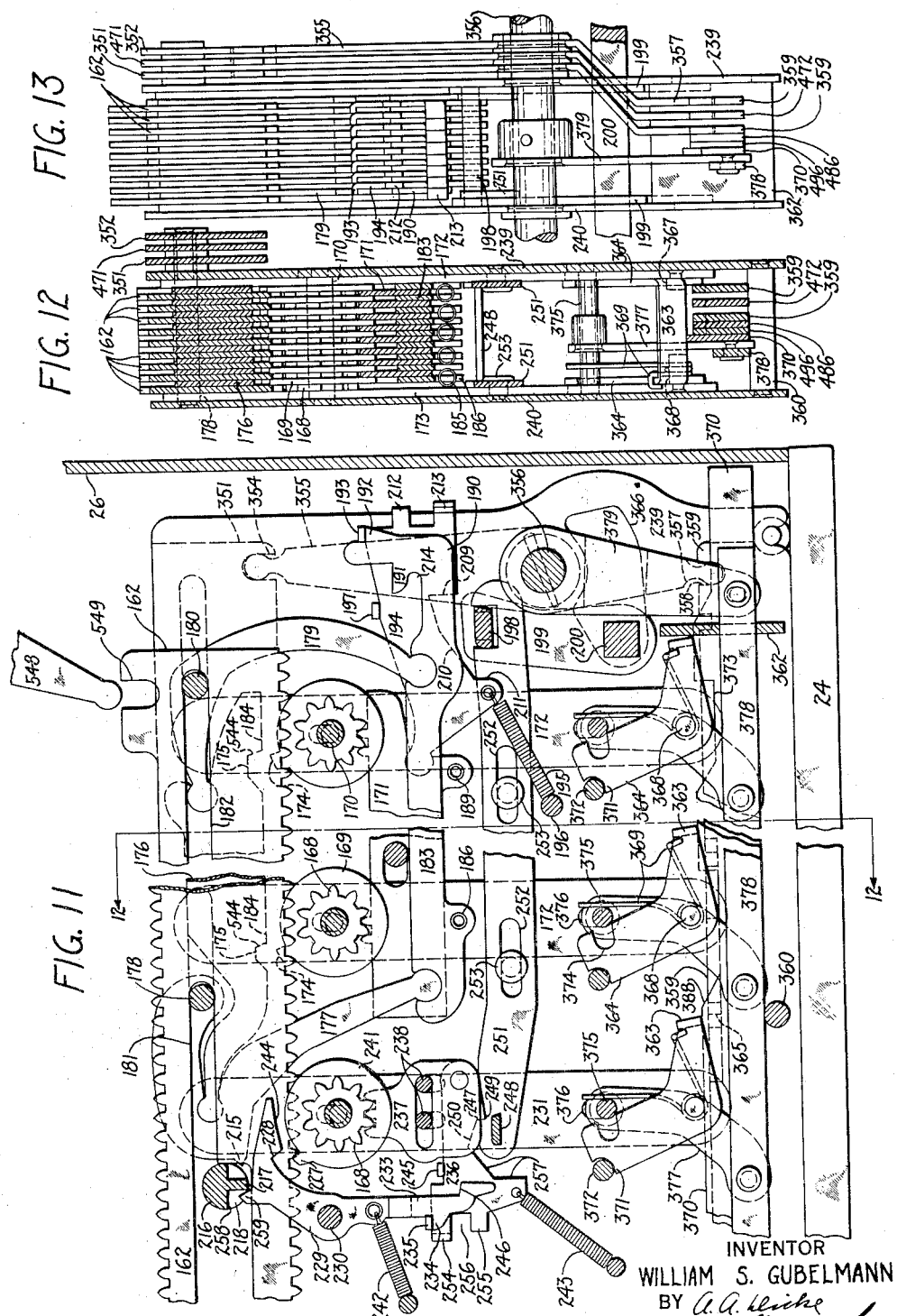

Dec. 31, 1940.  W. S. GUBELMAN  2,226,919
CASH REGISTER
Filed Jan. 22, 1929   37 Sheets-Sheet 9
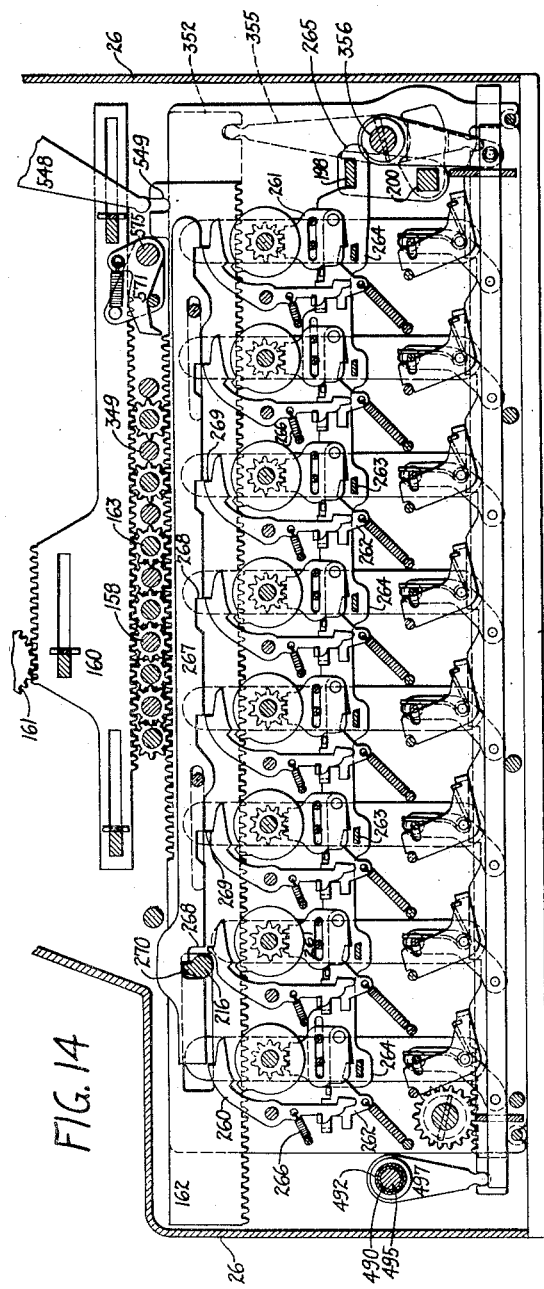
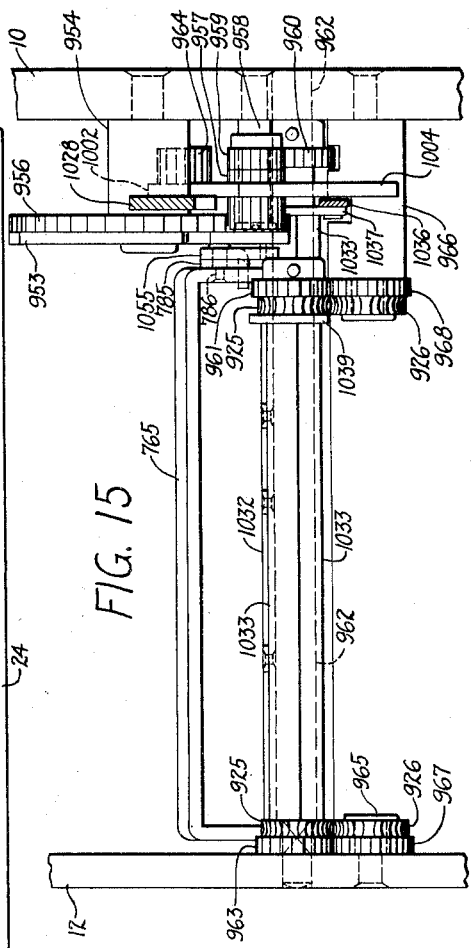
INVENTOR
WILLIAM S. GUBELMANN
BY
ATTORNEYS Dec. 31, 1940.  W. S. GUBELMAN  2,226,919
CASH REGISTER
Filed Jan. 22, 1929  37 Sheets-Sheet 10
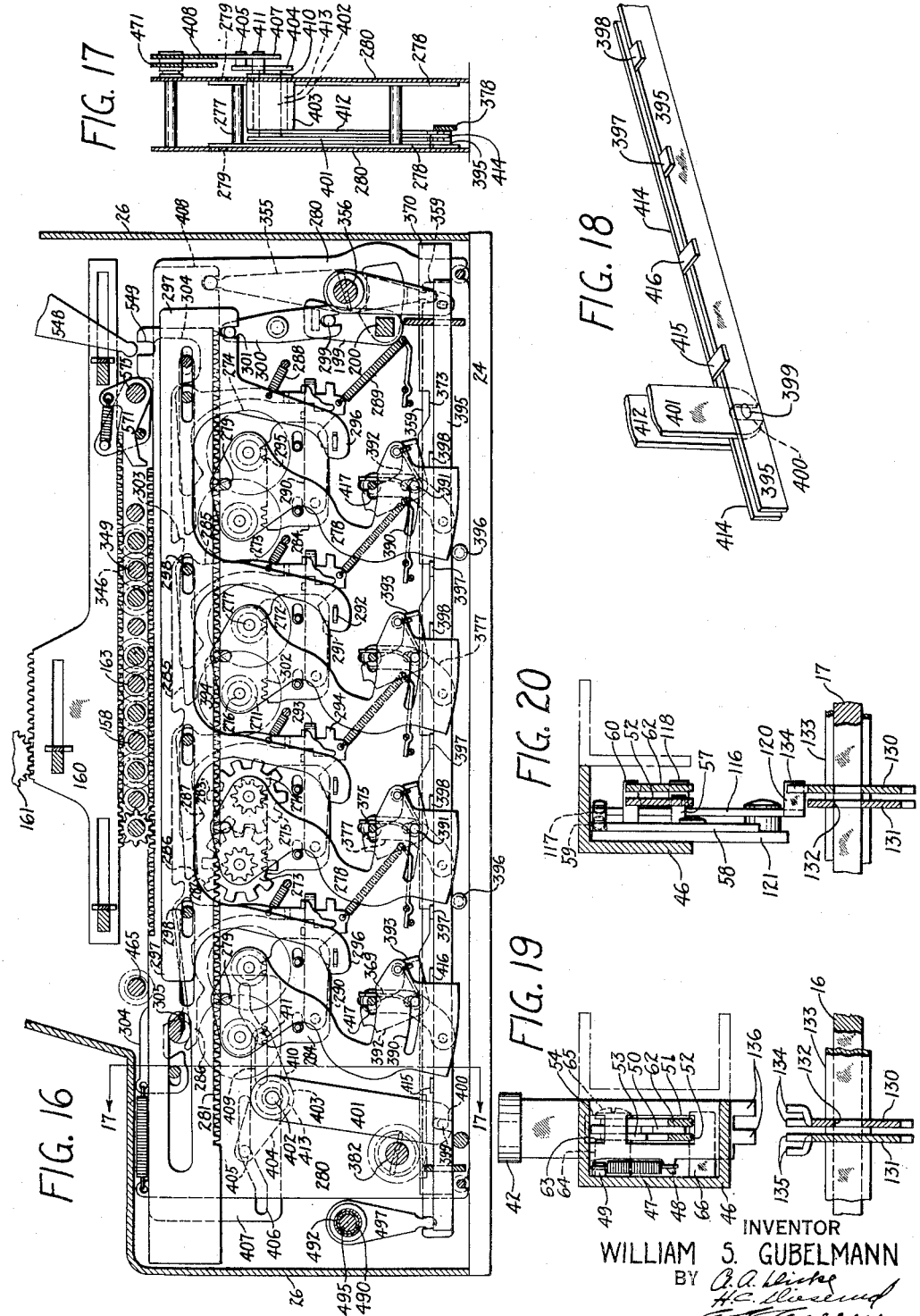
INVENTOR
WILLIAM S. GUBELMANN
BY
ATTORNEYS Dec. 31, 1940.  W. S. GUBELMAN  2,226,919
CASH REGISTER
Filed Jan. 22, 1929  37 Sheets-Sheet 11
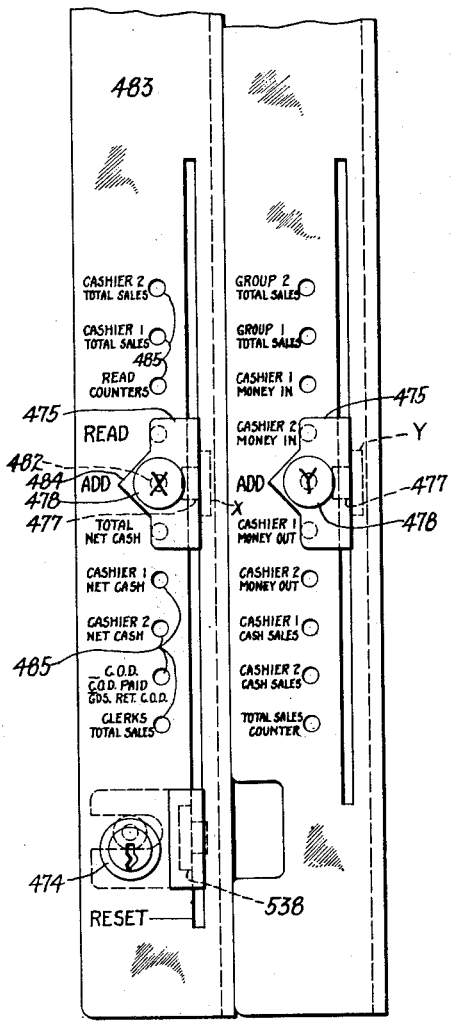
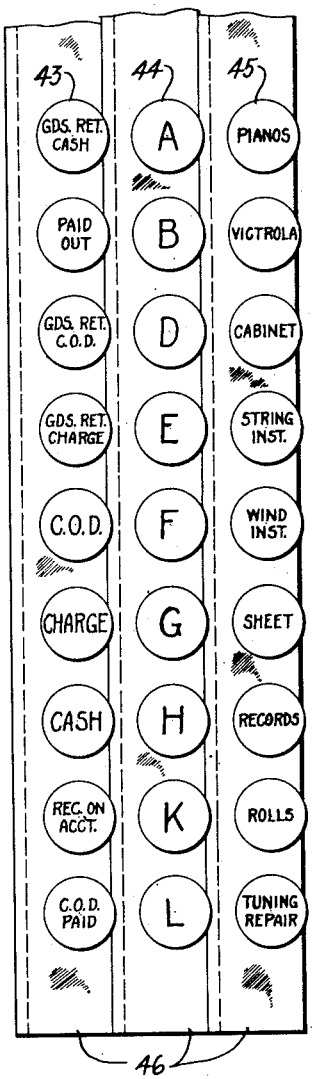
INVENTOR
WILLIAM S. GUBELMANN
BY
ATTORNEYS Dec. 31, 1940. W. S. GUBELMAN 2,226,919
CASH REGISTER
Filed Jan. 22, 1929 37 Sheets-Sheet 12

INVENTOR
WILLIAM S. GUBELMANN
BY
ATTORNEYS

Dec. 31, 1940.   W. S. GUBELMAN   2,226,919
CASH REGISTER
Filed Jan. 22, 1929   37 Sheets-Sheet 13

INVENTOR
WILLIAM S. GUBELMANN
BY
ATTORNEYS

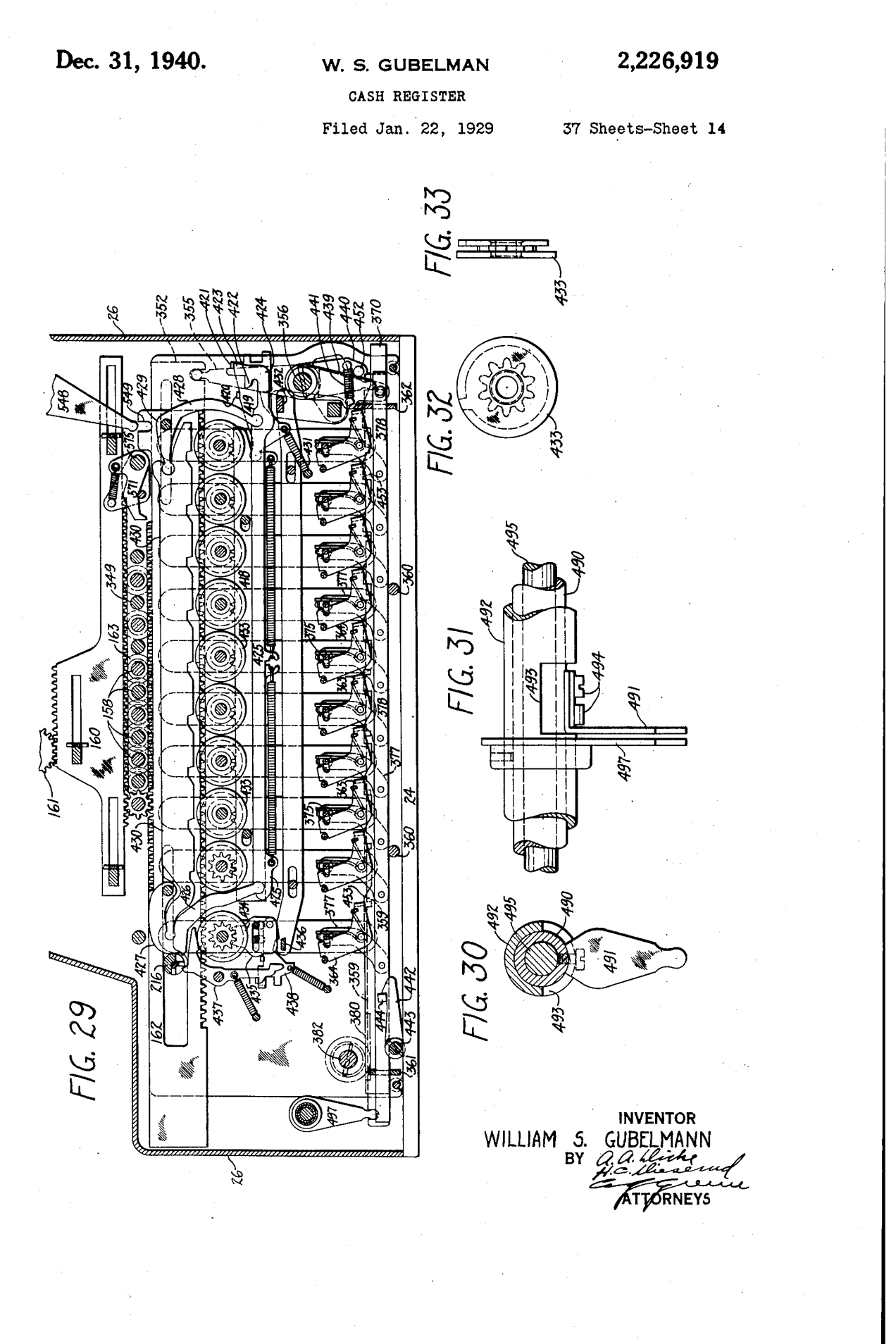

Dec. 31, 1940.  W. S. GUBELMAN  2,226,919
CASH REGISTER
Filed Jan. 22, 1929   37 Sheets-Sheet 14

INVENTOR
WILLIAM S. GUBELMANN
BY
ATTORNEYS

Dec. 31, 1940.                W. S. GUBELMAN                2,226,919
                                CASH REGISTER
                             Filed Jan. 22, 1929              37 Sheets-Sheet 15

INVENTOR
WILLIAM S. GUBELMANN
BY
ATTORNEYS

Dec. 31, 1940.  W. S. GUBELMAN  2,226,919
CASH REGISTER
Filed Jan. 22, 1929   37 Sheets-Sheet 16
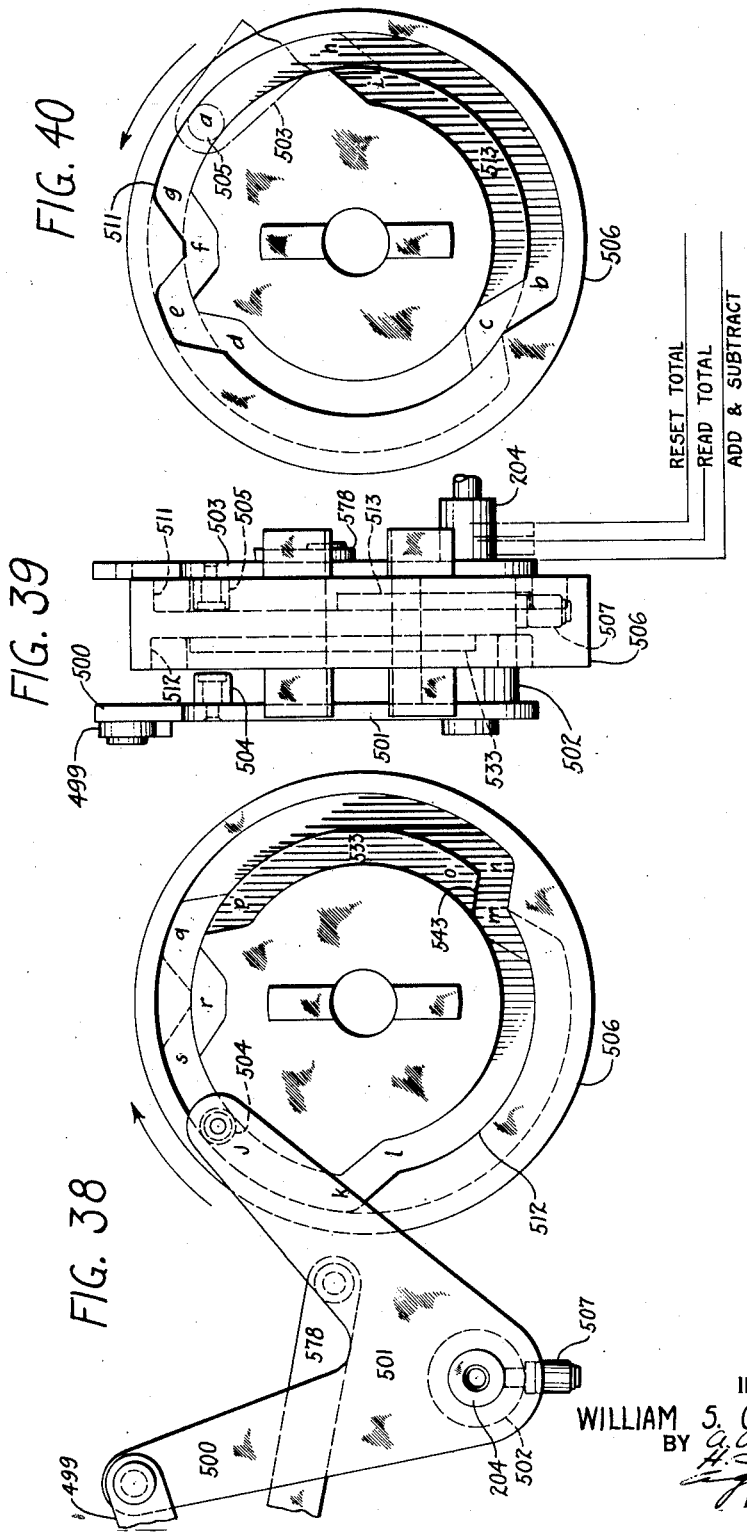
INVENTOR
WILLIAM S. GUBELMANN
BY
ATTORNEYS Dec. 31, 1940.                    W. S. GUBELMAN                         2,226,919
                                    CASH REGISTER
                       Filed Jan. 22, 1929       37 Sheets-Sheet 18

FIG. 45

```
00246  ----I Cash L Piano         650.00
00247  ----I CODE Cab             20.00
00248  ----I RET CODSist          78.50

00249  ----I BOTH Wist             1.29

00250  ----I CHG B Recd           12.50
```
809

FIG. 46

```
01278  -TOTAL--CHG---           3477.50
01279  --GR.I/TOT.S--            8561.43
01280  -ITEM----A---                1.67
```
809

FIG. 47

```
07532  *TOTAL----B---            545.65
07533  *ITEM----Piano              2.41
07534  *--CAS.Z/MDL.0--           16.57
```
809

FIG. 48

| NAME | Mrs. E. White | | | |
|---|---|---|---|---|
| ADDRESS | 649 Woodhurst Ave. Glendale L.I. | | | |

INSTALLMENT SHEET
SELLING PRICE $100.00  NO. INSTALLMENTS 10  EACH $7.50

| DATE | SALE NO. | TRANS-CLERK-DEPT. | AMOUNT | INSTALT NO. |
|---|---|---|---|---|
| JAN 30 15 | 00087 | ----2R+BV ct. | 25.00 | X |
| MAR 1 15 | 00009 | ----2R+BV ct. | 7.50 | 1 |
| | | | | 2 |
| | | | | ... |
| | | | | 30 |

RECEIPT
THE FRED. BROWN MUSIC STORE

| DATE | SALE NO. | TRANS-CLERK-DEPT | AMOUNT | INSTALT NO. |
|---|---|---|---|---|
| JAN 30 15 | 00087 | ----2R+BV ct. | 25.00 | X |
| MAR 1 15 | 00009 | ----2R+BV ct. | 7.50 | 1 |
| | | | | 2 |
| | | | | ... |
| | | | | 20 |

INVENTOR
WILLIAM S. GUBELMANN
BY *A. A. Clarke*
*H. C. Thiesen*
ATTORNEYS

Dec. 31, 1940.   W. S. GUBELMAN   2,226,919
CASH REGISTER
Filed Jan. 22, 1929   37 Sheets-Sheet 19

```
DATE      SALE NO.   TRANS-CLERK-DEPT.      AMOUNT
MAR 15,14  00168    ----1 CashK Roll         7.00
```
THE FRED. BROWN MUSIC STORE

---

RECEIPT

```
DATE      SALE NO.   TRANS-CLERK-DEPT       AMOUNT
MAR 15,14  00168    ----1 CashK Roll         7.00
```
THE FRED. BROWN MUSIC STORE
EVERYTHING FOR THE BAND

SEE OTHER SIDE FOR LATEST SONG HITS ON ROLL & RECORD

— 912

---

SATISFIED PURCHASERS ARE OUR ONLY AGENTS

THE FRED. BROWN MUSIC STORE
EVERY INSTRUMENT GUARANTEED

```
DATE     SALE NO.  TRANS-CLERK-DEPT.  AMOUNT
AUG 20 14  09763   ----1 CashFWh       126 50
```

---

```
AUG 20 14  09763   ----1 CashFWh       126 50
DATE     SALE NO.  TRANS-CLERK-DEPT   AMOUNT
```

```
DATE     SALE NO.  TRANS-CLERK-DEPT   AMOU
AUG 20 14  09763   ----1 CashFWh       126
```
PURCHASER  John W. Armbruster
ADDRESS    125 Forest Ave Bklyn N.Y.

| NO. | ITEMS | PRICE |
|---|---|---|
| 2 | Model 10 Saxaphones | 110 00 |
| 2 | No 14 Mutes | 12 00 |
| 1 | Saxaphone manual | 4 50 |
|  |  | 126 50 |

INVENTOR
WILLIAM S. GUBELMANN
BY *(signatures)*
ATTORNEYS

Dec. 31, 1940.  W. S. GUBELMAN  2,226,919
CASH REGISTER
Filed Jan. 22, 1929  37 Sheets-Sheet 20

INVENTOR
WILLIAM S. GUBELMANN
BY
ATTORNEYS

Dec. 31, 1940.  W. S. GUBELMAN  2,226,919
CASH REGISTER
Filed Jan. 22, 1929   37 Sheets-Sheet 21
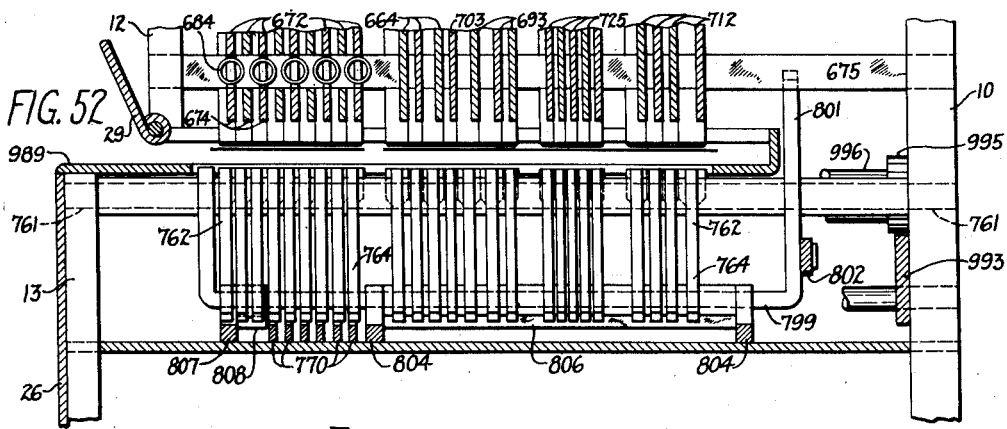
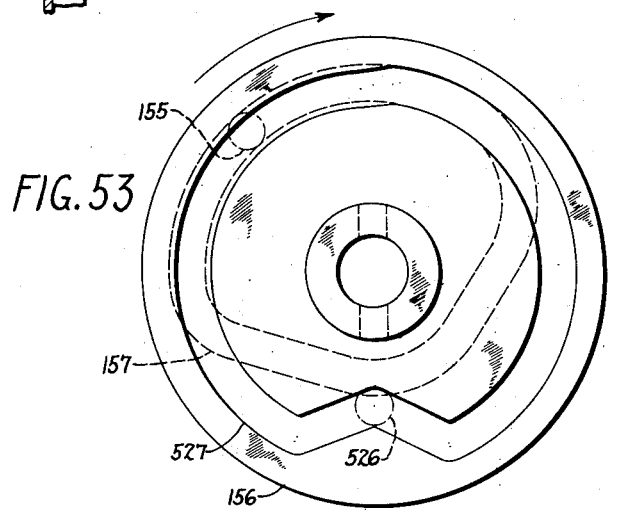
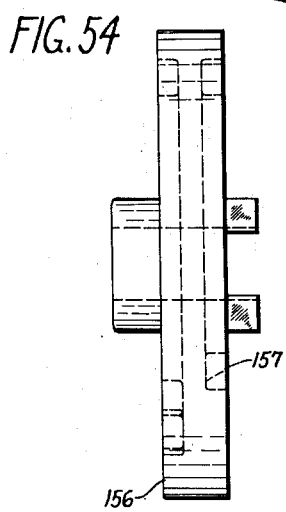
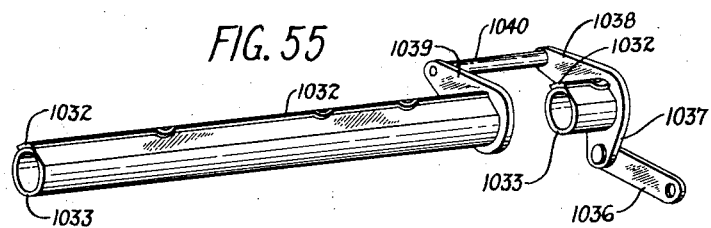
INVENTOR
WILLIAM S. GUBELMANN
BY
ATTORNEYS Dec. 31, 1940.    W. S. GUBELMAN    2,226,919
CASH REGISTER
Filed Jan. 22, 1929    37 Sheets-Sheet 22
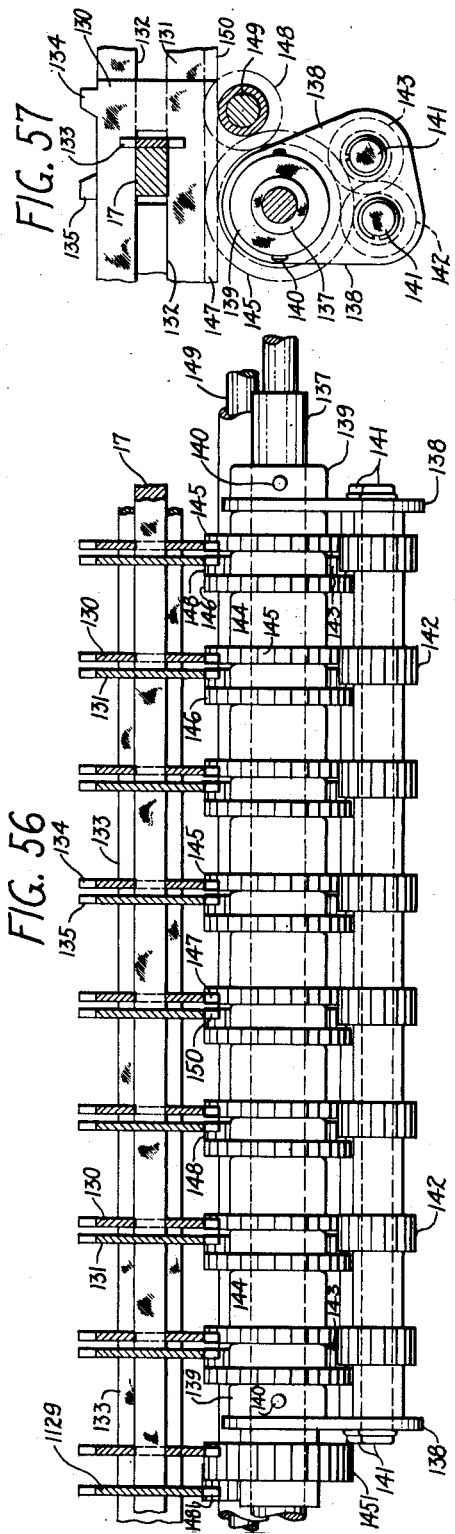
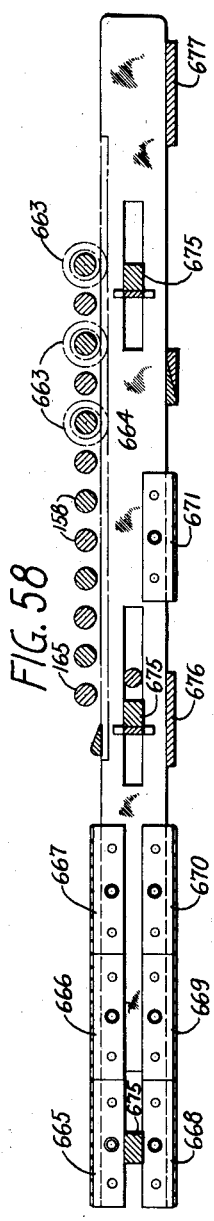
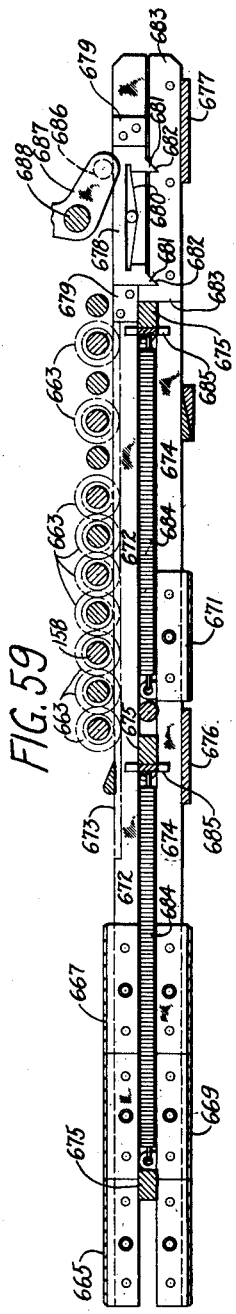
INVENTOR
WILLIAM S. GUBELMANN
BY
ATTORNEYS Dec. 31, 1940.  W. S. GUBELMAN  2,226,919
CASH REGISTER
Filed Jan. 22, 1929   37 Sheets-Sheet 23
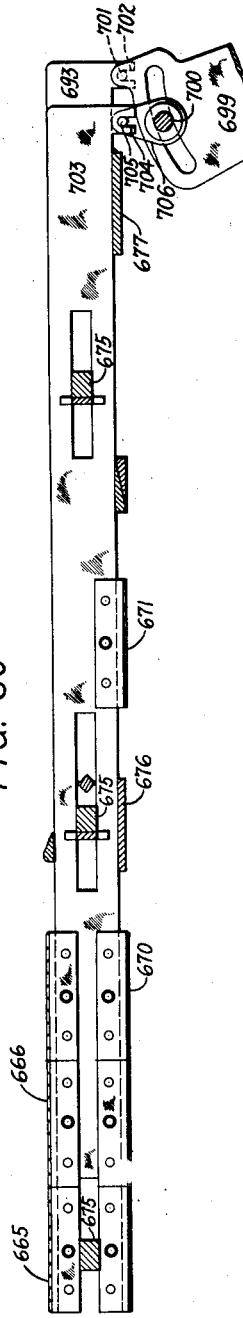
FIG. 60
FIG. 61
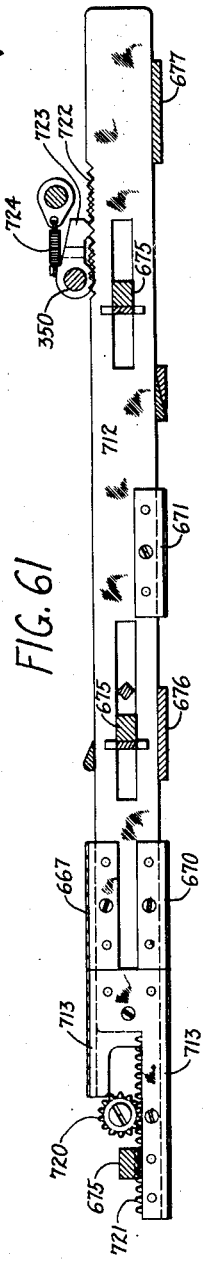
FIG. 62
INVENTOR
WILLIAM S. GUBELMANN
BY
ATTORNEYS Dec. 31, 1940.   W. S. GUBELMAN   2,226,919
CASH REGISTER
Filed Jan. 22, 1929   37 Sheets-Sheet 25
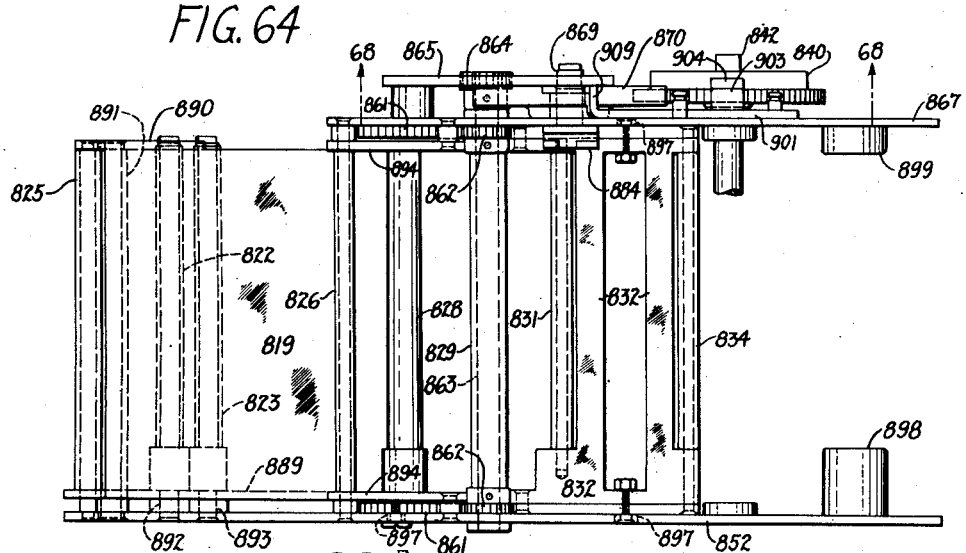
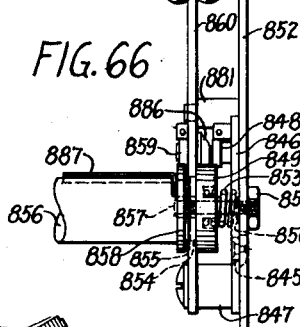
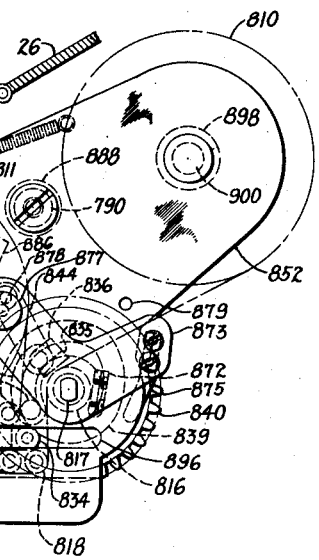
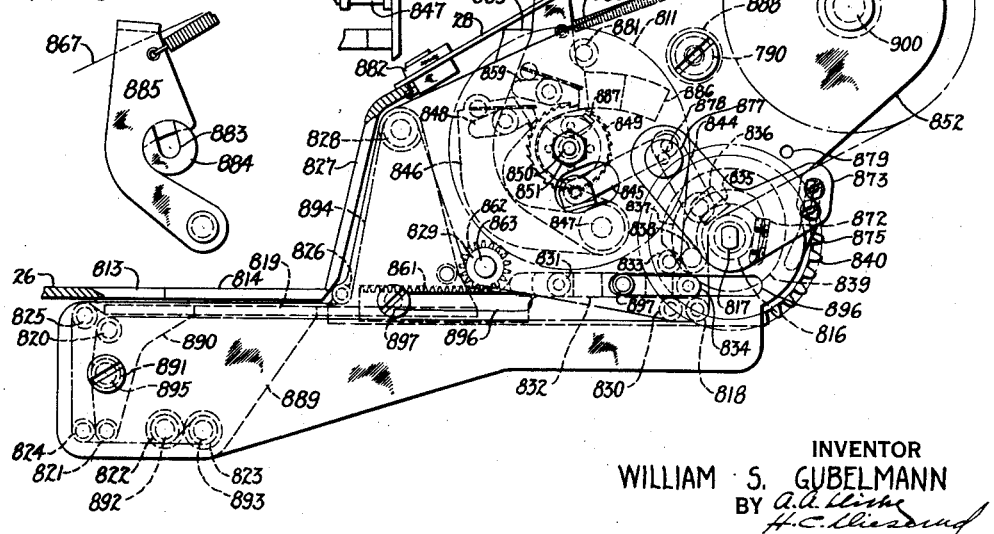
INVENTOR
WILLIAM S. GUBELMANN
BY
ATTORNEYS Dec. 31, 1940. W. S. GUBELMAN 2,226,919
CASH REGISTER
Filed Jan. 22, 1929 37 Sheets-Sheet 26
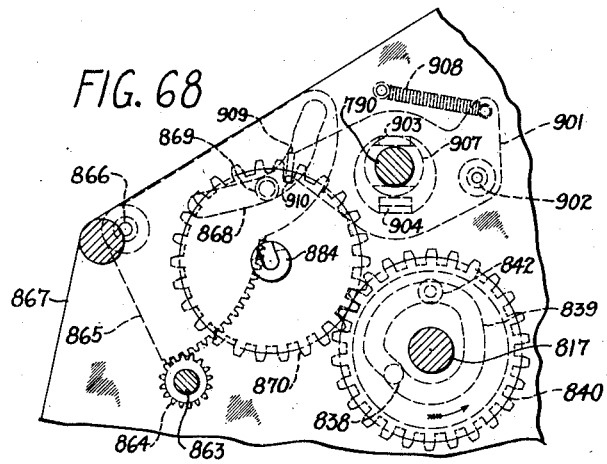
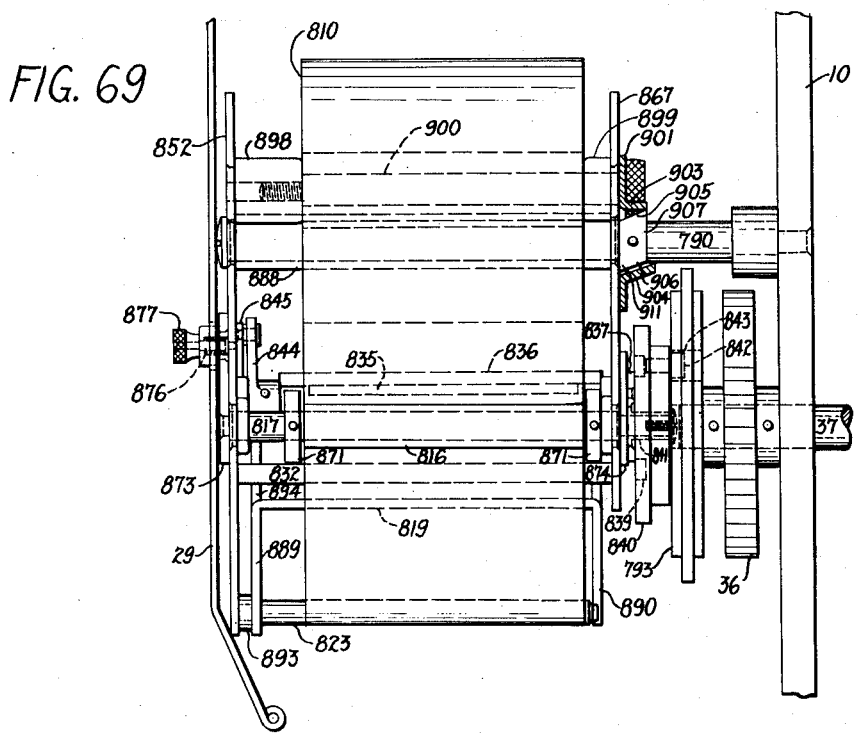
INVENTOR
WILLIAM S. GUBELMANN
BY
ATTORNEYS Dec. 31, 1940.  W. S. GUBELMAN  2,226,919
CASH REGISTER
Filed Jan. 22, 1929    37 Sheets-Sheet 28
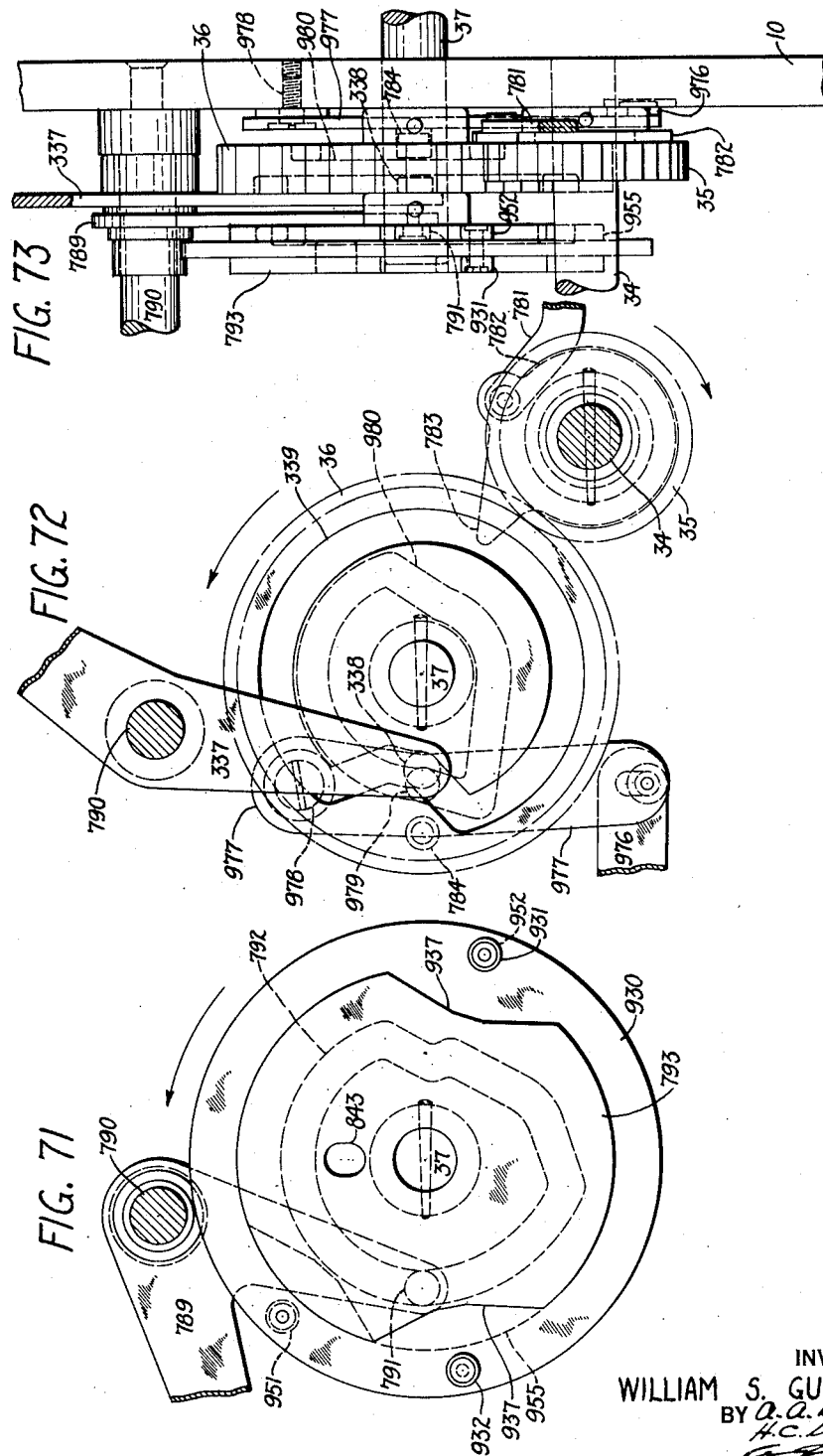
INVENTOR
WILLIAM S. GUBELMANN
BY
ATTORNEYS

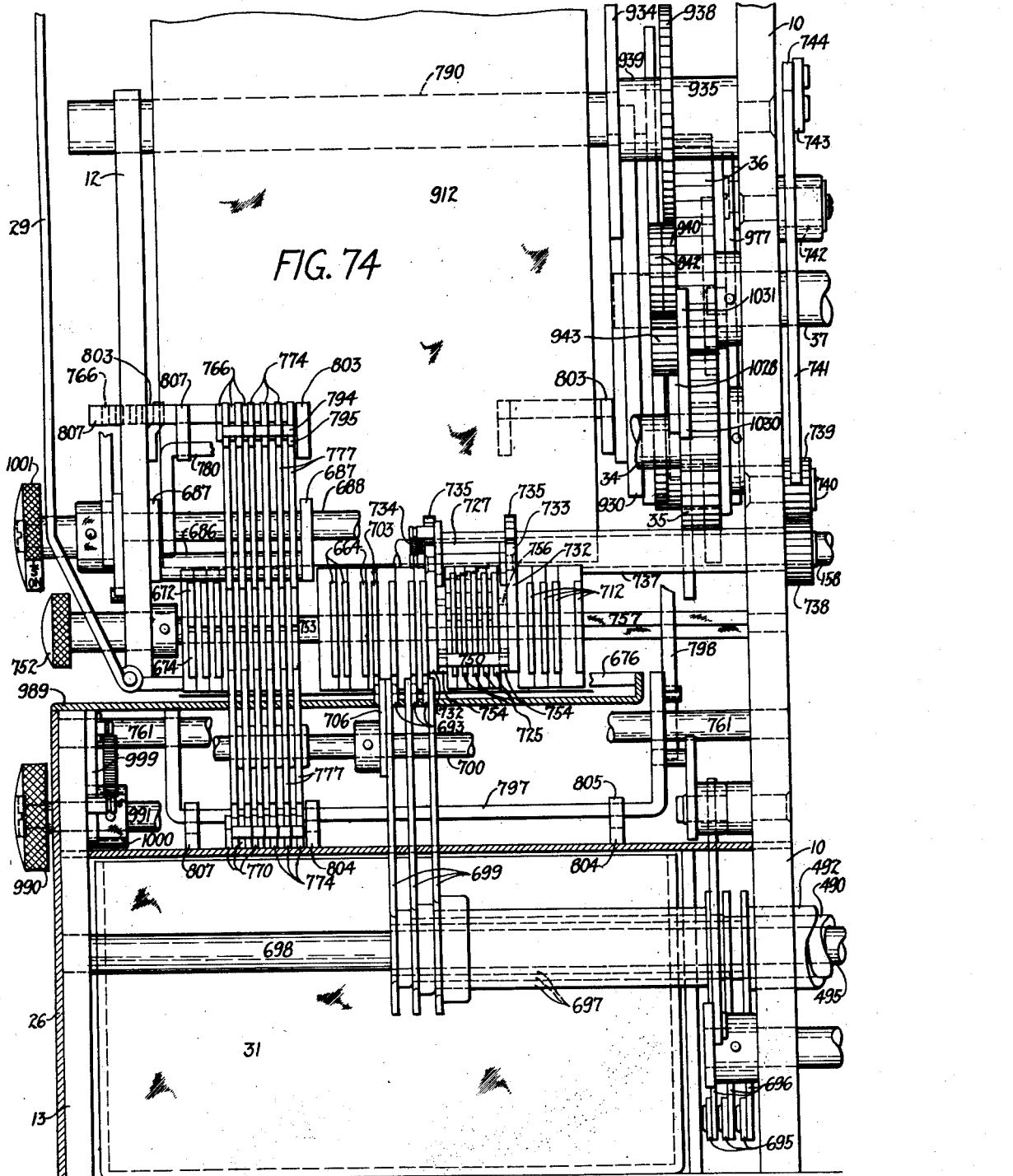

Dec. 31, 1940.   W. S. GUBELMAN   2,226,919
CASH REGISTER
Filed Jan. 22, 1929   37 Sheets-Sheet 30
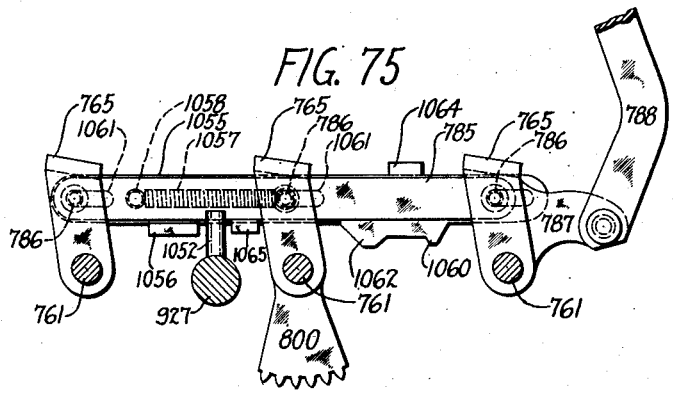
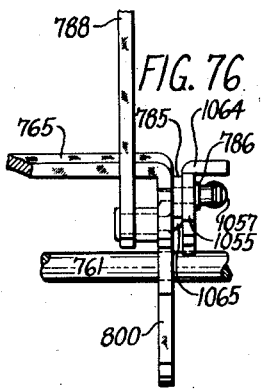
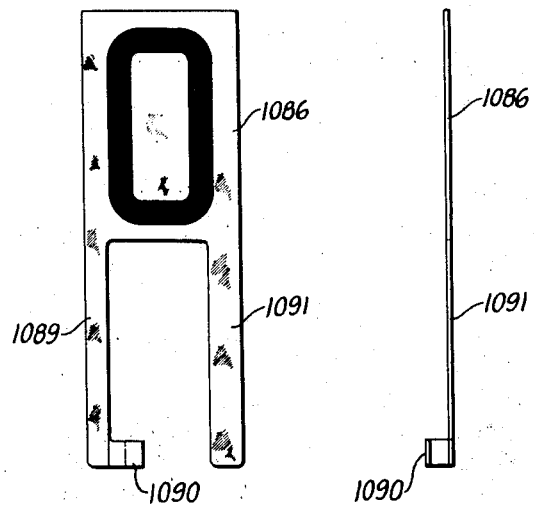
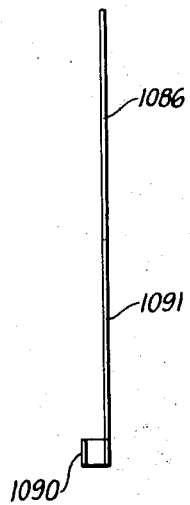
INVENTOR
WILLIAM S. GUBELMANN
BY
ATTORNEYS

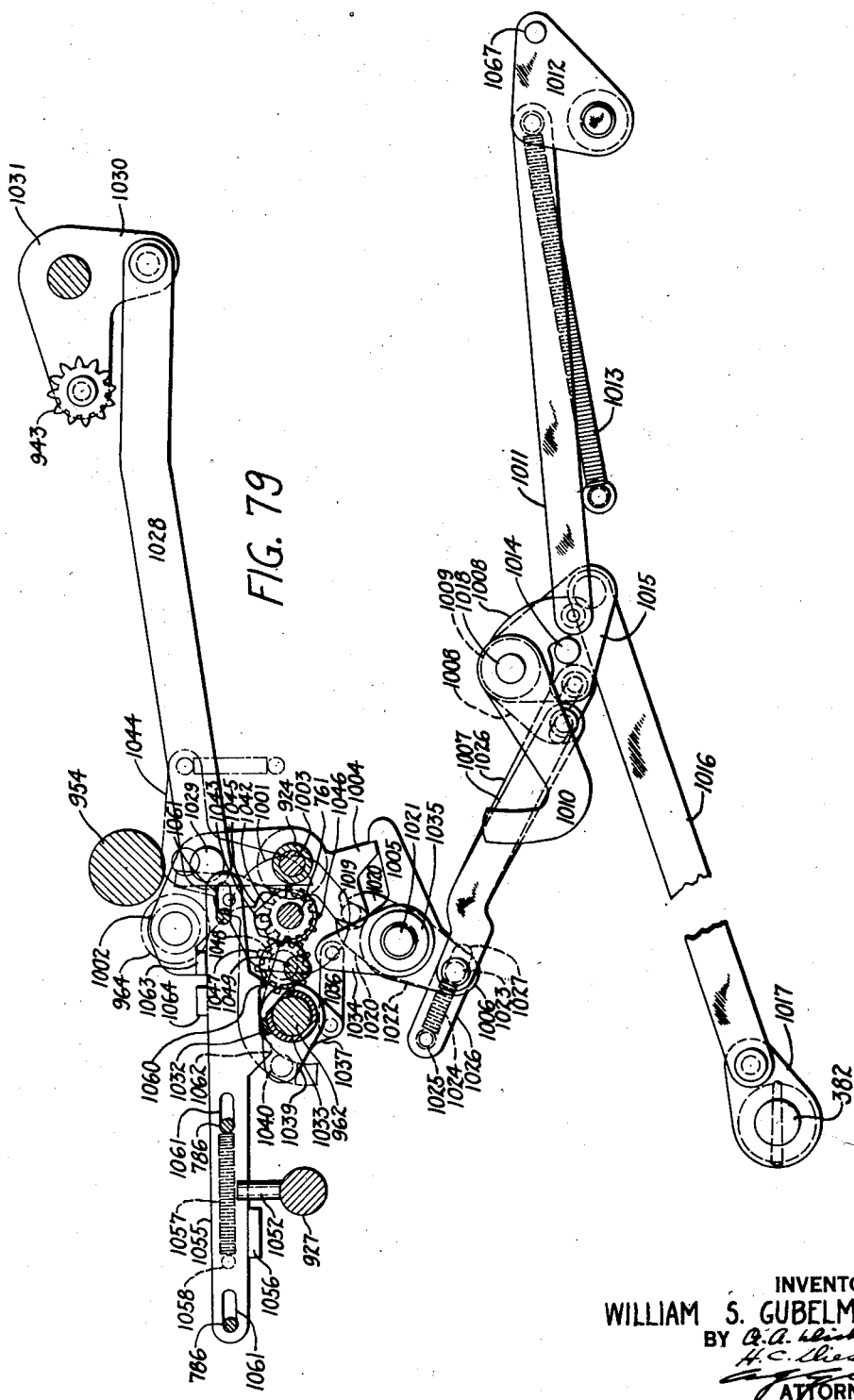

Dec. 31, 1940.   W. S. GUBELMAN   2,226,919
CASH REGISTER
Filed Jan. 22, 1929    37 Sheets-Sheet 32
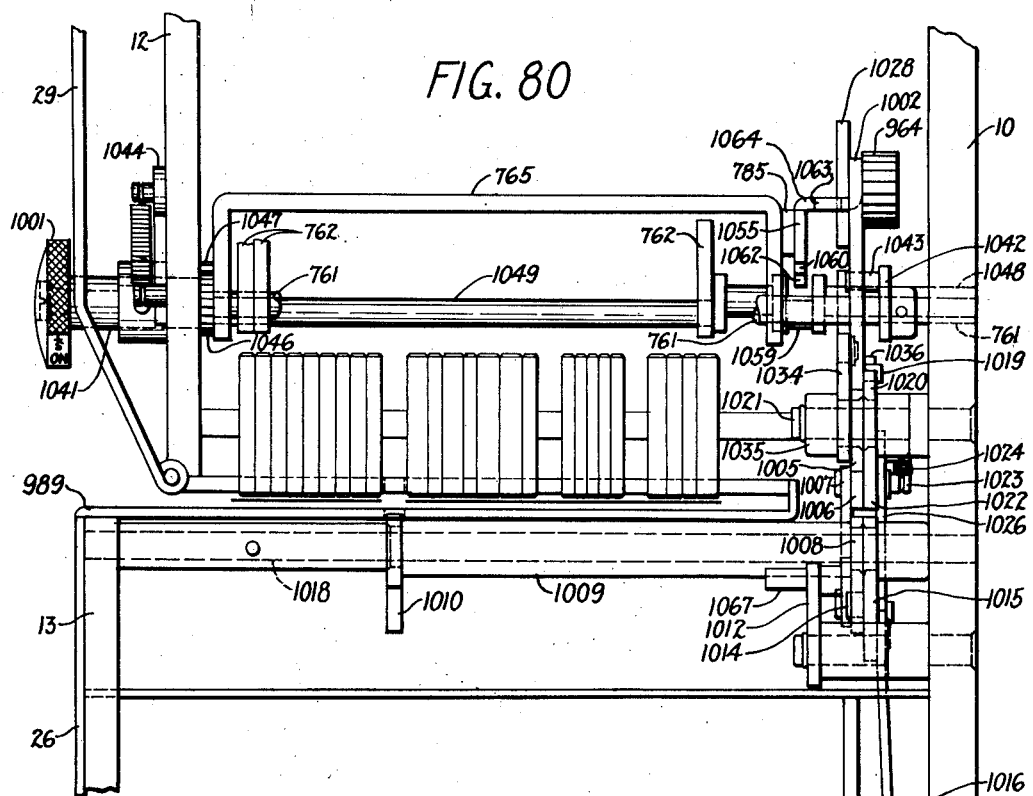
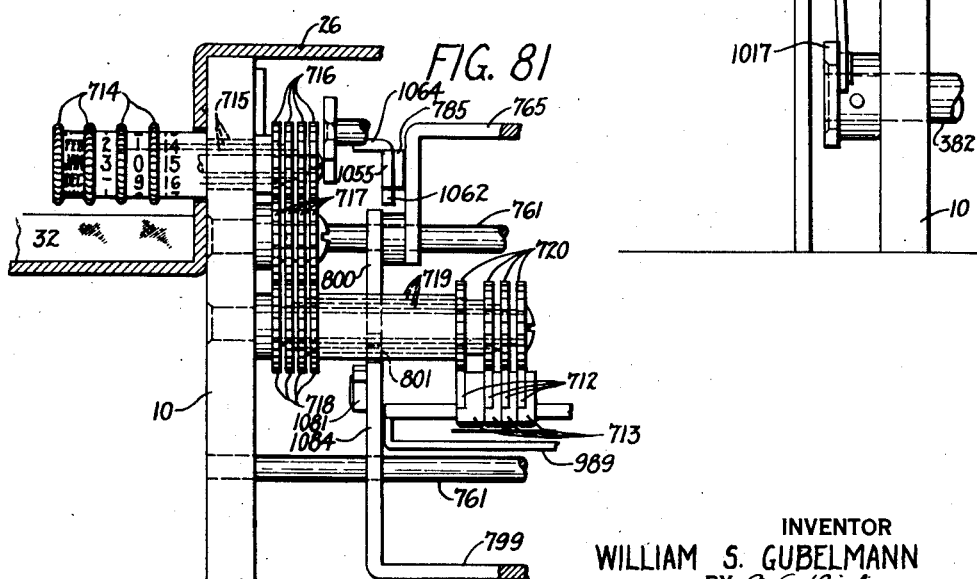
INVENTOR
WILLIAM S. GUBELMANN
BY
ATTORNEYS Dec. 31, 1940.  W. S. GUBELMAN  2,226,919
CASH REGISTER
Filed Jan. 22, 1929    37 Sheets-Sheet 33

INVENTOR
WILLIAM S. GUBELMANN
BY
ATTORNEYS

Dec. 31, 1940.                W. S. GUBELMAN                    2,226,919
                                CASH REGISTER
                      Filed Jan. 22, 1929        37 Sheets-Sheet 34

INVENTOR
WILLIAM S. GUBELMANN
BY
ATTORNEYS

Dec. 31, 1940.  W. S. GUBELMAN  2,226,919
CASH REGISTER
Filed Jan. 22, 1929   37 Sheets-Sheet 35

INVENTOR
WILLIAM S. GUBELMANN
BY
ATTORNEYS

Dec. 31, 1940.  W. S. GUBELMAN  2,226,919

CASH REGISTER

Filed Jan. 22, 1929   37 Sheets-Sheet 36

INVENTOR
WILLIAM S. GUBELMANN
BY
ATTORNEYS

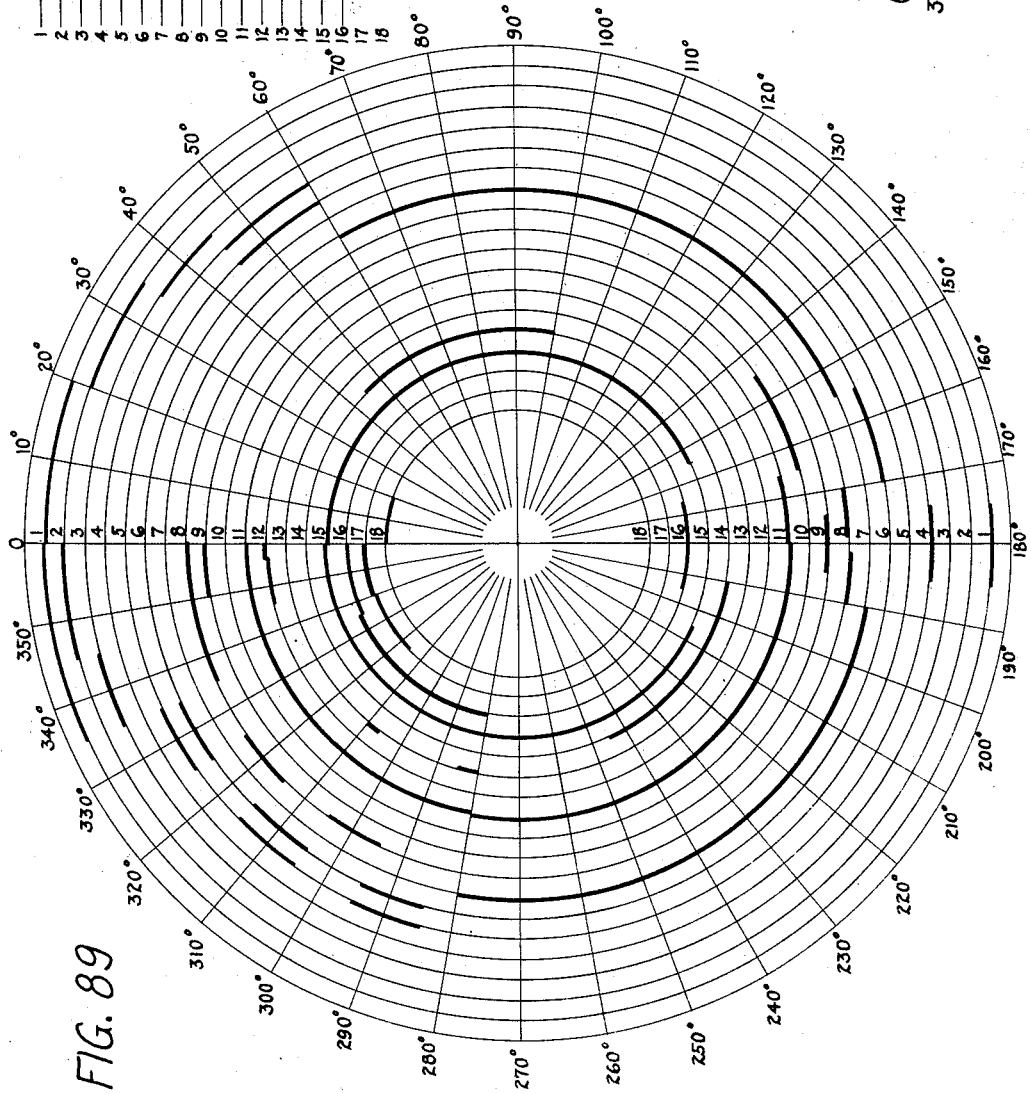

Patented Dec. 31, 1940

2,226,919

UNITED STATES PATENT OFFICE 2,226,919

CASH REGISTER

William S. Gubelmann, Brooklyn, N. Y.

Application January 22, 1929, Serial No. 334,160

85 Claims. (Cl. 235—6)

A primary object of the present invention is to improve the several features of cash register constructions generally and more particularly to improve that type of machine which is adapted to record and indicate the various items which are entered in the machine, as well as the totals of these items. It is further an object in this connection to provide for the segregation of the items into a plurality of totalizing devices so that separate totals of amounts entered may be obtained according to any desired system of classification. In accordance with the invention, it is intended that a plurality of totalizers shall receive each item entered in the machine, the selection of the particular totalizers to receive an item being placed under the control of a plurality of sets of keys or equivalent devices.

The improved mechanism which applicant has devised is particularly suited for the inclusion of an unusually large number of totalizers in a single machine. This is due not only to the novel construction of the totalizers themselves, but partly also to the provision of a novel totalizer selecting mechanism by virtue of which it is possible to control the selection of certain totalizers by corresponding individual keys, and to control the selection of other totalizers through the joint action of two or more of the same or different keys, or similar controlling elements. In the illustrative machine, which will be described hereinafter in detail, three groups of selecting keys, including 27 keys in all, are adapted to variously select one or more of 43 totalizers upon each operation of the machine. Furthermore it is contemplated to provide the machine with a plurality of item counters adapted to count the number of operations of each class under any system of classification that may be adopted. Thirty such counters are herein disclosed and each is adapted to control the printing of the total count which it carries.

It has therefore been an important object of the present invention to so construct and arrange the totalizers and counters as to permit the accumulation of a series of individual totals as well as the counting of the items entering into these totals in accordance with several different classifications represented by the different groups of special selecting keys. In addition totalizers have been provided for the accumulation of grand totals of different combinations of these individual totals, or portions of such individual totals; while still other totalizers have been provided for maintaining a constant balance of certain factors of interest in connection with sales.

For this latter purpose a plurality of adding and subtracting totalizers are included. The construction of this phase of the mechanism is such that in accordance with the combination of special keys depressed one or more of these adding and subtracting totalizers may be selected for operation either additively or subtractively while others remain neutral. The determination as to whether an item will be entered additively or subtractively in these totalizers is entirely automatic and the mechanism for accomplishing this result is effective in such a way that one totalizer may be added upon while the other is simultaneously subtracted from.

In view of the intended use of an unusually large number of totalizers in the machine constructed in accordance with the present invention, it has been an important object to condense and simplify the transfer mechanism to such an extent that it will require an absolute minimum of space. Heretofore it has usually been necessary to arrange at least three, and frequently more, elements in separate planes to cooperate with each denominational order of a totalizer so that a totalizer of say ten orders has usually been of considerable width. By means of the present invention applicant has succeeded in condensing the space required by each order of the totalizer to two thicknesses of suitable metal which, for the sake of example, may be said to be fifty thousandths of an inch in thickness. Thus a totalizer of 10 orders constructed in this way will occupy a space, in width, of only one inch. Furthermore, the number of parts required for effecting the necessary carry from one order to the next has been materially reduced.

In order that the time interval allotted to the operation of carrying from the first to the last order of the totalizer may be reduced to a minimum, the transfer mechanism embodied in this machine is of the nines coupling type so that the carry into all orders of a totalizer that are to receive a transfer is effected simultaneously. The construction is such, furthermore, that separate actuators independent of the item entering racks are employed to effect transfers.

Under the arrangement and classification of the totalizers contemplated by the invention certain groups or rows of totalizers need only be active singly, whereas in other groups it is necessary that any number of the totalizers be operable at will, while in still another group it is necessary to be able at will to operate two or more totalizers either additively or subtractively.

This has necessitated or made advisable the employment of various modifications of the transfer mechanism all of which embody certain common broad principles. In the development of the several modifications a maximum saving has been effected in the space required for each complete totalizer as well as for each group or row of totalizers. In those groups or rows in which only one totalizer need be operated at a time the transfer elements may in part, at least, be common to the same orders of the entire group; these may, therefore, be termed universal carry totalizers, while the other groups must comprise individual carry totalizers in which all of the elements are independent.

Due to the construction of the totalizers, their arrangement, and their mode of selection, it has been rendered possible, by the present invention, to work out a much greater flexibility in the use of the machine than has heretofore been possible in the use of any machine having a plurality of totalizers. Reference has been made broadly to the mechanism for controlling the selection of totalizers in accordance with the depression of one or more keys, or the adjustment of similar devices. Considerable novelty has been incorporated in the particular mechanism employed for this purpose. Heretofore it has been possible in some machines to control the selection of one or more totalizers from two separate sources, but no construction prior to the present invention is known whereby more than two distinct controls may enter into the determination of whether or not a totalizer will be selected for operation. Furthermore, none of the constructions of the prior art are suited to the inclusion of such a large number of totalizers as may be provided in accordance with applicant's invention which contemplates a number of totalizers that materially exceed the number of selecting keys or positions of adjustment of differentially movable selecting members. The number of separate and distinct controls which may enter into the selection of a totalizer under this invention is limited only by the space which it is desired to allot to the totalizer in point of width. Applicant has disclosed as many as six totalizer selection controls in the illustrated machine of which five effect the selection of certain totalizers, and it would be readily possible to increase this number without even increasing the width of the totalizer units as shown.

The particular form of applicant's novel totalizer selecting mechanism disclosed in the present case embodies a series of movable slide members each of which may be shifted to any one of ten positions to exert different controls. The construction of this mechanism is such that the selection of a particular totalizer for actuation calls for the adjustment of all of the slides related to that totalizer to what may be termed an affirmative position. If a single one of these slides should be in a position to negative the selection of the particular totalizer, then the totalizer will not be engaged with the actuators. Obviously, the reverse condition might be adopted within the broad scope of applicant's invention, so that upon the adjustment of one or more slides, to an affirmative position the totalizer would be engaged with the actuators regardless of the positions of the other slides. This arrangement however would not be as flexible as the one which has been illustrated.

An improved feature of the totalizer engaging mechanism is the positive action of the latter in moving the totalizers both into and out of mesh with the actuators. Another novel phase of the engaging mechanism disclosed herein is the provision of a double reciprocating movement of a selected totalizer toward and away from the actuators during each item entering operation. This double movement has been provided as an incident to the particular form of transfer mechanism employed and the mode of operation of the latter. If desired the engaging mechanism could be modified in such a way as to cause only a single reciprocation of a selected totalizer during an operation of the machine provided a corresponding alteration were made in the transfer mechanism.

The simplicity with which the machine may be converted from an item entering condition to a totaling condition with respect to any one of the totalizers constitutes another improved feature of the present invention. Due to the fact that there are more totalizers in the machine contemplated than there are special totalizers selecting keys and, due to the fact that the selection of some of these totalizers calls for a joint control from two or more keys or similar members, it has been found desirable to provide the present improved cash register with a plurality of total controlling members. These members are preferably so constructed that they may be moved manually to any one of a plurality of positions and when any member is moved to any position, other than normal, it will condition the machine for the taking of a total instead of the entering of an item. In certain positions of these members definite totalizers may be selected for totaling operations, whereas in other positions these members may merely serve to condition the machine for totaling while the selection of a totalizer may still be effected by the regular selecting keys, or equivalent selecting elements. It is contemplated by the present invention to provide suitable interlocks between the members to prevent any attempts to take totals from more than a single totalizer upon one operation of the machine. When the selection of a totalizer for total taking is dependent solely upon the movement of one of the total controlling members it is brought about simply by the appropriate adjustment of one or more of the selecting bars similar to those adjusted under control of the selecting keys.

As a simple and effective way of providing for the resetting of any one of the totalizers, a special key-controlled lock has been included, which in conjunction with either one of the total controlling members will predetermine a grand total or resetting operation of the machine through its effect upon the timing of the totalizer engaging mechanism. Obviously, other means might be provided for modifying the control of the totaling members so as to condition the machine for grand totals instead of sub-totals.

As has been suggested another important feature of the machine is the provision of a large number of item counters, one or more of which may be selected for operation upon each operation of the machine. These counters are intended primarily to indicate the number of operations of the machine in accordance with one or more classifications, corresponding in general to the classifications of a part or all of the totalizers. An improved feature of the system of item counters is in the provision of suitable mechanism for controlling the recording devices to print the totals standing upon the individual counters at any desired time. Preferably the printing of the total from a counter will be effected at a time immediately preceding or following the printing of a total from the corresponding totalizer although if desired the totals from all counters may be printed in a series of successive operations either preceding or following a similar series of totaling operations with relation to the totalizers. Only slight modification of the construction of a totalizer unit has rendered it suitable for the purpose of item counting. Operation of a counter to add a unit when it is selected for actuation is effected by tripping a mechanism similar to the ordinary transfer mechanism, but related to the unit order of the counter. The tripping action is brought about as an incident to the movement of the counter away from its normal position and into mesh with racks similar to and operable with the totalizer actuating racks. It will be apparent that it will be necessary to maintain a selected counter out of engagement with the racks during movement of the latter in item entering operations, and it is therefore necessary to provide for a very quick movement of the counter to effect the tripping action which has been mentioned after the racks have come to rest. For this purpose the movement of a selected counter is produced by a spring action, and the series of springs employed to accomplish this for the three rows of counters are normally only slightly tensioned but they are placed under greater tension upon an operation of the machine and are rendered active at the appropriate time. In most respects the construction and arrangement of the counters is similar to that of the totalizers of the type of which only one is operable at a time and which have certain universal elements for effecting transfers. With the exception of the spring connection, mentioned above, the method of selecting a counter is, furthermore, substantially the same as the method of selecting a totalizer. Various improved features of the counters will become apparent from the detailed description which will be given hereinafter.

Still another important feature of the machine is the provision of an improved form of differential mechanism which is of the positive type. In the machine disclosed this mechanism comprises a pair of complementally movable slides related to each of the banks of amount keys, and these slides are positively driven in opposite directions during item entering operations until a shoulder or lug on each is brought into engagement with a depressed key, or if no key is depressed in a particular bank, then with a zero stop. One of the novel features of the differential mechanism is that during totaling operations the mechanism is placed partially under the control of a series of springs which are inactive during ordinary item entering operations. The construction and arrangement of the parts is such that in the taking of totals, the springs tend to cause one of the complemental members to move first to such an extent that the connected actuating rack will rotate the engaged totalizer wheel until it is positively stopped at its zero position. Additional movement of the positive driving mechanism will at this time be taken up by the remaining complemental member. Thus, while the driving of the parts in total taking is positive just as in item entering, the control of the members in accordance with the position of the totalizer wheel is effected through the action of the normally inactive springs. It would be possible to maintain these springs in active condition during all operations of the machine but the present invention contemplates holding them in disengaged or inactive condition during item entering operations, when they are not required, so as to relieve the operating mechanism of the extra burden of tensioning them.

In many constructions of the prior art where provision is made for taking totals from any one of a series of totalizers, it has been found necessary to provide for a two cycle operation of the machine during totaling. This is due to the fact that a considerable period in the operation of the ordinary machine is required for the purpose of selecting a totalizer before it may be engaged with the actuators while its engaging movement must take place, for totaling, prior to any movement of the actuators. According to the present invention, the need for this sort of two cycle operation during total taking operations, has been eliminated. This has been made possible largely by the provision of a new and improved form of differential mechanism associated with the special keys; this mechanism being different from that related to the amount keys. The primary feature of this special differential construction is that depression of one of the special keys serves to directly shift a slide bar differentially in one direction or another to a limited extent, while at the beginning of the subsequent operation of the machine a cam hook is rendered active early in the cycle to position the totalizer selecting parts in accordance with the setting of the differential slide bar. Thus, while a part of the differential movement is initiated upon depression of a special key very little work is required to affect this part of the action. At the same time a very prompt totalizer selection is made possible.

In addition to the two types of differential mechanism already mentioned for the amount and the special key banks, there is provided another differential construction under control of a plurality of locks which may for example be designated cashiers' locks. Other differential connections are provided also from the total controlling levers and the resetting control lock which has already been mentioned; the novel features of these mechanisms will become apparent from the detailed description which will be given hereinafter.

A number of improved and novel features have been incorporated in the recording mechanism with which the machine of the present invention has been equipped. This recording mechanism is designed in such a way that it is extremely flexible in the matter of controlling the number of impressions taken upon various record media. Provision has been made for the recording of items upon a detail strip, a check strip and an inserted slip; impressions upon all three media may be made during a single operation if desired, although in the practical use of the machine it will usually be found sufficient to record on a detail strip and either the check strip which is issued from the machine, or upon an inserted sales slip, or record card taken from a file.

The impression to be taken upon the detail strip need only be single and will suitably include information as to the amount of an item, the special selecting keys active during an operation, the cashier instrumental in handling the transaction, and a consecutive number. According to the invention the impression upon the issued check strip may be made either single or double at the will of the proprietor or manager of the store in which the machine is used. If desired, the nature of the impression may be varied from time to time, or in accordance with the transaction handled, so that during certain operations a stub check may be issued whereas during others only a single check may be issued. Still greater flexibility is provided in connection with the impressions to be taken on the inserted slip.

The construction of the slip printing mechanism is such that duplicate impressions may be taken if desired upon separate portions of a statement sheet so that an original and a copy may be kept of a monthly statement having daily entries, or an account having line for line entries corresponding to transactions of a particular customer during a given period. This system of impressions will be particularly suited to the making of an hotel or bank statement or to the entry of payments on instalments due in connection with sales of articles sold on such a basis. At other times when it may be desired to handle, for example, a charge sale involving the use of an ordinary sales slip, the machine is designed to record full information upon each of the three sections of a triplicate slip. The impressions made upon a slip of this sort will be closer together than the duplicate impressions made upon a statement sheet, and will preferably be placed on the main body of the slip, on a detachable section adapted to be folded over the main body, and on a stub portion extending from the opposite end of the main body of the slip. This type of record will be found extremely useful in systems where it is customary to hand to a customer one copy of the sales slip, send another copy to the bookkeeper, and send a third copy or stub to the cashier.

For the purpose of determining the nature of the impressions which will be effected upon inserted material, the present invention contemplates the use of a single knob which may be turned to either of two positions. In one position of the knob the double form of impression will be effected, while in the other the triplicate form will be effected. Since it will not be necessary to print upon inserted material on all operations of the machine, the present invention further contemplates the provision of a feeler mechanism for completely disabling the slip printing mechanism whenever no slip or record card is inserted to receive an impression. In other words, the absence of an inserted slip will completely disable the impression devices cooperating with the inserted slip printing type regardless of the position of the control knob.

On either an issued check or an inserted slip the machine herein disclosed will record the amounts of items entered, the dates thereof, special characters designating the special keys depressed, cashier's designations, and, in the case of the issued check, the consecutive number. The consecutive numbering mechanism is of a novel form. The type elements are mounted on sliding type bars which are fed consecutively by the main operating mechanism any of the bars being restored automatically to zero when it has shifted ten steps.

For the purpose of effecting the plural impressions on the various record media, a plurality of sets of type are provided so that only a single impression is required from each set of type during a single operation of the machine. A particular advantage of this construction is in the reduction of the time element required for the recording operation. In this connection it should be pointed out that the general construction of the machine which applicant has invented is such that the desired multiple sets of type may be provided with facility.

Individual hammers are provided at each printing point for effecting impressions from the positioned type on the several carriers or type bars, a separate hammer being provided for each of the bars. In this way applicant is enabled to effect zero elimination as well as the filling in of zeros in a simple and automatic manner.

Many novel features will be found to be present in the various phases of the recording mechanism, and only a few of these have been generally alluded to at this point. It may be mentioned as a further feature that the detail strip is designed to provide for the insertion of autographic notations and for this purpose novel means have been provided for shifting the paper from visible writing position to printing position and back to visible position. This mechanism also includes novel line spacing provisions. Another important feature of the recording mechanism which may be mentioned is the provision of means for locking up the machine whenever any attempt is made to tamper with the setting of the type elements during a totaling operation. It will be recalled that at this time the action of the differential mechanism is only semi-positive and it is important that any attempts to print an incorrect total should be prevented. For other objects carried out and advantages present in the recording mechanism reference may be had to the detailed description to be given hereinafter.

A novel form of indicating mechanism has also been incorporated in the machine of the present invention. This mechanism includes means for indicating amounts and characters designating the various special keys operated, which for the sake of example may represent transactions, departments and clerks. It is also capable during totaling operations of indicating the amounts of totals standing on either the totalizers or the item counters, and if the totalizer or counter involved is one directly related to a single special key, the designating character for that key will also be indicated.

By the use of a very thin form of indicator tablet it has been found possible to provide a very complete indication which is visible from all angles and at a considerable distance. It is rendered comparatively free from excessive casting of shadows without the necessity of moving an entire series of tablets from front to rear of the machine as is frequently required in constructions of the prior art. In accordance with the present invention, it has been found possible to select an indicator for exposure by a relatively small movement of a small slide which is carried by an indicator lifting frame that is in turn connected to the operating mechanism. A feature of the lifting mechanism for exposing selected indicators is the arrangement which substantially eliminates the noise usually incident to the dropping of indicators. For this purpose the lifting means holds the indicators elevated when the machine is idle or between operations and it serves to restore them gradually at the beginning of a new operation. The connections from the amount key banks to the small selecting slides carried by the lifting frames are somewhat different from the corresponding connections from the special key banks; the novel features of each will be made apparent from the detailed description to be given hereinafter.

Numerous other novel features are present in the mechanism as a whole. It is contemplated that the machine of the present invention will be equipped with all of the usual adjuncts of a cash register including certain phases in addition to those already mentioned. Various new and improved features have been incorporated in practically all of these adjuncts among which may be mentioned the drawer releasing mechanism. A number of novel and effective forms of locking and interlocking devices have been provided for the keys and other operative portions of the machine. Reference may be had to the detailed description and the claims for appropriate designation of the novel features of these constructions.

While an attempt has been made in the foregoing section to enumerate a number of the outstanding improved and novel features embodied in the cash register of the present invention, it will be understood that many other features, too numerous to specifically mention at this point, are present and will become more apparent as the description the illustrative machine progresses.

*General outline of illustrative machine*

In order that the relation between the various parts, which will be described hereinafter in detail, may be more readily understood a general outline will first be given of the component parts of the machine illustrated in the drawings. While this machine serves admirably to illustrate the important features of the invention it will be understood that the specific application of these features herein given is not intended to be restrictive but various modifications may be made to adapt the machine for innumerable other uses.

It has been found convenient for the purpose of explaining the extreme flexibility in application of the novel features of the invention to disclose them in connection with a machine adapted for use in a large musical instrument store which handles not only a variety of such instruments but a number of accessory items as well. It will be assumed that such a store is divided into a number of departments which may themselves be assigned to one of two groups as for example an instrument group and a miscellaneous group including accessories or miscellaneous items, such as sheet music, player rolls, phonograph records, and repairs. The instrument group may embrace such departments as piano, wind instrument, string instrument, phonograph, and so on.

Each department may have assigned to it a number of clerks although for the sake of avoiding duplication of parts in the disclosure only one clerk will be assumed to be associated with each department. The store may be of such size and conduct its business in such a way that a wide variety of transactions are encountered such as the usual cash, charge, paid out, received on account, and C. O. D. transactions. These types of transactions will necessitate extreme flexibility in the printing features of the machine in order to enable its coordination with a suitable bookkeeping system. Thus, for cash transactions it may be desired to issue a printed check which may be handed to the customer as a receipt covering his purchase. A charge sale will preferably call for printing upon an inserted sales slip which for convenience should be separable into three units, each bearing the printed amount of the sale and other data such as the date, clerk's initial, department, etc. For received on account transactions it will be found desirable to print upon an inserted statement sheet the amount of and other information regarding the money received. This as contemplated by the present invention may be effected upon duplicate sections of a statement sheet or card adapted to receive successive entries upon successive lines. Other transactions may require still other printing conditions, for example a paid out amount may not call for printing upon any form of inserted material or even upon a check. All amounts, however, regardless of the nature of the transaction should be entered upon a detail strip which may at the same time identify the transaction as to type, department, clerk involved, consecutive number, cashier operating the machine, and any desired additional matter which may be entered through an autographic opening.

As intimated in the foregoing the present machine is intended to be operated by either of a pair of cashiers who may be responsible for all transactions occurring during their respective terms of duty. Each cashier, furthermore, may be enabled to control certain identifying and totalizing devices related only to himself in such a way as to prevent any one else from using these devices to produce a false or erroneous entry.

In order that instantaneous totals may be obtainable of a wide variety of items a large number of totalizers are provided and these are related not only to the individual keys assigned to the departments, clerks and transactions, but are related as well to combinations of these classes. Thus, for the nine departments, nine clerks, and nine transactions, there are provided twenty-seven totalizers arranged in three groups or banks, each containing the nine falling under a particular classification. Since it is only necessary to operate one of the totalizers in each of these groups of nine upon any single operation of the machine, these groups are provided with what may be termed a universal carrying mechanism which has certain parts common to all of the nine totalizers in the group. In addition each of these three banks of totalizers includes a tenth totalizer which is adapted to carry the grand total of the amounts on all of the nine universal type of totalizers in the group, or if desired it may carry some entirely independent total. These grand totalizers are provided with what may be termed individual carrying mechanism since each must be capable of operation without regard to any other totalizer. Those totalizers related to the departments and the clerks are adapted in the present disclosure to accumulate only those transactions which represent actual sales, that is, cash, charge, and C. O. D. items, while the transaction group of totalizers will of course accumulate all items of each particular type of transaction. Since the grand total of the clerks' group of totalizers will be the same as the grand total of the department totalizers under the arrangement assumed above only one of the individual totalizers will be used for this purpose. The remaining individual totalizer associated with these groups has, in the illustrative machine, been assigned to one of the cashiers to accumulate the total sales registered by him. Similarly, the second cashier's sales will be entered upon the individual totalizer of the transaction group, since a grand total of all transactions would be meaningless.

A fourth group of totalizers is provided in the machine and this group is of such construction that as many of the totalizers in the group as desired may be operated at the same time. Thus in the group illustrated there are eight totalizers all of which might be operated during an operation of the machine if occasion required it since the transfer mechanisms, while provided with certain common operating devices, are sufficiently independent to permit the proper action for each individual totalizer of the group. In the particular layout adopted for illustration these totalizers are devoted to such items as the total sales registered in each of the two groups of departments, the money taken in by each cashier, the money paid out by each cashier, and the cash sales registered by each cashier. From these designations it will be seen that it will not actually be necessary to operate more than two or at most three of these units upon a single operation of the machine. It will be apparent that the determination as to whether any one of these totalizers shall be rendered effective upon a particular operation is dependent upon the particular keys operated either in the department or the transaction banks as well as upon the state of the pair of cashiers' locks.

A fifth bank of totalizers is further provided for the purpose of handling such combinations of items as may require both addition and subtraction. This bank, as shown, is made to include four totalizers, one of which is devoted to the total cash on hand, while two others are devoted to the cash for which each cashier is to be held responsible, and the fourth is devoted to "C. O. D." items in such a way as to indicate at all times the amount of "C. O. D." business for which collections have not been made. The first of this group of totalizers will be so arranged and operated that it will receive as positive entries all "cash," "received on account," and "C. O. D. paid" amounts, while it will receive as negative or subtractive entries all "paid out" amounts. The selection of this totalizer for effective operation will therefore be dependent upon the particular transaction key depressed and if this key renders the totalizer effective it must at the same time determine its state, that is as to whether it is to be operated additively or subtractively. Substantially the same mode of control must be provided for the two totalizers devoted to the cash of the individual cashiers with the additional requirement that the selection of these totalizers must also be governed by the cashiers' locks. The remaining totalizer of this group will of course be rendered active only when one of the three C. O. D. keys happens to be depressed. Thus if the ordinary C. O. D. key is depressed this totalizer will be selected for additive operation whereas if the "C. O. D. paid" key or the "Goods returned C. O. D." key is depressed the selection of this totalizer will be for subtractive operation. From what has been said it may be noted that as to this fifth bank of totalizers it may be necessary under certain conditions to operate one of them additively and at the same time operate another of them subtractively to the same extent. Thus when a "C. O. D. paid" amount is reported and registered it must be added to the general cash totalizer as well as to one of the cashiers' cash totalizers but it must at the same time be subtracted from the C. O. D. totalizer in order that the latter may represent only outstanding items of this character.

In addition to the foregoing banks of totalizers capable of receiving the variable amounts of the various transactions and some of them either additively or subtractively the machine illustrated is provided with some thirty item counters which are arranged in three banks and are adapted to receive only unitary actuation upon operations of the machine. These counters are of substantially the same construction as the totalizers of the first three banks mentioned but, as stated, are adapted to receive only unit actuation upon operations of the machine. Twenty-seven of these counters are of the universal carry type and are directly related to corresponding ones of the keys in the three special key banks so that upon normal operations three counters will have a unit added to their registrations. The remaining three counters which are of the individual transfer construction are devoted to the counting of the total number of operations performed by each cashier and the counting of the number of sales made by all of the clerks.

From the foregoing brief outline of the general character of the totalizers and item counters provided in the machine illustrated herein, it will be found that this machine is capable of operating a maximum of eighteen totalizers and six item counters upon a single operation of the machine although due to the particular designations assigned to the totalizers and counters the actual number which will be selected during any normal operation will probably not exceed ten totalizers and five counters.

From time to time it may be desired to take the totals standing upon one or another or possibly all of the totalizers either with or without resetting. For this purpose certain lock controlled devices are provided through the adjustment of which it is made possible for an authorized person to condition the machine for the printing of totals from any of the totalizers and the returning of the same amounts to the wheels, i. e., sub-totaling, while the same person or another specially delegated party may so condition the machine as to effect the resetting of the totalizers coincidentally with the printing of totals. Now since there are a large number of totalizers provided in the illustrative machine for which there are no single selecting keys and which are engaged with the actuators under the joint control of a plurality of keys it has been found necessary or desirable to provide a plurality of total controlling levers each of which may be moved to any one of several totaling positions. These levers are normally locked, but when the manager of the store, for example, releases them by the use of a special removable key they may be moved to any desired position. Now for the three banks of what have been termed the universal totalizers, comprising twenty-seven in all, the selection of any one for totaling may be aided by the depression of the corresponding key in one of the three special banks, just as for item entering operations. The invention, therefore, contemplates the movement of one of the totaling levers to a certain position, which is one step removed from the normal adding position, and in which any one of the twenty-seven universal totalizers may be selected for sub-totaling by depression of the related key. A similar arrangement is made possible with respect to the twenty-seven item counters having the universal transfer construction, but in order to distinguish between the totalizer and the item counter related to a particular key during total taking there is provided a separate position of the same total lever for item counter totals. This position may, for example, be two steps away from normal. However, this arrangement alone does not take care of the three individual transfer type of totalizers located one in each of the three banks discussed above nor the three individual transfer item counters. Separate positions of the same total lever are accordingly provided for determining the selection of each of these individual totalizers during totaling. This control is necessarily without the aid of any special keys since no keys correspond directly to these totalizers. Substantially the same construction is provided for that item counter which represents a grand total of the number of all sales entered, the only difference being that a definite position of the other total lever is provided for this purpose. As for the remaining individual transfer item counters the aid of the cashiers' locks may be relied upon to effect a selection so that the total lever first mentioned is merely placed in the second position specified and the appropriate cashier's lock turned.

For the remaining twelve totalizers, namely the bank of eight individual transfer totalizers and the four adding and subtracting totalizers, there must be provided four additional positions for the first mentioned lever, as well as some eight positions other than the normal and "total sales counter" positions of the second lever. By the arrangement specified it is thus made possible to select any one of the forty-two totalizers or of the thirty item counters by the selective movement of one of two levers to one of nine positions away from normal, the selection of certain of the totalizers and counters being aided by the depression of certain keys or the turning of the cashiers' locks.

The resetting control is precisely the same for all totalizers and is effected by the mere turning of a lock in addition to the appropriate adjustment of the levers mentioned. Thus, in order to condition the machine for a reset or grand total operation it is necessary that the party operating the machine should have not only the key to unlock the pair of adjustable levers but a special key to turn the resetting control lock.

One feature of the invention which should probably be mentioned at this point is the general mode of operation of the differential mechanism. During normal adding operations this mechanism is entirely positive in its action and is of the type involving complementally movable elements which move in opposite directions until a shoulder on each engages a portion of the depressed key in the particular bank involved. During totaling operations it has been found desirable to introduce a spring for operating that one of the complemental elements for each bank which is connected at the time through gearing to the totalizer actuator. On operations of this kind it is desired to have the totalizer elements, in being turned back to zero positions, to control the extent of movement of the actuators and hence the complemental elements. For this reason, the special springs are rendered effective for totaling to insure the movement of the actuators and connected ones of the complemental members prior to any movement of the remaining complemental members; in this way the latter will then subsequently be shifted, after the totalizer wheels have reached zero, to take up the balance of the full complement which each pair of members must receive. Since the type carriers are therefore positioned under only spring control in totaling, certain precautionary devices have been provided to lock up the machine in the event of any interference with the free movement of the type carriers as by the insertion of a wire.

An important phase of the machine is the provision of suitable machine release and key interlocking devices. The arrangement adopted for purposes of illustration contemplates compelling the operation of a key in each of the special key blanks as well as the turning of one of the cashiers' locks into active position as an incident to the operation of the machine. Four separate locking arms are therefore provided to normally block the operation of the main shaft. However, when totals are being taken from any of the twenty-seven totalizers of the universal transfer type, or when totaling from the corresponding item counters, the machine should be releasably by the depression of a single key. Furthermore, it should be impossible at such times to depress more than a single key. To this end the movement of one of the total control levers to the position wherein it predetermines either of the two conditions mentioned it automatically serves to couple up the four locking arms in such a way that movement of one will cause releasing movement of all four. Again, when the machine is conditioned for taking totals from other totalizers or counters which are not directly related to one of the special keys or a cashier's lock the machine should be releasable without the need of depressing any key or the turning of either of the cashiers' locks. To this end movement of either of the total controlling levers to any positions, other than the two above specified, away from normal is adapted to automatically withdraw all of the four locking arms mentioned so that the machine may be operated directly or may be released by a motor bus bar.

In addition to the foregoing machine locking and releasing mechanisms there are provided interlocking means which prevent movement away from normal of more than one of the total control levers at a time; there are also means for preventing depression of more than a single key in any bank and means for compelling proper coordination between the total levers and special keys for all positions of the levers. Various other locks and interlocks will be described in connection with the detailed description which will follow.

It will be understood that the usual adjuncts of cash registers as distinguished from plain adding and bookkeeping machines will also be provided. Thus suitable indicating devices may be employed to exhibit at both the front and rear of the machine the nature and amount of each transaction entered, and this indication is so devised that the figures of the amounts will be displayed in their true denominational sequence in both directions. If desired the indicators may also be used to display totals during totaling operations. Other adjuncts which may be provided include such devices as drawer mechanism, key releasing devices, repeating mechanism, and so forth.

With this brief general outline of the features of the machine as a whole the several sections will now be described in detail with reference to the drawings which accompany and form part of the specification.

In the drawings:

Figure 9 is a plan view showing particularly the actuators for the totalizers and counters and showing the denominational shafts for driving the same.

Figure 10 is a schematic showing of the totalizers and counters and the related selection controlling bars.

Figure 11 is a view in side elevation, partly broken away, of a bank of universal totalizers with a related grand totalizer. For clearness one of the spacing frames has been removed.

Figure 12 is a vertical sectional view taken through a universal totalizer bank along the line 12—12 of Figure 11 and looking in the direction shown by the arrows.

Figure 13 is a view in rear elevation of a bank of universal totalizers.

Figure 14 is a view in side elevation of a bank of individual totalizers.

Figure 15 is a sectional view through the printing mechanism looking toward the front and showing the forward check feeding devices.

Figure 16 is a view in side elevation of a bank of adding and subtracting totalizers.

Figure 17 is a vertical sectional view showing the mechanism for determining addition or subtraction and is taken along the line 17—17 of Figure 16 looking in the direction indicated by the arrows.

Figure 18 is a fragmentary perspective view showing the relative position of the arms and slides for determining addition and subtraction.

Figure 19 is a vertical sectional view thru an amount key bank showing the complemental slides. This section is taken along the line 19—19 of Figure 2, looking in the direction of the arrows.

Figure 20 is a vertical sectional view taken toward the rear of an amount key bank along the line 20—20 of Figure 2 and shows the zero stop and complemental slides.

Figure 21 is a plan view of the total controlling levers, with their designating plates, and also showing the reset lever and lock.

Figure 22 is a plan view of the groups of special keys, namely, the transaction, clerk, and department keys.

Figure 29 is a vertical sectional view of a bank of item counters.

Figure 30 is a cross sectional view of the cross tubes and shaft operated by the total controlling devices.

Figure 31 is a front detail view of the cross tubes and shaft operated by the total controlling devices.

Figure 32 is a side view of the units order wheel used in the item counters.

Figure 33 is a front view of the units order wheel used in the item counters.

Figure 38 is a detail view in elevation of the totalizer engaging cam disk and its associated bell cranks.

Figure 39 is a front elevation of the parts shown in Figure 38.

Figure 40 is a detail view of the opposite side of the totalizer engaging cam disk from that shown in Figure 38.

Figure 41:
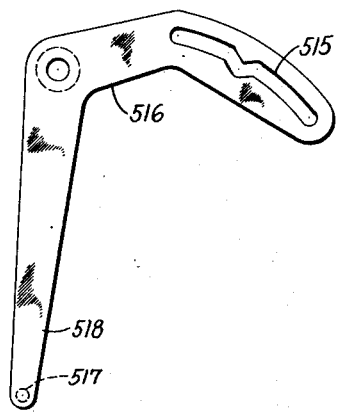
Figure 42:
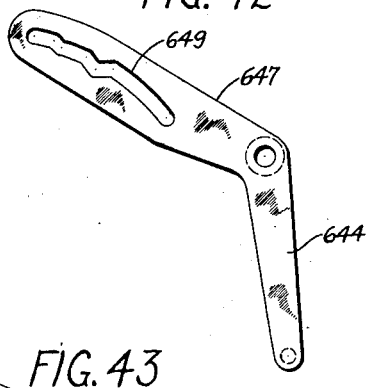
Figure 43:
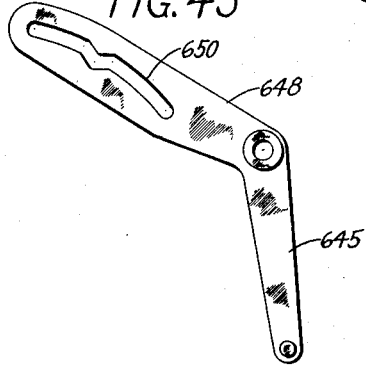

Figures 41, 42, and 43, are detail views of certain of the bell cranks associated with the totaling levers.

Figure 44:
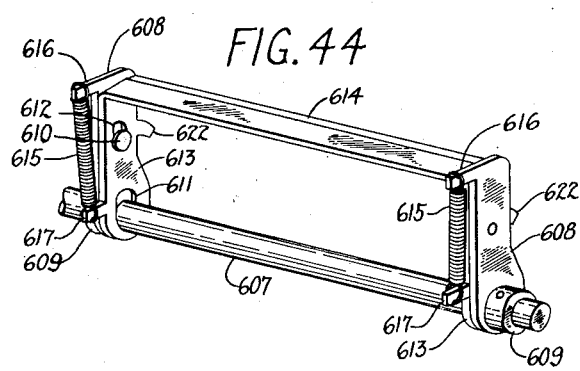

Figure 44 is a perspective view of the interlock bail.

Figure 45 is a view showing in full size a portion of the detail strip which the machine is adapted to print, illustrating the entry of ordinary transactions having both autographic and narrow spacing.

Figure 46 is a detail view showing in full size a portion of the detail strip having a read total printed thereon.

Figure 47 is a detail view showing in full size a portion of the detail strip having a reset total printed thereon.

Figure 48 is a detail view showing in reduced size a portion of a duplicate installment sheet adapted to be inserted and printed by the machine.

Figure 49 is a detail view showing a form of stub check in full size.

Figure 50 is a detail view in reduced size of a portion of a triplicate record adapted to be printed on a sales slip inserted in the machine.

Figure 51:
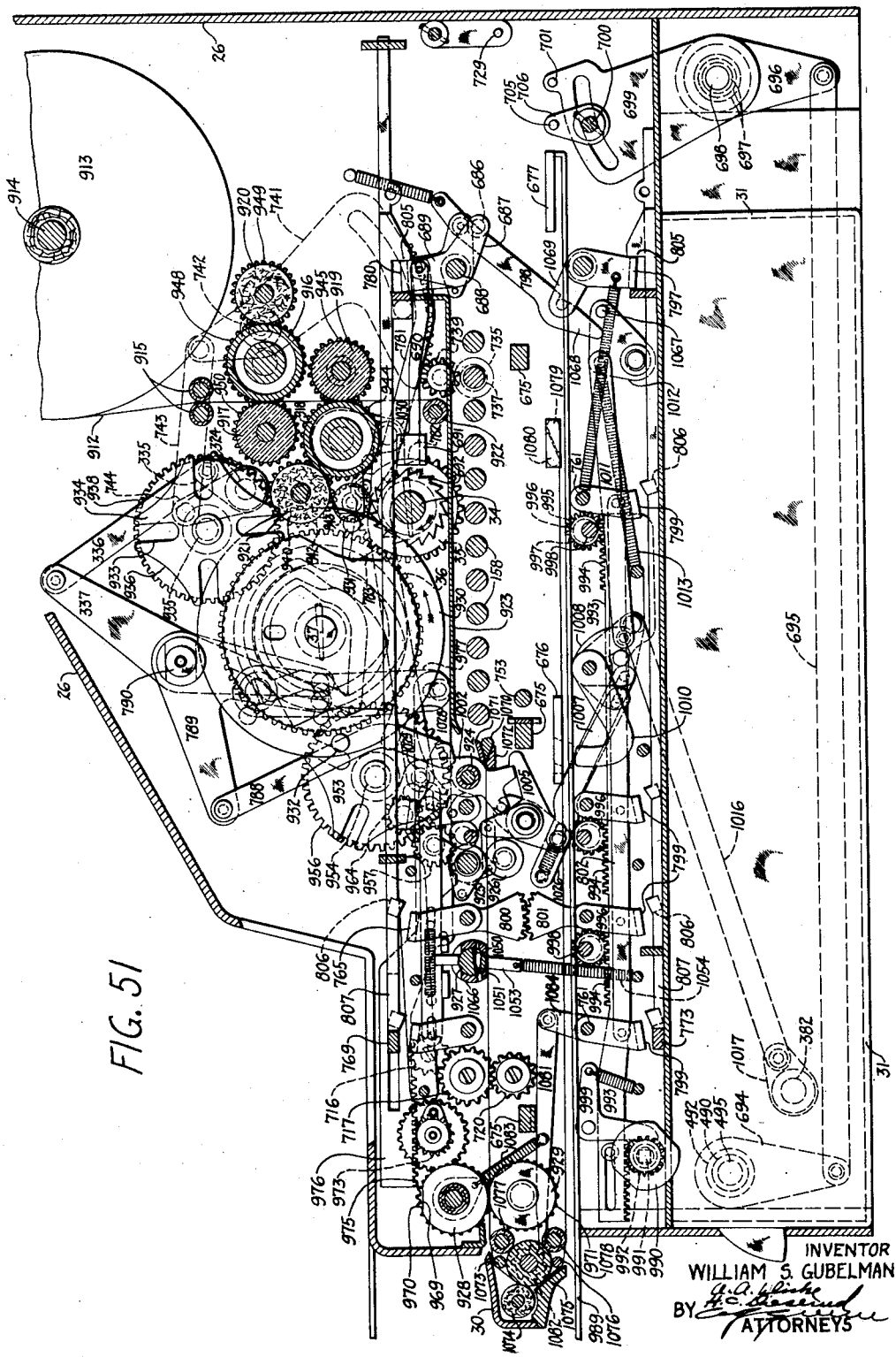

Figure 51 is a view in sectional elevation of the mechanism outside of the right side frame. This mechanism includes the printing controlling and operating parts, as well as the check feeding, check severing, and ribbon feeding devices. For clearness, the type bars and type hammers have been omitted.

Figure 52 is a transverse sectional view through the type bars, hammers, and hammer release mechanism for the inserted slip printing elements. This view is taken along the line 52—52 of Fig. 63, looking in the direction of the arrows.

Figure 53 is a detail side view of the cam used to operate the differential mechanism, indicating mechanism, and cash drawer release.

Figure 54 is a front view of the cam shown in Fig. 53.

Figure 55 is a perspective view of the no-printing tube and bail for blocking the stub check hammers.

Figure 56 is a front view, partly in section, of a portion of the differential mechanism.

Figure 57 is a side view of the differential mechanism shown in Figure 56.

Figure 58 is a detail view of one of the type bars controlled by the clerk, department, and transaction banks of keys.

Figure 59 is a detail view of one of the amount type bars showing its sectional construction and also the locking feature between the sections.

Figure 60 is a detail view of one of the special total character type bars and the connections for operating the cashiers' type bar.

Figure 61 is a detail view of one of the dating type bars.

Figure 62 is a detail view of one of the consecutive numbering type bars and the actuating mechanism therefor.

Figure 63:
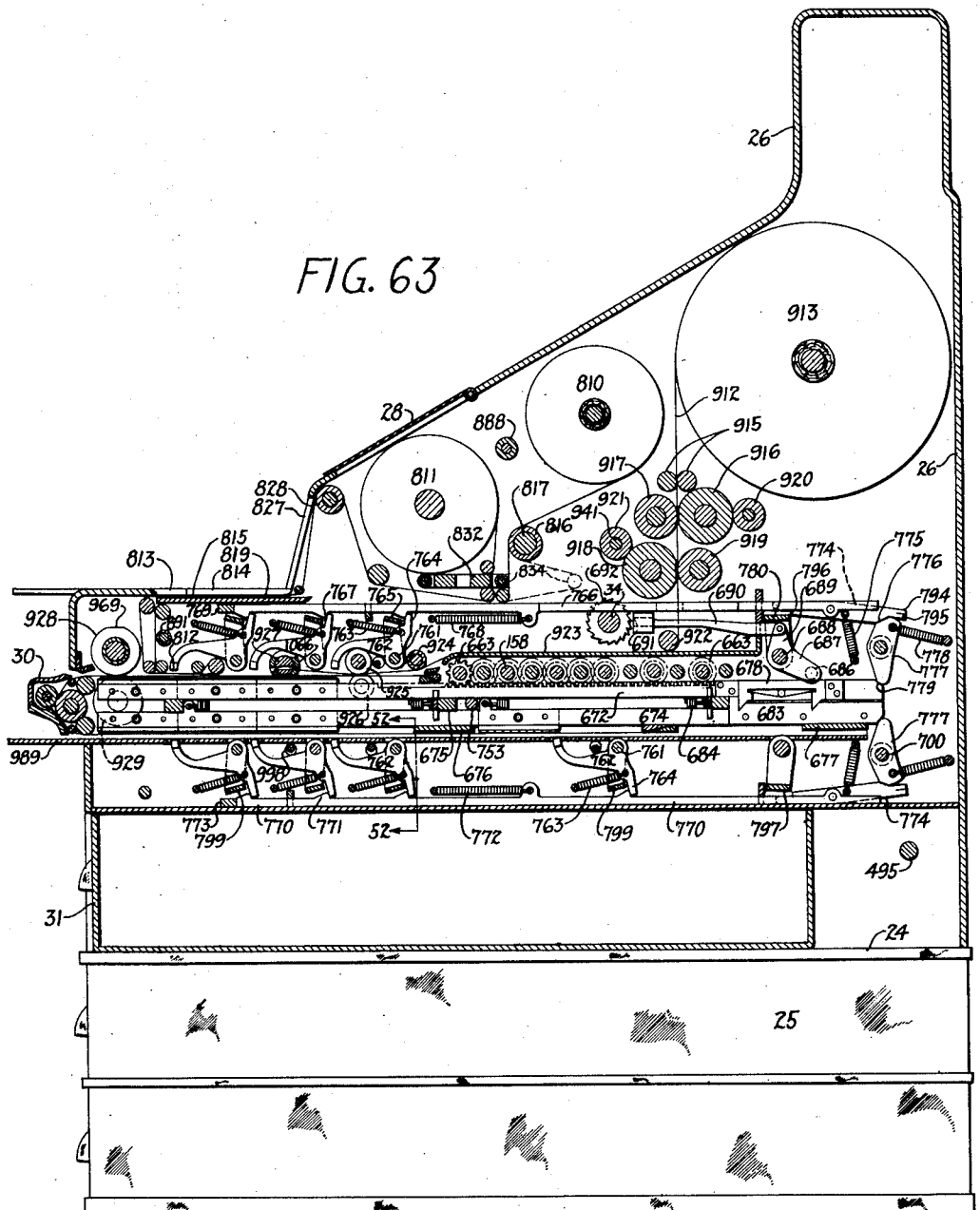

Figure 63 is a sectional elevational view thru the machine taken at a point outside the right side frame and showing the printing mechanism, also the check and detail strip rolls.

Figure 64 is a plan view of the detail strip unit with the paper rolls and certain connections removed.

Figure 65 is a view in side elevation of the detail strip unit showing also a portion of the casing of the machine.

Figure 66 is a detail view in front elevation of a portion of the mechanism used to feed the detail strip and showing also the paper roll releasing mechanism.

Figure 67 is a detail view of the paper roll latch.

Figure 68 is a vertical sectional view of the operating mechanism for the detail strip shifting devices, taken along the line 68—68 of Figure 64 and looking in the direction of the arrows.

Figure 69 is a view in rear elevation of the detail strip unit as assembled in the machine.

Figure 70:
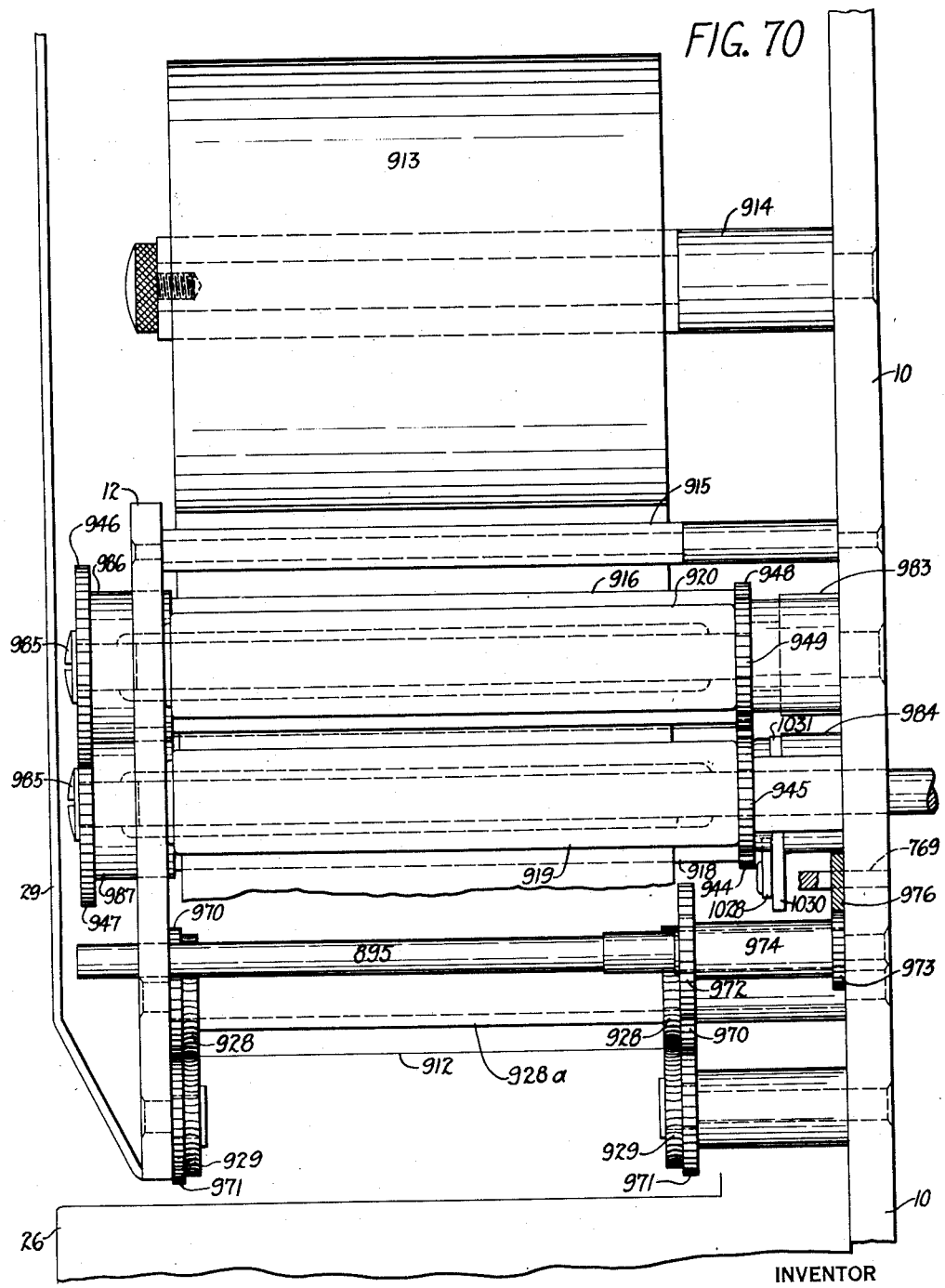

Figure 70 is a view in rear elevation of the check feeding and ejecting mechanism showing the removable electros.

Figure 71 is a detail view of the cam disk which operates the printing and check feeding and severing mechanisms.

Figure 72 is a view in side elevation showing the spindle on which the operating handle is mounted and the gear connections to the main operating shaft. The cam grooves in the gear which is shown operate the check ejecting mechanism, the actuating means for the totalizer selection mechanism, and the consecutive numbering mechanism.

Figure 73 is a view in rear elevation of the mechanism shown in Figures 71 and 72.

Figure 74 is a view in sectional elevation taken from the rear behind the type bars and showing other mechanism outside the right side frame.

Figure 75 is a view in side elevation of the hammer resetting bails and showing also the connecting and operating links.

Figure 76 is a view in rear elevation of the mechanism shown in Figure 75.

Figure 77 is a detail view of one of the indicating tablets.

Figure 78 is a side view of the indicating tablet.

Figure 79 is a view in side elevation of the no check and no print mechanism showing both the automatic feeler finger mechanism and the manually operated connections.

Figure 80 is a view in rear elevation of the mechanism shown in Figure 79 including an end view of the type carriers.

Figure 81 is a view in front elevation of the date printing controlling knobs and the tubular connections operated thereby.

Figure 82:
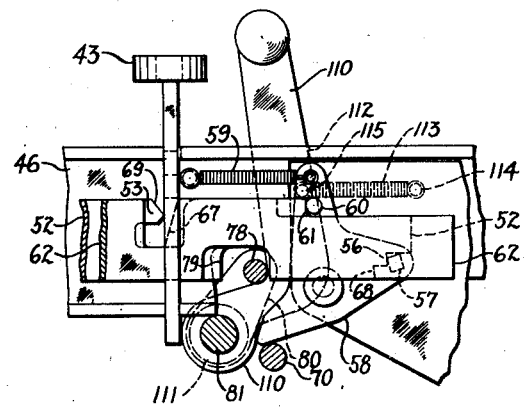

Figure 82 is a detail view in side elevation of a portion of the transaction key bank showing the correction lever in normal position on the other side.

Figure 23:
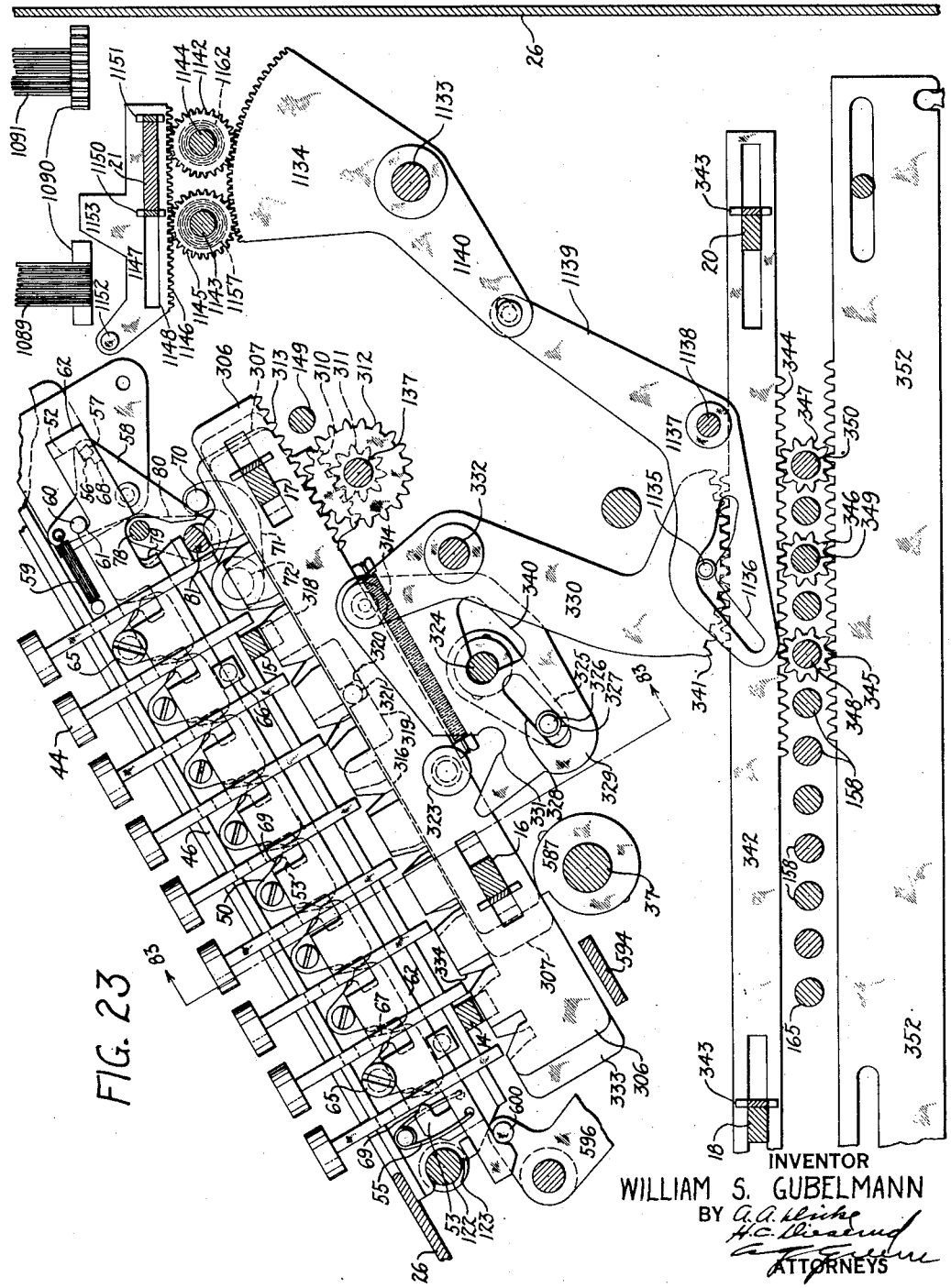
Figure 23 is a vertical sectional view of a special key bank showing also the selection mechanism operated under control of the special keys.
Figure 83:
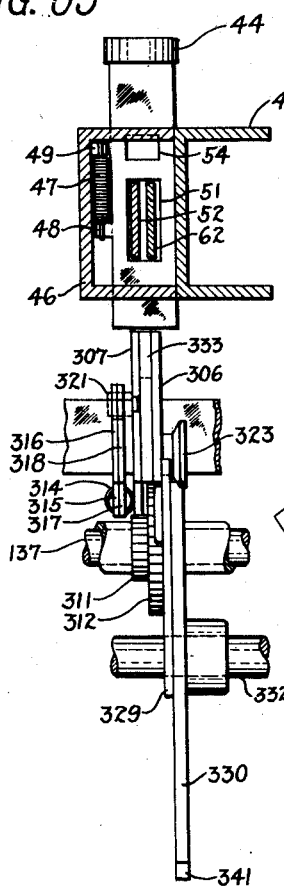

Figure 83 is a vertical section thru one of the special banks of keys showing also the selecting mechanism. This section is taken along the line 83—83 of Figure 23, and looking in the direction shown by the arrows.

Figure 84:
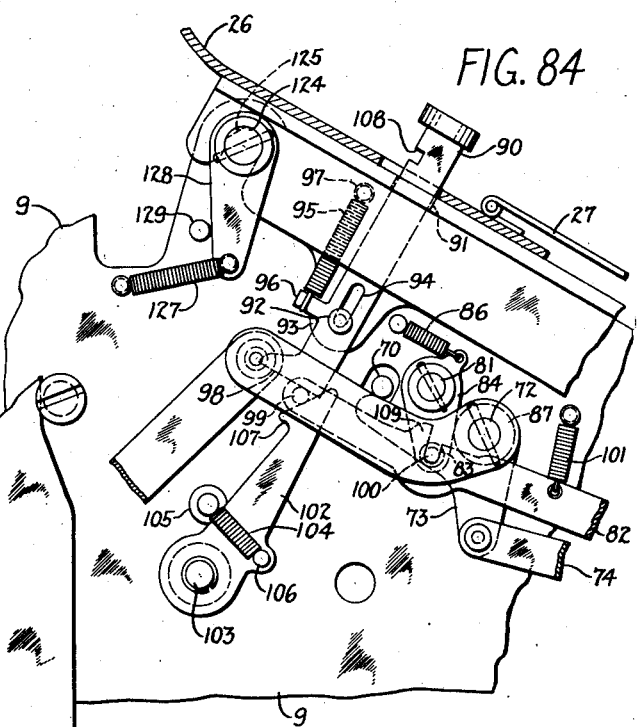

Figure 84 is a view in side elevation of the repeat mechanism.

Figure 85:
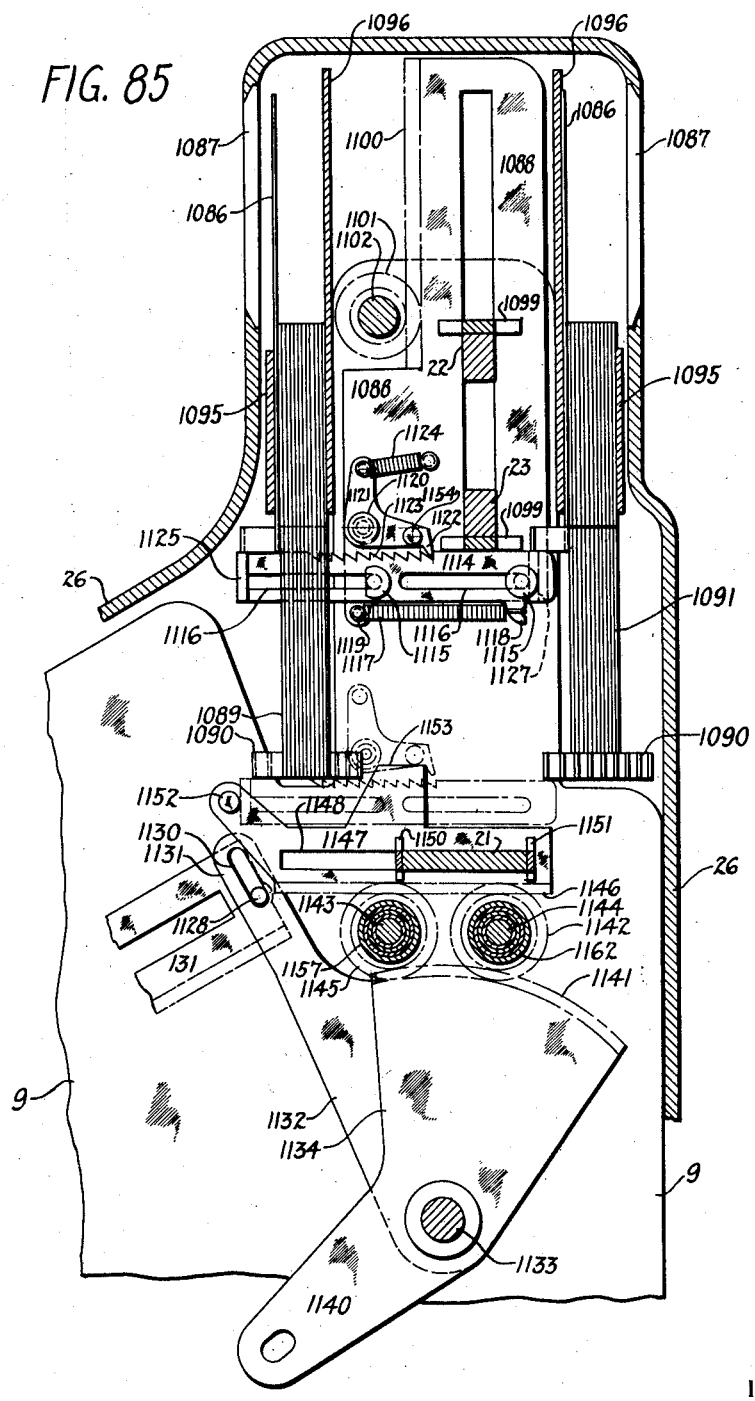

Figure 85 is a vertical section thru the indicating mechanism.

Figure 86:
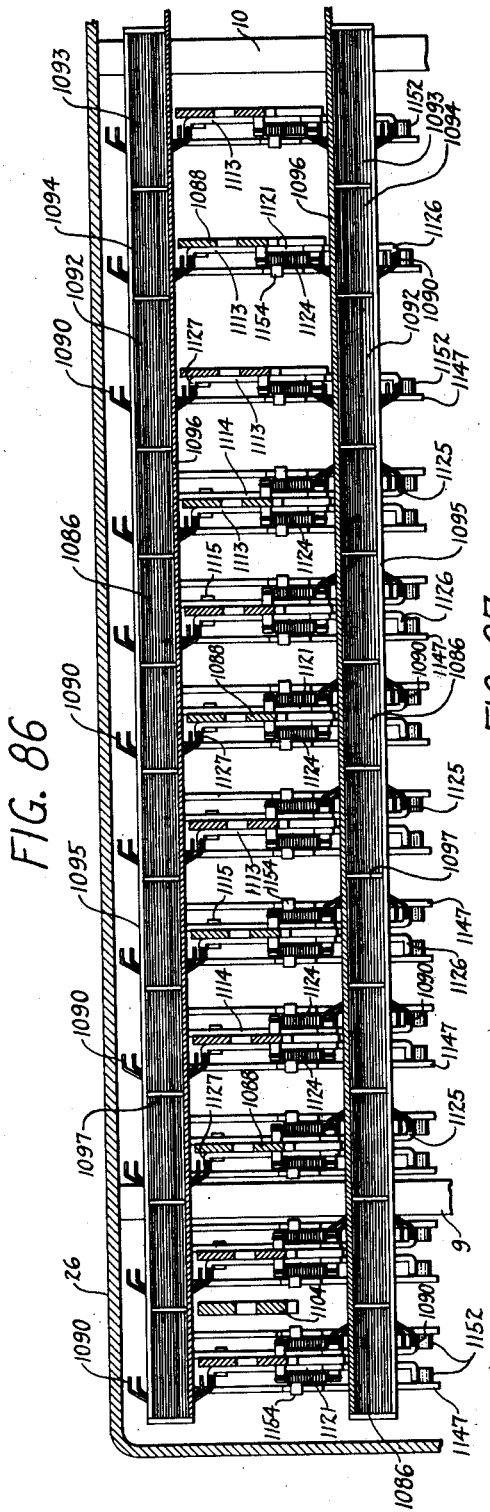

Figure 86 is a horizontal sectional view thru the indicating mechanism.

Figure 87:
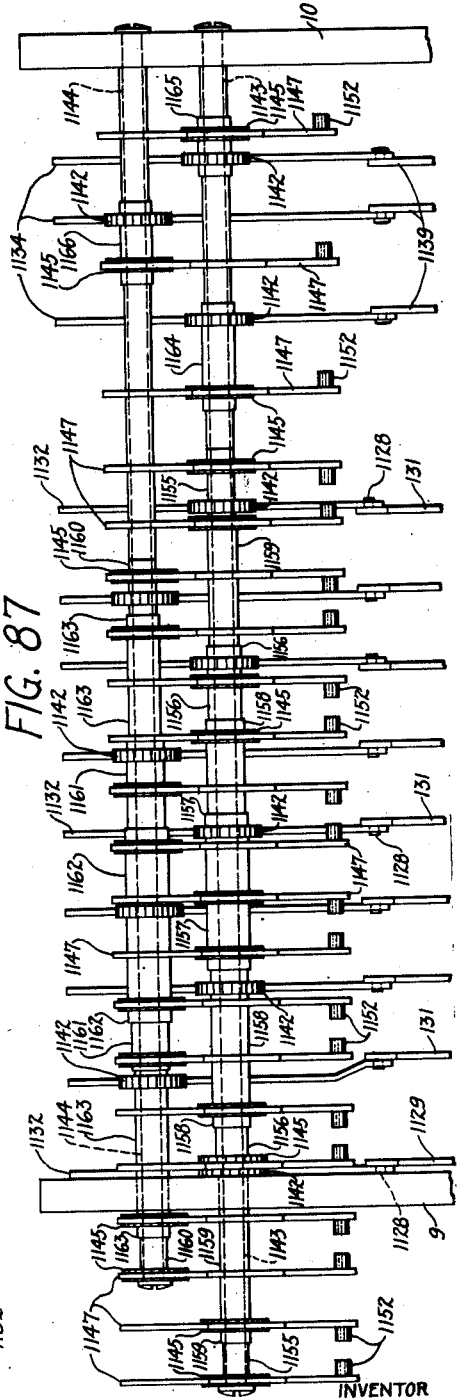

Figure 87 is a plan view of the indicator selection mechanism.

Figure 88:
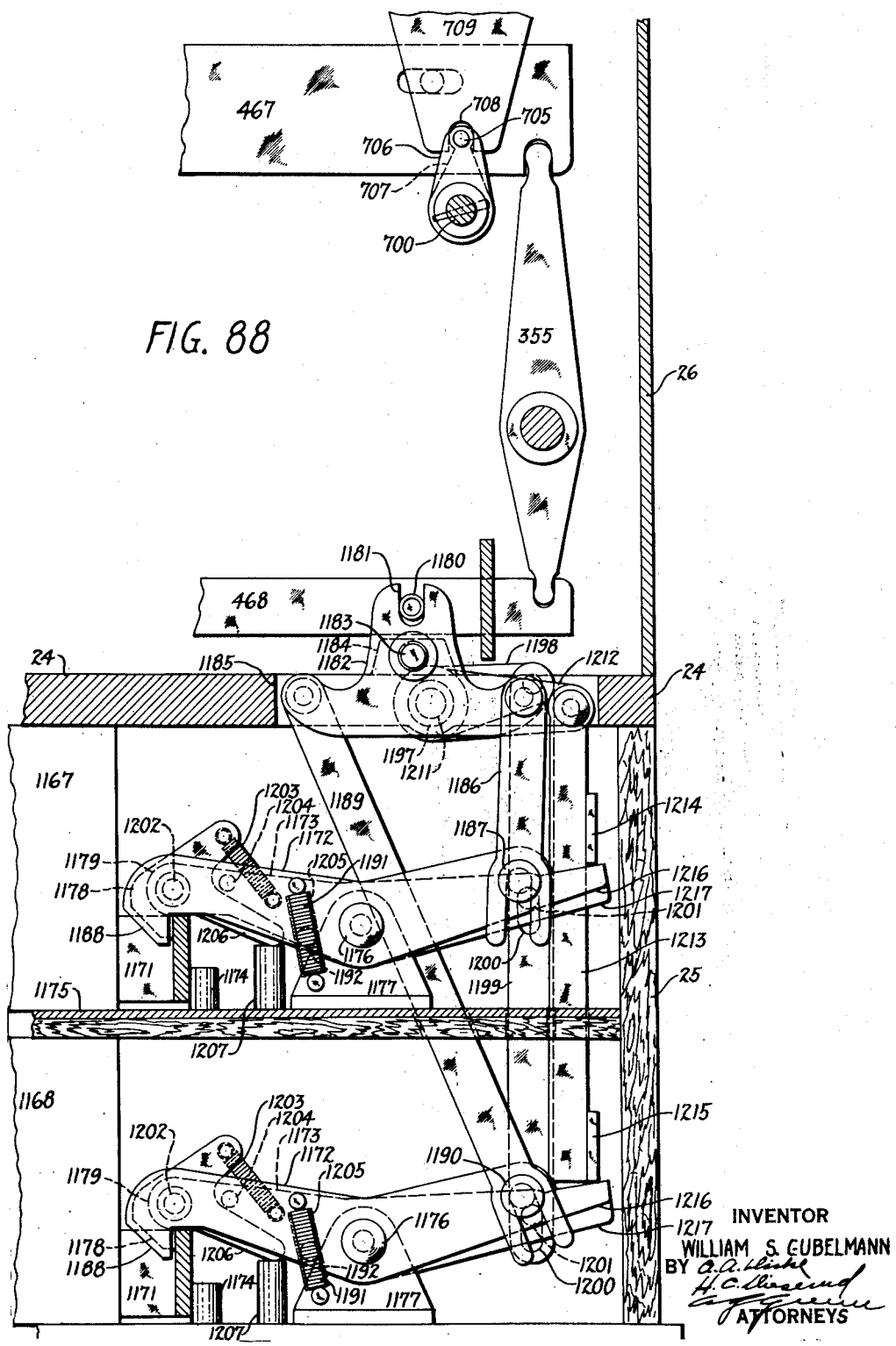

Figure 88 is a side elevation, partly in section, showing the cash drawer releasing mechanism.

Figure 89 is a chart showing graphically the timing of the major functions performed by the machine.

Figure 90 is a section thru the hub of the operating handle showing the driving connection between the operating handle and the driving spindle.

*Framework and casing*

Figure 2:
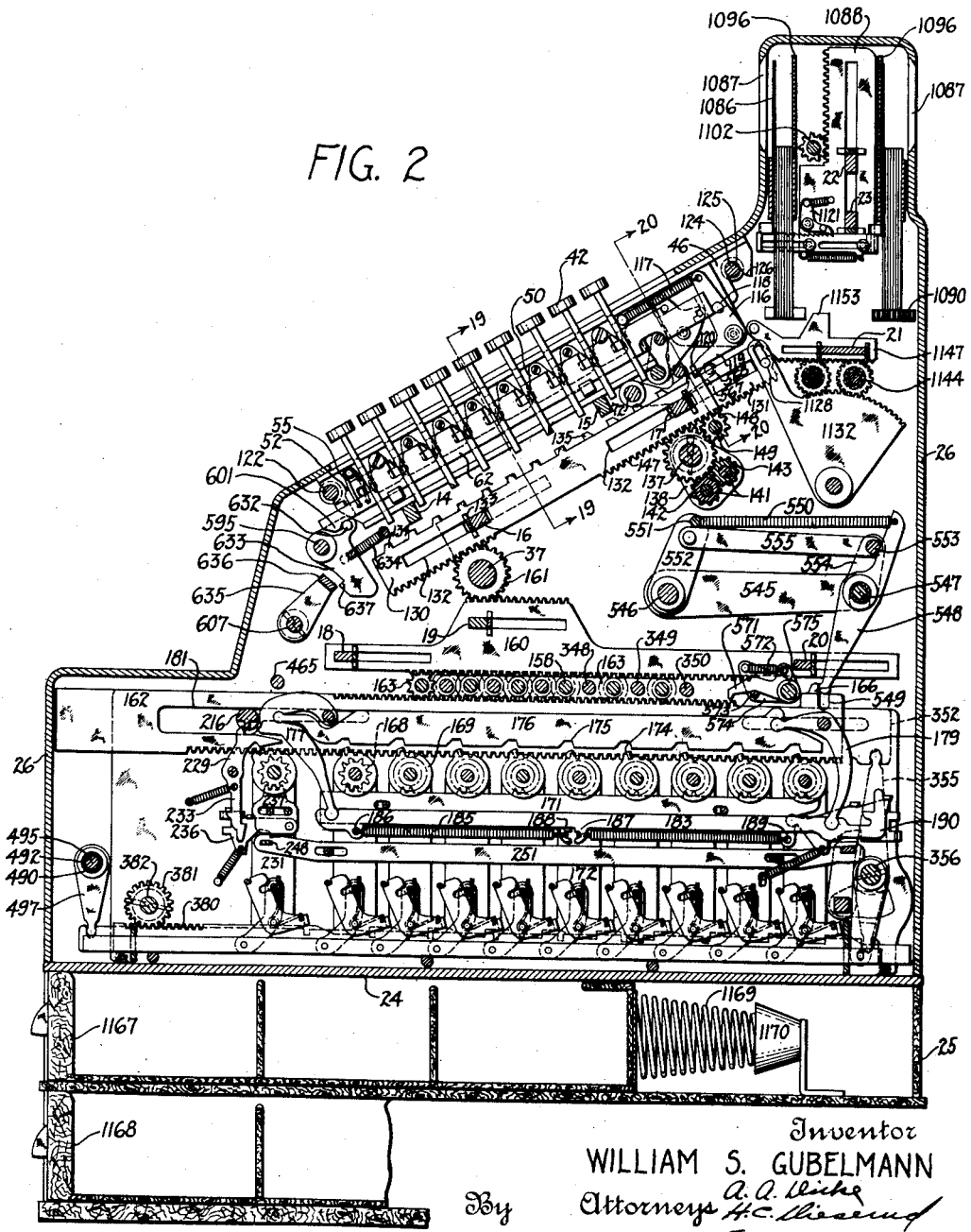
Figure 2 is a vertical sectional view thru the machine showing the differential mechanism, the indicators, a bank of universal totalizers, and the cash drawers.

As best shown in Fig. 9, the main frame of the machine, which serves to support all of the various mechanisms to be described, comprises a pair of side frames 9 and 10, the first situated toward the left side of the machine and the second toward the right. An intermediate frame 11, which need not be as thick as the side frames, is located toward the center of the machine to break up the otherwise unsupported span of certain through shafts which serve in a measure to aid in holding these vertical frame elements together and in their proper relations. Also on the right side two auxiliary frames 12 and 13 (Fig. 8) are provided for supporting parts of the printing mechanism. Various means in the form of cross bars 14, 15, 16, 17, 18, 19, 20, 21, 22, and 23, as illustrated in Fig. 2, are primarily relied upon for maintaining the proper positioning and rigidity of the frame structure aided, as before explained, by a number of through shafts. All of the vertical frames are secured to and supported by a base plate 24 which rests on a drawer unit generally designated by the character 25.

The arrangement is such that the bulk of the operating parts are located between the two outside frame members 9 and 10, although at each side there is an overhang of certain portions of the mechanism including a number of the main through shafts. It will be understood as the description progresses that wherever possible the various distinct features of the machine have been constructed as individual units having their own supporting structures which are separably mounted and secured in place on an appropriate portion of the main supporting structure.

A casing 26 is adapted to surround all of the frame work as well as the great majority of operative parts including those which extend beyond the main side frames. Suitable openings are provided in this casing for permitting the indicators to be viewed and permitting the necessary access to various portions of the printing mechanism. The casing, Fig. 1, has a hinged cover 27 for normally concealing the parts related to the total levers, a cover 28 for permitting access to the roll containing the printed detail strip, a cover 29 for permitting removal of the entire detail strip unit and access to the check strip and electros, and for giving access to the printer 30 for the purpose of inking the ribbon. A drawer 31 may be provided below the printer unit and may be used for filing away installment sheets, charge account sheets, or similar slips. Openings are also provided in the casing for the key units and operating handle, as well as for other operative elements which must be accessible from the outside of the machine. A marble slab 32 may be provided on a front shelf of the case for retaining money, sales slips and the like, during the course of operation of the machine.

Operating mechanism

Figure 1:
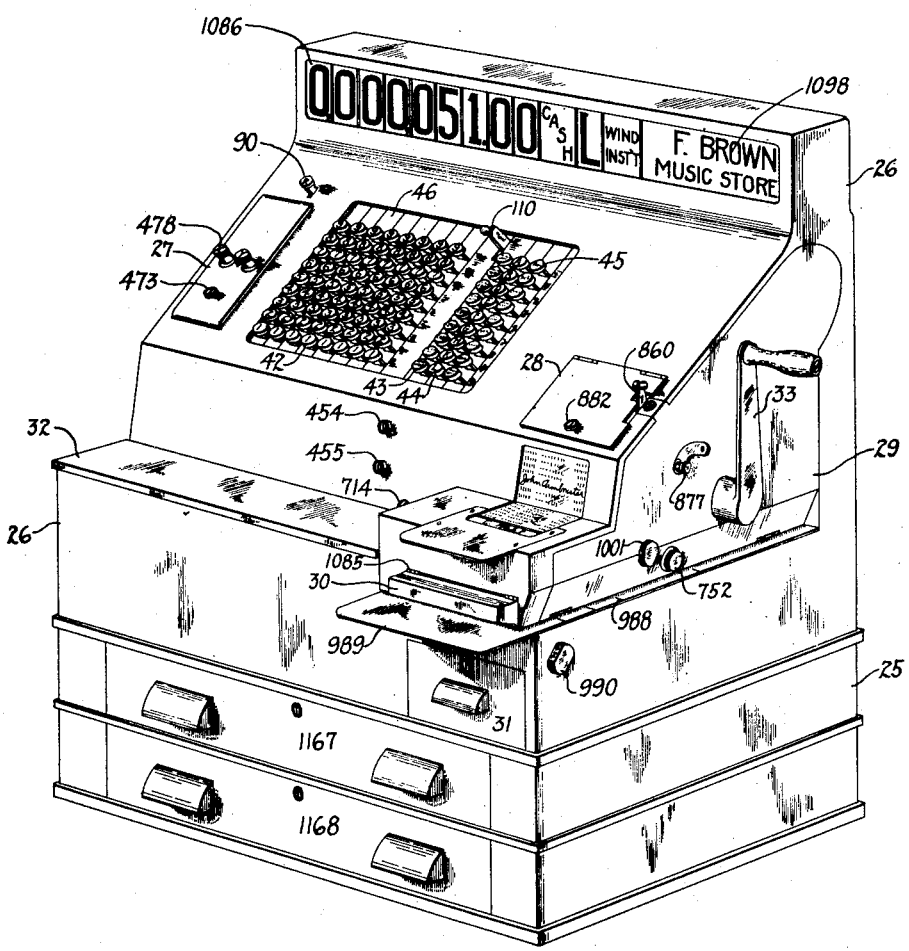
Figure 1 is a perspective view of the entire machine.

The machine illustrated is adapted to be driven by means of a hand crank 33, Fig. 1, although it will be understood that a motor may readily be provided to supply the motive power if desired. In actual use it will no doubt be advisable to employ a motor, since the machine will necessarily require a fair amount of power for its operation. The crank 33 is detachably mounted on a spindle 34 (Figs. 51, 63, 72, 73 and 90) and is held in position on said spindle in any suitable way as by a ball and socket arrangement 2000 or by any similar means. A driving connection between the crank and spindle may be provided by means of a key or a square recess 2001 which may be provided at the center of the hub of the crank to cooperate with a corresponding square portion 2002 of the spindle. It is from a gear 35 secured to the spindle (Fig. 51) that all of the other driving and driven parts within the machine receive their power. Thus, by means of the gear 35 and a gear 36 power is transmitted to a main shaft 37 at the opposite end of which a gear 38 is secured. This shaft extends across the entire machine and serves to transmit the power to certain operating parts at intermediate points within the machine as well as to certain mechanisms at the left hand side of the machine on the outer side of the left side frame. It is on this side of the machine that the gear 38 (Figs. 3 and 6) serves to drive an idler gear 39 which then transmits the power to a gear 40 which is coupled by means of a hub to a camming unit 506 to be described in greater detail hereinafter.

Keyboard

As has already been mentioned, the machine disclosed is provided, as best shown in Fig. 1, with a number of banks of amount keys 42 which are sufficient to set up an amount up to $999,999.99. There are also provided three banks of special keys such as transaction keys 43, clerks' keys 44, and department keys 45.

Since all of the amount key banks are of the same construction and serve to control related differential devices in the same way, it will be necessary to describe only one bank in detail. As best shown in Fig. 2, each bank of keys is constructed and arranged as a separate unit removable as an entity together with certain associated latching and locking devices. For this purpose the main supporting structure for each bank comprises a channel member 46 (Figs. 1, 2, and 19) which is suitably slotted in its upper and lower overturned portions to receive the stems of the nine keys in the bank. Springs 47 (Fig. 19) connected between hooks 48 on the keys and studs 49 extending from the inner side of the web of the channel serve to hold the keys normally elevated. A series of single key pendants 50 pivoted on studs extending from the side wall of the channel member are arranged in the usual manner to have a limited movement which will permit the introduction of only one key stem between an adjacent pair of pendants or the camming of an end pendant which then shifts the others into locking position. It is to be noted in this connection that the keys are assembled in such a way as to present their flat faces toward the front and rear of the machine and they are provided with suitable openings 51 (Fig. 19) through which the pendants are adapted to swing. A latching and locking bar 52 (Figs. 19, 20, 23, and 82) is also adapted to pass through these openings in the series of keys and is provided with a series of bills 53 (Fig. 82) which may cooperate either with the upper edge of the opening 51 of the keys or with the lower edge of an upper and smaller opening 54. The bar 52 is spring urged by means of a spring 55 (Fig. 2) toward the upper rear end of the keyboard but this movement is normally opposed by means of the cooperation of a shoulder 56 of the bar with a square lug 57 carried by a pivoted plate 58 which is urged counter-clockwise by a spring 59 (Fig. 82). A pin 60 carried by an upwardly extending arm of the plate is in the path of movement of a shoulder 61 of a releasing slide 62. This slide is parallel with and adjacent to the bar 52 and passes through the openings 51 of the keys, both the bar and the slide being guided on their upper edges by the recesses formed between the shoulders 63 on a pair of studs 64 and the large heads of screws 65 while the bottom edges are guided by a notched stud 66. Cam surfaces 67 (Fig. 82) provided on the slide 62 one adjacent each of the keys are adapted to be engaged by the solid parts between the two openings in the keys as the latter are depressed. Thus, depression of any key in a bank will cause rearward movement of the releasing slide in opposition to the action of the same spring 55 whose opposite end is connected to the bar 52. Rearward movement of the slide will cause its shoulder 61 to engage the pin 60 and rock the plate 58 until the lug 57 is carried away from the shoulder 56 and is brought into the path of another shoulder 68 on the bar 52. Spring 55 may then shift the bar slightly to the rear until one of the bills 53 enters the upper opening in the depressed key while the other bills enter the lower openings 51 in the undepressed keys. This movement of the bar, however, is not sufficient to completely lock the undepressed keys since the latter cooperate merely with the cam faces 69 of the locking bills and if another key is depressed it will force the bar forwardly until the previously depressed key is released and then upon further depression of the new key the bar will be released to partake of the same latching movement which it had for the first key. In this connection it should be mentioned that the single key pendants 50 are so formed that depression of a second key sufficiently to release a fully depressed key will be permitted, but full depression of two keys is not possible. Thus there is provided a flexible keyboard construction in which it is impossible to fully depress more than a single key and simultaneous depression of two keys will be prevented.

In order that all of the keys will become locked in either depressed or undepressed position upon the initial operation of the main operating mechanism of the machine a cross rod 70 (Figs. 23 and 84) extends across the machine beneath a forward extention of the plates 58 related to all of the banks of keys. This rod is carried by and secured to a pair of arms 71 loosely mounted on a shaft 72 which extends between the left side frame and the center plate 11 of the machine. Rod 70 extends beyond the right hand arm 71 to cooperate with the transaction key banks. A plate 73 (Figs. 3 and 84) also loosely mounted on the shaft 72 passes beneath an extension of the rod 70, which protrudes beyond the left side frame, and when the plate 73 is rocked slightly clockwise (Fig. 3) by means which will presently be described the rod will be elevated and will rock all of the plates 58 clockwise to an extent sufficient to disengage lugs 57 from shoulders 56 or 68 and permit full movement of the locking bars toward the rear. It will be clear that this movement of a bar 52 will serve to carry the bills 53 into full locking relation with respect to all of the keys of its bank.

Figure 3:
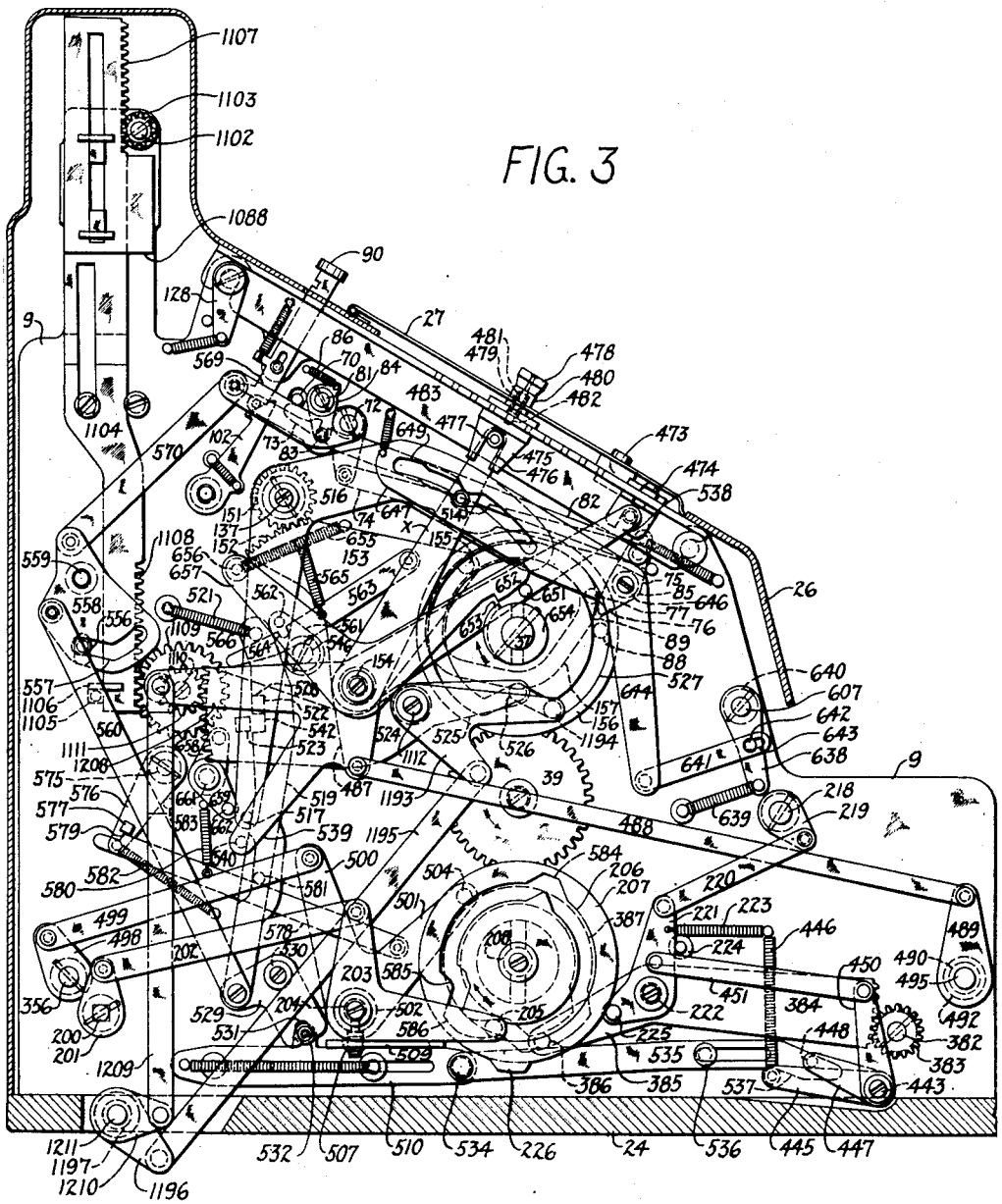
Figure 3 is a side elevation of the machine showing the control mechanism mounted on the left side frame of the machine.
Figure 6:
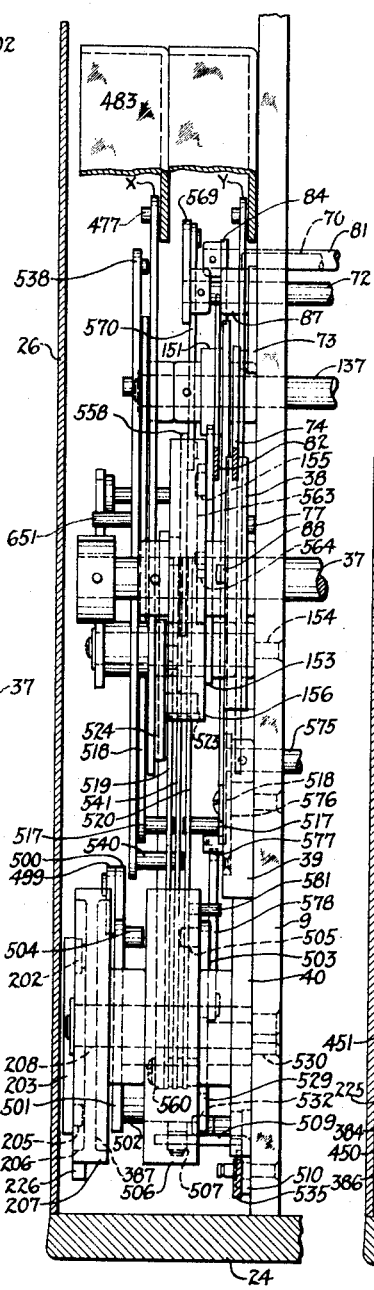
Figure 6 is a view similar to Figure 5 but taken along a section at about the middle portion of the control mechanism mounted on the left side frame.
Figure 7:
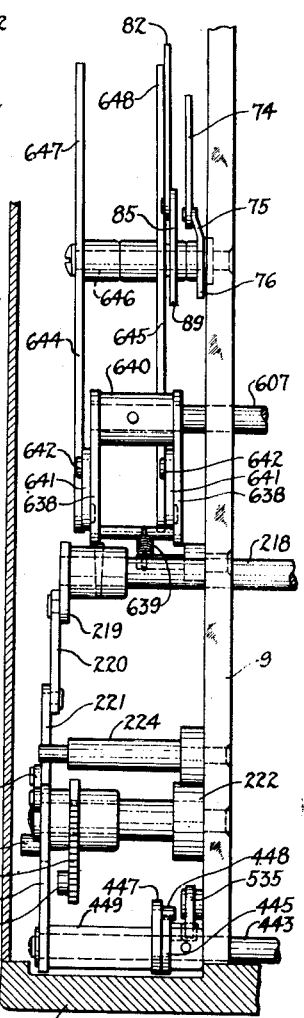
Figure 7 is a view in front elevation of the control mechanism mounted on the left side frame and shows particularly the forward portion of this mechanism.

The means for rocking the plate 73, as mentioned, is best shown in Figs. 3, 6, and 7, and comprises a link 74 connected at its rear end to the plate and at its forward end to an arm of a pawl 75. A spring attached to the upper end of the pawl arm tends to urge it clockwise until arrested by the pin shown. Another arm 76 of this pawl is in the path of a stud 77 carried by the gear 38 secured to the driving shaft 37. The arrangement is such that very early in the operation of the machine the pawl will be rocked and will impart a clockwise movement to all of the plates 58 (Fig. 23) thereby releasing all of the locking bars 52 for their full locking movement, as explained.

Toward the end of an operation of the machine the bars 52 are all shifted in the reverse direction against the action of the springs 55 to release the keys so that those depressed may be restored to normal by means of their springs 47. For producing this movement of the bars there is provided a rod 78 (Figs. 23 and 82) which extends across all of the banks of keys and is adapted to cooperate with a shoulder 79 on each of the bars. This rod is carried by suitable arms 80 secured to a shaft 81 which is rocked counter-clockwise near the end of an operation of the machine by means comprising a link 82 (Figs. 3, 7, 84) which is connected by a notch 83 therein at one end to an arm 84 secured to the shaft 81 and connected at its other end to an arm of a pawl 85 somewhat similar to pawl 75. The shaft 81 is held in normal position by spring 86 forcing arm 84 against the hub 87 of plate 73 (Fig. 84). A pin 88 carried by the same gear 38 secured to the shaft 37 serves to engage another arm 89 of the pawl 85 and rocks it counter-clockwise (Fig. 3) to release the depressed keys through the connections just described. When the bars 52 are thus restored slightly beyond their normal positions the plates 58 will be permitted to rock under influence of their springs 59 until the square lugs 57 are again in their normal relation in the path of shoulders 56.

A mechanism is provided, which, by disabling the above described key releasing action, allows all of the keys set for a previous item to remain depressed and ready for a repeat operation. This mechanism includes a repeat key 90 (Fig. 84) located in the upper left hand portion of the machine (Fig. 1), and mounted on an angular frame that will subsequently be described in connection with the total levers. The key is slidably mounted within a slot 91 in the horizontal portion of the frame and is slotted at 94 to surround a stud 92 in an ear 93 of the vertical portion of the frame. The slot 94 limits the movement of the key which is held up normally by a spring 95 connected between an extension 96 of the key and a stud 97 on the frame. An extension or foot 98 of the key coacts with a pin 99 mounted in the rear end of the link 82 which is normally held up to engage its notch 83 with the stud 100 on the arm 84, by means of a spring 101. The pin 99 on link 82 is of sufficient length to be in the plane of a latch 102, which is out of the plane of both link 82 and key 90. This latch 102 is fulcrumed on a stud 103 in the side frame and is held against pin 99 by a spring 104 connected between a stop stud 105 on the side frame and a stud 106 on the latch. On depression of the key 90 the pin 99 will be forced under and will be held by the nose 107 of the latch 102, this motion being sufficient to bring notch 83 out of engagement with stud 100. The link 82 will not, on its subsequent movement to the left (Fig. 84) rock shaft 81 to release the keys, but will pass under stud 100 on arm 84. After a slight clearance is taken up between stud 105 and latch 102, the pin 99, because of the movement of the link, will disengage itself from the latch. The link will then be drawn upwardly slightly by spring 101 and will be held against the stud 100 until the return movement of the link to the right will again engage the notch 83 with the stud. The repeat key is allowed to rise after latching the pin 99 under the nose 107 if only a single repetition of an item is desired, however, if more than one repetition is desired the key may be held down by latching the notch 108 in the key into the edge of the casing 26 at the upper end of the slot 91. This will serve to hold the pin 99 down for re-engagement by the hook 102 as the link is restored toward the front of the machine. The link 82 is provided with an extension 109 in rear of the slot 83, this extension being added to enable the correction lever, which will be described, to release the pin 99 from the hook 102 and thus disable the repeat mechanism. If the link is merely held by latch 102 and is not locked down by the repeat key, a clockwise correction movement of the shaft 81, by means to be presently explained, will rock the stud 100 against the extension 109, thereby releasing the pin 99 from the latch 102 and permitting the spring 101 to restore the link to normal.

A correction lever 110 (Fig. 82) is provided, and is mounted beside the transaction bank of special keys (Fig. 1). This lever is loosely mounted by hub 111 on shaft 81 and protrudes thru a slot 112 in the blank spacing channel between the amount and the special keys. The lever is spring held against the end of slot 112 by a spring 113 connected between stud 114 on the vertical wall of the transaction key supporting channel and a stud 115 on the lever. The lower contour of the lever is such as to clear the rod 70, which acts on the plates 58, and to contact with the under and rear sides of the rod 78 so that a counter-clockwise rocking of the lever (Fig. 82) will rock the shaft 81, through the rod 78 and arms 80, against the pull of spring 86. The rod 78 will then reset any of the slides 52 which were moved to the right (Fig. 82), thus withdrawing the bills 53 and allowing the depressed keys to rise. At the same time the pin 100 will be shifted to release the repeat mechanism as explained.

A two armed member 116 which is normally urged in a counter-clockwise direction (Fig. 2) by means of a spring 117 carries a stud 118 which is in the path of the rear upper end of the releasing slide 62 (Fig. 20). At the forward end of a downwardly extending arm 119 of this member there is formed a tab or lug 120 which, as will be more fully described hereinafter, serves as a zero stop for a certain differential member. The member 116 and plate 58 are both pivoted in a plate riveted to or forming an extension 121 of the web of the channel 46.

The key-board channel member 46 which supports all of the elements which have been described in this section except the shafts 72 and 81 and related connections is supported at its lower end by means of a rod 122 (Figs. 2 and 23) which is engaged by a notch 123 in the vertical web of the channel. At its upper end the channel 46 is supported by means of a rod 124 which has a flat face 125 formed thereon so that a hook 126 formed at the upper end of the channel may be carried freely into engagement with the rod 124 as the channel pivots about the lower rod 122. After all of the desired key channels have been properly positioned the rod 124 may be turned slightly about its own axis to carry the flat side away from the assembling position and into a position preventing withdrawal of the hooks 126. If desired the rod may be urged into its locking position to hold the channels in place by means of a spring 127 (Fig. 84) connected to an arm 128 secured to the rod. Movement of the arm may be limited by a pin 129 on the side frame 9. As a further support for the key units they may rest upon the pair of rectangular supporting bars 14 and 15, previously mentioned, which are secured at their opposite ends to the side frames. These bars serve to prevent tilting of the channels on the rods 122 and 124.

*Differential mechanism*

The differential mechanism which is controlled by the amount keys is of the type employing members which are complementally movable in opposite directions and which thereby are permitted to be positively driven in both directions.

Again considering only a single representative order of the differential mechanism there is provided a pair of slide members 130 and 131 (Figs. 2 and 56) the first of which is movable upwardly and the second downwardly from the normal positions shown. These slide members are provided with suitable elongated slots 132 adapted to cooperate with the supporting bars 16 and 17 which are secured at their opposite ends to the side frames 9 and 10. Comb plates 133 secured to the supporting bars serve to maintain the members in true vertical planes and also to hold them in the desired spaced relation. Each slide member is adapted to receive a variable movement up to nine steps and the two are so interrelated that if one receives the full nine steps of movement the other will be held stationary and at all times the sum of the movements of the two members, disregarding the direction of movement, will be nine steps. For the purpose of controlling the extent of movement of the members by the depression of a key the member 130 is provided with a series of nine projections 134 each having a square shoulder facing upwardly in the direction of movement of the member while the opposite face of each projection may be inclined to provide greater strength. Similarly the member 131 is provided with nine projections 135 having square shoulders facing downwardly and toward the front. Alternate ones of the projections 134 (Fig. 19) are offset or bent into a different plane from that of the member 130 itself and the remaining projections. So also alternate ones of the projections 135 are offset or bent out of the plane of the member 131 and in both instances the offset projections are bent away from the opposite member from the one on which they are formed. In this way the projections 134 and 135 are arranged in four separate rows. The lower end of the stem of each of the keys 42 is provided with a pair of projections 136 one of which projections is adapted to cooperate with a projection 134 on the member 130 and the other of which is adapted to cooperate with a projection 135 on member 131. In order to take care of the four positions, which the projections on the members may assume, the ends of the keys may be regarded as divided into four sections. The pair of projections on one key may be in the first and third sections while the pair of projections on the next key in the bank will be in the second and fourth sections and so on for alternate keys. This permits alternate keys to cooperate with say a straight projection on one member and a bent projection on the other while the remaining keys have just the opposite relation. In this way the members are allowed to travel a maximum extent equal to almost double the key spacing.

Normally the member 130 is prevented from movement by the downwardly extending arm of the previously mentioned member 116 (Fig. 2) whose lug 120 cooperates with the uppermost projection 134. When some key in the bank is depressed, however, this pivoted member is rocked, as explained, and its lug is withdrawn from the projection at the upper end of member 130. Upon subsequent operation of the machine, as will be explained, the member 130 is shifted up and to the rear until stopped by engagement of one of its projections with the depressed key or by engagement of the lower ends of the slots 132 with the supports 16 and 17. The extent of movement of the member will be directly proportional to the value of the key depressed. Member 131 on the other hand is normally free to move downwardly upon operations of the machine and if no key in the bank has been depressed this member will move an extent equal to nine steps. At all times it will move an extent which is the nine's complement of the distance through which the member 130 is moved upwardly. This means that when the upper or nine key is depressed member 131 will be blocked against any downward movement.

The means for driving the members 130 and 131 in the way explained comprises a differential gear construction (Figs. 56 and 57) operated by a rock shaft 137. For this purpose there is secured to this shaft a pair of frames 138, one located to the right and the other beyond the left of the group of members 130 and 131. The frames consist preferably of a pair of plates the hubs 139 of which will be secured to the shaft as by pins 140. A pair of shafts 141 supported at opposite ends in these frame plates is provided and one of these carries a series of broad toothed pinions 142 loosely mounted thereon while the other carries a similar series of pinions 143 in such a way that a pinion of each series is intergeared with a pinion of the other series through the engagement of only a portion of the width of the teeth. Loosely mounted on the operating shaft 137 by means of hubs 144 are a plurality of pairs of adjacent gears 145 and 146, each of the gears 145 being adapted to mesh with one of the pinions 142 and each of the gears 146 being adapted to mesh with one of the pinions 143. Each gear 145 is adapted to mesh directly with teeth 147 formed on the underside of a corresponding member 130 while each gear 146 meshes with an idler 148 on a shaft 149 fixed in the side frames, each idler in turn meshing with teeth 150 formed on the underside of a corresponding member 131.

Upon operations of the machine the shaft 137 is rocked first clockwise (Figs. 2 and 57) and then counter-clockwise. It will be apparent that clockwise movement of this shaft will tend to cause the pinions 142 and 143 to carry the two sets of gears 145 and 146 clockwise about the shaft so that each gear 145 will tend to move its member 130 upwardly while each gear 146 through idler 148 will tend to move its member 131 downwardly. Now when one of the members is stopped as by engagement of one of the projections thereon with a depressed key its corresponding gear 145 or 146 will be arrested and the inter-meshed pinion, either 142 or 143, will be made to planetate about this gear and will cause a double movement of the remaining gear and member until the full clockwise movement of the shaft 137 is completed. Thus assuming that the 1 key were depressed in a particular bank both of the members 130 and 131 will be shifted a single step during the initial movement of shaft 137 while continued movement of the latter will cause pinion 142 to planetate about the gear 145 which has by this time become fixed. The remaining pinion 143 will then be rotated counter-clockwise on its shaft 141 in addition to partaking of the bodily movement of the latter so the gear 146, idler 148 and member 131 will be shifted at double speed to take up the remaining clockwise movement of shaft 137. On the return movement of shaft 137 it will be obvious that the parts will be restored to the normal position shown in Fig. 2.

The means for rocking the shaft 137 as explained, as best shown in Fig. 3, comprises a pinion 151 secured to this shaft toward its left end and adapted to be engaged by segment teeth 152 carried by a plate 153 pivoted on a stud 154. This plate is provided with a roller 155 which cooperates with a cam 156 (Fig. 53) that forms a part of a unit that is secured to the drive shaft 37. The groove 157 in the cam 156 is so formed as to rock the plate 153 and shaft as required, it being noted that a considerable dwell portion is provided before, intermediate and after the two movements of the plate in order to allow time for the performance of other necessary functions.

*Control of actuators*

As has already been briefly explained, the present machine is provided with a large number of totalizers and these are arranged in banks each extending from front to rear of the machine and the several banks being horizontally arranged across a considerable portion of the width of the machine. This means that a set of actuators must be provided for each bank of totalizers and each set must contain an actuator corresponding to each denominational order of the key-board. Due to the necessity of using these actuators in connection with the taking of totals, as will be explained more fully hereinafter, one set must be provided for each bank of item counters as well. In the illustrative machine this calls for eight actuators corresponding to each denomination of the keyboard, each actuator being capable of operating a particular order of any of the totalizers or counters in a particular bank. As a convenient means of coordinating the eight actuators which must partake of the same movement under the control of one of the banks of keys a shaft 158 (Fig. 9) is provided for each denominational order. There are, therefore, as many of these shafts extending across the machine between the pair of side frames as there are banks of amount keys on the keyboard and as shown there is one additional similar shaft 165, making nine in all, for the purpose of taking totals from an extra or overflow order provided in each totalizer as will be explained.

The connections for driving the shafts 158 to differential extents comprise pinions 159 secured one to each shaft and each meshing with a rack 160 (Fig. 2) supported by suitable cross bars 18, 19 and 20, each in turn meshing with a gear 161 loosely mounted on the shaft 37. These gears 161 are of extra width and are adapted to transmit the movement of the members 130 to the racks 160. For the purpose of driving the actuators 162 of which, as stated, there are eight for each denominational order, each shaft 158 is provided with seven pinions 163 secured thereto. The eighth actuator is driven directly by the pinion 159 which, as before mentioned, serves to transmit the movement of the rack 160 to the shaft. This is the reason for spacing the gears 161 by means of the collars 164 as shown in Fig 9 and for forming them of extra width so that each may not only mesh with a member 130 but may mesh also with its related rack 160 which at the same time may be located directly above an actuator 162 of the particular denomination involved.

It is to be noted that the shafts 158 are not placed in a regular denominational order. The reason for this is that if they were placed in a regular order with the units shaft next to the tens, etc., there would not be room enough between a pinion 163 on one shaft and a pinion 163 on an adjacent shaft for the provision of a substantial hub, such as the hubs that are shown, which are used for securing the pinions 163 to the shafts 158. Therefore, the denominational shafts are interspersed or specially arranged as shown to secure room for an adequate method of fastening the pinions 163 to the shafts 158.

For printing and indicating totals from the extra or overflow order of the totalizers and counters, eight actuators are also provided. One of these actuators has an extra shoulder 166 (Figs. 2 and 9) which is adapted to cooperate with an element that is stationary on item operations and thus confines the entire inter-connected group of actuators in normal position when not taking totals, as will later be explained. The actuators for this denominational order mesh with related pinions 159 and 183 secured to the shaft 165, the pinion 159 meshing with the corresponding rack 160. This rack cooperates with a gear 167 loose on the shaft 37 (Fig. 9) similar to gears 161; this gear then drives a member 130 not associated with any key bank. This member 130 then meshes with a gear 1451 (Fig. 56) similar to those related to the banks of keys and loose on shaft 137. The gear 1451 then meshes with a gear 1481 similar to the idler gears 148 related to the key banks and mounted on fixed shaft 149. That portion of gear 1481 which is out of the plane of gear 1451 then drives a slide 1129 similar to the slides 131, the resultant movement being in the proper downward and forward direction as required for the indicator positioning mechanism to be hereinafter described.

As will be more fully explained in connection with the construction of the totalizers each order of each of the latter is restricted to two thicknesses of relatively thin metal, say fifty thousandths of an inch thick. The actuators, which are of the same thickness, are spaced an amount substantially equal to their thickness. That is to say the group of actuators 162 that are related to one bank of totalizers will be separated from each other by only about fifty thousandths of an inch. The groups of actuators related to different banks of totalizers are spaced a greater distance, as best shown in Fig. 9.

Totalizers

As has been stated hereinbefore the illustrative machine is equipped with forty-two totalizers of various constructions. Thirty of these totalizers (Fig. 10) are arranged in three separate similar banks each containing nine of what may be termed the universal transfer type and one of the individual transfer type. A detailed description of one of these banks will suffice for all and will now be given.

Referring particularly to Figs. 2, 11, 12, and 13, it will be seen that each of the nine universal totalizers consists of series of alternately arranged pinions 168 and larger single toothed disks 169 all mounted upon a short shaft 170. Each order of the totalizer consists of a pair of such elements suitably secured together as by pins each element having preferably a thickness of about fifty thousandths of an inch and each order of the totalizer therefore requiring only one-tenth of an inch in width. A totalizer of ten orders may be condensed into a space of slightly over an inch in width. The pinions 168 are adapted to be moved into mesh with the teeth on the actuators 162 by means which will be later described. Normally these pinions are in engagement with teeth formed on transfer slides 171. The disks 169 which serve to control the transfer mechanism are of such size as to constantly overlap, to a certain extent, the adjacent actuators 162 and the transfer slides 171 regardless of the position of the totalizer and in this way the proper alinement of these parts is always insured. There can be no danger of misalinement and consequent difficulty in engaging the teeth of the pinions with the actuators. The shaft 170 of each totalizer is mounted in two side frames 172 and 173 as shown in Fig. 12 and these frames serve to aid in confining the elements to their proper positions.

Normally all of the totalizer elements are in the position shown in Fig. 11 in which the single teeth or projections 174 of the disks 169 are opposite notches 175 formed in the under edges of transfer tripping bars 176. These bars 176 are supported at their forward ends by means of a ball and socket connection with levers 177 which are in effect bell cranks pivoted at 178. At its rear end each of the bars 176 is supported by a ball and socket connection with a bell crank 179 pivoted at 180. The pivot rods 178 and 180 are fixed and pass through elongated slots 181 and 182 in the actuators to permit the necessary nine steps of movement of the latter. At the lower ends of the downwardly extending arms of the lever 177 and the bell crank 179 there is carried, preferably by means of ball and socket connections, a bar 183 which serves to complete the parallelogram consisting of the bars 176 and 183 and the arms 177 and 179. This construction is such that if any one of the nine universal totalizers is in mesh with the actuators and the projection 174 of one of the disks 169 is carried nine steps, from the normal position shown (Fig. 11) in a counter-clockwise direction it will strike the under surface 184 of the related bar 176 and will cam the latter upwardly. Due to the closed link construction the bar 176 can only move up in such a way as to maintain its horizontal position. As the bar 176 is lifted the arms 177 and 179 will be rocked clockwise to a certain extent and the bar 183 will be shifted to the left (Fig. 11) in opposition to a spring 185 (Fig. 2) which is connected at one end to the bar 183 at one or another of a pair of tabs 186 and 187 and at its opposite end to one or the other of the lugs 188 and 189 formed on the related transfer slide 171. These springs 185 are arranged alternately, front and rear, from order to order to enable the use of a stronger spring than could otherwise be employed.

Figure 5:
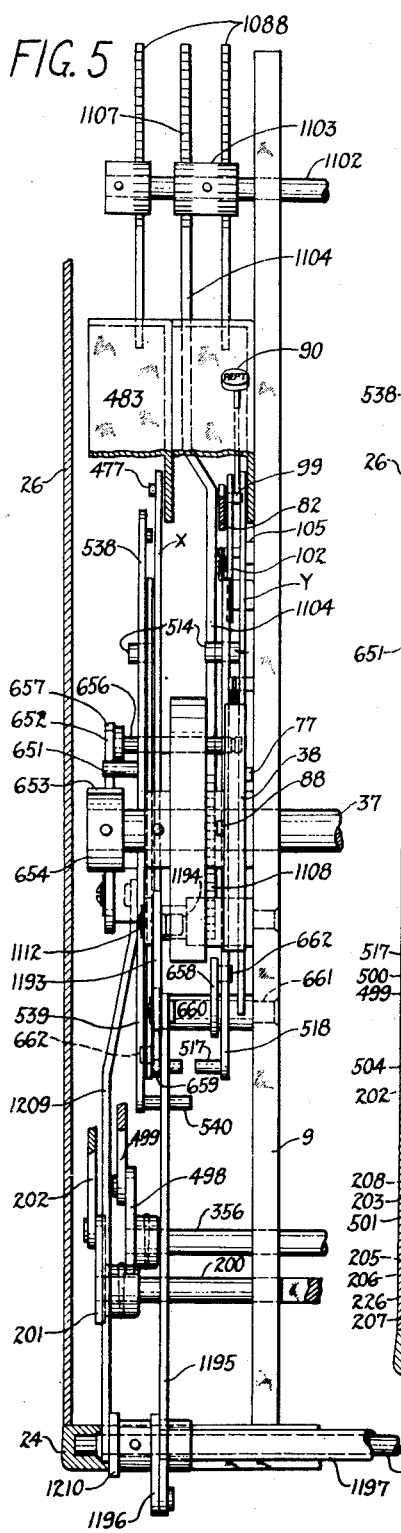
Figure 5 is a sectional elevational view taken toward the rear and showing a portion of the control mechanism which is mounted on the left side frame.

An extension 190 of the bar 183 is provided with a pair of shoulders 191 and 192. Normally the shoulder 192 is under a lug 193 formed as an overturned tab on a plate 194 which is pivotally connected, as by a ball and socket connection, to the transfer slide 171. A spring 195 connected between a trunnion 196 and an extension of the plate 194 tends to rock the latter clockwise thus holding the lug 193 in engagement with the shoulder 192. Also when the bar 183 is shifted to the left, as explained, upon lifting of the trip bar 176 by the projection 174 so that the shoulder 192 is disengaged from the lug 193 the spring 195 will rock the plate 194 until another overturned lug 197 thereon engages the shoulder 191 which at this time is carried under the lug. Now if the disk 169 is rotated still further until the projection 174 is carried beyond the surface 184 of the bar 176 so that the latter may drop again, the bar 183 will be shifted to the right again by the spring 185 and the shoulder 191 will be carried away from the lug 197. The spring 195 may then rock the plate 194 still further until the edge of a cut-out portion of the plate engages a movable cross bar 198. Assuming that one of the plates 194 has been thus rocked to engage the cross bar 198 during the movement of the actuators 162, the totalizer pinions 168 will then be lowered out of mesh with the actuators and into engagement with the transfer slides 171 by the mechanism which will later be described. At this time the bar 198 will be oscillated by first imparting to it a movement to the right in Fig. 11 and then to the left beyond the normal position shown and finally to the right into the position shown. The means for so moving the bar comprises a pair of arms 199 in which the cross bar is secured to form a bail. The arms 199 are formed with square openings which surround a squared shaft 200. Referring now to Figs. 3, 5, and 6, it will be seen that the shaft 200 has secured thereto at its left end an arm 201 to which is connected a link 202. At its forward end this link is connected to one arm of a bell crank 203 loosely pivoted on a stud 204. A roller 205 carried by the other arm of the bell crank is adapted to follow a suitable cam groove 206 in a box cam 207 forming part of the cam unit mounted on a stud 208 and connected to the driven gear 40. The groove 206 is properly shaped to provide for the movement of the parts as explained.

Returning now to the cross-bar 198 the movement to the right under the conditions assumed will cause it to engage a shoulder 209 on the plate 194 which has been dropped into engagement with it. This will cause the transfer slide 171, which is connected to the plate, to shift to the right and enter a unit into the totalizer wheel of next higher order from that which carried the projection 174 that controlled this transfer. Movement of the cross-bar to the left will permit the springs 185 and 195 to restore the slide 171 to the left and continued movement of the cross-bar in this direction will cause it to engage a cam surface 210 of the plate 194 which has been active and will raise it until the lug 193 is carried above the shoulder 192. Upon completing the movement of the cross-bar to return it to normal the spring 195 will settle the plate 194 back to its normal position as well. If springs 185 were not provided or did not function properly the cross-bar would cooperate with a shoulder 211 to restore the latter and the slide 171 toward the left.

It will be obvious that several of the plates 194 related to a particular bank may have been dropped into engagement with the cross-bar by passage of several wheels through zero and in this event all will be operated simultaneously by the cross-bar. This simultaneous action gives rise to the need for a special provision in the event that a wheel should be standing at nine at the time that it receives a transfer movement. Passage of such a wheel to zero will come too late to permit it to drop the next higher plate 194 on to the cross-bar 198. However, by virtue of the fact that such a wheel stands at nine under the conditions assumed its projection 174 will have raised the trip bar 176 and will have shifted the bar 183 to the left so that the next higher order plate 194 will have dropped until its lug 197 engages the shoulder 191. Each plate, furthermore, is provided with a straight projection 212 and an inclined overturned finger 213. Normally each of the latter overlaps the adjacent finger on the right as shown in the rear view (Fig. 13). So also if any adjacent plates have been dropped into their "nine" positions the higher order plate will have its finger 213 in the path of the next lower order plate. Assuming now that the next lower plate beyond the adjacent plates considered has been dropped fully, by the passage of a wheel to the zero position or beyond, its projection 212 will have dropped to a position just below the normal plane of the fingers 213 and will be alined with the next higher finger 213 that has been partly dropped. All three of the plates under considration will then be simultaneously shifted upon the positive driving of the fully dropped plate by the bar 198 to effect a carry in the three orders. For this purpose the projection 212 of the fully dropped plate will engage the finger 213 of the adjacent partially dropped plate and its movement in turn will be transmitted to the finger 213 of the still higher partially dropped plate. Thus all transfers that are to be effected during an operation of the machine will occur simultaneously and will take place not only in those orders wherein the plate 194 has been engaged with the cross-bar 198 but also in those orders wherein the plates have been dropped one step by virtue of the fact that the next lower wheel stands at nine and where this lower order in turn has its plate dropped fully into engagement with the cross-bar. Any of the plates which are in their normal positions at the beginning of a transfer operation can under no condition receive a transferring movement, and those which have been partly dropped will only be operated if they are coupled dirctly to a plate that has been fully dropped or indirectly coupled to such plate through another partly dropped plate. It is to be noted that the upturned end 190 of the bar 183 is so formed that it will not interfere with the movement of the lug 197 whether it is in the nine position or the fully dropped position. For this purpose the shoulder 191 is of extra length to permit this movement when the plate is in the nine position while a notch 214 below this shoulder permits movement of the plate when it is in the fully dropped position.

Another detail of this construction which should be mentioned is that the projection 212 is slightly rounded on the end so that it may have a camming effect upon the next higher plate finger as the plate carrying the projection drops all of the way to the cross bar. Preferably the curvature of the end is in the form of an arc having the pivot of the plate as a center. This will merely cam the finger of the next plate slightly against the tension of springs 185 and 195 and the movement is so slight as to be practically negligible. The purpose of this feature is to insure direct contact between the projections and fingers when they cooperate so as to avoid any lost motion in transmitting the movement of the cross-bar from one to the next.

A further point which should be observed is that if a wheel stands at nine when it is being moved up into mesh with the actuators its projection 174 will raise the trip bar 176 just as when the wheel is turned to nine after it is in mesh.

Suppose now a wheel is in the nine position so that its projection 174 is holding the trip bar elevated just prior to the movement of the totalizer out of mesh with the a ctuators, if no means were provided to prevent it, the trip bar would drop as the totalizer is lowered and the bar 183 would be shifted to permit the full dropping of the plate 194 just as if the wheel had passed on to zero or beyond. For this reason there is provided a projection 215 on the lever 177 with which cooperates an angle member 216 which is turned counter-clockwise about 60° just before the totalizers are lowered. If the trip bar is in normal position the leg 217 of the angle member will pass over the projection 215 and prevent accidental raising of the trip bar, but if the bar is held raised at this time by the transfer tooth the angle member will engage the underside of the projection and hold the bar up even though the totalizer is lowered and the transfer tooth is withdrawn.

The angle member 216 extends across a considerable portion of the width of the machine having different forms at different points so as to cooperate with all of the groups of totalizers and at its ends it assumes the form of a solid shaft to serve as circular bearing portions 218. At its left end the shaft portion 218, as best shown in Figs. 3 and 7, has secured thereto an arm 219 which is connected by a link 220 to a bell crank 221 pivoted on a stud 222 and normally urged by a spring 223 against a stud 224. A roller 225 carried by the other arm of the bell crank is in the path of a cam projection 226 forming a part of the beforementioned cam unit 207. The cam projection 226 is so located and is of such length that it will turn the angle member just before the totalizers are lowered and hold it turned throughout the active transfer operation.

Due to the fact that only a single trip bar 176, and a single transfer slide 171 and related parts are provided for the same order all nine of the universal totalizers in a bank it will be apparent that only one of these totalizers may be active at a time since otherwise there would be a conflict in the control of the transfer members for a particular denominational order. This is the reason for the designation "universal" as applied to these totalizers since most of the transfer mechanism is common to them all.

It may appear from what has been described that an erroneous carry will be effected in all of the inactive totalizers in those orders in which the active totalizer receives its transfers. This is not the case however, as will be clear from the following explanation. When a transfer slide 171 is shifted to the right (Fig. 11) to effect a carry in an order of the active totalizer it will simultaneously operate all of the same orders of the inactive totalizers as well but the unit which is thus added will be immediately withdrawn from these inactive totalizers upon the restoration of the transfer slide to its normal position. The active totalizer, however, will not partake of this subtractive or return movement of the transfer slide due to the fact that it will be raised out of engagement with the latter prior to the movement of the cross-bar 198 toward the left (Fig. 11). The mechanism for bringing about this movement of the active totalizer will be explained hereinafter in connection with the totalizer engaging mechanism.

*Grand totalizer for universal bank*

As already mentioned, each bank of universal totalizers is provided with a grand totalizer which may be operated each time that any one of the universal totalizers of the bank is operated. For this purpose it is necessary to provide a separately controlled transfer mechanism for this totalizer since the carrying between its wheels must take place at different times from the carrying in the universal totalizers. Spaced frame members 231 and 232 are provided for supporting the various elements of the totalizer. The construction of the totalizer elements themselves is the same as already explained, that is, each order consists of a pinion 168 and a larger disk 241 having a single projection 227 similar to the projections 174. Normally this projection stands in the position shown in Fig. 11 in which it is opposite a cut-out portion 228 of an arm 229 of a two-armed member pivoted on a rod 230 carried by the plates 239 and 240 which serve as the totalizer frame. A downwardly extending arm 233 of the two-armed member is provided with a shoulder 234 which cooperates with an overturned lug 235 formed on a plate 236 which is somewhat similar to the plate 194. This plate is pivotally mounted on a slidable rack plate 237 mounted on cross rods 238 carried by the spacing frames 239 and 240 this rack having teeth which are normally in engagement with the teeth of the pinion of the next higher order than that whose disk controls the arms 229 and 233. As shown, the arm 233 is bent or offset to bring it into the proper plane this being necessitated by the fact that each order consists of only two thicknesses of metal. The upper arm 229 must be in the plane of the disk 241 of a lower order while the lower arm 233 must be in the plane of the lugs on the plate 236 and these lugs are in the plane of the rack 237 and the pinion 168 of the next higher order. A spring 242 urges the arm 233 in a clockwise direction until arrested by engagement with the lug 235 another spring 243 connected to the plate 236 urges it down and toward the left to hold it as well as the rack 237 in the normal position shown in Fig. 11. The action of this mechanism is quite similar to that of the mechanism related to the universal totalizers although it will be observed that the arrangement of the plate 236 is about the reverse of the arrangement of the plate 194 connected to the universal transfer slide 171. The operation is as follows: whenever the projection 227 is carried into the nine position it will engage a surface 244 of the arm 229 and rock the two-armed member to disengage the shoulder 234 from the lug 235. Spring 243 will then rock the plate 236 counter-clockwise until another lug 245 thereon engages another shoulder 246 on the arm 233. This is not sufficient to carry a shoulder 247 on the plate in rear of a cross-bar 248 but is merely enough to carry the point 249 of this shoulder to a position on a horizontal line with the upper surface of the cross-bar. Now if the projection 227 passes to the zero position or beyond, the spring 242 will rock the two-armed member to carry the shoulder 246 away from the lug 245 and will permit the plate 236 to drop still further until the surface 250 rests on the cross-bar 248 and the shoulder 247 is in the path of the latter. The cross-bar is carried by a pair of slides 251 which are mounted by means of elongated slots 252 on studs 253 carried by the guide frames 239 and 240, and are connected at their rear ends to the cross bar 198 which operates the universal transfer slides. It will therefore be apparent that the bar 248 will partake of the same movements as explained in connection with the universal cross-bar 198.

Each plate 236 has an upper overturned finger 254 and a projection 255 beneath it. Normally all of the fingers 254 are coupled in series so that each lower order plate if moved would carry with it the next higher order. When all of the plates are at normal none of them will be coupled to the bar 248 so that none will be moved. Assuming, however, that the plate controlled by the units order and connected with the dimes transfer slide has been fully coupled to the bar 248, then its finger 254 will have dropped to a position below the normal position of the projection 255 of the next higher order plate. Now if this next higher order plate is dropped one step to the nines coupling position its projection 255 will be carried into the path of the finger 254 of the fully coupled plate. Should the tens of dollars plate or that next above the first nines coupled plate be also dropped to the nines coupling position its finger 254 will be carried into the path of the finger of the first nines coupled plate. Therefore, when the bar 248 is shifted to the right it will directly carry the dimes plate 236 and the finger 254 of the latter will engage the projection 255 of the dollars plate to shift it, while the finger of this plate will engage the corresponding finger of the tens of dollars plate so that all three plates will be simultaneously shifted. As the tens of dollars plate is shifted its overturned finger will merely enter the notch 256 between the projection and finger of the hundreds of dollars plate.

A point to be noted in connection with the movement of plates which stand in the nines coupling position is the means for maintaining them in proper relation when the lug 245 passes off of the shoulder 246 of the arm 233. In the case of a nines coupled plate adjacent a higher order one which stands at normal it will be clear that the finger 254 of the partly coupled plate can only drop until it is supported by the upper side of the projection 255 of the next higher plate. This is only to the extent of a very slight clearance and is not enough to destroy the proper relation of the parts. Where two adjacent plates are in the nines coupled position the lower order one cannot have the type of support mentioned but must rely on the engagement of the corner 249 provided by the shoulder 247 of the plate 236 with the upper surface of the cross-bar 248. In this connection it is to be noted that there is a slight clearance between the cross-bar and the shoulder 247 of a fully coupled plate so that the cross-bar will be given sufficient movement to carry it beneath the corners 249 of the nines coupled plates before any movement is imparted to any of the plates. On the return movement of the cross-bar 248 toward the left it will be understood that the shifted plates are all returned either by their springs 243 or by the positive action of the bar on the surfaces 257 and at the same time this coaction will serve to lift the plates until the lugs 235 clear the shoulders 234 and the springs 242 are permitted to restore all of the arms 233 to normal. Cross-bar 248 is then shifted slightly to the right into normal position again.

The angularly grooved member 216 which serves to hold the universal transfer elements in nines coupled position serves also to hold the arms 229 in such position upon downward movement of the totalizer wheels. Thus a shoulder 258 of the angle member will cooperate with one side or the other of projections 259 of the arms 229 depending on whether the latter are rocked or in normal position. It should be noted that the actuating racks 162 are slotted suitably to permit a free sliding movement clear of the angle member 216 and on the supporting rods 178 and 180.

Bank of individual totalizers

Adjacent the left hand one of the three banks of universal totalizers, each of which is provided with a single grand totalizer as above explained, there is provided a bank of eight individual totalizers (Fig. 14). These are of substantially the same construction as the grand totalizers of the universal banks and are so arranged that any number of them may be operated at one time. The construction and mounting of the totalizer wheels and their relation to the transfer levers 260 is precisely the same as for the grand totalizers of the universal banks. So also the form of transfer racks 261 and connected coupling plates 262 is precisely the same as the equivalent parts for the grand totalizers and their mode of operation has already been fully set forth. The cross bars or bails 263, for all of the eight totalizers, adapted to effect carries in the proper orders of the latter are mounted in a single slidable frame comprising two side members 264 between which these bars extend. A hook 265 at the right end of one or both of these side members is adapted to engage the cross-bar 198 which is carried by the squared shaft 200. As explained, this shaft has the properly timed rocking movement to effect transfers and to then restore the plates 262 and other parts. For the purpose of holding the levers 260 in their rocked positions when the related wheels have been turned to and left in the nine positions and for preventing these levers from rocking clockwise again under influence of springs 266 as the totalizers are lowered out of mesh with the actuators there is provided a series of slides 267, one for each denominational order, having suitable shoulders 268 to cooperate with shoulders 269 on the levers. The member 216 is turned at the proper time as already explained and by means of camming portion 270 thereon will shift the slides 267 to the left to effect the desired result.

Adding and subtracting totalizers

The extreme left hand bank of totalizers comprises a series of four units capable of both addition and subtraction. As will be explained in connection with the totalizer selecting and engaging mechanism the means for determining the nature of an operation, i. e., whether addition or subtraction, is controlled by the bank of transaction keys. It has been a particular feature of the present invention to provide a totalizer of this type which has each of its orders confined to two thicknesses of metal just as for the simple adding totalizers.

Referring to Fig. 16 it will be noted that each totalizer of this group comprises two sets of pinions 271 and 272 and larger toothed disks 273 and 274. Each order of a totalizer is composed of a pair of the pinions to which are secured the larger disks which in turn are intermeshed by means of large teeth 275 so that turning of either pinion will cause turning of the other. The construction is such that either set of pinions 271 or 272 may be carried into mesh with the actuating racks during the return movement of the latter to either add or subtract an amount. For this purpose the pinions 271 and disks 273 are loosely mounted on a shaft 276 while pinions 272 and disks 274 are loosely mounted on a shaft 277 and these two shafts are supported by a pair of rock plates 278 (Fig. 17) pivoted at 279 by studs carried by the plates and coacting with elongated slots in the intermediate supporting frames 280. The plates 278 are adapted to be lifted slightly when either in the position shown in Fig. 16 or when rocked counter-clockwise to change the relation between the pinions 271 and 272 and the actuators. If the plate is raised when in the position shown the pinions 271 will be carried into mesh with the racks 281 and addition will follow whereas when the plate is rocked and then raised the pinions 272 will be carried into mesh with the actuators and subtraction will follow. The large disks 273 and 274 not only serve to intergear the pinion 271 and 272 but carry extra long teeth 282 and 283 for the purpose of controlling transfers.

A set of transfer racks 284 is provided for each of the adding and subtracting totalizers so that transfers may be effected independently in each. Normally the subtracting pinions 272 are in mesh with these racks but they are carried out of mesh whenever the adding totalizer wheels 271 are raised to mesh them with the actuators. Also when the plates 278 are rocked the pinions 272 are carried out of mesh and the adding pinions are carried into mesh with the transfer racks until the totalizer is raised to mesh the subtracting wheels with the actuators.

The general principle of operation of the transfer mechanism for this group of totalizers is precisely the same as for the individual type of totalizer before described. Thus, for each order with the exception of the highest order wheel of each of these totalizers there is provided a lever 285 adapted to have its horizontal arm cooperate with a long tooth 282 on the large gear 273 or a similar tooth 283 on the corresponding large subtracting gear 274. For this purpose the surface 286 on each arm is adapted to be cammed by the tooth 282 whenever the adding wheels are active and the related one is turned into the nine position. Similarly the surface 287 is adapted to be cammed by the tooth 283 of the subtracting wheel when it is in mesh with the actuator and is being turned into its nine position. When either of these wheels, which happens to be active, is carried to or beyond its zero position the arm will again drop under influence of a spring 288. Rocking of the lever 285 by either wheel as explained will permit a spring 289 to lower the next higher plate 290 either one step or three steps according to whether the wheel has passed to the nine position or to or beyond the zero position. If the plate is dropped only one step the point of the shoulder 291 is brought just above the plane of the upper surface of the cross-bail 292. If the plate is dropped three steps the shoulder will be brought completely into the path of the bail 292. Just as for the individual totalizers the plates 290 are provided with overturned fingers 293 and projections 294 so that when a lower order plate is fully dropped and a next higher plate is dropped a single step its projection 294 will be in line with and to the left of the finger 293 of the lower plate. Movement of the bail 292 toward the left will therefore shift the lower order plate and through the finger and projection will also shift the next higher plate to the left (Fig. 16). Furthermore if the next still higher order plate is dropped one step its finger 293 will be in line with the finger of the first mentioned higher order plate so that all three plates would be shifted simultaneously, and so on.

The plates 290 are pivotally secured as by pins to the slidably mounted transfer racks 284 so that upon shifting of the plates the racks will be shifted and by engagement of the teeth 295 with the pinions 272 a unit will be added to the adding wheels, assuming that these have been active. In this connection it is to be noted that the unit is transmitted to the pinions 271 through the large disks 273 and 274 and the subtracting wheels 272 which act as idlers so that the movement of the transfer racks and hence the bails 292 is required to be in the opposite direction from that of the other banks of totalizers described. For this purpose the bails are mounted in downwardly extending arms 296 depending from two slide bars 297 which thus form a sliding frame mounted on rods 298 which support the levers 285. Movement of this frame to shift the bails first to the left, then to the right beyond normal to restore the plates 284, and finally to the left to normal position is effected by the squared shaft 200 through a pin and slot connection 299 between the arm 199 and a lever 300 whose upper end engages in a notch 301 in one of the slide bars of the frame.

If subtraction is being effected the teeth 302 of the actuated transfer racks will directly engage the adding wheels and turn them a unit subtractively. In the foregoing discussion mention has been made of the nine position and the zero position of the subtracting wheel 274. It is to be understood that this refers to the relative position of the long tooth 283 of this wheel to the shoulder at the left of the surface 287 on the transfer lever. This relation is such that when the tooth is nine steps from the shoulder so that the wheel is said to be in the nine position the corresponding adding wheel will be in the zero position. When the subtracting wheel is in its zero position, on the other hand, the adding wheel will be in the nine position and so for all positions of the two related wheels the one will represent the nine's complement of the other.

In order to hold a transfer lever 285 which has been moved to the nine position and prevent its following the downward movement of the totalizer as the latter is moved out of mesh with the actuators the extreme ends of the horizontal arms of the levers are adapted to cooperate with hooks 303 formed on slides 304. The latter are adapted to be shifted at the proper time by the camming portion 305 of the previously described shaft or member 216. Any of the levers 285 which have been rocked will thus be held in the nine position while the remaining levers for all four totalizers will be held in their normal positions as long as the shaft 216 remains rocked.

The means for determining the positions of the several plates 278 to control the condition of the totalizers in this bank, as to whether they are to receive additive or subtractive amounts, as well as the means for controlling the movements of the totalizers into and out of mesh with the actuators will be described in a subsequent section.

*Special key banks*

In addition to the banks of amount keys the machine, as already suggested, is provided with several banks of special keys, there being three such banks shown (Fig. 22). These are devoted to the designation of clerks, transactions and departments and are indicated respectively by the characters 44, 43, and 45.

The construction and arrangement of these keys in each bank are substantially the same as for the amount keys. Thus, there is provided for each bank a detent bar 52 (Figs. 23 and 82) carrying hooks or beaks 23 to engage openings in the several keys to hold them depressed or elevated and there is also a release bar 62 which upon depression of a key serves to release the detent bar 52 for one step of movement to latch the key. Single key pendants 50 adapted to permit the full depression of only a single key in a bank are also provided. The parts, furthermore, are mounted in a channel frame 46 which serves to establish a unit assembly of these parts. Upon operation of the main operating mechanism the plate 58 will be rocked an additional step by means of the rod 70 carried by arms 71 secured to the shaft 72 to permit the detent bar 52 to move still further toward the rear so that the beaks 53 may completely lock the keys in whatever position they may happen to be. Toward the end of an operation of the machine the cross rod 78 engages a shoulder 79 on the detent bar and restores it to normal thereby releasing the keys.

The differential mechanism controlled by the special banks of keys is required to take effect much sooner that the amount differentials due to the control of the special keys over the totalizer selecting mechanism as will be explained in a later section. On account of the form of differential mechanism adopted the special keys are not provided with the projections and cut out portions to be found at the ends of the amount keys but are preferably flat across the bottom ends. Another feature of distinction between these banks and the amount banks is that no zero stops are provided for the special keys. This is due to the fact that certain springs are provided to maintain the parts in normal and the depression of some key in each of these banks is always required to release the machine, except in totaling operations, as will be explained.

Figure 27:
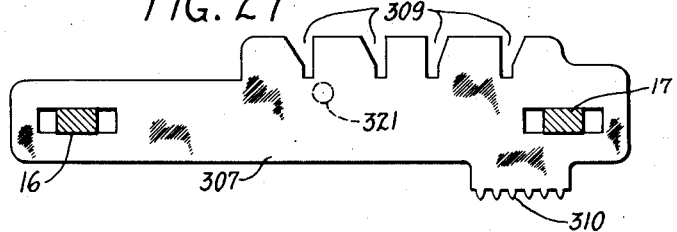
Figure 27 is a detail view of a positioning slide acted upon by the four rear special keys of a bank.
Figure 28:
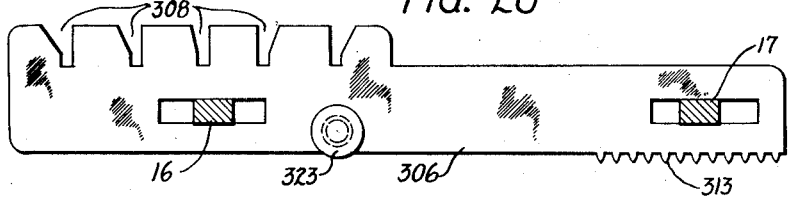
Figure 28 is a detail view of a positioning slide acted upon by the five front special keys of a bank.
Figure 34:
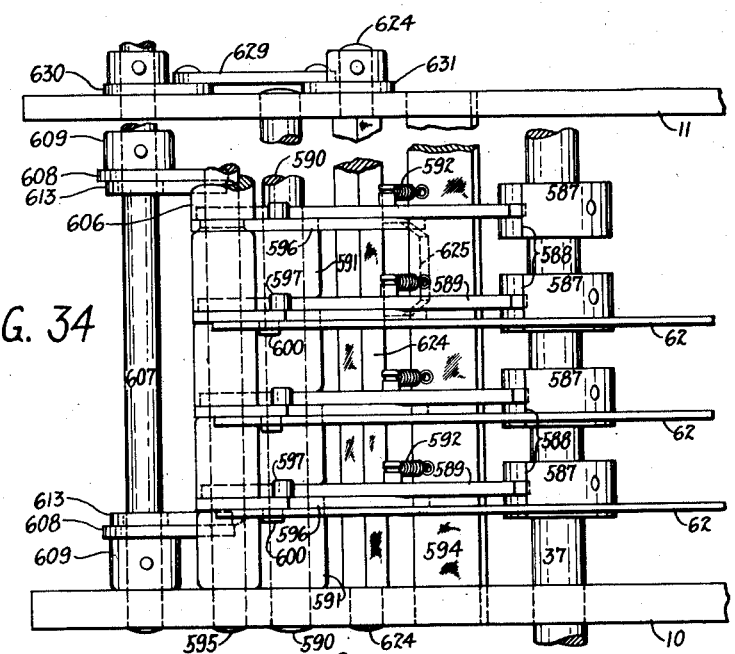
Figure 34 is a plan view of certain of the interlocking mechanism.

Each of the special key banks (Fig. 23) is provided with a pair of slides 306 (Fig. 28) and 307 (Fig. 27) having a series of slots 308 and 309, respectively. The five lowermost keys (Fig. 23) are adapted to cooperate directly with the slots 308 in the slide 306 and these slots have one edge of graded inclination and one edge straight. The construction is such that the lowermost key will shift the slide three steps downwardly while the next key will shift it two steps downwardly and the third key from the bottom will shift the slide only one step downwardly. On the other hand the fourth and fifth keys will move the slide upwardly one and two steps respectively.

Figure 24:
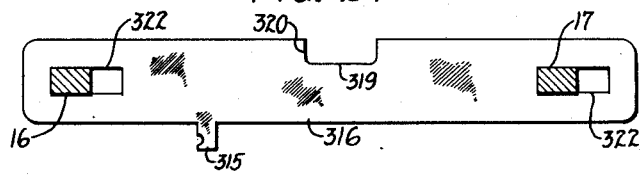
Figure 24 is a detail view of the rearwardly tensioned centralizing slide for a special key bank.
Figure 25:
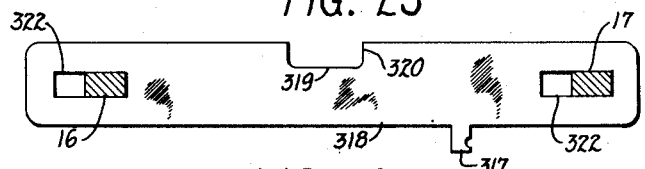
Figure 25 is a detail view of the forwardly tensioned centralizing slide for a special key bank.

The four uppermost keys in the bank cooperate with the slots 309 in the slide 307, and these slots are so arranged that the slide is moved upwardly two steps by the uppermost key, and one and one-half steps by the next key, while the third key from the top shifts the slide downwardly two steps and the fourth key moves it two and one half steps in this direction. A rack portion 310 on the slide 307 meshes with a pinion 311 mounted loosely on a reduced portion of the shaft 137. Secured to this pinion is a larger gear 312 of twice the diameter of the pinion and this gear meshes with rack teeth 313 formed on the slide 306. It will be understood therefore that any movement of the slide 307 will be transmitted to the slide 306 and in such a way as to cause twice as great a movement of the latter slide. Considering the movements of the slides, as already mentioned, it will be apparent that the slide 306 may be shifted to any one of five different extents downwardly or any one of four different extents upwardly depending upon the key depressed, the greater movements in either direction being brought about indirectly through the slide 307 and the gear and pinion connection. A spring 314 extending between a lug 315 depending from a slide 316 (Fig. 24) and a lug 317 depending from a slide 318 (Fig. 25) serves to maintain these parts normally in the position shown in Fig. 23. For this purpose the two centralizing slides are provided with cut-out portions 319 forming shoulders 320 which engage opposite sides of a pin 321 on the slide 307. The supporting slots 322 cooperating with the bars 16 serve to limit the movement of the slides under influence of the spring 314. Due to the two to one relation between the movements of the two slides any movement of the slides from normal will tend to stretch the spring 314 and this will be opposed by the spring itself.

A stud 323 is mounted on the slide 306 and is carried thereby to any one of nine different positions, five down and four up from the normal. This positioning of the stud takes place at once upon the depression of one of the special keys and prior to any movement of the main operating mechanism. Now as the operating mechanism begins to operate the shaft 324 will be rocked by connections which will presently be described. Arms 325 secured to this shaft carry a rod 326 and rollers 327 which cooperate with a slot 328 in a plate 329 pivoted to the upper end of a bell-crank member 330. A V notch 331 in the plate is adapted to cooperate with the stud 323 as the plate is rocked and since the stud is held firmly in one of its nine positions of adjustment the V camming notch will force the plate together with its own pivot either to the right or left an amount corresponding to the key depressed. This means that the bell-crank member 330 will be rocked about the fixed pivot 332 to an extent depending upon the key which has been depressed.

Figure 26:
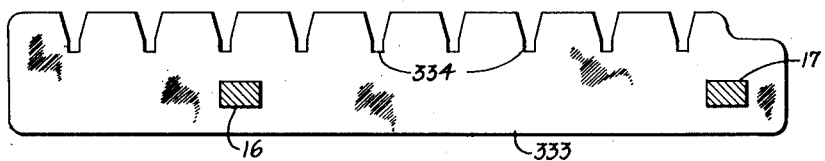
Figure 26 is a detail view of a fixed plate used to guide and strengthen the ends of the special keys.

A special plate 333 (Fig. 26) having a series of slots 334 which are in direct alinement with the several keys of a bank serves to guide the lower ends of the keys as they are depressed and holds them steady. These slots are wide at their upper ends but taper down to the width of the keys at their lower ends. The slots in the slides 306 and 307 likewise converge toward the bottom into a narrower straight sided alining portion and a similar construction is provided for the V notch 331.

The means for operating the rock shaft 324 to rock the plates 329 at the beginning of an operation of the machine comprises an arm 335 secured to the shaft toward its right hand end (Fig. 51) and a link 336 extending between the arm and a lever 337, carrying a roller 338 (Fig. 72) adapted to cooperate with a cam groove 339 formed in the side of gear 36 on the previously mentioned operating shaft 37. The groove 339 is so formed that after a slight idle movement of the operating shaft the lever 337 will be rocked and will be held in operated position until near the end of the operation of the machine. As will be noted in Fig. 23 the plates 329 are provided with openings 340 surrounding the shaft 324 and so shaped as to insure proper return of the plates to normal upon restoration of the shaft.

Teeth 341 formed on an extension at the lower end of the bell-crank member 330 (Fig. 23) mesh with a rack slide 342 which is mounted on the cross-bars 18 and 19 that support the amount racks 160. Combplates 343 serve to maintain the proper position and alinement of these racks. Rack teeth 344 on the undersides of the rack slides 342 are adapted to mesh with a pinion 345, 346 or 347, secured respectively to shafts 348, 349 and 350, similar to the amount denominational shafts 158. It will be understood, therefore, that a shaft is provided for each bank of special keys so that, as will now be explained, it is possible to control lower rack slides 351, 352 and 353 in as many of the banks of totalizers as desired, to determine which, if any, of the totalizers in each group shall be active. For this purpose each of the three shafts related respectively to the transaction, clerks, and department key banks, carries a number of pinions 345, 346 or 347 (Fig. 9) which mesh with rack teeth on the upper edges of the lower slide bars, a slide bar of this character being provided for each group of totalizers as to which the particular bank of keys exerts a control. Thus for the transaction bank of keys there is provided a bar 352 for each of the five banks of totalizers and the three banks of counters, since the nature of the transaction being entered determines whether or not certain totalizers or counters are to be engaged with the actuators from each of the groups. There will, therefore, be eight pinions 346 on the shaft 349 related to transactions. The particular clerk involved in an entry in the machine on the other hand, need only affect the selection of a totalizer or counter in the clerks' bank so that but two bars 353 and three pinions 347 on the clerks' shaft 350 are provided, the one pinion being merely for actuation of the shaft from the corresponding slide 342. As for the department keys it will be observed that they enter into the selection of a totalizer not only in the department bank but also in the bank of eight individual carry totalizers to determine the selection of the two uppermost totalizers, namely the groups one and two total sales registers; they also select a department counter. There will, therefore, be three bars 351 and three pinions 345 related to the department key shaft 348. There are extra pinions on the three shafts for positioning the type bars, as will be explained later.

Referring now particularly to Figs. 9, 11 and 13 the means whereby the slide bars 351, 352 and 353 serve to determine or control, in conjunction with other elements, the selection of totalizers will now be described. Toward the rear end of each bar on its under side there is provided a notch 354 which serves as a socket for the upper end of a lever 355 loosely mounted on a cross shaft 356. A downwardly extending arm 357 of the lever 355 is bent to pass thru a hole 366 in the frame 239, and has its lower end fitted into a socket 358 in the upper edge of a slide bar 359 mounted on supporting rods 360 and combs 361 and 362 (Fig. 29). The slide bar 359 is cut away in places and is left in its full height at other points so that either a notch or a solid portion of its upper edge may be brought into the path of a crossfinger 363 of a pivoted plate or bail 364 related to each totalizer in the bank with which the particular slide bar cooperates. As will presently appear if a notch 365 in the bar presents itself to a crossfinger 363 after the bar has been shifted under control of its special key bank then the related totalizer will be selected, whereas if a projection or solid portion of the bar presents itself to such finger, the related totalizer will not be selected.

The bail 364 is pivotally mounted on pins 367 and 368 extending from the supporting frame plates 172 and 173 for each universal totalizer and it is normally urged in a clockwise direction (Fig. 11) by means of a spring 369. Movement of the bail 364 in this way, however, is normally prevented by means of a slide bar 370 whose upper edge normally stands under the finger 363 and holds the bail with a shoulder 371 against a fixed rod 372 carried by the spacing plates 239 and 240. At the appropriate time in the operation of the machine, however, the bar 370 is forced to the left (Fig. 11) by means which will be described and a cutaway portion 373 will be presented below each of the fingers 363 of the several bails 364 for the totalizers in the bank. Now if a notch in the bar 359 happens to be positioned below the finger 363 of a particular bail the spring 369 will rock the bail until a notch 374 toward its upper end engages a rod 375 which is slidably supported between the two spacing plates 239 and 240 in slots 376 and passes through similar lots in the two totalizer frame plates 172 and 173. This rod is adapted to be raised a slight distance, and this is the reason for its beng mounted in the elongated vertical slots 376. The rod passes freely through these elongated slots in the two totalizer frame plates and is held against longitudinal movement by engagement of its shouldered ends with the spacing plates 239 and 240 as best shown in Fig. 12. At the appropriate point in the operation of the machine all of the rods 375 adapted to be elevated and those bails 364 which have been rocked to engage the notches 374 with their rods will also be raised. Since the bails 364 are pivoted on the totalizer frames the latter will be raised also and the totalizer pinions 168 will be carried into mesh with the actuating racks. Of course any bail 364 which has not been rocked by virtue of the fact that the finger 363 has encountered a solid portion of the bar 359 will not be raised and it, as well as the related totalizer, will be held against accidental lifting by cooperation of shoulder 371 with the rod 372. It is to be noted that when the bar 370 is shifted to the left even such a bail will be rocked slightly but not to a sufficient extent to engage the notch 374 with the rod 375 or to disengage the shoulder 371 from the rod 372.

The means for raising the several rods 375 at the appropriate time comprises a series of toggle links 377 each of which is connected at one end to one of the rods and all of which are connected at their opposite ends to a slide bar 378. At the appropriate time, namely after the actuators have been differentially positioned during adding operations, the bar 378 is shifted to the right (Fig. 11) with the result that all of the toggle links will be straightened out to a more nearly vertical position. This will cause the rods 375 to be raised in the guide slots of the division plates and any of the bails 364 which have their notches 374 engaged with these rods will be lifted and will carry their related totalizers into mesh with the actuators. The means for shifting the bar 378 in the manner indicated comprises an arm 379 which is secured to the shaft 356 and which is connected, as by a pin, at its lower end to the bar. The system of levers, links and cams for rocking the shaft 356 at the appropriate time to give the proper movement to the bar 378 will be described in a later section, suffice it to say at this point that the timing of this operation varies in accordance with the nature of the operation, i. e., whether adding, totaling, or subtotaling. It will be understood that movement of the bar in the reverse direction, i. e. to the left in Fig. 11, serves to lower the rods 375 and withdraw the totalizers which were previously raised.

It is important to note in connection with the foregoing that in those banks of totalizers where several of the notched bars 359 are provided it is necessary that a notch in each of them be presented beneath the finger of a bail 364 related to a particular totalizer in order to cause the engagement of that totalizer with the actuators. Thus for the bank of eight individual carry totalizers there will be a notched bar under the control of the transaction bank of keys and another under the control of the department bank of keys. Obviously if either of these bars should be so positioned as to present its high upper edge or a projection to the finger of a particular bail the spring 369 acting on the bail could not engage the notch 374 with the rod 375. Notches 365 in all bars must be alined to permit rocking of the bail 364. As will be more fully explained hereinafter there are other bars, similar to those controlled by the several banks of special keys, provided for the various banks of totalizers and these must likewise have a notch alined with a particular finger 363 to permit engagement of the related totalizer. These additional bars are under the control of certain cashiers' locks and the total controlling devices.

Returning to the bar 370 which as stated is for the purpose of normally holding all of the bails 364 in rocked position and which is shifted to the left (Fig. 11) at the proper time to permit the bails to be rocked provided that notches 365 in all of the controlling bars are alined beneath the fingers 363 of these bails, it will be noted that it is provided on its forward upper edge with a series of rack teeth 380 (Fig. 2). These are adapted to mesh with a pinion 381 secured to a shaft 382 which as shown in Fig. 3 has secured thereto outside the left side frame a pinion 383. This pinion meshes with a segment 384 pivoted at 222 and provided with a rearwardly extending arm 385 carrying a roller 386 which rides in the raceway 387 of the cam 207. The timing of the raceway 387 in this cam is such as to permit the necessary movements of the totalizers during all operations and for this purpose the cam holds the bar in the normal position shown during about the first 30° of movement of cam 207 and then shifts the bar and retains it in shifted position until very near the end of the operation of the machine. It will be noted that the upper edge of bar 370 (Fig. 11) is slightly above the upper edges of the selecting bars 359 so that normally the fingers 363 are held high enough to permit free movement of the selecting bars. Furthermore, the cam formation of the surfaces 388 of the bar 370 renders them effective on the return of the bar toward the right (Fig. 11) to return the bails 364 to their normal inactive positions.

It should be understood that the construction of the totalizer selecting and engaging mechanism is precisely the same for all of the banks of adding totalizers and the counters. The several banks differ one from the other only in that the number of selecting bars 359 may vary and the arrangement of the notches in these bars will necessarily differ. Reference to Fig. 10 will disclose the special formation of each of the selecting bars required for each of the banks of totalizers to adapt the machine for the particular business selected for illustration. Section Q of Fig. 10 discloses the form of the two bars 359 controlled by the department and transaction banks of keys which are associated with the department bank of universal totalizers. The vertical lines appearing at about the centers of the blocks designating the totalizers in this figure represent the position of the cross fingers 363 of the bails 364. In the normal position of the bar controlled by the department bank of keys none of the totalizers of this bank will be selected, with the exception of the lowermost or individual carry totalizer since in this position there is a notch in line only with the finger 363 for this totalizer. The lowermost totalizer as shown is devoted to the total sales of cashier No. 2 so that this totalizer has no real relation to the department bank. For each of the other totalizers of this bank there is one of the nine positions of the bar away from normal in which a notch is alined with the corresponding finger 363 while in eight shifted positions of the bar with respect to each totalizer there will be presented the high portion of the bar. Thus only a single one of these totalizers may be selected at one time and that one depends upon the department key depressed. As for the bar 359 controlled by the transaction bank of keys there is normally a notch opposite each of the fingers 363 related to all totalizers. This is to permit the necessary selection during totaling as will be explained. Upon shifting this bar notches will be presented to all of the fingers when either the cash, charge, or C. O. D. key is operated but when any other transaction key has been depressed the bar will present high portions to all of the fingers. This will insure that only actual sales will be registered in any of these totalizers including the foremost or cashier 2's totalizer. Other types of transaction will not be registered since they do not represent real sales.

Section P of Fig. 10 shows the two bars 359 related to the clerks' bank of totalizers and controlled by the clerks' and transaction banks of keys. That bar controlled by the clerks' bank of keys corresponds precisely to the department bar for the bank of totalizers discussed in the preceding section. Insofar as the foremost or clerk's total sales totalizer is concerned it is desired to engage it whenever any one of the other clerk's totalizers is engaged and it must be independent of the clerk's bank of keys for totaling. That bar which is controlled by the transaction keys is exactly the same as the transaction bar described for the department bank of totalizers.

It should be explained here that the arrangement of the totalizers in the three universal banks does not correspond precisely to the arrangement of keys in the related banks. Correspondence between the positions of the totalizers and keys is maintained except for the first and sixth totalizers from the rear whose positions are interchanged with respect to the first and sixth keys from the top of the three special banks. Thus, the A clerk's totalizer is the sixth from the rear of the clerks' group while the G clerk's totalizer is the rearmost of this group. The reason for this slight transposition is to provide a greater space between the sockets 358 for the arms 357 which shift these selecting slides and the rearmost control notch. Since the uppermost key in any of the special key banks will bring about four steps of movement of the control slide to the left in Fig. 10 it will be apparent that if a notch had to be provided in line with the finger 363 of the rearmost totalizer this notch would fall very close to the socket for arm 357. The slight rearrangement indicated obviates this difficulty. For all other keys the totalizers of the three universal banks from rear to front follow the arrangement of the keys from top to bottom.

The transaction bank of totalizers is provided with only a single bar 359, section O of Fig. 10, that is controlled by a special key bank and this is under control of the transaction keys. It is substantially like the department and clerks' bars related respectively to the department and clerks' banks of totalizers. Normally a cut-out or notched portion is in line only with the finger 363 related to the foremost or "cashier 1 total sales" totalizer while for each of the nine shifted positions a notch is brought in line with a different one of the fingers related to the remaining totalizers. Unlike the other bars mentioned this bar does not permit the engagement of the foremost totalizer on all operations, but only when either the cash, charge, or C. O. D. key is depressed.

For all other shifted positions of the bar there is presented a high portion to the finger related to this totalizer.

Referring to section N of Fig. 10 it will be noted that there are provided two bars 359 controlled by the special keys namely by the department and transaction banks for determining the selection of the individual totalizers. The department bar is cut away opposite the six foremost totalizers of this group so that it will not interfere with the selection of any of these totalizers by the means which should control them. For the first totalizer from the rear of the machine the bar will be cut-away to permit its selection in the normal position and in the positions determined by the keys marked "Sheet," "Records," "Rolls," and "Tuning and repair." For the remaining positions of the bar the first totalizer will be prevented from being engaged with the actuators. The second or "group 1 total sales" totalizer will be normally free for selection insofar as this bar is concerned due to totaling requirements and notches or cut-away portions are also provided in the positions determined by the keys marked "Victrola," "Cabinet," "String instrument," "Wind instrument" and "Piano." Shifting of the bar to any of the other positions as by the depression of a group 2 key will prevent selection of this totalizer.

The transaction key controlled bar enters into the selection of all of the individual totalizers. In the normal position of this bar it presents a cut-out portion opposite all totalizers so that all are normally free to be engaged for purposes of totaling. The first two totalizers represent total sales so that notches or cut-out portions of the bar line up with the fingers 363 for these whenever the "Cash," "Charge," or "C. O. D." keys are depressed. The next two totalizers of this group represent money taken in and are therefore to be engaged only when the "Cash," "Rec. on acc't.," or "C. O. D. Paid" keys are depressed. Notches are therefore provided in the bar only for the positions determined by these keys. For the next two totalizers which represent money paid out the transaction bar is notched only in the positions determined by the keys designated "Paid out," and "Gds. ret. cash." The last two totalizers of this group represent only cash transactions so that the transaction bar is notched only in the cash position in addition to the normal position opposite these totalizers.

*Selection and control of adding and subtracting totalizers*

A somewhat different problem is presented by the adding and subtracting bank of totalizers. It is necessary with respect to these to not only determine which of the totalizers shall be active but also whether they shall be additively or subtractively affected.

As shown in section M of Fig. 10 only the transaction bank of keys requires a bar 359 in this bank of totalizers to aid in selection and this group of keys must likewise determine the nature of the entry.

In place of the simply vertically movable side frames that are provided for the plain adding totalizers the adding and subtracting units, as previously explained, are provided with side plates 278 (Fig. 16) which may be both lifted and rocked. Normally these plates are in such position that the pinions 272 of the subtracting wheels are in mesh with the transfer teeth 295 while the rods 375 are at the lower ends of the elongated guiding slots in the supporting and spacing plates 280. In this position of the plates 278, furthermore, the arcuate slots 390 in the lower portions thereof have their right hand ends (Fig. 16) in contact with studs 391 extending from lifting bails 392 which are similar to the bails 364 for the adding totalizers. Each bail 392 is normally urged in a clockwise direction by a spring 369 but is prevented from moving in this direction by engagement of the cross finger 393 of the bail with the slide bar 370 such as also provided for the plain adding totalizers. This bar, therefore, is shifted at the beginning of an operation of the machine to carry a series of notches 373 below the fingers 393 of all the bails and permits the springs 369 to rock the bails 392 provided notches in the selecting bars 359 controlled by the transaction keys are also beneath the fingers. For the rearmost totalizer (Fig. 10) which represents "total net cash" this will be the case whenever any one of the "Paid out," "Goods returned cash," "Cash," "Received on account," or "C. O. D. paid" keys are active since all of these transactions affect the status of the cash. Assuming now that the bail 392 for this totalizer has been rocked by its spring 369 due to the operation of the machine with the "Cash" key depressed, the toggle link 377 will be straightened out at the proper time to lift the bail 392 and hence the totalizer frame plates 278 until the adding pinions 271 are meshed with the actuating racks while the subtracting wheels are carried out of mesh with the transfer teeth 295. During this movement of the totalizer frame plates the studs 279 and 391 will be lifted to the upper ends of slots 394 in the supporting and spacing plates 280. After the proper amount has been added the toggle link will be returned to its normal position by the return to the left, just as in the previously described universal bank of totalizers, (Fig. 11), of the bar 378 which operates all of the toggles simultaneously. The means for shifting this bar will be hereinafter described.

Assuming now that the "Paid out" key has been depressed instead of the "Cash" key. It will be necessary to effect subtraction on the rearmost totalizer instead of addition. The operation of the selecting bar 359 and the totalizer lifting mechanism will be precisely the same as explained above. However, the totalizer frame plates must be rocked about the pivot studs 279 until the opposite ends of the arcuate slots 390 are engaged with the studs 391. At this time the adding wheels will be brought into mesh with the transfer teeth 302 while the subtracting wheels will be carried out of mesh with the transfer teeth 295. For so swinging the frame plates 278 a bar 395 is slidably mounted on the rods 390 and carries overturned lugs 397 and 398 one in front and the other in rear of one of the plates. Normally this bar is, as shown, in a position to permit adding. However, a pin 399 at the forward end of the bar is engaged by a fork 400 (Fig. 18) in an arm 401 which is mounted on a stud 402 extending thru hub 403 secured to the side frame 280. An arm 404 connected with the forked arm by stud 402 carries a pin 405 which cooperates with a cam slot 406 in a portion 407 of the lower rack slide 408 that is controlled by the transaction keys and is associated with this group of totalizers. The formation of the slot 406 is such that if the "Cash" key is depressed and the rack slide shifts one step to the left from its normal position the swinging plates 278 will remain in the adding position. So also if the rack slide is shifted two, three, four, or five spaces to the left (Fig. 16) since two of the keys determining these positions, i. e., "Rec'd. on acc't." and "C. O. D. paid," represent money taken in while the remaining keys will not cause the totalizer to be raised at all. However, if the rack bar is shifted to the right one or two steps the arms 404 and 401 will be rocked to shift the bar 395 to the right and will rock the swinging plates 278 toward the subtracting position. Two steps of movement of the rack bar may be utilized for this shifting of condition since for these positions of the totalizer selecting bar a projection or high portion will be presented to the finger 393 and the totalizer will not be lifted at all. For the third and fourth steps of movement in this direction, however, a notch will be presented to the finger 393 and since the swinging plates will be in the subtracting position, subtraction will take place. This then is the condition of the parts when the "Paid out" or the "Goods returned cash" key is depressed.

The control of the second and third totalizers from the rear is substantially the same. These are devoted to the accumulation of totals of the "net cash" taken in by the cashiers 1 and 2, respectively. Therefore the control from the transaction keys is precisely the same as for the rearmost totalizer and there is merely in addition thereto a control from the cashiers' designating means as will be explained in a subsequent section. The same bar 395 which rocks the swinging plates 278 for the rearmost totalizer is provided with similar additional lugs which cooperate with the plates 278 of the second and third totalizers from the rear.

A somewhat different problem is presented by the foremost totalizer of this group which is devoted to C. O. D. transactions. This totalizer is intended, in the illustrative construction, to at all times give an indication of outstanding C. O. D. accounts. Upon the making of a C. O. D. sale the amount is to be added to the wheels of this totalizer while any C. O. D. payment or the return of goods sent out C. O. D. will be registered subtractively in this totalizer. To accomplish the desired result it will be necessary to control this totalizer in opposite sense in certain instances from the control over the remaining totalizers of this bank in which the "C. O. D. paid" amounts, for example, are added. For this purpose a second cam slot 409 (Fig. 16) similar to the slot 406 is provided in plate 407 which is connected with the transaction key controlled rack 408 related to this group of totalizers. The formation of this slot is such that its control thru stud 411 over an arm 410 and connected forked arm 412 (Fig. 17), both of which are secured to a sleeve 413 loosely mounted on the stud 402, will cause the proper shifting of the bar 414 (Figs. 17, 18) which is parallel and similar to bar 395. Lugs 415 and 416 on this bar engage opposite edges of the swinging plate 278 for the foremost totalizer and shift it to determine either addition or subtraction. Normally the bar 414 and plate 278 are in the adding position and when the selecting bar 359 is also in normal the totalizer may be raised to effect totaling through engagement of the adding wheels, as will be explained. However, if the "Cash" key is depressed and the bar 359 is shifted one step to the left the presence of a projection or high portion on the selecting bar beneath the finger 393 for this totalizer will prevent it from being elevated to engage either set of pinions with the actuators while the bar 414 and plate 278 will be shifted toward the subtracting position. So also if the "Charge" key is depressed and the plate is moved one step to the right a high portion of the bar 359 will prevent lifting of the totalizer. Upon movement of the rack slide 408 two steps to the right (Fig. 16) by virtue of the depression of the "C. O. D." key and subsequent operation of the machine the arms 410 and 412 and hence the bar 414 will still remain in their normal positions to retain the totalizer in its additive condition due to the form of slot 409. In this type of operation, however, a notch 365 in the bar 359 will be presented beneath the finger 393 and thus insure rocking of bail 392 to engage its notch 417 with the totalizer lifting rod 375. Adding in the foremost totalizer will therefore result upon this transaction. If the rack bar is shifted still further to the right to either of its other positions in this direction representing "Paid out" and "Goods returned cash" transactions the swinging plate 278 will be retained in its adding condition but high portions on the selecting bars 359 for these positions will prevent raising of the totalizer.

Now if the rack slide 408 is moved two steps to the left as the result of depressing the "Rec'd. on acc't." key the cam slot 409 will rock the arms 410 and 412 still further than when the "Cash" key is depressed and shift the bar 414 to place the swinging plate 278 in the subtracting condition. It will be understood that the "Cash" key will only permit partial movement of the parts in this direction and the movement will not be complete until the rack shifts two steps to the left. The C. O. D. totalizer will not be raised into engagement with the actuators upon operations in which either of these two keys are depressed due to the presence of a high portion of the selecting bar 359 beneath the finger 393 for this totalizer. Upon movement of the rack and plate three or four steps to the left as the result of depressing either the "C. O. D. paid" or the "Goods returned C. O. D." key the parts will be placed in subtracting condition and there will also be a notch in the selecting bar beneath the finger 393 for the C. O. D. totalizer so that the subtracting wheels will, at the proper time, be engaged with the actuators and subtracting will result. Five steps of movement of the rack slide 408 due to depression of the "Goods returned charge" key will place a high portion of the selecting bar beneath the finger 393 of this totalizer so that it will not be raised and there is no harm done by the subtractive condition of the related parts.

From the foregoing it will be clear that the transaction keys not only determine the selection of the adding and subtracting totalizers but determine the nature of their operation, when selected, as well. Furthermore, it is possible to simultaneously add on one totalizer and subtract from another.

*Item counters*

Mention has already been made of the fact that the present machine has, for purposes of illustration, been provided with a number of item counters which are adapted to segregate the entries and keep an accurate count of the number of entries of certain specified types, i. e., those representing actual sales, related to each of the special keys in the three banks. For this purpose twenty-seven counters are required and these are arranged in three banks of nine each (sections R, S and T of Fig. 10). Three additional counters are also provided for the purpose of keeping count of the grand total number of sales made by the entire group of clerks and the total number of operations of the machine effected under control of cashiers 1 and 2 respectively.

Since it is only necessary to operate one of the nine counters of a group during an operation of the machine these may be equipped with a universal or common form of transfer mechanism. This enables the adoption of a construction which is almost identical with that employed for the universal banks of totalizers.

The operation of the units order wheel is effected through a modified form of the transfer mechanism, while carries into the higher orders are effected in the same way as in the universal totalizers themselves. In order to permit of taking the totals standing on the counters they are adapted to mesh with racks cooperating with pinions secured to the denominational shafts 158 just as for the totalizers. However, as will be explained presently, the means for causing the lifting of the counters into mesh with the actuators functions somewhat differently than for the totalizers so that in item entering operations the actuators will not disturb the counters.

The means for adding a unit to the lower order wheel of a counter comprises a system of elements similar to a section of the universal type of transfer mechanism. This includes an actuating bar 418 with teeth to cooperate with the several units order wheels of the nine universal counters. At the right end of this bar (Fig. 29) there is provided a pivoted plate 419 having overturned lugs 420 and 421 adapted to cooperate with shoulders 422 and 423 on an extension 424 of a second bar 425. The latter is carried at its left end by an arm 426 of a member 427 while the right hand end of the bar is carried by an arm 428 of a bell crank 429. This member and bell crank are connected between points having substantially vertical movement by means of a trip bar 430. The arrangement is such that upon lifting the trip bar the member and bell crank will be rocked to shift the bar 425 to the left and withdraw the shoulder 423 from lug 421 thereby permitting the plate 419 to drop under influence of its spring 431 until lug 420 strikes shoulder 422. Subsequent dropping of the trip bar will result in the shifting of the bar 425 to the right again (Fig. 29) and in the disengagement of the shoulder 422 from lug 420 so that the plate 419 may drop two steps further to engage a transfer operating bar 432 which is in all respects similar to the bar 198 (Fig. 11) for operating the transfers of the universal totalizers. In fact the construction and mode of operation of all the parts thus far explained is precisely the same as for such a transfer unit. The primary difference arises through the mode of operating the trip bar 430. For this purpose a large disk 433 (Figs. 32 and 33) is secured to the units order counter wheel to the right of the pinion as viewed from the front of the machine. If desired this disk may merely be loosely mounted on the counter wheel supporting shaft. It is completely circular in form and is directly in the plane of the extra trip bar 430. As the counter is raised in the manner to be explained the disk will invariably raise the trip bar to produce the result already explained. Upon subsequent lowering of the counter the trip bar will be permitted to drop again to bring about the full engagement of the plate 419 with the operating bar 432. In this connection it should be stated that the shaft 216 which normally serves to hold the trip bars of the transfer sections, as 176 of Figure 2, in their nines positions, when so located at the time of the withdrawal of a totalizer from the actuators, is cut away in the plane of the extra trip bar 430 so as not to affect the latter. Now upon operation of the operating bar 432 the actuating bar 418 will be shifted and will add a unit to the selected item counter. Transfers may take place in the manner already described in connection with the universal totalizers.

The same differences exist between the grand total item counters and the grand totalizers related to the several universal banks as above pointed out between the universal counters and the universal totalizers. A large round disk 434 (Fig. 29) of a radius equal to that of the transfer tripping projections 227 (Fig. 11) is provided on the right side of the lower order wheel. This serves to effect the coupling of a special actuating slide 435 to the transfer actuating bar 436 just as a trip tooth effects this result with relation to a transfer slide in effecting carries. It will be apparent that the mere upward movement of the disk 434 with the counter as it is raised will effect the tripping of a trip lever 437 which then permits a plate 438 to drop one step while subsequent lowering of the counter will permit return of the trip lever and the full coupling of the plate. Transfers in this counter will be effected just as in the corresponding type of totalizer.

As in the case of the universal counters the timing of the upward movement of the grand total or individual counters is such as to avoid interference with the forward movement of the actuators. The means for lifting the item counters of all types is of the same construction as the totalizer engaging or lifting means and is even operated by the same cam. This necessitates a special construction for delaying the action of the counter lifting means so that the pinions of the counter will not engage the actuators until they have been restored and are at rest, while of course the totalizers must be lifted prior to the return movement of the actuators. To this end the link 378, which has connected thereto the lower ends of toggle links 377 that are active in raising the counters, is connected at its rear to an arm 439 which is loose on the shaft 356, instead of being secured thereto as is the case with the arms 379 associated with the totalizers. Another arm 440 is secured to the shaft 356 and a spring 441 serves to connect the two arms 439 and 440. At the front of the machine a hook 442 secured to a shaft 443 normally engages a square lug 444 on the side of a bar 378 related to each of the banks of item counters. Therefore when the shaft 356 is turned, by means later to be described, for the purpose of lifting the totalizers, the bars 378 for the item counters will not be shifted, but the springs 441 will merely be tensioned. At a later point in the operation, however, after the actuators have come to rest after being restored to their normal positions, the hooks 442 will be rocked to release the related bars 378 so that the springs 441 may slide these bars suddenly to the right (Fig.

29). The means for rocking the hooks 442 in this manner comprises an arm 445 (Figs. 3 and 7) secured toward the left hand end of the shaft 443 and normally urged by a spring 446 in a direction to cause active engagement of the hooks. Another arm 447 is loosely mounted on the shaft 443 and carries a pin 448 which extends over the arm 445. A sleeve 449 extending from the second arm to an upstanding arm 450 serves to unite these elements for movement together. The last mentioned arm is connected by a link 451 to the bell crank 221 which is urged by the spring 223 in a clockwise direction (Fig. 3). A roller 225 carried by one arm of the bell crank is in the path of a cam projection 226 on the periphery of the cam unit 207 previously mentioned. At the appropriate time, which is toward the end of an operation of the machine, the projection rocks the bell crank so that the arms 450 and 447 are rocked counter-clockwise and through the arm 445 the shaft 443 and hooks 442 are rocked to the free bars 378. Subsequently the shaft 356 at the rear of the machine is returned clockwise (Fig. 29) toward its normal position and a stud 452 carried by each of the arms 440 engages its related arm 439 to restore it and the connected bar 378 to normal for the purpose of lowering the counters. As will be later explained the shaft 356 is oscillated twice in the manner indicated during each operation of the machine so that the counters as well as the totalizers will be lifted and lowered twice. The cam projection 226 (Fig. 3) acting on bell crank 221 is of sufficient length to maintain the hooks 442 in ineffective condition long enough to permit the second movement of the counters together with the totalizers.

The releasing of latches 442 during totaling must be effected much earlier than in item entering operations. The reasons and means for accomplishing an earlier release will be fully explained under a discussion of the "Timing of totalizer engagement."

The selection of the item counters for operation during item entering operations of the machine is effected in the same way as the selection of the totalizers. Whether or not the movement of the toggles 377 with the resulting up and down movement of the rods 375 will serve to lift the counters will depend upon whether the bails 364 are rocked to engage their notches with the rods. A slide 370 for each bank of counters normally has a series of high portions 453 under the several fingers 363 of the bails 364 related to the counters of a particular bank but at the appropriate time in the operation of the machine these slides are shifted to the left (Fig. 29) to present cut out portions to all of the fingers 363. The selecting slides 359 controlled by the banks of special keys will in the meantime have been positioned in accordance with the special keys depressed. Sections R, S, and T, of Figure 10 illustrate the form of the selecting slides for the counters as provided in the machine herein disclosed. Each bank of counters has a slide controlled by the transaction keys. In the clerks and department banks of counters these slides normally tend to permit rocking of the bails 364 of all the counters and similarly tend to permit such rocking of the universal carry counters even when the slides are shifted after the Cash, Charge or C. O. D. key has been depressed. For other positions of the slides as determined by the other transaction keys the bails for these universal counters will not be permitted to rock. It will be understood that in the department bank of counters there will be another slide under control of the department keys which will determine which one of the universal counters will be active provided the transaction slide will tend to permit them all to be raised. For each position of the department slide away from normal eight of the bails 364 will be blocked and one will be permitted to rock so far as this slide is concerned. The grand total counter of this group is devoted to the number of all transactions handled by a particular cashier and will therefore not be affected at all by the transaction slide nor by the department slide. It is controlled solely by a third slide which will be mentioned later.

In the clerk's bank of counters there is a slide 359 controlled by the clerk's keys in addition to the transaction key controlled slide. This clerk's slide serves in the same way in this bank as the department slide in the department bank as discussed above. The grand total counter for this bank is devoted to the sales of all of the clerks, or in other words total sales, so that it is not affected by the clerk's slide but it is affected by the transaction slide to permit rocking of the bail 364 for only "cash," "charge" or "C. O. D." transactions. It will therefore be operated whenever any one of the universal counters for this bank is operated.

For the transaction bank of counters there is but a single special key controlled selecting slide 359 and this is controlled by the transaction keys. This slide always tends to permit movement of the grand total counter bail 364 but it normally blocks all of the others. For each of the nine shifted positions of this slide one of the universal counter bails will be permitted to rock while the remaining eight will be blocked. The grand total counter of this group which is devoted to all transactions handled by cashier 2 is controlled by a separate slide, as will be later explained.

*Cashiers' locks*

Figures 35, 36:
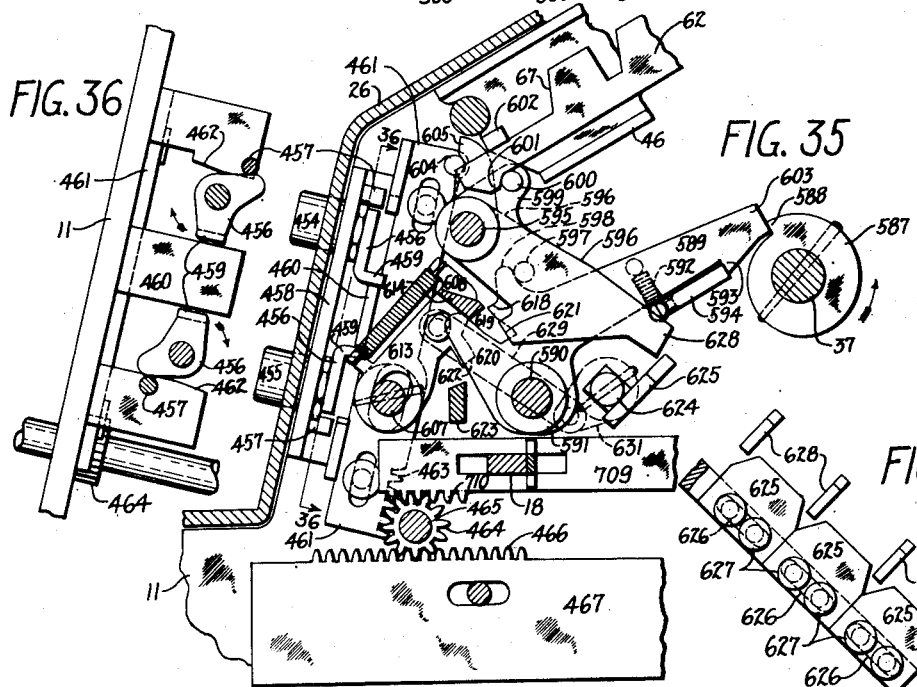
Figure 35 is a view in side elevation of a portion of the interlocking mechanism and the cashiers' locks.
Figure 36 is a detail view showing the cam plates operated by the cashiers' locks and is a section taken on the line 36—36 of Figure 35, looking in the direction of the arrows.
Figure 37:
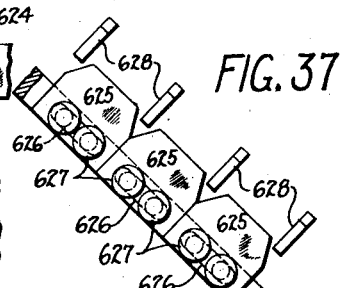
Figure 37 is a detail view of the single key mechanism associated with the interlocking mechanism.

As best shown in Figs. 1, 35, and 36 there are provided two cashiers' locks 454 and 455 which are adapted to designate which of two cashiers is on duty. Turning of a selected one of the locks will control a number of functions in the machine, such as the selection of certain totalizers, printing of a corresponding character, release of machine locking devices, and drawer release mechanism. Only the control over totalizer selection will be discussed here, while the remaining features will be dealt with under later sections devoted to the particular features.

At the inner end of the barrel of each lock there is provided a cam plate 456 each of which has a toe adapted to engage one of the pins 457 carried by a fixed plate 458 which supports the locks. Each cam plate furthermore has a bent over portion 459 which is normally adapted to engage a central overturned extension 460 of a slide plate 461. In the normal position of these cam plates as shown in Fig. 36 they serve to hold the slide plate against movement by cooperation of the latter with the portions 459 of the cam plates and these in turn are held against further counter-clockwise movement by the pins 457. Upon turning one of the locks in a clockwise direction (Fig. 36) by means of an inserted key the bent portion 459 of the cam plate will engage a camming surface 462 of a corresponding overturned extension of the slide plate 461.

Continued turning of the lock will therefore shift the slide plate, it being noted that the bent portion of the cam plate that is turned has in the meantime gotten out of the way to permit this movement of the slide. As will be apparent, the upper lock will cause an upward movement of the slide while the lower lock will cause a downward movement. Rack teeth 463 are provided at the lower end of the slide and these mesh with a pinion 464 secured to a shaft 465 (Figs. 9 and 35). This pinion also meshes with teeth 466 on a slide 467 which as will be later explained aids in the selection and release of the cash drawers. In addition, the slide 467 controls, thru lever 355 (Fig. 88), another slide 468 which carries notches and high portions or projections which enter into the selection of the grand total counter of the third group of counters from the right. As shown in section R of Fig. 10 the notch 469 in this slide 468 is so positioned as to permit the selection of this counter when the cashier I lock is turned. The two armed lever 355 fitted in sockets toward the rear ends of the slides 467 and 468 (Fig. 88) serves to produce the desired cooperative action.

Other pinions 470 (Fig. 9) secured to the shaft 465 are located in the planes of slides 471 similar to slide 467 and which through two armed members 355 serve to shift totalizer or counter selecting slides 472. One of these selecting slides is provided for the adding and subtracting group of totalizers, the individual carry group, the transaction and department groups of universal totalizers as well as the corresponding groups of counters. Sections M, N, O, Q, R, and T, respectively, of Fig. 10 disclose the form which these slides take for the proper control over the selection of the totalizers and counters having to do with the operations by the different cashiers. For all totalizers and counters in these banks which have no relation to cashiers the bars are cut away not only in the normal positions opposite the fingers 363 (Fig. 11) but also in the two shifted positions of the slides. On the other hand, opposite the fingers 363 for the counters devoted to cashiers, these slides are in normal position, provided with high portions while in the shifted positions they are provided on one side of normal with a notch and on the opposite side with a high portion so that one counter may be selected when one lock is turned and another counter is selected when the other lock is turned. Their action is precisely the same as that of the slides controlled by the three special key banks. The slides controlled by these locks in the various totalizer banks are so cut that when in normal position they will not interfere with the selection of the totalizers for totaling.

*Totaling controls*

In the preceding sections the operation of the totalizers and counters has been considered only from the standpoint of item entering which, as explained, may involve either adding or subtracting upon certain selected ones. Provision is also made for the taking of totals from any one of the totalizers or counters in such a way that the amount standing thereon may be determined by means of both indicating and recording mechanisms and furthermore the operation may or may not involve resetting as desired.

For the purpose of determining the condition of the machine as between item entering and total taking a pair of levers X and Y (Figs. 3, 6, and 21) are provided and these are normally locked in their item entering or adding positions by passing thru openings in the cover 27 which is provided with a lock 473 so that only authorized persons carrying the necessary key may determine totals. Movement of one of the levers X or Y will only condition the machine for what is commonly known as a sub-total or read total and will not bring about resetting of the selected totalizer or counter. Whenever it is desired to reset the totalizer or counter selected for totaling it is necessary also to turn the reset lock 474 (Fig. 21) prior to an operation of the main operating mechanism. In order to restrict resetting operations to special parties such as auditors or the like the lock 474 is preferably designed to receive a key different from that required to unlock the levers X and Y. Thus while a manager or perhaps a cashier may be permitted to take sub-totals the operation of resetting is under the control of only the proprietor or a trusted auditor.

The necessity for a large number of totaling positions and hence the desirability of employing a plurality of levers will be apparent when it is considered that there are a large number of totalizers as to which there is no direct means of selection. For example, the selection of any one of the adding and subtracting totalizers depends upon several controlling factors each of which tends to control the selection of other totalizers as well so that the mere conditioning of the machine for totals is not enough when these totalizers are to be selected.

Each of the levers X and Y is adapted to be shifted to any of its adjusted positions by means of a slidable head 475 having a notch 476 in a downwardly extending portion in engagement with a pin 477 at the upper end of the lever. A button 478 (Fig. 3) having a stem 479 slidable in a portion of the hub 480 carried by the head 475 is normally urged downwardly by a spring 481 acting between a collar on the stem and the upper end of hub 480. In the normal condition of the parts the lower end of the stem 479 is centered in a hole 482 in a guide plate 483 in which the head is slidable. Opposite this hole is the legend "Add" which is directly in line with an index point 484 formed on the head. When it is desired to take a total the button 478 related to one of the levers X or Y is raised against the force of the spring and is shifted either toward the front or toward the rear until the index point 484 (Fig. 21) is opposite the desired one of a series of legends related to the type of total desired. The button is then released and the lower end of the stem 479 will enter another one of the series of centering or aligning holes 485 in the guide plate.

Considering first the movements of the lever X which is near the left hand edge of the machine it will be noted in Fig. 21 that one step of movement of the pointer 484 toward the rear will carry it into the position designated "Read." In this position the machine, as will be explained directly, will be conditioned for the taking of a read or subtotal from one of the universal totalizers located in one of the three groups of such totalizers. Which one of these totalizers will be selected will be further determined by the depression of a desired one of the special keys. It will be recalled (see Fig. 10) that in each of the universal groups of totalizers the selecting bars 359, 472, 486 and 496 are so constructed that normally a notch is presented by each adjacent to all of the totalizers, except that in each case the slide controlled by the bank of keys directly related to each group of totalizers will normally present a high portion to all of the fingers 363 to prevent engagement of all. Thus for the clerk's group of totalizers the slide controlled by the clerk's keys will normally prevent rocking of all of the bails 364 but for each shifted position of this slide as controlled by a depressed clerk's key, a certain one of the totalizers will be selected to the exclusion of the others. Another selecting slide 486 (Fig. 10) in each of these groups is controlled by the total lever X and will in its normal or "Add" position have a notch in line with all of the fingers 363 on the totalizer engaging bails 364. So also in the shifted position under consideration a notch will be presented to all of these fingers, related to the universal carry totalizers to permit operation of any one that may be selected by a special key. However, for all of the remaining totalizers including the individual grand totalizers associated with these groups, as well as for the item counters the slides 486 controlled by this total lever will have a high portion opposite all of the fingers 363 and 393 when the slides are shifted one step due to movement of the lever to the "Read" position. This will insure that none of these totalizers or counters can be selected at this time. Of course, when all of these slides are in their normal or "Add" positions they will present notches to all of the fingers 363 and 393 of all totalizers and counters in order not to interfere with their regular selection.

The connections through which the lever X shifts the several selecting slides 486 are as follows:

An extension 487 (Fig. 3) of the lever is connected by means of a link 488 with an arm 489 secured to a sleeve 490 toward the front of the machine. At the required points along the sleeve there is secured thereto a series of arms 491 (Fig. 30) which extend downwardly and have their rounded ends fitted into sockets in the selected slides, one of which is to be found below each group of totalizers and counters.

It will be observed (from Figs. 30 and 31) that some of the arms 491 secured to the inner sleeve 490 must pass thru an outer sleeve 492. This is permitted by providing a cut out portion 493 in the outer sleeve thru which the arm 491 moves, the arm being secured to the inner sleeve by any suitable means such as screws 494. The two sleeves 490 and 492 are mounted on a shaft 495 which is controlled by the reset lever and which as will be more fully explained has no direct action in the way of counter or totalizer selection.

If the lever X (Fig. 21) is shifted two steps toward the rear so that the pointer on the slidable head is brought opposite the legend "Read counters" the machine is conditioned for the taking of a total from any one of the item counters with the exception of the total sales counters. To select any one of the twenty-seven universal type of counters the corresponding special key must also be depressed. It will be apparent that in order to avoid confusion with the universal totalizers the slides 486 when shifted the extra step must present high portions to the fingers 363 (Fig. 11) related to all of the universal totalizers. At the same time notches in the slides 486 related to all of the counters with the exception noted will be brought in line with the corresponding fingers. Selection of the two cashier's counters will be permitted in so far as the slides 486 are concerned and which is to be selected will be determined by the pair of cashier's locks. As for the remaining groups of special totalizers and the total sales counter the related slides 486 are so constructed as to produce the same effect when given two steps of movement as for the single step, i. e. high portions will still be presented to the fingers of the related bails 363

Movement of the lever X three of four steps to the rear so that the pointer on the head 475 is opposite either the "Cashier 1 total sales" or "Cashier 2 total sales" legend will serve to select the corresponding one of these totalizers for totalling. This means that the selecting slides 486 (sections O and Q of Fig. 10) in the transaction or department groups of totalizers will have notches to be brought opposite the fingers 363 of the individual or grand totalizers when the total lever is shifted to these positions but for all other totalizers of these groups as well as all remaining groups, including also the counters, high portions of the slides will serve to prevent selection.

Similarly upon any movement of the lever X toward the front from its normal adding position only a single one of the entire number of totalizers and no counters will be conditioned for selection. To this end a high portion of the several slides 486 controlled by this total lever will be presented to the fingers 363 of every totalizer and counter with the exception of the one which corresponds to the legend opposite which the pointer 484 stands. Thus upon movement of the lever one step forward a notch will be brought into cooperative relation with the rearmost totalizer of the adding and subtracting group, which is related to total net cash. All other totalizers, and counters as well, will have projections or high portions aligned therewith to prevent their engagement. Movement of the lever two, three, four or five steps toward the front will result in aligning a notch in the appropriate slide 486 with the "Cashier 1 net cash," "Cashier 2 net cash," "C. O. D.—C. O D. pd.—gds. ret. C. O. D." or "Clerks total sales" respectively, while all remaining totalizers and counters are disabled All of the first three totalizers mentioned are to be found in the adding and subtracting group while the last mentioned totalizer is the grand total totalizer at the front of the clerks' group.

The other total lever Y functions in substantially the same way to select a definite one of the totalizers for a totaling operation. A slide 496, operated by a lever 497 secured to the sleeve 492 (Fig. 31) is provided for each group of totalizers and the clerks' group of counters under control of this second total lever. These slides in their normal positions are provided with notches opposite all totalizers and counters in order not to interfere with their selection for adding or subtracting. In all other positions of all of the slides 496 except the one associated with the individual group of totalizers and the clerks' counter bank a high portion is presented to every related totalizer and counter. However, since all of the totalizers which are selected by this lever are in the individual group, there will be a notch opposite a different one of the totalizers of this group for each shifted position of the lever. The remaining seven totalizers of the group will be rendered ineffective for each position of the lever Y by the presence of a high portion of the slide. In a similar way, the slide in the clerks' group of counters will have a notch brought into line with its selecting finger upon movement of the lever Y to its foremost position.

Timing of totalizer engagement

It has previously been explained how the rods 375 (Fig. 11) are all lifted upon every operation of the machine by straightening of the toggle links 377. For this purpose, as explained, each group of totalizers is provided with a bar 378 connected to the lower ends of all the related toggles. These bars in turn are connected at their rear ends to downwardly extending arms 379 all of which are secured to the shaft 356, while the corresponding arms 439 related to the banks of item counters are loose on shaft 356.

Figure 4:
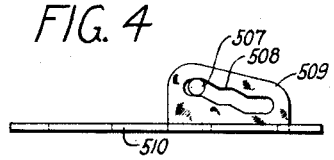
Figure 4 is a bottom view of a cam slide which positions a portion of the totalizer engaging mechanism.

Referring now to Figs. 3 and 6 which show elevations of the mechanism at the left of the machine, the shaft 356 has secured thereto an arm 498 which is connected by means of a link 499 to an arm 500 of a bell-crank lever 501. This bell crank is secured to or formed integral with a sleeve 502, which is slidably mounted on a stud 204, extending from the side frame 9. At the opposite end of the sleeve there is secured an arm 503 (Fig. 39) similar to the forwardly extending arm of the bell crank. In these forwardly extending arms 501 and 503 there are provided rollers 504 and 505 respectively which are adapted to fit into cam grooves or raceways cut in the side of a cam unit 506 mounted on the stud 208. A downwardly extending stud 507 which may be provided with a roller is secured to the sleeve 502 and fits into a cam slot 508 (Fig. 4) formed in a horizontal overturned portion 509 of a slide 510. The latter is adjustable from front to rear of the machine as will be explained, under control of the totaling mechanism and when the machine is in the adding or subtracting condition this slide is, as shown in Figs. 3 and 4, in its foremost position. At this time the roller 505 in the arm 503 of the bell crank is deep into the groove 511 (Fig. 40) of the cam unit 506. On the other hand the corresponding roller 504 in the arm of the bell crank 501 is completely out of the groove 512 (Fig. 38) of the cam 506. Upon an operation of the machine with the parts in this condition the roller 505 will follow the path designated *abcdefg* of the groove 511 (Fig. 40). It should be noted that at the point *h* the pin will be forced into the portion of the groove *hb* rather than following the groove *hic* since the roller extends into the full depth of the groove *abcdefg*. The portion designated 513 or *hic* is only half the depth of the portion *hb* so that a substantial ridge or wall of the cam is provided at *h* to constrain the pin to follow the correct path. The timing of the groove *abcdefg* is such that at the beginning of the operation of the machine and for approximately 155 degrees (Figs. 6 and 89) the bell-crank 503 will remain idle and the toggles 377 will therefore remain stationary and have no effect upon the totalizers. This is for the purpose of first permitting the differential mechanism to position the actuators in accordance with the keys depressed. The totalizer selecting slides 359 (Fig. 12) will also be positioned at this time while the other selecting slides 472, 486 and 496 will have been positioned prior to the beginning of the operation of the machine.

Upon the entry of the roller 505 into the portion *bc*, however, the bell-crank will be rocked, thereby turning the shaft 356 and causing all of the toggles 377 to be straightened. As a result those totalizers which have been predetermined for actuation by virtue of the adjustment of the selecting slides 359, 472, 486 and 496 to present a series of notches in line with their related fingers 363 will be raised to engage their pinions with the actuators. In the case of the adding and subtracting totalizers (Fig. 16) this may mean the engagement of either the pinions 271 or the pinions 272 depending upon the position of the plates 278. During this period then the amount determined by the depressed amount keys will be either added to or subtracted from the engaged totalizers. When the actuators have reached their home positions the cam 207 will rock the double lever 221, as previously explained, to cause the rocking of shaft 443 and the consequent disengagement of the hooks 442 which have up to this time detained the bars 378 related to the counters. As a result the springs 441 will draw these bars to the right (Fig. 29) and suddenly straighten the toggles 377 to cause upward movement of the selected counters. This will, as explained, bring about the tripping of the special transfer mechanism for the units orders of these counters. Now the roller 505 will have reached the beginning of the portion *de* of the cam groove and the totalizers as well as the counters which have been lifted will be lowered again to engage their pinions with the transfer slides. Shaft 200 will be rocked at this time to shift the bars 198 and 432 and thereby effect a carry into those orders of all of the totalizers and of the item counters, in which the transfer actuators have been partly or fully coupled to the actuating bar. Even those totalizers of the universal banks which were not selected for operation will have a unit inserted therein wherever transfers are to be effected in the selected universal totalizers of those groups due to the fact that only a single transfer actuator 171 is provided for all nine wheels of a certain order of the nine totalizers. However, after the carries have been effected a slight depression *ef* in the cam groove 511 serves to lift the selected totalizers and counters out of engagement with the transfer actuators and into engagement with the stationary actuating racks again. It is at this time that the transfer actuators are restored to normal and in being so shifted those related to the universal banks of totalizers will subtract the units from all orders into which they were erroneously put in the unselected totalizers and counters of these banks. Of course, the selected totalizers and counters will not be affected at this time due to the fact that they are elevated and out of engagement with the toothed transfer slides. It should be noted that the cam projection 226 (Fig. 3) which rocks the hooks 442 to release the counter engaging bars 378 is so timed (Figs. 8, 9 and 13) as to hold these hooks out until the counters start on their second upward movement so that the return to normal of the transfer actuators for the counters will not subtract the units from those counters that have been selected. Portion *fg* of the cam groove 511 now becomes effective to restore the bell-crank 501 and connected parts including the toggles 377 to their normal positions.

If either of the total controlling levers is moved out of its adding position, connections which will now be described come into play to shift the bell-crank 501 and arm 503 axially along the supporting stud 204. Referring particularly to Figs. 3, 6, and 41 it will be noted that each of the levers X and Y is provided with a roller 514 (Figs. 3 and 5) toward its upper end which cooperates with a cam groove 515 (Fig. 41) in a forwardly extending arm of one of a pair of bell-cranks 516. The groove 515 in each of these bell-cranks is such that upon movement of the related total lever one or more steps in either direction from normal the bell-crank will be rocked a certain extent in a clockwise direction (Fig. 3). A pin 517 is carried by the downwardly extending arm 518 of each of these bell-cranks and each pin stands normally in rear of one of a pair of links or pitmen 519 and 520 and holds it in the position shown against the tension of a connected spring 521. However, upon rocking of one of the bell-cranks as explained and the removal of the pin 517 from the rear of the related pitman 519 the latter will be drawn by its spring 521 until the edge of a cut out portion 522 of the pitmen engages a square stud 523 carried by a segment 524. An extension 525 of the segment 524 carries a roller 526 which cooperates with a cam groove 527 (Fig. 53) in a cam 156 secured to the driving shaft 37. The form of this groove is such that at the very beginning of the operation of the machine the segment will be rocked clockwise and will be held in rocked position until very near the end of the operation of the machine. As a result of this rocking movement the square stud 523 will be raised and will engage a shoulder 528 formed by the cut out portion of the link 519 or 520 that has been permitted to rock rearwardly. The movement of the stud 523 is sufficient to not only take up the normal clearance in the cut-out portion up to the shoulder 528 but to lift the link 519 to a certain extent as well. The links 519 and 520 are of the same construction, the first being related to the lever X and the second to the lever Y. At their lower ends both of the links 519 and 520 are connected to a plate 529 which is pivoted by means of a stud 530 extending from the side frame 9. Therefore, upward movement of either of the links 519 or 520 will cause the rocking of the plate 529 so that a notch 531 in the latter engaging a roller 532 carried by an extension of the previously mentioned slide 510 will slide the latter toward the rear. The arrangement is such that the upward movement of one of the links 519 or 520 will serve to shift the slide 510 only about half of the effective length of the cam slot 508 which by this movement acts upon the roller 507 (Fig. 38) and slides the arms 501 and 503 and sleeve 502 axially on the supporting stud 204. This movement, however, will not be sufficient to carry the roller 505 of the arm 503 wholly out of the groove 511 in the cam disk 506 but will merely carry it to a position where it enters the disk to an extent slightly less than the depth of the shallower portions of the groove in said disk. At the same time the roller 504 in the bell-crank 501 will enter the groove 512 to an extent equal to about half of the greatest depth of the groove or slightly less than the shallower portions.

The formation of the portions of the groove 512 in the disk 506 (Figs. 38, 39 and 40) which are active at this time is such as to cooperate with the groove 511 previously mentioned so that a smooth and positive action on the bell cranks 501 and 503 is brought about. Thus a portion *jk* of this groove 512 (Fig. 38) will first permit a small idle movement of the cam disk without disturbing the bell-crank, but when the point *k* is reached the disk will rock the bell-crank to cause the selected totalizer wheels to be lifted. It should be noted that at the point in the operation of the adding groove 511 (Fig. 40) corresponding to the section *kl* of the groove 512 it is provided with two channels namely the deep portion *hb* previously mentioned and a second shallower portion *hic* thereby permitting the section *kl* to positively control the bell crank and force the roller 505 into the portion *hic*. After the pair of disks has turned through substantially 180° the totaling cam groove 512 will present a deep portion *mn* and a shallow adjacent portion *op* (533) to the roller 504 in the bell crank arm so that the pin might follow either of two courses so far as this groove is concerned. However, the adding groove 511 just previous to this point will have converged its two courses *ic* and *bc* as indicated in dotted lines at *m* (Fig. 38) and will tend to confine the roller 505 of its bell-crank to a single course *cdefg* corresponding to the course *mopqrs* of the totaling cam. Throughout the balance of the two grooves the forms of the grooves are such that the adding disk will control the movements of the bell cranks while the totaling disk will permit such control without interference. Briefly summarizing the joint control of the cam grooves over the totalizer engaging mechanism during read totals it will be noted that during practically the first 180° the totaling cam is primarily effective and where there would otherwise be conflict the adding cam is cut away to a shallow depth to render it passive. During the last 180° the situation is just reversed so that the adding cam is active and the totaling cam is cut away to a shallow depth wherever required to make it passive. The points in the two cams at which a change of course would normally be brought about, i. e. about 180° from normal, are off-set sufficiently so that positive control is never lost and the totalizer wheels are held up in mesh continuously.

The slide 510 (Fig. 3) has secured to it by means of a stud 534 a cam slide 535 which is guided on the side frame by cooperation of an elongated slot with a stud 536. A cam face 537 is provided on the forward end of the cam slide so that during the early part of a totaling operation as the slide is shifted rearwardly (Fig. 3) in the manner previously explained it will engage a pin in the arm 445 on shaft 443 and rock it counterclockwise. This shaft as it is turned, serves to rock out the item counter detaining latches 442, (Fig. 29) as already explained. The early release of these item counter latches in this manner is necessary on totaling operations, so that if a counter is selected, it may be raised early in the operation as required and prior to the normal time of tripping of the latches 442 by means of the cam projection 226.

*Grand or reset total*

At times it will be desirable to bring about a resetting of the totalizer wheels during a totaling operation and at such times the wheels must be raised into engagement with the actuators only during the forward stroke of the latter and must be disengaged during the return of the actuators. To accomplish the necessary control over the bell-crank 501 (Fig. 38) for this purpose the latter and the sleeve 502 will be shifted still further than as above explained, so that the roller 505 will be completely disengaged from the groove 511 of the cam 506, while the roller 504 will be brought into the full depth of the deeper portion of the totaling cam grove 512. In order to bring about this shifting of the bell-crank and sleeve a lock 474 is provided which when turned will rock an arm 538 in a clockwise direction until a rearward extension 539 carries a stud 540 away from the rear edge of a link 541 (Fig.

6), somewhat similar to the links 519 and 520, pivotally carried by the plate 529.

In Fig. 3 is will be noted that the link 519 is cut away or bent forwardly at a point in front of the stud 540 carried by the lock controlled extension 539 so as not to be interfered with in its movements by the latter. On the other hand the stud 540 does not extend into the plane of the link 520 so that the latter need not be bent or cut away at this point.

In the rear edge of the link 541 toward its upper end there is provided a notch 542 which is in line with and just of sufficient size to engage the square stud 523 on the segment 524. Upon turning of the lock 474 and consequent rearward movement of the stud 540 the related spring 521 will rock the link 541 to engage the notch 542 with the square stud 523 so that throughout the upward movement of the latter upon rocking of the segment 524 the link will be raised and the plate 529 will be rocked. This will cause the desired movement of the slide 510 which is about twice as great as that brought about during ordinary read or sub-total operations so that the full length of the slot 509 is effective. At this time the deep portions of the totaling groove 512 in disk 506 (Fig. 38) will be rendered active to cause proper timing of the engagement of the selected totalizer wheels and actuators for resetting and the roller 505 will be out of the cam groove 511 entirely. To this end the portion jklm, after a short idle movement from j to k, during which the selecting mechanism is effective, will from k to l rock the bell-crank 501 to raise the selected totalizer and hold it elevated from l to m or until the disk has rotated about 180°. The wall 543 at this point between the shallow and deep portions o and mn respectively will then serve to cam the bell-crank 501 outwardly again into the deep portion ngs where the roller 504 will remain throughout the balance of the turning of the disk 506, thus maintaining the totalizer wheels out of mesh on the return stroke of the actuators.

*Spring operation of actuators*

It will be recalled that in ordinary item entering operations the actuators 162 (Fig. 2) are positively driven through the action of the complemental slides 130 and 131 and the connected gearing until opposite sides of a depressed key or zero stop are engaged by the projections on the slides. During totaling it is necessary to control the movements of the actuators in accordance with the amounts standing on the selected totalizer wheels. For this purpose the engagement of the transfer lug 174 (Fig. 11) of each wheel with the related shoulder 544 of the transfer bar 176 is relied upon to stop the totalizer wheel as it is turned backwardly to zero upon the initial or forward stroke of the related actuator with which the wheel is at this time engaged. In order to insure sufficient movement of the actuators at this time to completely restore the wheels a spring drive for the actuators is brought into action. Thus it is that the slides 130 will first be shifted upon movement of the driving frames 138 until the wheels are fully restored and the actuators are stopped after which the complemental slides 131 are shifted to take up the balance of the movement of the driving frames. It will be obvious that if no special provision of this character were made there would be danger that the complemental slides would partake of too great a movement at the outset and would not allow a sufficient part of the action of the driving frames to drive the actuators.

The construction and operation of the spring driving means is as follows: two or more arms 545 (Fig. 2) loosely supported by the shaft 546 carry at their rear ends a cross rod 547. On this cross rod there are loosely mounted at spaced intervals a series of two armed members 548 the lower arms of which are provided with rounded ends adapted to fit into sockets 549 in certain of the actuators 162. Now since all of the actuators of each denomination are inter-connected by means of one of the cross shafts 158 so as to cause them all to move together it is only necessary to provide one arm 548 for each denomination, i. e. one for units, one for tens, etc., and these may be scattered over a considerable width of the machine. Thus the units actuator arm may be just above the units actuator in the transaction totalizer bank, while the tens actuator arm may be just above the tens actuator in the transaction counter bank, and the hundreds actuator arm may be just above the hundreds actuator in the clerk's counter bank, etc. This permits the use of larger parts than if all elements were grouped adjacent a single set of actuators and particularly permits the use of larger springs 550 which are connected between the upper arms of the two armed members 548 and a rod 551 carried by arms 552 secured to the shaft 546. Of course, if desired, smaller parts could be used and duplicate sets of springs, arms and other members for each set of actuators might be employed but the above described construction is believed to be simpler and preferable. The two armed members 548 are normally maintained in the position shown in Fig. 2 against the action of the springs 550 by means of a rod 553 which is carried by arms 554 loosely mounted on the rod 547 and connected by links 555 to the arms 552. In order to carry the arms 554 through a slightly greater angular distance than the arms 552, to insure free action of the springs 550, the links 555 are attached to the arms somewhat further from the center of support than is the point of attachment of the links to the arms 554 from the center of support of the latter.

Normally the rounded ends of the members 548 are out of the notches 549 of the actuators in order to avoid the burden and wear of needlessly tensioning the springs 550 during item entering operations. Obviously, the members could be in constant engagement with the actuators if desired since they would not interfere with the free movement of the latter under their positive differential control. To provide for the lowering of the members 548 to engage them with the actuators during totaling the supporting rod 547 therefor is provided with an extension 556 (Fig. 3) which cooperates with a cam slot 557 in a plate 558. The latter is pivoted at 559 and is connected by a link 560 to the previously mentioned plate 529. It will be apparent that rocking of the plate 529 by means of segment 524 whenever either of the total levers is shifted or the reset lock is turned will simultaneously cause an operation of the plate 558. The form of cam slot 557 is such that either a half or full movement of the plate, depending on whether a sub-total or reset total is to be taken, will cause the same amount of depression of the rod 547 which is enough to engage the members 548 with the actuators. Now upon further operation of the machine the shaft 546 will be turned counterclockwise (Fig. 2) to withdraw the rod 553 and permit the springs 550 to rock the members 548 counterclockwise and cause the actuators to take up the first part of the movement of the differential mechanism. For the purpose of withdrawing the rod 553 the shaft 546 is turned by means of an arm 561 (Fig. 3) secured thereto and which carries a pin 562. A link 563, pivoted at one end to the segment 153, which, as before explained, serves to drive the differential driving frames 138, is provided with a notch 564 adapted to engage the pin 562. Spring 565 urges the link to engage the notch with the pin but it is normally prevented from doing so by the cooperation of a pin 566 carried by the link 520 with the upper surface of the end of link 563. During totals, however, the link 520 is raised as already explained and the pin 566 is carried away from link 563 thus permitting engagement of the notch and pin. Upon subsequent rocking of the segment 153 the link 563 will be carried bodily to rock the arms 561 so that the rod 553 will be withdrawn and the springs 550 will be tensioned.

Thus at the beginning of a total taking operation the members 548 are not only lowered into cooperative engagement with the amount racks but they are freed for rocking movement under influence of the springs 550 (Fig. 2) which are themselves given additional tension.

No movement of the racks 162 will take place at the outset due to the direct gearing of the latter through racks and pinions to the differential driving frames 138. However, as soon as these frames are operated the springs 550 will tend to shift the racks and the connected slides 130 in preference to the complemental slides 131. In order to permit this movement of the slides 130 it is of course necessary to rock the entire group of zero stops 119, associated with the amount banks of keys, until the overturned lugs 120 are carried out of the path of the projections of the slides. For this purpose a series of arms 567 (Fig. 2) are secured to the shaft 72 and each arm carries a pin 568, at its free end, which is in the plane of and beneath the forwardly extending arm of a related zero stop. At the left hand end of the shaft 72 (Figs. 3 and 6) there is secured an arm 569 which is connected by a link 570 to an upward extension of the plate 558. It will be apparent, therefore, that as the latter is rocked at the beginning of a totaling operation the shaft 72 will be rocked clockwise (Fig. 3) or counter-clockwise (Fig. 2) so that the several pins 568 will raise the entire group of zero stops and permit the desired movement of the slides 130.

Movement of the slides 130 and connected parts will continue until the respective selected totalizer pinions have been turned rearwardly to zero at which time the projections 174 (Fig. 11) will be arrested by the shoulders 544 of the transfer bars 176, assuming that a universal transfer type of totalizer has been selected. Now since the racks 162 and hence the slides 130 can no longer be shifted the balance of the movement of the differential driving frames 138 will be taken up by the several complemental slides 131. On the return movement of the driving frames the springs 550 will serve to retard the operation of the racks 162 and slides 130 until the complemental slides 131 have been restored to normal. After these have been restored, however, the racks will be restored against the tension of their springs which during the course of this movement will have their tension partially relieved and the rod 553 will be restored to normal to hold the members 548 against the remaining tension of the springs. Arms 545 will then be rocked counter-clockwise (Fig. 2) to disengage the members from the racks. The operation of the differential mechanism as explained will be precisely the same for sub-totals as for resetting or grand totals, the difference between these operations being brought about by the action of the engaging cams as has already been described.

It is pointed out that the actuator 162 (Fig. 2) for the overflow bank has an extra shoulder 166 which is in contact at all times with the lower end of the two armed member 548. This actuator is thus confined in normal position by means of the end of the slot 182 (Fig. 11) acting against the rod 180, and the shoulder 166, acting against the member 548. In lieu of holding this actuator in normal position in the manner indicated, during item entering operations, it might if desired be held by means of the action of a special zero stop on the related complemental slide, this stop being shifted to inactive position by means of an arm 367 just as described for the regular amount banks.

Special detents 571 (Fig. 2) are provided to prevent jumping of the actuating racks 162 during resetting total operations at a time when they have been positioned under control of the totalizer wheels and when the latter are moved down out of engagement with the racks at about the middle of an operation of the machine. It will be apparent that at this time if no detents were provided, there would be danger that the springs 550 would shift the racks for the balance of their nine steps of movement in spite of the friction in the gearing of the differential mechanism. While such shifting might not result in any misoperation of the machine it would bring about an objectionable noise and jar which it is desirable to avoid. In order to provide the proper timing for the operation of the detents which are normally urged downwardly by the springs 572 they are controlled by a rod 573 supported at opposite ends by plates 574 and normally in a position to prevent engagement of the detents with the racks. The plates 574 are secured to a shaft 575 on which the detents are loosely mounted. As best shown in Figs. 3 and 6, the shaft 575 has secured at one end an arm 576 which carries a lug 577. A link 578 is provided with a shoulder 579 which is adapted to cooperate with the lug to operate the shaft 575 at the proper time. The link 578 is pivotally connected to one arm of the bell-crank 503 which, as has been explained, is a part of the system that serves to operate the mechanism for lifting the selected totalizer frames to engage the wheels with the actuators. A spring 580 tends to urge the free end of the link upwardly but this action is normally prevented by engagement of a pin 581, carried by the link 520, with the upper edge of the link 578. During totaling operations, however, the link 520 will be raised, thus carrying the pin 581 away from the link 578 and permitting the spring 580 to take effect. Consequently, when the bell-cranks 501 and 503 are rocked clockwise (Figs. 3 and 38) to lift the selected totalizer, the link 578 will be drawn down and toward the front until the shoulder 579 clears the lug 577 and permits the spring 580 to act. After the first half of the operation has been completed and the racks have been set under control of the totalizer wheels the bell-crank 503 will be restored and will shift the link 578 toward the rear so that by engagement of the shoulder 579 with the lug 577 the shaft 575 will be rocked clockwise (Fig. 3.) The timing of this operation will be such as to carry the rod 573 (Fig. 2) downwardly and permit the detents 571 to be operated before the totalizer wheels are fully disengaged from the racks. That is to say while these two actions take place simultaneously the ends of the detent pawls will begin to take effect before the totalizer pinions are fully disengaged. Toward the end of the totaling operation the link 520 will be lowered again and its pin 581 will depress the link 578 to disengage its shoulder 579 from the lug 577 at which time the arm 576, shaft 575, and the detents will be restored to their normal positions by means of a spring 582 pulling the arm 576 against a stop stud 583 in the side frame (Fig. 3). While the operation of the detents is only required or of special value in connection with resetting total operations it will be understood that they are operated during sub-total operations as well. During such operations no harm will be done since the detents merely prevent forward movement of the racks and do not interfere with the return movement of the latter which restores the amount previously standing on the wheels. If desired they could be made active only on resetting operations by positioning the pin 581 lower on link 520, so that the partial lifting of link 520 on sub-totaling would not be sufficient to permit bringing the shoulder 579 in line with lug 577. Obviously then the link 578 would normally be rocked downwardly further than shown.

In connection with the taking of totals it may happen that some of the transfer elements will be displaced and if a special form of transfer operating cam were not provided an erroneous amount might be returned to the wheels of a totalizer during sub-totaling. For example if a totalizer wheel stands at nine and it is moved up to engage the actuators its tripping projection 174 (considering the universal type Fig. 11) will engage and lift the transfer trip bar 176 and cause the dropping of the related plate 194 to nines coupling position. Then as the wheel is turned toward zero the projection will recede from the trip bar so that the latter will drop and permit the plate 194 to become fully coupled. Since the operation of the engaging mechanism and differential mechanism is the same for the last half of a sub-total operation as for an adding operation the erroneously tripped transfer would cause a unit to be added where none should be. To avoid this difficulty the cam 207 which operates the several transfer operating bars 198 and 248 is provided with a special cam formation 584 (Fig. 3) at a point about 180° from the normal position. The construction is such that the bell-crank 203, which through link 202 and arm 201 serves to rock the squared shaft 200 that operates to effect the transfers, will be rocked by the formation 584 in the proper direction to restore any of the plates 194 which may have been partially or fully dropped to coupling position in the manner indicated. Thus the cross bar 198 will be shifted to the left (Fig. 11) at this time to cooperate with the cam faces 210 of the plates 194 to restore them. In adding operations this is merely an idle movement since it occurs before the totalizers have been engaged with the actuators. After this point in a totaling operation there is no danger of a transfer being fully conditioned, i. e., no plate 194 could be fully coupled. Of course, one or more plates may be dropped to nines coupling position upon return of the wheels to their initial amounts but so long as no plate is fully coupled there can be no movement of any of the transfer racks. Under these conditions all that will happen is that after the portion 585 (Fig. 3) of the cam 207 has produced an idle movement of the cross bars 198 in the active direction the portion 586 will serve to again restore all of the partly coupled plates to normal.

*Locks and interlocks*

The machine herein disclosed is provided with means for preventing the operation of the main operating shaft, whether manually or motor driven, during item entering operations until a key in each of the three special key banks has been operated and until one of a plurality of cashier's locks has been turned to effective position. In the drawings only a manual drive has been shown but if a motor were provided it might be automatically released upon the operation of the four elements indicated or, if desired, a special motor release key might be provided and rendered operable only after the four conditions specified had been fulfilled. During totaling operations where a total is to be taken from one of the totalizers or counters related to one of the special keys the operating mechanism is releasable directly upon depression of any one of the special keys or turning of one of the cashier's locks and the need for depressing two additional keys and turning a cashier's lock or depressing three keys is not only dispensed with but such operation is prevented. When either of the total levers is shifted to a total position for a definite totalizer not related to a particular special key the machine is directly released for operation and no key need be depressed and no cashier's lock need be turned. In fact, all of these elements will be locked against operation at such times.

The conditions so far as the interlocks between the keys and cashier's locks are concerned are no different for resetting total operations than for sub-total operations. However, a special interlock is provided to prevent an operation of the machine after the resetting control lock has been turned and until one of the total levers has been shifted to a totaling position. This is to prevent an operation of the machine for resetting a totalizer or counter, unless the machine is fully conditioned for a totaling operation by movement of one of the levers X or Y, otherwise a misoperation would result. Furthermore an interlock is provided between the two total levers so that only one can be shifted out of the item entering position at a time in order to avoid a conflict in the operation of the selecting mechanism.

Referring particularly to Figs. 34, 35, 36 and 37 it will be seen that the main drive shaft 37 is provided with a series of four disks 587 each secured thereto and each having a shoulder 588 abutting against the end of a related pawl 589. These pawls are pivotally mounted on a shaft 590 and are suitably spaced thereon by means of hubs 591. A spring 592 connected to each of the pawls normally tends to hold it in the effective position shown in Fig. 35. In order to relieve the pawls of the longitudinal force which might be exerted upon them from the driving shaft when an effort is made to turn the latter in the direction indicated by the arrow a shoulder 593 is provided on each and is adapted to cooperate with a plate 594 so that the compressional force suggested will be taken up by this plate and will not be transmitted throughout the length of the pawls to their supporting shaft. Adjacent each of the pawls there is pivotally mounted on a shaft 595, above the shaft 590, a corresponding cooperating pawl 596. Each of the latter carries a pin 597 extending into the plane of the related pawl 589 and adapted to cooperate with an extension 598 of the latter. Three of the pawls 596 are provided with upwardly extending ears 599 carrying pins 600 each adapted to cooperate with a cam formation 601 on the under side of a related key detent release bar 62 associated with one of the three banks of special keys. The square studs 602 in the key channels serve to provide upper bearings or guides for the bars during their camming acting. This construction is such that when upon depression of a special key the related bar 62 is forced upwardly it thereby causes the cam 601 to force the pin 600 and hence pawl 596 downwardly or clockwise (Fig. 35) thus causing the pin 597 in contact with projection 598 to lift the related pawl 589 or rock it counter-clockwise. Depression of three of the special keys, one in each bank, will in this way serve to disengage the ends 603 of three of the pawls 589 from the shoulders 588. The fourth pawl will be rocked to free the shaft by the turning of one of the cashier's locks 454 or 455. For this purpose the slide 461 which is shifted either up or down from normal, depending upon which lock is turned, carries a pin 604 which cooperates with an arm 605 joined by a sleeve 606 to the fourth of the pawls 596. Normally the pin fits into a depression in this arm but when the slide 461 is shifted in either direction the pin will be carried out of the depression and will cam the arm clockwise thereby depressing the fourth pawl 596 and rocking the fourth pawl 589 counter-clockwise to release the machine.

While it is thus rendered necessary to operate four separate elements in order to release the machine for the entry of an item, suitable coupling devices are employed for the purpose of tying these elements together during certain total taking operations to permit the release of the machine upon the operation of a single one of the elements such as any one of the keys in the three special banks or either of the cashier's locks. This construction is required by virtue of the fact that in taking the totals from any of the totalizers in the three groups of the universal carry type the total lever is moved to the "Read" position and the desired totalizer is selected by depression of the related special key, as already explained. Obviously if three keys had to be depressed to release the machine there would be confusion in the operation of the totalizer selecting mechanism.

The coupling mechanism comprises a shaft 607 (Figs. 34, 35 and 44) which is rocked upon movement of either of the total levers, as will be later explained. Movement of total lever X to either the "Read" or the "Read counters" position will serve to rock the shaft 607 a certain limited extent, whereas movement of this lever to any other position away from normal or movement of the other total lever Y to any position away from the normal add position will serve to rock the shaft 607 to a greater extent. Secured to the shaft, as by means of pins, are a pair of arms 608 (Fig. 44) provided with hubs 609 surrounding the shaft. A stud 610 having an enlarged head is carried by each arm. Slidably mounted by means of elongated slots 611 and 612 cooperating respectively with the shaft 607 and the studs 610 is a ball having a pair of side arms 613 and a cross bar 614. A pair of springs 615 connected at one end to extensions 616 of the arms 608 and at the other end to projections 617 formed on the arms 613 of the ball serves to hold the ball in the position shown in Figs. 35 and 44 with relation to the arms 608; i. e. the lower ends of the elongated slots engage the shaft 607 and studs 610. Normally the cross bar 614 is above and to the front of a shoulder 618 formed on each of the locking pawls 589 and does not interfere with the individual movement of the latter. However, when the shaft 607 is turned slightly clockwise (Fig. 35) due to movement of the total lever X to the "Read" position the cross bar 614 is carried into the upper end 619 of a slot cut into each of the locking pawls 589. It will be apparent that with the cross bar in this position rocking of any one of the pawls 589 as by the depression of any one of the special keys will cause the shoulder 618 of the operated pawl to shift the ball downwardly on the shaft 607 and studs 610 (Fig. 44) against the tension in the springs 615. Now as the ball is slid downwardly it cooperates with the tails 620 of all of the remaining pawls 589 and rocks them along with the one that is rocked upon depression of the key.

If the shaft 607 is rocked a greater amount as by the movement of one of the total levers out of the add position and to some position other than "Read" or "Read counters" the cross bar 614 will be carried further into the slots formed in the locking pawls 589. The lower ends of these slots are cut at an angle so that a camming action is produced upon movement of the bar in this way to its full extent. This camming action is such as to rock all of the locking pawls to disengage the ends 603 from the shoulders 588 and thereby release the machine for operation without requiring the depression of a special key or the turning of a cashier's lock. Furthermore, the depression of such a key or the turning of any of said locks is effectively prevented at this time by the cooperation of the nose of the cross bar with a face 621 formed on each of the pawls 596. Since operation of these pawls is a necessary incident to the operation of the keys and locks mentioned their accidental or intentional misoperation will be prevented. It is, of course, necessary that the sliding movement of the ball should be blocked in order to render this interlock positive and toward this end a finger 622 (Figs. 44 and 35) is formed on each of the arms of the ball and is adapted to cooperate with a fixed cross bar 623 whenever the shaft 607 is rocked to its full extent. This construction also serves to prevent movement of the total levers to any positions other than "Add", "Read" or "Read counter" after the ball has been slid forward by depression of a key in the manner above explained since under this condition the finger 622 will be above the fixed bar 623 so that further rocking of shaft 607 is prevented. It should be mentioned also that if any of the pawls 589 is rocked as by the depression of a special key while the total levers are both in their "Add" positions the shoulder 618 of such pawl will be carried under the cross bar 614 to prevent any subsequent rocking movement of the ball and hence any movement of either total lever.

When the machine is conditioned for the taking of totals from any of the totalizers or counters, directly related to the banks of special keys, means which will now be described are effective to permit only the depression of a single key or the equivalent turning of one of the cashier's locks. For this purpose there is provided a squared shaft or bar 624 having its ends formed as trunnions rotatable in the supporting frames 10 and 11. On this bar there is slidably mounted a series of blocking members 625 (Fig. 37) which have slots 626 cooperating with large headed pins or screws 627 in such a way as to permit a limited lateral sliding movement of the members. Normally these members are completely out of the path of the pawls 596 but when the square bar 624 is turned slightly counter-clockwise (Fig. 35) they are carried into the path of movement of the ends 628 of the pawls. Rocking of the bar for this purpose is effected by means of a link 629 connected at one end to an arm 630 (Fig. 34) secured to shaft 607 and connected at its other end to an arm 631 secured to the bar. It will be clear that when the shaft 607 is turned as by the movement of the total lever X to the "Read" or "Read counters" position the members 625 will become effective to prevent operation of more than one of the pawls 596. The action of the members 625 is similar to that of ordinary single key mechanisms and is such that the rocking of any one of the pawls 596 will wedge its end between the members 625 and take up all available movement of the latter so that no other pawl may be operated.

When the shaft 607 is rocked still further as upon movement of the total lever X to some other position or upon any movement of the lever Y the bar 624 will be rocked further but the relation of the members 625 and the pawls 596 will not be materially changed. At this time, however, as already explained, movement of all of the pawls 596 is blocked by cooperation of the faces 621 with the cross bar 614. If desired the lower edge of the ends of the pawls 596 could be so formed that upon this further rocking of the square bar 624 the members 625 would be forced between the pawls just enough to take up all of the loose play between the members and thus additionally prevent movement of the pawls.

In order to prevent the operation of any of the amount keys whenever either of the total levers is shifted out of the "Add" position each of the releasing bars 62 (Fig. 2) for these keys is provided with a cam formation 601 which cooperates with a pin 632 carried by a related hook element 633 loosely mounted on the shaft 595 and held in position by spring 634. A bail having arms 635 and a cross piece 636 is secured to the shaft 607 which is turned, as explained, by virtue of connections to be presently described upon movement of the total levers. If an amount key is depressed the hook element 633 related to its bank will be rocked to carry the shoulder 637 beneath the cross piece 636 and thus prevent any subsequent rocking of the bail 635 and hence any movement of the total levers. On the other hand rocking of the shaft 607 to either of its extents of movement by shifting of either total lever will carry the cross piece 636 in front of all of the hook elements 633 and effectively prevent subsequent depression of any of the amount keys.

The means for rocking the shaft 607 in the manner indicated upon the movement of the total levers will now be explained. As best shown in Figs. 3 and 7 the shaft 607 is provided at its left end with arms 638 which are drawn by a spring 639 in a counterclockwise direction (Fig. 3) to normally maintain the shaft in the position shown. These arms are secured together and pinned to the shaft 607 by means of a sleeve 640.

Each of a pair of links 641 is connected at one end by means of a headed pin 642 and elongated slot 643 to one of the arms 638 while its opposite end is connected by direct pivotal connection to one of a pair of bell-cranks 644 (Fig. 42) and 645 (Fig. 43) loosely mounted on a stud 646. The rearwardly extending arms 647 and 648 of these bell-cranks are provided respectively with cam slots 649 and 650. Total lever X carries a roller 514 that cooperates with the slot 649 (Fig. 42) which is so formed that movement of the lever one or two steps toward the rear of the machine, i. e. to the "Read" or "Read counters" position will serve to rock the bell-crank a slight amount so that through the link 641 (Fig. 3) and arm 638 it will rock the shaft 607 the partial extent which has been referred to. The slot 649 is so formed, furthermore, that movement of the lever to any other of its totaling positions will rock the bell-crank a further amount so as to rock the shaft 607 the full extent which has been mentioned. The slot 650 in the other bell-crank which cooperates in a similar way with a roller 514 on the other total lever Y is so formed as to produce the full rocking of the shaft 607 upon any movement of the lever away from its normal add position.

In order to prevent a misoperation of the machine which might be occasioned by the turning of the reset lock and a subsequent release of the machine while the total levers are both in the "Add" position a special interlock is provided. For this purpose the lever 538, which is rocked upon turning of the reset lock, carries a pin 651 (Figs. 3 and 5) which normally holds a hook element 652, pivoted at 154, out of engagement with a locking shoulder 653 formed on a disk 654 secured to the shaft 37. When the lever 538 is rocked, however, due to turning of the lock the hook member is urged by a spring 655 (Fig. 3) to engage the shoulder 653 to lock the machine. A stud 656 carried by a rearward extension 657 of the hook member stands in rear of the pair of levers 516 which, as before explained, are rocked upon movement of the related total levers. Therefore as either total lever is shifted in either direction from normal the stud 656 will be engaged by one or the other of the levers 516 to rock the hook element 652 to again release the machine so far as this element is concerned.

An interlock between the pair of total levers is also provided. This consists of a pair of arms 658 (Figs. 3 and 5) and 659 which are connected together by a sleeve 660 which is journaled on a stud 661 extending from the frame 9 at a point in rear of the lower ends of the arms 518. Each arm carries a pin 662 which is in the path of movement of the arm 518 (Fig. 41) of the related bell-crank that is rocked upon movement of one of the total levers. This construction is such that only one of the arms 518 can be moved to a sufficient extent to permit movement of its related total lever to a totaling position. Thus if the arm 658 is rocked by engagement of its pin 662 by the arm 518 moved by total lever Y the other arm 659 will be forced against the other arm 518 which would have to be rocked upon movement of the other total lever X, thereby effectively locking the latter.

*Printing mechanism*

As has already been indicated in a general way the machine herein disclosed is provided with an extremely flexible arrangement of printing devices. In addition to providing a record slip, which after receiving an impression of all pertinent data regarding a particular transaction is wound upon a storage roll within the machine, the present machine is adapted to issue a printed check with either one or two impressions of desirable information, and is also adapted to print at one, two or three points on an inserted slip. The inserted slip, furthermore, may be printed upon in duplicate in either of two ways, i. e., either with the two impressions relatively close together on the slip or with these impressions widely separated. For the purpose of providing this large number of possible impressions seven distinct sets of type are provided, all of the sets being substantially alike, and a separate set of individual printing hammers is employed for each set of type in order to permit printing from only the desired set of type and to enable the elimination of zeros to the left of the first significant number.

All of the printing units are located on the right hand side of the machine between the main frame 10 and the auxiliary side frames 12 and 13 which are at the extreme right adjacent the side of the casing. Those type carriers which are controlled by the keyboard to represent amounts and to designate the special keys depressed are adjusted by means of the shafts 158, 165, 348, 349 and 350 (Fig. 9) each of which is related to a particular denomination or bank of keys. These shafts are extended to the auxiliary frame 12 and at the appropriate point each has secured thereto a pinion 663 which meshes with a rack bar 664 or 673, the former being related to the special keys and the latter to the amount keys. It will be understood that the racks 664 and 673 are arranged in adjacent planes much as the actuating racks for the several banks of totalizers. Each of these racks is provided on its upper forward edge with three similar sets of type, 665, 666, and 667 the amount racks having in each set the numerals 0 to 9 inclusive and the special key racks having in each set a type element for each key in the related rows. Furthermore, on the lower edges of these racks there are four such sets of type 668, 669, 670 and 671. These type may be secured to the rack in any suitable way but are preferably formed as separate elements which are riveted to the rack; if desired they could be formed integral with the rack.

While in the foregoing passage the seven sets of type for each key bank have been referred to as mounted on a single rack member this is true only of the racks 664 related to the special keys in the machine disclosed. A special construction is provided for the amount type bearing racks 673 in order to prevent a fraudulent manipulation of the latter during total taking. It will be recalled that during totaling operations the differential mechanism including the shafts, 158, 165, 348, 349 and 350 will merely be spring driven under influence of the springs 550. Obviously if it were possible to positively arrest the movement of the shafts 158, etc., against the action of the springs as by the insertion of a wire through an opening adjacent the printing elements an incorrect total could be produced. As will be more apparent from the subsequent sections the insertion of a wire for this purpose is only possible at a point adjacent the lower sets of type. For this reason it has been found desirable to split the amount type carriers (Fig. 59) into an upper section 672 integral with the rack 673, and a lower section 674. The upper sections are supported by cross bars 675 extending between the frames 10 and 12 while the lower sections are supported by cross pieces 676 and 677. A coupling between the two sections of each type carrier normally serves to bring about a movement of the sections in unison. This coupling consists of a vertically slidable element 678 (Fig. 59) mounted on the upper section between shoulders which as shown may be provided by plates 679 riveted to the rack. A spring 680 serves to urge the element 678 downwardly to force the pointed ends 681 into notches 682 formed in a plate 683 secured to the lower section of the type carrier. The pointed ends 681 and the notches 682 are so formed that movement of the upper section toward the left (Fig. 59) will be transmitted positively, through the square shoulders then active, to the lower section whereas movement of the upper section toward the right may take place independently of the lower section with the result that the element 678 will merely be cammed upwardly against the action of spring 680. Normally a spring 684 connected at its forward end to the lower section 674 and at its other end to a comb plate 685 on the fixed cross bar 675 serves to shift the lower section to the right in response to any movement of the upper section in this direction while movements of the upper section toward the left will, as explained, be transmitted positively to the lower section through the square shoulders of 681 and 683. In order to permit of the use of relatively large springs 684 the latter are alternately located toward the front and toward the rear portions of the type carriers. Thus for the units order the spring may be located toward the front, and for the tens order toward the rear, etc.

It will be apparent from the foregoing that if the lower section 674 of a rack should be held by a wire or other obstruction from following the differential movement imparted to the upper section by the related shaft 158 the element 678 would be cammed upwardly. The upper surface of this element is engaged by a rod 686 which extends across all of the amount type carriers and is carried by a pair of arms 687 loosely mounted on a shaft 688. An arm 689 (Fig. 63) integral with one of the arms 687 has connected thereto one end of a pawl 690 the other end of which is slidably mounted in a block 691. Now if any one of the elements 678 is raised due to relative movement between the sections of its type carrier the arms 687 and 689 will be rocked and the end of pawl 690 will be forced into the teeth of a ratchet 692 secured to the driving spindle 34 thereby locking the machine against further operation until the lower section of the carrier is released and assumes its normal position with respect to the upper section. It will be clear that this construction is only necessary or particularly desired during totaling when the differential mechanism is only spring controlled. The same construction may be effective during item operations as well, although it is not essential then since there is at this time a positive driving of the differential shafts. Therefore during item operations the sections 672 (Fig. 59) and 674 may be positively coupled if desired by merely positively holding the rod 686 in engagement with the upper edges of the elements 678 and thus preventing any lifting of the latter. When the carriers are so coupled any interference with the movement of the latter will interfere with the positive driving connections and therefore effectively lock up the machine.

It will be clear that the locking feature could be dispensed with if desired and the connection between the upper and lower sections of a carrier might be through cooperating lugs or square shoulders on the section and through springs 684. The correct item or total would always be correctly printed by the three upper sets of type even should the lower section be obstructed.

The springs 684 will aid the springs 550 in taking totals and if desired the latter could be dispensed with altogether under normal operations in which no attempt is made to interfere with the movement of the racks.

However, the springs 684 are preferably designed to be merely part of the safety devices described and are made to merely supplement the action of the spring actuated members 548. In order that there will be no tendency for the coupling member 678 to hold the upper section by friction between the surfaces 682 and the element 683 when a lower section is positively obstructed the spring 680 is made quite weak with relation to the force of spring 550.

The type carriers 664 which are controlled by the banks of special keys are best illustrated in Fig. 58 and as there shown are formed of single integral members to which the seven sets of type are riveted or otherwise secured.

Three separate type carriers 693, such as illustrated in Fig. 60, are also provided one for the purpose of indicating whether a printed amount represents an item, a sub-total or a reset total and the two others for indicating the position of the two total levers. For this purpose the two sleeves 490 and 492 (Figs. 51 and 74) as well as the shaft 495, which as already explained are turned upon movement of the two total levers and the reset lock, respectively, are provided with depending arms 694 (Fig. 51) toward the right hand side of the machine. These arms in turn are connected by a plurality of links 695 to downwardly extending arms 696 secured to a series of nested sleeves 697 carried by a shaft 698 at the rear of the machine. At the appropriate point, which as shown in Fig. 74 is at about the middle of the printing unit, these sleeves are provided with upstanding arms 699, which are accurately slotted to surround a shaft 700 in such a way as not to interfere with the necessary free movement of the arms. Each arm carries a pin 701 which is adapted to engage a notch 702 on the underside of a related type bar 693. The three type bars 693 for this purpose are of construction similar to the bars controlled by the three banks of special keys, i. e., the top and bottom sections are integral and each bar has riveted thereto the seven sets of type, as best shown in Fig. 60. It will be understood that these bars are provided with type suitable for the designation of the different positions which the total levers and the reset lock may assume. In Figs. 46 and 47 some of the characters adapted to be printed by these type carriers may be noted.

Cashier's type

A type carrier 703 is also provided for the purpose of designating which, if any, of the cashier's locks is effective during an operation of the machine. This carrier, which is substantially the same as the bar 693 in construction, is provided with a notch or fork 704 toward its rear end which is adapted to engage a pin 705 carried by an arm 706 secured to the shaft 700. This shaft, as shown in Fig. 88 has also secured thereto an arm 707 which has a rounded end fitting into a socket 708 of a downward extention of a slide bar 709. At its forward end this slide bar is provided with rack teeth 710 (Fig. 35) which mesh with the pinion 711 Fig. 9. This pinion is on the shaft 465 which, it will be recalled, is turned by means of the slide 461 and pinion 464 whose position is governed by the pair of cashier's locks. The type bar 703 will be provided with two type in each of the seven sets to designate the two locks and if desired a third type may be provided to designate an intermediate position thus indicating that neither lock is active.

Date printing type

Another group of type carriers 712 (Fig. 61) is provided for printing, in conjunction with the other matter mentioned, the date on which each transaction is made. These type carriers are of integral construction but differ from others that have been described in that only six sets of type are provided on each member. This is due to the fact that it is not regarded as essential to print the date in connection with each item on the detail strip. On account of the necessity of cutting away the forward ends of these carriers to accommodate the adjusting means, which will be presently described, the sets of type at this end, two on the underside and one set on the upper side are formed as a single unit 713 riveted or screwed to the sides of the members 712. Referring to Figs. 1 and 81, it will be noted that at the forward end the printing section is somewhat higher than the regular coin slab 32 to the left so that a portion of the left side of the printer is exposed. This affords a convenient position for locating the controlling or adjusting knobs 714. These knobs are secured to the left hand ends of a series of nested sleeves 715 (Fig. 81) which carry at their opposite ends a series of pinions 716. A set of idlers 717 meshing with the pinions 716 and also with a series of pinions 718 secured to another set of nested sleeves 719 serve to transmit the movement of knobs 714 to these sleeves. At their right ends the sleeves 719 carry pinions 720 which mesh with rack teeth 721 (Fig. 61) formed on the type carriers 712. It will be clear that by means of the sleeves and pinions mentioned it is possible to adjust the carriers 712 to any positions desired. Four type carriers are provided for this purpose one having abbreviations thereon indicative of the months of the year, the next two carrying numerals to designate days of the month and the fourth bearing the year designations. In view of the fact that the carrier having the months' designations must be provided with twelve distinct characters in the space normally provided for ten ciphers the height of the characters is slightly reduced. Toward the rear of the carriers 712 they have formed on their upper edges a series of serrations or notches 722 (Fig. 61) which are adapted to be engaged by spring pressed aligning pawls 723. The latter are loosely mounted on a shaft 350 and are urged into the notches 722 by springs 724 to hold the carriers in any proper position to which they may be adjusted.

Consecutive numbering type

A final group of type carriers included in the printing unit is the set 725 (Fig. 62) adapted to record consecutive numbers upon the various record media. These carriers are of the integral construction and each is provided with seven sets of type so that an item or other printed amount may be identified in a sequence at all points where it is recorded. The means for automatically adjusting these carriers to represent a consecutively increasing number of each operation of the machine is constructed as follows. Each carrier has formed on its upper edge a series of ratchet teeth 726 there being nine such teeth of similar form and a single final tooth having one side of greater depth than the others. This final tooth or the notch to the right of it (Fig. 62) is progressively deeper in the successive members 725 as their denominational values increase or from left to right as viewed from the front of the machine. A multitined operating pawl 727 in the form of a bail is adapted to cooperate with the notches 726 on the several type carriers after the cashing of the usual deep notch transfer mechanism. The pawl is operated longitudinally through slightly more than ten full steps, i. e., the length of the ten notches or teeth on a carrier, during each operation of the machine but it is normally held out of engagement with all of the teeth during nine of the ten steps of movement by means of one of a plurality of plates 728. These plates as shown are mounted at their forward ends on the cross bar 675 and at their rear ends are forked to engage a fixed rod 729; the one mentioned has an upper edge 730 which cooperates with the pawl 727 to hold it out of the teeth 726 for nine steps. For the tenth step of movement, however, the drop 731 in the upper edge of the plate permits the pawl to rock until arrested in some way as when the units tine of the pawl engages the tooth 726 of the units carrier bar 725. The remaining tines of the pawl are still out of active position by virtue of the part that the units tine will engage the bottom of the notch of an ordinary tooth before any of the other tines becomes effective. However, after the units type carrier has been shifted nine steps the deep notch of this carrier is in position to be engaged by the pawl during its tenth step of movement and this time the pawl is dropped low enough to engage its tens tine with a tooth on the tens carrier so as to advance it a unit. A similar mode of operation brings about an advance of the higher order carriers also, the pawl dropping further as more of the deep notches of successive orders, from the units up, are brought into line much as in the case of the usual deep notch transfer devices.

The means for operating the pawl 727 to reciprocate it through ten steps on each operation of the machine comprises a pair of rack bars or plates 732 supported by the cross bars 675 and each having an ear 733 supporting the pivot of the pawl. A spring 734 connected between a pin on the pawl and a pin on one of the rack bars serves to hold the pawl in engagement with the plate 728 or the ratchet teeth 726. It will be clear that the pawl 727 will be reciprocated whenever the rack bars 732 are reciprocated. For this purpose a pinion 735 meshes with teeth 736 on the upper edge of each of the rack bars 732 and both of these pinions are secured to a sleeve 737 (Figs. 51 and 74) which has secured at its other end another pinion 738 which is engaged by an idler pinion 739 mounted on a stud 740. This idler is driven by a segment 741 which is pivoted at 742 on a stud extending from the frame 10. A link 743 serves to connect an upwardly extending arm of the segment to an arm 744 secured to the shaft 324 which as has been explained in a previous section is rocked to cause the positioning of the differential elements controlled by the special banks of keys. It will be seen therefore that quite early in the operation of the machine the pawl carrying frame formed by the racks 732 will be shifted toward the left (Fig. 62) by means of the connections just described and it will remain there until near the end of the operation when it will be returned to normal again. On each reciprocation of the actuating pawl the units type carrier will be shifted one step and on its tenth step of movement the tens carrier will be shifted one step and so on.

After any of the type carriers 725 has been shifted ten steps or some other definite number of steps it will be apparent that some means must be provided to restore it to its initial position otherwise these carriers would have to be of indefinite length. For this purpose each type carrier 725 is provided with a pawl 745 (Fig. 62) which is pivotally mounted thereon and normally urged by a spring 746 in a counter-clockwise direction. A projection 747 on each of these pawls is adapted to cooperate with the under surface of the related plate 728, a series of which are provided as spacers between the carriers, and the upper surface of one of which as already explained, serves to hold the actuating pawl 727 inactive during nine steps of movement. After any one of the carriers has been shifted nine steps the corresponding projection 747 will engage a cam surface 748 on the under side of the related plate 728 and this will serve to cam the pawl 745 clockwise upon movement of the carrier into the tenth position. Rocking of the pawl 745 in this way will carry a hooked portion 749 into the path of a square crossbar 750, extending between the plates 732 which as explained are reciprocated ten steps on each operation of the machine. Since the movement of the type carrier can only take place during the last or tenth forward step of movement of the actuating plates 732 it is always insured that the crossbar 750 will be to the left (Fig. 62) of the hook 749 at the time the latter is cammed downwardly. In order to provide a slight clearance between the hook and cross-bar at this time, furthermore, the relation of the actuating pawl 727 to the ratchet teeth is such that a slight movement of the pawl in addition to the nine full steps is required before the exposed ratchet tooth will be engaged. Therefore the cross-bar 750 will have been carried slightly more than nine steps before the type carrier can begin its movement from the ninth to the tenth position. Assuming now that one of the pawls has been rocked clockwise by the cam surface 748 the plates 732 on their return movement toward the right will carry the square cross-bar 750 into the hook of the pawl and after this slight idle movement will serve to draw the pawl and hence the connected type carrier ten steps to the normal zero position. Due to the hook formation of the end of the pawl the latter will not be disengaged from the cross-bar even though the projection 747 is carried free of the cam surface 748 during the first return step. The normal relation between the cross-bar and hook, as shown in Fig. 62, will not be restored until the next operation of the plates 732 toward the left during the first part of which the hook will be freed to permit the spring 746 to rock the pawl counter-clockwise. It will be understood that the slight extra movement of the plates 732, in addition to the ten effective steps, as represented by the normal clearance between the actuating pawl 727 and the first ratchet tooth is a trifle greater than the normal overlap shown between the cross-bar 750 and the under portion of hook 749.

A series of spring operated detents 751 similar to the detents 723 for the date type carriers serves to hold the consecutive number carriers in their adjusted positions but offers only frictional resistance to the movement of the carriers in either direction.

In order to permit resetting of the consecutive numbering carriers when desired to start counting a new series of operations a knob 752 is provided on the right side of the machine as viewed from the front (Fig. 1) or the left side as viewed in Fig. 74. Preferably some suitable means under control of a lock will be provided to prevent turning of the knob and resetting of these type carriers except by authorized parties. The knob 752 is secured to a shaft 753 which passes through suitable openings in the entire group of type carriers, including the amount, special and date carriers, and is supported by the frame members 10 and 12. On each side of the consecutive number carriers and in close proximity thereto there is provided a slide 754 (Figs. 62 and 74) which is formed with internal rack teeth 755. These are adapted to mesh with pinions 756 carried by a squared portion 757 of the shaft 753. A cross bar 758 is mounted between the slides 754 at a point just in rear of the pinions 756 and extends through the openings 759 in the consecutive number type carriers 725. It will be apparent that as the knob 752 is rotated to turn the pinions 756 clockwise (Fig. 62) the slides 754 and hence the cross bar 758 will be shifted toward the rear or to the right (Fig. 62). The construction is such that the cross-bar will be shifted ten steps upon turning of the knob through one revolution and in the course of its movement it will engage the ends 760 of the openings in the carriers 725 and will force the latter toward the right into their normal zero positions. The knob should then be restored to its original position to withdraw the cross-bar 758 and permit subsequent free movement of the number carriers.

If desired, a numbered wheel or indicator could be provided to cooperate with each type carrier 725. They could be placed either in the front or the rear of the type carrier, and cooperate with suitable rack teeth on the latter near an opening in the case, so that a reading of the number printed on the previous operation could be had at all times.

Hammer operating mechanism

As already stated the printing from the various sets of type is effected by means of groups of individual type hammers. This necessitates seven groups of such hammers one group being provided at each of the seven possible printing points. The forward, upper group is for the detail strip and the two remaining upper groups are for printing on the check and stub, while all four of the lower groups are for printing on the inserted slips. All of the groups are substantially alike except for the fact that no date printing hammers are provided in the group at the printing point for the detail strip. If desired each type carrier, regardless of its character, may be provided with an individual hammer in each group or the construction may be simplified somewhat by employing broader hammers for certain groups of carriers such as the date group or the special character group since these always require a full impression. For the amount carriers, however, it is desirable to have individual hammers for all with the possible exception of the three lower orders. This is in order to permit the elimination of zeros to the left of the highest significant figure above the third or dollar's order. It has been found desirable, however, to always print from the three lower order amount carriers whether they should stand at zero and be unaccompanied by any higher significant figure or otherwise. While it would be possible to employ broad platens to print from those groups of carriers which do not require zero elimination such as the date carriers, the special character carriers, the consecutive number carriers, etc., the machine as disclosed herein is provided with individual hammers for each of the carriers of these types as well as for the amount carriers.

In Fig. 63 there is disclosed a set of seven hammers, one for each of the seven printing points, related to one of the higher order amount carriers. It will be understood that a similar arrangement of hammers is provided for each type carrier. A rod 761 near each printing point is adapted to support the group of hammers 762 (Fig. 63) related to all of the type carriers at such printing point. A spring 763 attached to each hammer tends to rock the latter counter-clockwise (referring to the three upper sets of hammers) until an upwardly extending tail 764 engages a stop shoulder 767 or bar 766 or a cross bail 765 which serves at times to hold all of the hammers of the group away from the type faces. The three hammers which print from the upper type of a carrier have related thereto a slide bar 766 which has a series of three shoulders 767 engaging the extending tails 764 of the hammers. This bar 766 is offset or bent into another plane at an intermediate section so as to permit it to pass to the left of the check strip (Fig. 74). Connected between an ear on the bar 766 and a fixed rod extending from the frame 12 is a spring 768 which urges the bar toward the left until its end engages a fixed cross bar 769. A slide bar 770 similar to bar 766 is provided for the four lower sets of hammers. This bar has four shoulders 771 for engaging the tails 764 of the lower hammers. A spring 772 urges bar 770 to the left (Fig. 63) until it is stopped by a fixed cross bar 773. Toward the rear end of each of the slide bars 766 and 770 there is pivotally mounted a pawl 774 which is urged in a clockwise direction (referring to the upper set) by a spring 775 until the cam surface 776 of the pawl engages a corresponding surface on a cam plate 777. This cam plate is rocked by a spring until a downwardly extending tail of the plate, considering the upper plate, engages a cam surface 779 on the rear upper edge of the type carrier 672. It will be apparent that when the type carrier is shifted toward the rear it will rock the plate 777 counter-clockwise and rock the pawl 774 in the same direction thereby placing the forward end of the latter in rear of a cross bail 780. Normally the forward end of the pawl is above the cross bail so that it will not be operated upon rocking of the bail in a clockwise direction. This is the condition which obtains when the type carrier stands at zero.

Referring now to Figs. 51 and 72, it will be seen that one of the arms of the cross bail 780 has connected thereto a link 781 which at its forward end is connected to a disk 782 loosely mounted on spindle 34. This disk has a projection 783 which is in the path of a stud 784 on the gear 36. This gear makes one complete revolution on each operation of the machine. The form of the projection on the disk is such that the bail 780 will be rocked clockwise after the type carriers have been positioned and before the latter begin their return toward normal. Rocking of the bail will serve to shift to the right all of the slide bars 766 (Fig. 63) whose pawls 774 have been rocked counter-clockwise to carry their forward ends into the path of the bail by movement of the related type bars. As the bars 766 are shifted the shoulder 767 will draw the tails 764 of the hammers toward the rear thus rocking the latter clockwise until the shoulders 767 clear the upper ends of the tails 764 and permit the springs 763 to rock the hammers counter-clockwise to make an impression. In the meantime the bails 765 will have been moved to a position clear of the hammers, so as not to interfere with the necessary full movement of the latter. For this purpose all of the upper bails are connected together by means of a link 785 (Figs. 75 and 76) held by studs 786 on an arm of each bail. The rearmost bail has an extension 787 (Fig. 75) from which a link 788 (Fig. 51) extends to a bell crank 789 pivoted on the stud 790 carried by the right side frame 10. The vertical arm of this crank has at its end a roller 791 which extends into a cam groove 792 (Fig. 71) formed in a disk 793 secured to the main shaft 37. The form of the cam groove is such that the series of bails 765 will be held normally clear of the tails 764 (Fig. 63) to avoid interference with the hammers when the latter are released by the slides 766. After printing has been effected the bails are rocked, due to the formation of the groove 792, to restore the hammers and if desired this movement may be made with sufficient promptness to prevent rebound action of the hammers. The slide bars 766 will meanwhile be spring urged toward the left until the forward cam slopes of the projections forming the shoulders 767 are held against the rear faces of the tails 764 of the hammers so that when these tails are forced by the bails to clear the shoulders of the slides the latter will be shifted by their springs into their normal position against the fixed bars 769. The bails 765 are then given a quick movement in the opposite direction away from the tails of the hammers due to the fact that the groove 792 is designed to also operate the check knife, as will be explained, and the restoring movement of the bails is utilized to operate the check perforating means. The quick opposite movement just mentioned is for the purpose of withdrawing the perforating blade from the check to allow feeding of the latter. A gradual movement of the bails in the same direction as the quick movement then continues past normal position to cause severing of the check as will be explained, and then the bails are brought back to their normal positions.

In the foregoing explanation it has been mentioned that those hammers related to type carriers which have been shifted from the zero position are operated by virtue of their slides 766 being operated by the bail 780. In addition any type carriers which may be at zero but which are to the right of a carrier which has been shifted will have their hammers operated also. For this purpose, commonly known as filling in of ciphers, the pawls 774 have their rear arms split as shown in Figs. 63 and 74 and the upper portion 794 of each is bent at an angle toward the left, as viewed from the front of the machine into the path of the similar portion of the next adjacent pawl. It will be apparent that if a higher order slide 672 is to be shifted toward the rear by virtue of its pawl having been rocked, the straight lower portion 795 of the latter will have engaged the bent portion 794 of the next lower order pawl and will have rocked it also. This in turn will have produced the same effect upon the still lower order pawl and so on until the units pawl is reached and rocked. In this way all orders below the highest significant figure set up will have their bars 766 shifted, regardless of whether the related type carriers have been moved from their zero positions or not.

Substantially the same sort of construction is provided for operating the hammers related to the lower sets of type. A bail 797 (Fig. 63) is adapted to engage the ends of any of the pawls 774 which may have been rocked clockwise due to movement of the related type carriers. For the purpose of operating the bail 797 in unison with the upper bail 780 a link 798 (Fig. 51) is connected between an extension of one arm of the upper bail and a similar extension of an arm of the lower bail. Furthermore four bails 799 similar to the bails 765 are provided one adjacent each line of the lower hammers for restoring the latter and these bails must be operated at the proper time also to get out of the path of the hammers. Proper timing of the operation of these bails in coordination with the upper bails is effected by means of segments 800 and 801 formed respectively on an arm of one of the upper bails 765 and an arm of a lower bail 799. A link 802 pinned to each of the lower bails serves to tie them together for joint operation.

The hammer operating means for the date, consecutive number, special character, total designation, cashier's designation, and three lower order amount carriers differs slightly from that above described for the higher order amount type carriers. This difference is due to the fact that the hammers for all of these type carriers are to be operated at all times, provided printing takes place at all at particular printing points; i. e., there is no zero elimination associated with these carriers. For this reason as best shown in Figs. 52 and 74 only two pairs of slides 803 and 804 equivalent to the slides 766 and 770, are required for the entire special group of carriers mentioned, not including the three lower order amount carriers, and these special carriers are provided with fixed shoulders 805 (Fig. 51) in the path of the bails 780 and 797 in lieu of the pivoted pawls 774 carried by the individual slides 766. The slides 803 which are provided for the upper groups of hammers are bent or offset to pass around the edges of the check strip, while the other pair of slides 804 is straight and is provided for the lower groups of the hammers. Cross bars 806 are provided between the slides of each pair in position to cooperate with the tails of the related hammers. These cross bars perform precisely the same function as the shoulders 767 on the individual slides 766 related to the higher order amount carriers. The three lower order amount hammers for the upper and lower sets of type are operated by single slides 807 each having studs 808 (Fig. 52) at the various printing lines and cooperating with the tails of these three hammers. Each of these slides furthermore has a fixed shoulder, similar to 805, cooperating with the related bail 780 or 797 for operating the slides. In other respects the operation of the printing hammers for the special carriers and the three lower order amount carriers is just the same as for the higher order amount carriers as has been described. It will be clear therefore that an impression is taken from all of these type carriers at a plurality of points on each operation of the machine although printing may be prevented at one or more of the printing lines in the manner to be described hereinafter.

Record media

The machine illustrated, as already explained, is adapted to enter items on a detail strip which passes from a supply roll to a storage roll and is retained within the machine until the end of a day or week or any given period when it is removed by an auditor or other duly authorized person. Provision is also made for printing upon checks issued from a roll mounted within the machine as well as upon slips which may be inserted into a suitable slot at the side of the machine. The arrangement disclosed is such that if a slip is fully inserted in printing position the check printing mechanism will not be operated. If the slip is inserted only partially, however, as for example to be printed upon by only the two front impression means, then the check printing mechanism will operate. Furthermore the latter is under the separate control of a knob which may prevent check printing operations altogether or may permit a single check or a double or stub-check to be printed at will provided no inserted slip is present. The slip printing elements are also under control of a knob to form either three impressions at three relatively close points on different detachable sections of a slip or at two points which are quite widely separated on two sections of an inserted statement card or sheet. Preferably the construction of the printing features is such that the detail strip is printed upon during every operation of the machine. Checks of either the single or stub variety may be desired either in accordance with particular types of transactions such as "cash" or in accordance with the class of goods involved such as sheet music, rolls, etc. Inserted slips of the triplicate form may be desired either upon such transactions as "C. O. D." or upon ordinary sales of commodities other than those for which checks are issued. On the other hand it may be desired to print in duplicate on separate sections of a statement sheet to note payments on account of instruments such as pianos, Victrolas, etc., when these are purchased under a credit plan. Similarly, regular "charge" account customers may have statement cards on which may be noted additional items of credit extended or payments received on account.

With the foregoing prospective or possible uses of the flexible provisions of the printing features of the machine the latter will now be described in detail. It is to be understood that the particular uses and modes of employing the various controls are illustrative only and that a variety of schemes suitable for the requirements of any particular business may be worked out within the scope of the present invention.

Detail strip

The detail strip 809 (Fig. 45) is adapted to be fed from a supply roll 810 (Fig. 63) and after receiving an impression and, if desired, an autographic notation, is adapted to be wound upon a storage roll 811. The printing line for the detail strip is at 812 (Fig. 63) printing being done by the foremost group of upper hammers, while the autographic opening is at 813 which is some distance directly above the printing line. It will be apparent that a considerable shifting of the record strip will be required in order to place the written notation in its proper relation, adjacent to the printed item to which it pertains. Normally the last printed item will appear just below the lower portion of the glass 814 at 815 (Fig. 63) thus permitting a notation to be made directly beneath it through the opening 813. Upon the subsequent operation of the machine the blank space just below the last autographic notation will be carried around to the printing line below the hammers 762 and after printing has been effected it will be returned a greater distance to carry this new item below the lower portion of the glass 814. The course of the record strip from the roll 810 to the storage roll 811 is as follows: (see Fig. 65) over the roller 816 mounted on shaft 817, under the guide roller 818, thence forwardly under a writing table 819, around a guide roller 820, downwardly around a guide roller 821, then toward the rear between the pair of guides 822 and 823, around the latter roller, thence forwardly around a roller 824, upwardly around a roller 825, toward the rear over the table 819 but beneath the writing opening 813 and glass 814, around a guide roller 826, upwardly in rear of another glass 827 and around a guide 828, then down and toward the rear around a pair of rollers 829 and 830, and finally toward the front around the forward guide roll 831 of a sliding table 832 and back around a guide 833 on to the storage roll.

Shifting of the record strip to carry a portion near the writing opening down to the printing point, and vice versa as explained, is brought about through the reciprocation of the sliding table 832. As this table is shifted toward the right (Fig. 65) a roller 834 supported at the right hand end of the table will engage that portion of the strip which is stretched between the roller on the shaft 817 and the roller 818. It will be apparent that continued movement of the table will cause the record strip to be carried with it until the strip assumes a V formation such as indicated in dotted lines in Figure 63. In order to permit this formation of the strip it must be supplied from a source in the direction of one or the other of its two ends.

Drawing of the paper from the supply roll 810 is prevented at this time by means of a friction block 835 (Fig. 65) formed of rubber or similar material and which may be forced against the roller on shaft 817 thus pinching the strip between the block and roller. Block 835 for this purpose is secured to a bar 836 having end trunnions, one of which has secured thereto an arm 837 having a pin or roller 838 that cooperates with a cam groove 839 in a gear 840 (Fig. 69). This gear is coupled by means of a stud 842 extending from it and cooperating with a hole or slot 843 in the disk 793 which is secured to the driving shaft 37 that is in direct alinement with the shaft 817. The gear 840 is mounted on a bearing 841 secured to the shaft 817. As will be hereinafter explained the form of connection between the gear and disk is provided to enable the ready removal of the detail strip frame. The formation of the cam groove 839 is such that normally a slight clearance is permitted between the block 835 and the roller on the shaft 817 so that the record medium may be passed between them in the process of threading a new roll and so that the strip may be manually fed in the manner to be explained. However soon after the operation of the machine commences and during the time that the table 832 is beginning to shift toward the right (Fig. 65) the cam will rock the arm 837 clockwise to carry the block against the roller thereby gripping the strip. This arrangement will insure the drawing of the strip from the opposite direction to supply the extra material in the loop.

Now it will be observed that as the right hand end of the table serves to draw a portion of the strip toward the right, the left hand end of the table will provide the necessary slack due to recession of this end of the table from the loop extending from roller 830 around the roller 831 at the end of the table and then around the roller 833. Thus the entire strip between the loop around the left end of the table and the loop being formed at the opposite end will be shifted thereby carrying that portion of the strip which is just to the left of the writing opening 813 (Fig. 63) to the printing line 812 of the foremost hammers 762. The table is shifted to such an extent that the roller 831 at the left hand end around which the left loop is formed is carried to a point where the strip may assume a straight line between the rollers 830 and 833 but with no clearance between the strip and the roller 831 on the table. On the other hand there is a slight normal clearance between the roller 834 at the right end of the table and the strip extending between rollers 816 and 818. As a result of this construction the amount of slack yielded at the left loop is greater than that taken up in the right loop. Furthermore the V formation of the right loop brings about a still greater difference in the amount of material in the two loops. Therefore when the table is fully shifted toward the right there is still a portion of slack in the left loop.

Provision is made for taking up this extra slack on the storage roll 811 while the table remains in shifted position and this in effect constitutes the line spacing movement of the strip. For this purpose an arm 844 (Figs. 65 and 69) secured to one of the trunnions of bar 836, which carries the block 835, is connected by means of a link 845 to an arm 846 pivoted on a stud 847. This arm is curved around the bearing for roll 811 and carries at its upper end a pawl 848 which is adapted to co-operate with a ratchet wheel 849 loosely mounted on a stud 850 in line with the center of the roll 811 and held by nut 851 in the right side frame 852 (see also Fig. 66).

A spring 853 normally urges the ratchet wheel 849 and a connected or integral friction disk 854 toward the left (Fig. 66) until the disk cooperates with a corresponding friction disk 855, secured to the end of the storage roll spool 856. A hub 857 of the ratchet 849 acts as a bearing for one end of the storage roll. It will be apparent from this arrangement that toward the beginning of an operation of the machine the arm 844 will be rocked clockwise to carry the pawl 848 idly over the teeth of the ratchet 849. However, after the table 832 has been fully shifted to the right the block 836 together with the arm 844 will be restored counterclockwise toward normal and in their movement will cause the pawl 848 to turn the ratchet wheel 849. Through the friction drive between the ratchet and the storage roll 811 the latter will be driven until the slack remaining in the left loop, after the right loop has been fully formed, is taken up and then the friction drive will merely slip during the remaining movement of the arm 844. At this point in the movement of the record strip the printing hammers will be operated to print the amount standing on the type carriers.

During the last half of the operation of the machine the table 832 will be restored toward the left and in its movement will tend to reestablish the left loop in the strip. A ratchet 858 (Fig. 66) secured to the storage roll spool 856 and a pawl 859 on lever 860 serves to prevent reverse rotation of the roll so that the paper to form the loop cannot come from this source but must come from the opposite direction. Obviously the V loop formed at the right which is at this time set free furnishes the greater portion of the material for the new left loop but an extra amount must be taken from the supply roll 810 at this time to make up for the portion previously wound upon the storage roll. This is made possible by the fact that by this time the block 835 will have been restored to its normal position away from the roller on the shaft 817.

The means for shifting the table to and fro in the manner explained comprises a pair of rack extensions 861 (Figs. 64 and 65) integral with the sides of the table and adapted to cooperate with a pair of pinions 862 secured to a shaft 863 above the racks. An extension of this shaft carries another pinion 864 which as best shown in Fig. 68 cooperates with a segment 865 loosely pivoted on a stud 866 extending from the left side frame 867. The segment is provided with a cam slot 868 which cooperates with a stud or roller 869 extending from the side of the gear 870. This gear in turn meshes with the gear 840 coupled to the drive shaft 37 so that upon each operation of the machine these gears are given one complete rotation. The formation of the cam slot 868 is such that as the pin 869 rotates clockwise with the gear 870 the segment 865 will be rocked clockwise, then held for a period as required and then returned counterclockwise to normal. Reciprocation of the table 832 results from the oscillation of the shaft 863 by means of the segment in the manner indicated.

In the foregoing description it has been mentioned that the loop formed at the right upon movement of the table 832 is of V shape. Due to the shortening of the path of the strip to form the V rather than causing it to follow the upper and lower surfaces of the table as is the case with the left loop the amount of paper in this V loop is considerably less than that in the left. This difference is in addition to that brought about by the fact that there is a normal clearance between the end of the table or roller 834 and the straight portion of the strip between rollers 816 and 818. The combined difference in the sizes of the loops is enough to account for the feeding of a section of the strip from a point below the autographic opening 813 to a point under the glass 814. In other words this feed is enough to permit autographic entries to be made below printed amounts.

Provision is made for reducing this feeding action by causing the right loop to conform more closely to the horizontal surfaces of the table rather than to assume a V formation. The difference in the size of the two loops is then due almost entirely to the normal clearance between the right end of the table and the surface of the strip. This clearance brings about just enough extra slack in the left loop, to be taken up by the storage roll, to cause a single line space action as shown on Fig. 46 with no space for autographic entries. For this purpose there is mounted on the shaft 817 a pair of collars 871 (Fig. 69) between which extends a cross bar 872 (Fig. 65) fastened at each end to one of the collars. Also secured to the shaft 817 is a pair of arms 873 and 874 which carry between them another cross bar 875. One of the arms 873 has an extension which carries a spring plunger 876 (Fig. 69) having a knurled button 877. The inner end of the plunger 876 is normally urged by a spring into engagement with a hole 878 (Fig. 65) but it may be disengaged by pulling out on the button 877. When the button is pulled out the arm 874 and the collars 871 together with both of the cross bars 872 and 875 may be rocked clockwise (Fig. 65) until the end of the plunger is in line with another hole 879 in the right side frame. In this position of the parts the cross bar 872 is placed just above the path of the upper surface of the table and just to the right of the section of record strip between rollers 816 and 818, while the forward end of the cross bar 875 will be similarly placed just below the path of the lower edge of the table. With the crossbars thus shifted the record strip will not be permitted to form a V at the right upon movement of the table but will be held against the table to form a loop like that at the left but slightly smaller than the latter. In this way the feeding of the record strip may be varied at will by movement of the plunger 876 to either position so that space for autographic notations may be provided or omitted as desired.

Means are also provided for feeding the strip manually whenever desired. For this purpose the previously mentioned arm 860 is pivoted loosely on the stud 847 and extends upwardly through the cover 28 that is located over this portion of the printer, the arm being provided with a knob or handle at its upper end. A pawl 859 carried by this arm is spring urged into the teeth of the ratchet 858. As the handle is moved toward the front the pawl will rotate the ratchet and the connected storage roll 811 to feed the record strip. A spring 880 serves to return the arm 860 idly to its normal position against a stop stud 881 in frame 852.

Whenever it is desired to remove a section of the printed record strip from the machine the spool 856 which serves to store the record may be lifted out of the machine to facilitate the handling of the strip. When the spool is removed it may be replaced by an empty spool or the record strip may be unwound from it and the same spool returned. The cover 28 through which the arm 860 extends is directly over the storage roll and is under the control of a lock 882, the key for which is preferably in the hands of an auditor or other authorized person. The left hand end of the spool is provided with a trunnion adapted to fit into a groove 883 (Fig. 67) in a suitable bearing 884 extending from the frame 867. A spring urged hook 885 pivoted on the frame is adapted to pass over the upper surface of the trunnion and hold it in the groove 883. This hook, however, may be manually rocked toward the front of the machine to release the trunnion.

At its right end the spool is provided with an opening at its center which normally fits over the hub 857 projecting from the center of the feeding ratchet 849. As already explained the latter is loosely mounted on a stud 850 carried by the frame element 852 and is urged by a spring 853 toward the left. It is adapted to be slid toward the right however by means of the lever 860 to disengage the hub 857 from the opening in the spool. For this purpose an extension 886 formed on the arm 860 cooperates with the side of the ratchet 849. A portion of this extension is in the same plane as the main body of the lever 860 so that the latter may be rocked sufficiently to feed the record strip as explained without shifting the ratchet laterally. The slot in the cover 28 is only of such length as to permit this strip feeding movement of the arm and prevents any further movement. However when the cover is raised the arm may be shifted further so that the end of the extension 886 which is bent laterally may cooperate with the side of the ratchet 849 and cam the latter toward the right (Fig. 66) against the action of spring 853 to disengage the hub 857 from the opening in the spool. It will be apparent that when the hook 885 is drawn forward against the action of the attached spring and the lever 860 is shifted fully toward the front both ends of the spool will be freed and the latter may be lifted out of the machine.

In order to facilitate the attachment of the end of a strip to the spool 856 it is provided with a bail 887 (Figs. 65 and 66) which is pivoted eccentrically on the ends of the spool and is adapted to bear upon the surface of the spool. The end of the strip is passed around this bail which is thereby drawn down against the spool to grip the paper. Obviously any other suitable means for securing the paper would be equally applicable and could be substituted for the form shown.

For convenience in the insertion of a new record strip in the machine the entire strip supporting and feeding means is mounted on a removable frame to which access may be had through the door 29 on the right side of the cabinet. This frame comprises a pair of side plates 852 and 867 (Figs. 64, 65 and 69) which are secured together by means of a sleeve 888 and the tie rods upon which the rollers 826, 830, 818 and 833 are mounted. Toward the front of the frame assembly there is secured to the right hand frame 852 a secondary smaller frame comprising two downwardly extending plates 889 and 890 and a cross plate 819 forming the writing table which has been mentioned. This secondary frame may be secured to the frame 852 by means of a sleeve 891, studs 892 and 893 and rods which support certain of the guide rollers and which are riveted to the frames. Upwardly extending ears 894 are also formed integral with the secondary frame and are similarly secured to both of the outside frame members 852 and 867. The sleeves 888 and 891 of the frames are adapted to slip over elongated studs 790 (Fig. 69) and 895 (Fig. 70) extending from the right main side frame 10. The detail strip unit when inserted in position over these studs may be held fast against shoulders on the latter by means of screws. The left hand downwardly extending portion 890 of the secondary frame is cut away as shown to a relatively small area so that in sliding the assembly into position on the studs 790 and 895 the forward set of hammers 762 will be cleared.

Suitable slots 896 are formed in the frames 852 and 867 for supporting and guiding rollers 897 secured to the sliding table 832. One or more of the rollers 897 may be mounted on studs or bolts having enlarged heads adapted to cooperate with the outer surfaces of the frame members. Tapped hub 898 (Fig. 69) and hub 899 secured respectively to the frames 852 and 867 are adapted to support a screw 900 which forms a removable bearing, permitting the insertion and withdrawal of the supply roll. It will thus be seen that all of the essential portions of the detail strip supporting and feeding mechanism are formed into a self contained unit.

Referring now to Fig. 69 it is to be noted that in the removal of the unit from the machine the break in the connection between the feeding elements and the main drive shaft of the machine occurs between a stud 842 mounted on the gear 840, and a slot or opening 843 (Fig. 71) in the disk 793 secured to the main shaft 37. In order to prevent displacement of the gear 840 and connected parts after the unit is removed from the machine a spring operated pawl 901 (Fig. 68) is pivotally mounted at 902 on the frame plate 867 and is adapted to engage the teeth of the gear 870 which meshes with the gear 840. Normally the pawl 901 is held out of engagement with the teeth by cooperation of lugs 903 and 904 formed on the pawl with cam faces 905 and 906 cut into the top and bottom surfaces of a collar 907 secured to the supporting stud 790. As the unit is removed from the machine the spring 908 rocks the pawl into locking position while upon insertion of the unit on the machine the lug 903 and cam face 905 cooperate to disengage the pawl. In Fig. 68 the pawl 901 is shown in a position allowing the assembly of the detail strip unit in the machine. As will now be explained if the parts on the removable unit have been displaced from normal the unit can not be inserted in the machine. It will be noted that in its normal position a finger 909 of the pawl 901 is in a deep notch 910 between two teeth of the gear 870; all of the other spaces between teeth of this gear are of ordinary depth. If finger 909 is not in the deep notch lug 904 will be held slightly elevated and if an attempt is made to insert the unit this lug will strike shoulder 911 of the collar 907 thus preventing the insertion of the unit into the machine. Should the unit be assembled in the machine and an effort be made to remove it while the machine is in partially operated condition the lug 904 will be unable to clear the cam face 906 because the pawl 901 will be unable to rock sufficiently and it will be held up by the finger 910 cooperating with a shallow notch; therefore the unit cannot be removed until its parts are restored to normal position. Since the disk 793 is connected with the drive shaft of the machine there is no danger of its getting out of proper position and since the pawl 901 will hold the gear 840 in proper alinement when the stud and slot are disengaged, re-engagement of the parts may be effected without difficulty.

As an aid to the insertion of a new record strip into the printer unit a line provided with a number of arrows may be formed in red or any other distinguishing color on the outer frame 852 to indicate the course of the strip from the supply roll around the various guides and to the storage roll. In order to further simplify the threading of new record material when an old roll is almost exhausted but still in the machine the end of the old strip may be pinned or glued to the beginning of the new strip and the latter may be fed through by operation of the lever 860. A warning of any suitable nature may be printed toward the end of a roll of record material so that when the warning reaches the autographic opening or soon thereafter the new roll may be inserted in the manner indicated.

The check strip 912 (Figs. 51 and 63) which is adapted to receive impressions from the two rearmost of the upper sets of hammers is fed from a supply roll 913 which is freely mounted on a rod 914 (Fig. 70) riveted into the frame member 10. From the roll 913 the strip is passed between a pair of guide rollers 915 mounted between the frame 10 and a secondary frame plate 12. Continuing downwardly the strip passes between an electro roll 916 and a cooperating feed roll 917 and then between a similar pair of rollers 918 and 919. The two electros 916 and 918 are adapted to print on opposite sides of the check strip and are inked by means of felt rollers 920 and 921. After leaving the second pair of electro and feed rollers the strip passes around a guide roller 922 and thence forwardly along the upper surface of a guard or plate 923 which extends over the series of shafts 158 and attached pinions 663. From the end of the plate the strip passes under a guide roller 924, between two pairs of rollers 925 and 926, under the ends of the rearmost hammers 762, through a rotary type of perforating and cutting blade 927, under the ends of the second set of hammers 762, and finally beneath the detail strip 809 and between two pairs of ejecting rollers 928 and 929 out through a slot at the front of the casing of the machine. It should be understood that when printing occurs the strip terminates at a point between the impression ends of the foremost group of hammers and the corresponding portion of the second group of hammers so as to permit printing upon the check strip by means of the two rear groups of hammers while at the same time the detail strip is free to be printed upon by the foremost group. After the check strip is printed upon it may, if desired, be perforated by appropriate turning of the blade 927 after which it is fed forward until its forward end projects into the pairs of ejecting rollers 928 and 929. At this time the cutting blade 927 may be operated to sever the check and the ejecting rollers are then subsequently operated to issue the check. On the next operation of the machine, during substantially the first quarter of the operation, the strip is again fed forward a sufficient extent to carry the end thereof to its print receiving position between the first and second groups of hammers as explained.

Before passing to a description of the means for feeding the check strip in the manner indicated attention is called to the construction of the bars 766 (Fig. 63) which serve to operate the upper sets of hammers and which are bent to avoid interference with the check strip in the passage of the latter from the lower electro roll 918 to the guide roller 922. The bending or displacement of these bars to the left (Fig. 74) is clearly shown in this figure and is of sufficient extent to permit the free passage of the check strip in the manner indicated.

In order to draw the strip from the supply roll the pairs of electro and feed rollers 916, 917, 918 and 919 are driven in the following manner. A disk 930 (Figs. 51 and 71) secured to the drive shaft 37 carries a pair of pins or rollers 931 and 932 adapted to cooperate with the slots 933 in a Geneva wheel 934 mounted on a stud 935 extending from the frame 10. Arcuate faces 936

(Fig. 51) of this Geneva wheel are adapted to cooperate with the circumference of a disk 793 (Fig. 71) to normally lock the wheel but in accordance with the usual operation of a Geneva drive the cut out portions 937 of the disk 793 in line with the rollers 931 and 932 will permit the free turning of the wheel as it is driven by the rollers. Upon each operation of the machine the Geneva wheel 934 will be rotated a half revolution in two separate steps since each of the rollers 931 and 932 will rotate it through a one-quarter revolution. A gear 938 (Fig. 74) secured to the Geneva wheel by sleeve 939 is in constant mesh with a pinion 940 loosely mounted on the shaft 941 (Fig. 63) which supports the inking roller 921. Another pinion 942 (Fig. 74) of the same size as pinion 940 is arranged adjacent the latter and is secured to the ink roller 921. A broad toothed pinion 943 is normally out of mesh with the pinions 940 and 942 but, as will be explained, is adapted to be rocked into mesh with the latter to serve as a clutch in the connection between the gear 938 and the roller 921. Secured to the electro 918 (Fig. 51) is a gear 944 which meshes with the pinion 942 and also with a pinion 945 secured to the feed roller 919. It will be apparent that by means of this system of gearing the electro and feed rollers will be turned with the inking roller. Suitable gears 946 (Fig. 70) and 947 on the outer ends of the electros 916 and 918 serve to transmit the movements of the Geneva wheel 934 to the upper electro. A gear 948 (Fig. 51) toward the inner end of the electro 916 then drives the associated inking and feed rollers by means of pinions 949 and 950 respectively. The arrangement of the pins or rollers 931 and 932 on the disk 930 is such that two steps of movement will be imparted to the check strip at the appropriate times in the manner indicated.

Another check strip feeding mechanism is provided further toward the front of the machine and this is operated simultaneously with the feeding mechanism just described. It comprises the pairs of rollers 925 and 926 which are driven in a manner somewhat similar to the electros. Thus a pair of rollers 951 and 952 (Figs. 71 and 73) extending from the opposite side of the disk 930 from that on which the rollers 931 and 932 are mounted, are adapted to cooperate with a Geneva wheel 953 (Figs. 51 and 15) mounted on a stud 954 extending from the side frame 10. A locking disk 955 (Figs. 71 and 73) similar to the disk 793 cooperates with the Geneva wheel to lock the latter until it is driven by the rollers. The arrangement of these rollers is such that the roller 952 falls at the same point on the disk 930 as the roller 931 on the opposite side so that these may be held by a single stud passing through the disk.

A gear 956 (Fig. 15) secured to the Geneva wheel 953 meshes with a pinion 957 loose on a stud 958. Another pinion 959 on this stud in turn meshes with a pinion 960 cooperating with a pinion 961 secured to the knurled roller 925, which in turn is secured to an upper secured shaft 962. On a square portion at the opposite end of the shaft 962 is keyed a pinion 963 and another roller 925 (Fig. 15). A broad toothed pinion 964 is normally out of mesh with the pinions 957 and 959 but is adapted to be rocked into mesh therewith to clutch them together. The lower rollers 926 mounted on studs 965 and 966 extending from the frames 12 and 10 are driven from the upper rollers by means of pinions 967 and 968 in mesh with the upper pinions 963 and 961 respectively.

The means for rocking the broad toothed pinions 943 and 964 to clutch or unclutch the pairs of pinions 940, 942, and 957 and 959 will be described in a later section. So also the means for operating the cutting and perforating device 927 will be described in connection with the means for determining whether a single check or stub check or none is to be printed.

After a check, either single or stub, has been printed it will have been fed by the three pairs of rollers mentioned until its forward edge is placed between the pairs of ejecting rollers 928 and 929. As shown in Fig. 51, these rollers are normally so arranged that their outer peripheries are in engagement but the upper rollers are provided with a flat side 969 which is brought directly above the lower rollers at the time the strip is fed forward between them. For the purpose of turning the rollers to effect this result, as well as to eject the check, the two pairs are intergeared by means of gears 970 and 971 (Fig. 70). One of the upper gears 970 meshes with a gear 972 to which is secured, by sleeve 974, a pinion 973. This pinion cooperates with rack teeth 975 on the lower edge of a slide 976 supported toward its front end on the cross bar 769 and connected at its rear end to an arm 977 (Fig. 72) suspended from a screw 978. A spring may if desired be employed to urge the slide 976 forwardly thus aiding in the production of a quick ejection action. A pin or roller 979 carried by the arm 977 engages a cam slot 980 in the gear 36, which slot is so formed that it produces no effect upon the arm during the first part of the rotation of the gear while the printing is taking place. However, just before the strip is given its second forward movement or during such movement the slide is shifted to the right (Fig. 51) so that the upper roller 928 is turned counter-clockwise until the flat side 969 is brought above the lower roller. After the strip has been fed forward and severed the arm 977 is rocked in the reverse direction to shift the slide 976 to the left beyond its normal position thereby ejecting the check. Subsequently the slide is returned toward the right to normal. The purpose of having the flat side 969 normally away from the lower roller is to close up the space which it provides between the rollers so that when the machine is at rest the type carriers may not be tampered with by the insertion of a wire or the like and no shield or card may be inserted to prevent printing on the detail strip. This is a valuable feature provided full width feed rollers are to be used so that the entire width of the check opening will be closed off. If only pairs of cooperating feed wheels are employed the wheels 928 are secured to a shaft or sleeve 928—A so that all may rotate in unison and the outer wheel may drive the cooperating wheel 929 through the gears 970 and 971.

Figure 8:
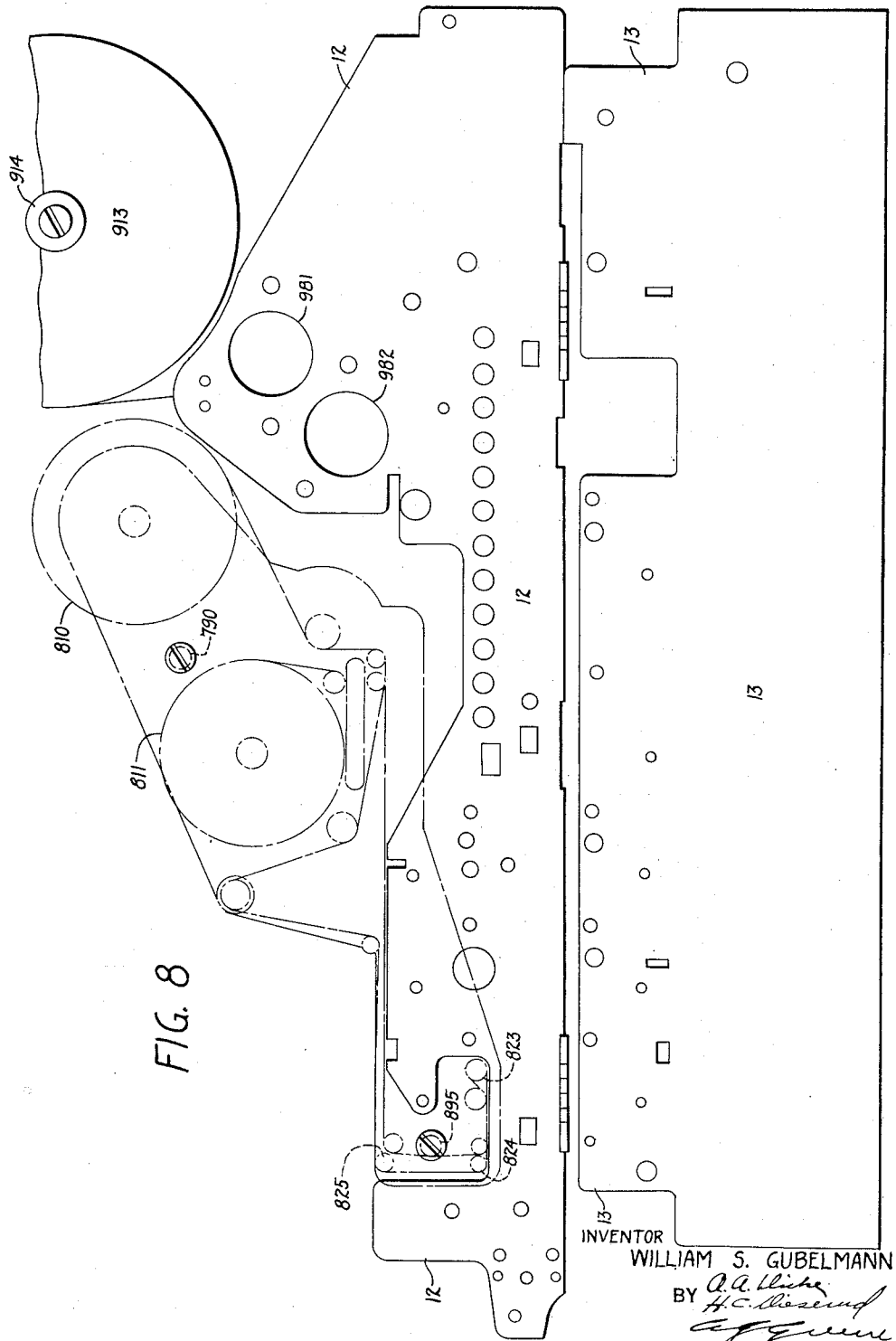
Figure 8 is a view in side elevation showing the two auxiliary side frames on the right side of the machine for supporting portions of the printing mechanism. The outlines of the detail strip unit are shown also.

In Fig. 8 it is shown that two large holes 981 and 982 are provided in the outer frame 12 in line with the electros 916 and 918. These holes are larger in diameter than the outside diameter of the driving pinions 944 and 948. The purpose of the holes is to permit the electros to be removed from the machine. To remove the electros all that is necessary is to unscrew the retaining screws 985 and slide the electros off of the supporting studs 983 and 984 (Fig. 70) extending from the side frame 10. If desired the large holes 981 and 982 may be used as bearings for the outer ends of the electros and for that purpose shoulders 986 and 987 of appropriate diameter may be provided on the ends of the electros.

Inserted slip printing

As previously stated the illustrative machine is provided with four sets of type on the lower sides of the several type carriers and there are correspondingly four sets of hammers 762 (Fig. 63) for taking impressions from these type. The arrangement is such that either a triplicate record such as shown in Fig. 50 may be printed or a duplicate record such as shown in Fig. 48 may be formed. If a sales slip in the form of three separable sections such as the stub section to be retained by the cashier, the original itemized portion sent to the bookkeeper and the duplicate itemized portion given to the customer, is to be printed on, the three forward sets of hammers 762 are rendered active. On the other hand if a duplicate statement card or sheet such as shown in Fig. 48 is to be printed upon the foremost and rearmost sets of hammers are rendered active. The spacing between these hammers is such as to insure printing on corresponding line of the two sections of the statement. For the purpose of assisting in the location of the proper lines of the statement at the printing lines the latter are designated by suitable marks 988 as indicated in Fig. 1 on the slip supporting shelf 989.

In order to determine which of the sets of lower hammers are to be operated the latter are placed under the control of a knob 990 (Fig. 51) which may assume either of two positions designated, respectively duplicate and triplicate. This knob is secured to a squared shaft 991 which extends over to the frame plate 10 and also has secured to it near this frame plate a pinion 992 meshing with teeth on a slide 993 (see also Fig. 52). On its upper side this slide is provided with three groups of rack teeth 994, each group meshing with a pinion 995 mounted on a journal member 996 having a bearing in the frame 10. These pinions are connected to disks 997 which carry eccentric rods 998 each extending across one of the several groups of hammers, with the exception of the foremost group. At their opposite ends these eccentrics are supported by journal members similar to 996 and having bearings in the frame 13. When the knob 990 is in the position shown the eccentric rods for the second and third groups of hammers, as shown in Figs. 51 and 63, are in their uppermost positions, where they are inactive. However, the rearmost rod is in its lower position, where it is in the path of the concave portions of the rearmost group of hammers and thereby prevents the latter from striking the inserted sheet or the type carriers. This therefore, is the condition of the parts when the knob 990 is positioned for triplicate printing. Upon turning this knob to the duplicate position it will cause the slide 993 to be shifted toward the rear of the machine and will thus turn the pinions 995 through a half revolution, thereby reversing the positions of the three eccentric rods 998. This will render the rearmost rod inactive while the other two rods will be placed in the paths of the second and third groups of hammers to disable them. It is to be noted that no disabling means is provided for the foremost group of hammers since these are active during either duplicate or triplicate printing. Obviously any other coordination of the rods might be adopted as desired to effect the proper enabling and disabling of hammers. If desired individual knobs each controlling a single eccentric rod 998 could be employed for separately controlling the several groups of hammers including the foremost group. A spring pressed arm 999 Figs. 51 and 74 forced against a collar 1000 is provided for retaining the knob in either of the positions to which it may be adjusted.

Check control

The check printing devices may be controlled from two sources, i. e., from a knob 1001 (Figs. 1 and 74) and by devices controlled by the presence or absence of an inserted slip. These latter devices are best shown in Figs. 51, 79 and 80. As already explained the lower set of feed rollers 925 and 926 for the check strip are adapted to be driven through a broad toothed clutching pinion 964 (Fig. 15) which serves to connect the pair of adjacent pinions 957 and 959. The broad toothed pinion 964 is carried by an arm 1002 pivoted on shaft 1003 and provided with a downward extension 1004 having a shoulder adapted to be engaged by a hook member 1005 pivoted on a stud 1021. Normally this hook prevents rocking of the broad toothed pinion into mesh with the pinions 957 and 959 but it may be disengaged to permit such rocking whenever an inserted slip is absent from the supporting shelf 989. For this purpose an extension 1006 of the hook member has connected thereto a link 1007 which at its other end is connected by a pin and slot connection to a two armed member 1008. This member is secured to a sleeve 1009, which also has secured to it a feeler finger 1010.

A link 1011 connected to an arm of the member 1008 is connected at its opposite end to a rock plate 1012 which is normally urged in a counter-clockwise direction by a spring 1013. Movement of the connected series of elements under the influence of this spring is normally prevented by means of a stud 1014 carried by a plate 1015 and standing in the path of the rear arm of the two armed member. The plate 1015 is adapted to be rocked clockwise and returned upon each operation of the machine by means of a link 1016 connected at one end to the plate and at its other end to an arm 1017 secured to the rock shaft 382. As the plate 1015 is rocked upon operation of the machine the spring 1013 causes the two armed member 1008 to rock clockwise on shaft 1018, following the pin 1014 and thus causing the end of the finger 1010 to rise. If the latter does not encounter any inserted slip it will rise to a considerable extent. During the first part of its movement it will have no effect upon the link 1007 due to the pin and slot connection between it and the arm of the member 1008 but after this idle movement the link will be raised or shifted toward the front and will rock the hook 1005 to disengage the extension 1004 of frame 1002. If the finger 1010 had encountered an inserted slip in its upward movement it would have been arrested since the spring 1013 is not strong enough to cause it to pierce the slip and the total movement of the finger would have been great enough only to take up the slack in the pin and slot between the arm of the plate 1008 and link 1007. Thus the hook 1005 would not have been rocked.

Now for the purpose of rocking the frame 1002 when it is released by the hook 1005 a special spring tensioning means controlled by the rock plate 1015 is provided so that very little resistance is presented to the withdrawal of the hook 1005.

This construction is as follows: A pin 1019 carried by the frame is engaged by a bifurcated arm 1020 pivoted on the stud 1021 and provided with a downwardly extending arm 1022. In the latter there is provided a pin 1023 to which is connected one end of a spring 1024 which is connected at its opposite end to a pin 1025 carried by a link 1026 having a slot 1027 surrounding the pin 1023. At its lower end the link 1026 has a pin and slot connection to the rock plate 1015. This arrangement is such that when the plate is rocked by operation of the shaft 382 there is first a slight idle movement due to the lower pin and slot connection and then the link 1026 is shifted upwardly thus placing either an initial or a further tension on the spring 1024 and carrying the upper end of the slot in the link away from the pin 1023. Preferably the slot in link 1007, which corresponds to the idle movement of the finger 1010, is shorter than the lower slot in link 1026 so that latch 1005 may be released before the spring 1024 is placed under any appreciable tension. Obviously if the hook 1005 has been disengaged due to the full upward movement of the finger 1010, resulting from the absence of an inserted slip, the frame 1002 will be rocked under the action of spring 1024 to engage the pinion 964 with pinions 957 and 959. This will serve to allow operation of the lower set of feed rollers.

In order to control the operation of the upper sets of feed rollers a link 1028 (Figs. 51 and 79) connected to a pin 1029 on the lower frame 1002 is also connected to an arm 1030 of the frame 1031 which carries the broad toothed pinion 943 that serves to couple the pinions 940 and 942 (see also Fig. 74). It will be apparent that by means of this connection all of the sets of feed rollers will be coordinated and the feeding of the check strip will be enabled or disabled according to whether the lower frame 1002 is rocked or not.

Whenever the check feed is disabled it is important that the rear set of hammers should be disabled since otherwise a series of numbers might be printed on the check strip and be confused with the proper amount when a check is issued on a subsequent operation of the machine. For this purpose a rib 1032 (Figs. 55 and 79) formed on a tube 1033 pivoted on the shaft 962 is normally in the path of this set of hammers to block their full movement. Thus while these hammers may be operated they will normally be arrested by this rib before they strike the check. However when the hook 1005 is rocked to permit the rocking of the frame 1002 the tube 1033 will be rocked counter-clockwise (Fig. 79) until the rib 1032 is carried out of the path of the hammers. To accomplish this result an arm 1034 connected by a hub 1035 (see also Fig. 80) to the hook 1005 is connected by a link 1036 to an arm 1037. This arm is directly secured to one section of the tube 1033, while a bail formed by arms 1038 (Fig. 55) and 1039 and a rod 1040 serves to connect the arm 1037 to the main portion of the tube. The formation of the tube 1033 in two sections as shown is for the purpose of avoiding interference with the check feed roller 925 (Fig. 15) which enters into the space between the two sections. No provision is made for disabling the printing hammers which are adapted to print on the forward portion of the check since when no check is to be issued there will be no portion of the strip beneath these hammers and their operation will be idle.

In addition to the control by the presence or absence of an inserted slip over the check printing and feeding devices the latter may be controlled by the knob 1001 having a sleeve 1041 secured to the shaft 761 (Figs. 79 and 80). Toward its opposite end this shaft has secured to it an arm 1042 carrying a pin 1043 which is in the plane of the frame 1002. The knob 1001 may be placed in any one of three positions and is frictionally held wherever set, by means of a spring urged detent 1044 (Fig. 80). In one position of the knob the parts assume the position shown in Fig. 79 and the machine is conditioned for the issuance of a stub check. At this time the pin 1043 is away from the frame 1002 and will not interfere with the latter so that if no inserted slip is present the frame will be rocked to cause feeding of the check strip. However, if the knob is turned clockwise (Fig. 79) to a position designated "no check" the pin 1043 will be carried under a shoulder 1045 of the frame 1002 and the latter will be held against rocking even though the hook 1005 may be withdrawn due to the absence of an inserted slip. At the same time a pinion 1046 secured to the sleeve 1041 meshes with a pinion 1047 mounted on a shaft 1048 which is mounted at its opposite ends in the frame members 10 and 12. This shaft 1048 is formed as a crank shaft having an intermediate eccentric portion 1049 which is adapted to be moved upon rotation of the shaft counter-clockwise into a position where it is in the path of the horizontal portions of the rearmost set of upper hammers near the pivot of the latter. Thus when the knob 1001 is turned to the "no check" position the rear check printing hammers as well as the check feeding devices will be disabled regardless of the position of the feeler finger 1010.

A third position of the knob is provided for conditioning the check printer to form only a single impression of the check. For this purpose the knob must be turned counter-clockwise from the position shown (Fig. 79) through substantially 180°. In this position of the parts the pin 1043 will still be out of the path of the frame 1002 as the latter is rocked so that its action is left entirely under control of the feeler finger and the check strip will be fed if no inserted slip is present in the machine. At the same time the eccentric portion 1049 of the shaft 1048 will be carried to a position substantially diametrically opposite that shown in Figure 79. In this position it will hold the rear set of hammers in a rocked position and will prevent engagement of the latter with the check strip. While they may be operated to a limited extent their movement will be idle.

The perforating blade 1050 (Fig. 51) and cutting blade 1051, formed on the rotary cutting device 927 are operated on each operation of the machine for the purpose of severing the check after it has been fed forward into the ejecting wheels and the device is operated to perforate the check between the two impressions on a stub check. Whenever only a single impression is made on a check provision is made for disabling the perforating action of the blade. This mechanism is constructed as follows: A pin 1052 (Fig. 79) extends radially from the rotary device 927 near one end. Another radial stud 1053 (Fig. 51) extending from the rotary device is provided to permit attachment of a centralizing spring 1054 which holds the device in normal position. Adjacent the pin 1052 there is mounted on the studs 786 extending from each of the hammer restoring bails 765, a slide 1055 (Fig. 75). This is in addition to the link 785 which as previously explained, serves to tie together the series of bails. The slide 1055 is provided with an overturned lug 1056 in front of the pin 1052 and adapted to cooperate therewith when the slide is shifted toward the rear. A spring 1057 connected between the stud 786 on the middle one of the bails 765 and a stud 1058 on the slide 1055 serves to shift the latter toward the right (Fig. 79) whenever the hammer restoring bails are rocked clockwise due to the form of the operating cam 792 (Fig. 71). This movement of the bails and slide 1055 from normal is timed to occur after the first feeding of the check strip and after the latter has received its impressions. Cooperation of the lug 1056 with the pin 1052 at this time will serve to rock the rotary device with the blade 1050 clockwise (Fig. 51) and will result in the perforation of the check strip at a point between the two impressions formed on it.

In the event that only a single impression is formed on the check due to turning of the control knob 1001 to the "no stub" position the perforating action of the blade is prevented. For this purpose the shaft 1048 having the eccentric portion which serves to arrest the rear set of printing hammers has another eccentric portion 1059 (Fig. 80) in the plane of the slide 1055 and when the knob is turned, as stated, this eccentric portion is brought to a position just in rear of a projection 1060 formed on the slide. This will prevent movement of the slide toward the right (Fig. 79) and will cause the spring 1057 to be merely tensioned upon operation of the bails 765. Elongated slots 1061 in the slide permit this idle movement of the bails.

Similarly whenever the check printing and issuing devices are disabled due to the presence of an inserted slip below the lower sets of type the rib 1032 on the tube 1033, as before explained, will remain in the position indicated in Fig. 79. It has a portion in the plane of the slide 1055 and when in normal position this is in the path of a projection 1062 on the slide thereby preventing its perforating movement toward the right. If the knob 1001 is turned to "no check" position, wherein it holds the pinion 964 in idle position, and if at the same time no inserted slip is presented to the lower sets of type the rib 1032 will be moved away from the projection 1062 on the slide 1055 and it will not block the perforating action of the blade 1050. Neither will the accentric portion 1059 interfere with the slide at this time. To eliminate the undesired perforation of the check which would result at a point near the border of the next check to be issued a lug 1063 is formed on the arm 1002 and is turned into the path of another lug 1064 on the slide 1055. Thus premature or misplaced perforation of a check is prevented because slide 1055 in its movement to the right (Fig. 79) will be obstructed by lug 1063 before the perforation blade 1050 (Fig. 51) reaches the check. Spring 1057 will merely be tensioned at this time during the full movement of the hammer restoring bails 765. It will be apparent however that when the frame or arm 1002 is rocked to cause the check feeding devices to become active the lug 1063 will be carried out of the path of the lug 1064.

The link 785 carried by the pins 786 is provided with an overturned lug 1065 (Fig. 75) which is in rear of the pin 1052 and extends into the plane of the latter so that upon movement of the link toward the left as the bails 765 are rocked the blade 1051 (Fig. 51) will be rocked counter-clockwise to sever the check. It will be recalled that the link 785 is connected directly to the bails 765 by the studs 786 without any idle play or flexible connection so that the link responds to all movements of the bails. The operating cam groove 792 (Fig. 71) for the bails 765 is so constructed that movement of the link 785 toward the left for the purpose described will take place after the second feeding movement of the check. The rotary cutting device 927, it will be noted, turns in a fixed sleeve 1066 which is provided with cutting edges cooperating with the blades 1050 and 1051.

*Slip hammer disabling device*

In order to disable all four sets of the lower or slip printing hammers whenever no slip is present in the machine the plate 1012, which is rocked by spring 1013 (Figs. 51 and 79) when the feeler finger 1010 is permitted to rise, is provided with a stud 1067. This is in the plane of an extension 1068 (Fig. 51) of the hook 798 which, as previously explained, serves to operate the hammer tensioning and releasing bail 797. When the plate 1067 is rocked counter-clockwise upon lifting of the feeler finger due to the absence of any inserted record material the hook is disengaged from the arm 1069 of the bail so that none of the lower hammers will be tensioned and released.

*Ribbon mechanism*

To provide suitable inking means for all of the seven printing lines which have been described, a single broad inking ribbon is employed. This ribbon extends in double thickness across all of the sets of type carriers. For this purpose the ribbon is looped around a guide bar 1070 (Fig. 51) supported by the frames 10 and 12 and situated in back of the rearmost of the upper sets of hammers. A pair of fixed guide bars 1071 and 1072, supported in the same manner as bar 1070 and positioned respectively above and below the bar 1070 serve not only to help support the latter but also to converge the two sides of the loop into a single plane toward the front. The ribbon in double thickness is then passed forwardly just above the type elements and below the check and detail strips. At the front of the machine the one thickness of ribbon is passed around a guide rod 1073, between a felt roller 1074 and a main feed roller 1075, around a lower guide rod 1076 and then toward the rear. The other thickness of ribbon is passed in back of the main feed roller 1075 between the latter and a pair of cooperating smaller feed rollers 1077 and 1078. The double thickness of ribbon then passes toward the rear beneath the lower type elements but above the plane of an inserted slip or card. In rear of the rearmost set of lower type elements the loop is again opened up and passed around a guide bar 1079 which is wedged in as shown in Fig. 51 beneath a fixed guide bar 1080. The two guide bars 1079 and 1070 around which the ribbon is looped at its opposite ends are removable laterally through suitable openings in the frame plates; in this way the ribbon may readily be removed from the machine and replaced by a new ribbon. Feeding of the ribbon upon each operation of the machine to present a fresh portion at each printing line is effected by means of a pawl 1081 adapted to cooperate with a ratchet wheel 1082 secured to the feed roller 1075. Pawl 1081 is urged into cooperation with the ratchet wheel by a spring 1083 and is pivotally connected at its rear to an arm 1084 extending upwardly from the lower forward hammer restoring bail 799. By means of this connection the ribbon will be fed a step on each operation of the machine as the bails are rocked. The underside of the crossbar 675 serves to arrest the upward movement of the pawl under influence of the spring 1083. The forward felt roller 1074 is adapted to receive a quantity of ink and to transfer it continuously to the ribbon to keep it evenly and properly supplied. A portion 30 of the enclosing casing which conceals the ink supplying roller 1074 may be pivoted at 1085 (Fig. 1) so that it may be raised to permit adding more ink to the roller.

An advantage of the double thickness of ribbon which is provided between the several sets of hammers and type elements is that it serves to take up a part of the severity of the blow of the metal hammers on the metal type faces. Less danger of tearing the record media is thus encountered.

In order to avoid interference with the feeler finer 1010 so that the latter may rise in the absence of an inserted slip the inking ribbon may be made sufficiently yielding for the purpose or as shown in Fig. 80 it may be formed in two laterally spaced sections mounted on separate adjacent guide rollers and on bars provided with grooves adapted to maintain a space of about ⅛ of an inch between the sections. By reference to Fig. 80 it will be noted that the feeler finger 1010 operates in a plane between the amount printing type elements and the department designating element.

*Indicating mechanism*

Indicating devices are included in the present invention for displaying in large visual characters the amount of a transaction together with the designation of the nature of the transaction and the clerk and department involved. For this purpose indicator tablets are provided and adapted to be exposed both at the front and at the rear of the machine.

The indicator tablets 1086 are all mounted near the top of the rear portion of the machine and are displayed, front and rear, thru glass windows 1087 provided in the casing (Fig. 2). There are eight banks of amount keys and each of said banks is represented by two sets of tablets, one set being arranged to be read from the front of the machine and the other set being arranged to be read from the rear both being in correct denominational order. There are also two sets of tablets one front and one rear, to indicate the amounts standing on the overflow wheels of the totalizers. These overflow sets will only be required in indicating totals to take care of the extra order beyond the key capacity which is provided in each totalizer and counter as previously mentioned. The three special banks of keys are, as stated, similarly represented by tablets, each of said banks having two sets of tablets, for front and rear indication. These special tablets need not be arranged to present the same order of appearance to the operator when viewed from the front as when viewed by the customer from the rear, as is the case with the amount tablets since their relative order is immaterial. For this reason like sets of special character tablets may be directly alined for front and rear indication. The amount sets of indicators however, for the units or pennies tablets are alined from front to rear with the overflow or millions of dollars tablets, (Fig. 86) both being lifted by a common lifting plate 1088. Similarly the dimes set of tablets for the front will be alined with the hundreds of thousands of dollars tablets for the rear and so on. It will be clear that the hundreds of dollars tablets, due to their central position among the amount indicators, will be alined at the front and rear of the machine.

Each tablet 1086 (Fig. 77) consists of a very thin sheet of metal, say for example twenty thousandths of an inch in thickness, having a downwardly extending finger 1089 with an offset portion or finger 1090 used in lifting the tablet as will be explained. It is also provided with another plain finger 1091 used as a guide. The offset portions 1090 extend varying distances, front and rear, from the plane of the tablets, the arrangement being such that each of the ten tablets comprising a set has a different plane for the offset finger (Fig. 86), and the ends of the ten offsets are spaced at equal intervals. The transaction tablets 1092 (Fig. 86) and the department tablets 1093 are slightly wider than the amount tablets 1086 and clerks' tablets 1094 since a proper designation of each of these requires several letters.

A compartment or rectangular box (Fig. 86) is provided for each set of tablets. The series of boxes for the front and the rear indicators are formed in the same way by means of plates 1095 and 1096 which are secured to the side frames 9 and 10, and are spaced sufficiently to provide for the thickness of an entire group of ten tablets. Partitions 1097 serve to divide the two large boxes for the front and the rear indicators into smaller compartments which confine and guide the indicators of a single group. The inner plates 1096 (Fig. 85) extend upwardly to a sufficient extent to conceal the mechanism between the front and rear boxes. These plates may be useful furthermore for advertisement display purposes, the portion behind the raised tablets being visible during a portion of the operation of the machine. The portion 1098 (Fig. 1) of the indicator space to the right of the groups of tablets may be provided with advertising matter either on the plate 1096 or directly on the glass 1087.

Between the two main boxes which guide and confine the indicators are a series of lifting plates 1088 (Figs. 85 and 86) slidably mounted on bars 22 and 23 extending between the side frames, and guided and held in position by means of comb plates 1099 secure to the bars. These lifting plates 1088, each of which is common to a front and a rear group of tablets, have rack portions 1100 in engagement with the teeth of pinions 1101 which are secured to a shaft 1102. On a portion of shaft 1102 (Fig. 3) extending beyond the left side frame 9 is secured another pinion 1103. In mesh with the latter is an operating rack slide 1104 guided by extensions of the bars 22 and 23 as well as by a guide stud 1105 and comb 1106 at the lower end. The operating rack 1104 has two rack portions, one portion 1107 being in mesh with the pinion 1103 and the other rack portion 1108 being in mesh with a gear 1109. This gear 1109 which is loosely mounted on a stud 1110 extending from the side frame 9 has secured to it a smaller gear 1111. The purpose of this double gear construction is to produce a greater movement of the rack slide 1104 than is imparted to the small gear 1111 by means of the segment 524. It will be recalled that this segment which is pivoted at 1112 has a roller 526 cooperating with a groove 527 (Fig. 53) in the disk 156. The groove 527 is so designed that at the start of the operation of the machine, operating rack slide 1104 is lowered, at the middle of the operation it is raised slightly and toward the end of the operation it is raised fully to its normal position. Through the shaft 1102 and the pinions 1101 the movement of slide 1104 is imparted to the lifting plates 1088.

Each lifting plate 1088, for the amount tablets 1086, has mounted thereon two independently movable selecting slides 1113 and 1114 (Figs. 85 and 86). Two double headed studs 1115 carried by the lifting plate 1088 cooperate with guide slots 1116 in each of the selecting slides 1113 and 1114. Both slides are urged to the left (Fig. 85) by a pair of springs 1117 connected between a finger 1118 on each of the slides and studs 1119 on the lifting plate 1088. On each side of the lifting plate 1088 there is pivoted on a stud 1120 a positioning pawl or detent 1121. These pawls normally have their pointed ends 1122 engaged in one of a series of notches 1123 in the corresponding slides 1113 and 1114, being urged in this direction by means of tension spring 1124. Thus the slides are held in any set position, by pawls 1121, against the pull of springs 1117. The selecting slide 1114 which is on the right side of the plate 1088 (Fig. 86) has an overturned lug 1125 adapted to cooperate with the offset portions 1090 of the front tablets 1086 to raise the latter and this lug also serves as a means for positioning the slide as will later be explained. The left hand selecting slide 1113 has two overturned lugs 1126 and 1127; the lug 1126 serves as a positioning surface, as will be explained, while the other lug 1127 cooperates with the off-set portions 1090 of the rear tablets to lift the latter. For the six sets of tablets related to the three banks of special keys, only the left hand selecting slide 1113 need be provided on each lifting plate 1088 since this slide may be adapted to lift both a front and a rear tablet which will always correspond. In the case of these three slides the lugs 1126 cooperate with the front tablets (Fig. 86) as well as with the positioning means while lugs 1127 cooperate with the rear tablets to lift the latter.

From the above description it is obvious that every selecting slide 1113 or 1114 can independently lift and lower any one of its related set of tablets. It will be apparent also that after permitting the lowering of the previously raised tablets the selecting slides must be released to permit them to assume their normal positions so that thy may then be shifted to new positions to lift other tablets representing the new item or they may if desired, be shifted directly to their new positions. The mechanism for positioning the selecting slides will now be described.

A pin 1128 (Figs. 2 and 85) in the upper end of each of the complemental slides 131, as well as the overflow order slide 1129 (Fig. 87), extends into a slot 1130 (Fig. 85) in the upwardly extending arm 1131 of a segment 1132. These segments 1132 are loosely mounted on a shaft 1133 supported by the side frames 9 and 10. Three additional segments 1134 positioned by the special key mechanism (Fig. 23) are also mounted on shaft 1133. For positioning these special segments a roller 1135 (Fig. 23) on each of the segments 330 extends thru a cam slot 1136 in one of a series of bell cranks 1137. The three bell cranks 1137 are loosely mounted on a shaft 1138 which is mounted between the center frame 11 (Fig. 9) and the right side frame 10. Each bell crank 1137 has an arm 1139 overlapping an arm 1140 on a corresponding one of the segments 1134 and has a pin and slot connection with this arm. The cam slot 1136 is so shaped that the arm 1139 may be rocked clockwise to any one of nine positions upon depression of a selected one of the special keys and the subsequent operation of the machine which rocks the special key differential segment 330. It will be understood that the segments 1132 are rocked counter-clockwise under control of the complemental slides 131 either in accordance with the keys depressed in item entering operations, or in accordance with the values standing on the totalizer or counter wheels selected during totaling operations. The segments 1134 are only rocked in accordance with the special keys depressed.

The teeth 1141 (Fig. 85) on the segments 1132 and 1134 mesh with pinions 1142 secured to one or another of two series of nested tubes mounted on shafts 1143 and 1144. Two shafts and sets of tubes are provided in order to simplify the tubing construction. Other pinions 1145, on the tubes at the proper points, mesh with rack teeth 1146 of positioning slides 1147 mounted by means of slots 1148 on the cross bar 21 and held in position by combs 1150 and 1151. Each positioning slide 1147 has a stud 1152 which cooperates with one of the lugs 1126 or 1125 on a related selecting slide 1113 or 1114, when the latter together with its carrier plate 1088 is lowered, to position the slide in accordance with the movements of its segment 1132 or 1134. The upper surface of a stop shoulder 1153 (Fig. 85) on the positioning slide 1147 is adapted to engage a pin 1154 on the related pawl 1121 when the lifting plate 1088 is in its lowermost position. The point 1122 of the pawl is at this time held out of engagement with the ratchet teeth 1123 so that the corresponding slide 1113 or 1114 will be released, letting spring 1117 pull it to the left (Fig. 85) until it is stopped by the stud 1152 on the positioning slide 1147.

As shown in Fig. 87 the tubes for the amount tablets have secured to each a pinion 1142 in mesh with the related segment 1132, and two pinions 1145 in mesh with two different positioning slides 1147. One of these slides positions a selecting slide 1113 for controlling the rear indication and the other positions a slide 1114 for controlling the front indication. Thus the units of cents tube 155 is mounted directly on the shaft 1143 and has its pinions 1145 near the extreme ends of the tubes the left hand pinion being provided to control the rear indication and the right hand pinion being provided to control the front indication. Just to the left of the right hand pinion 1145 will be found the pinion 1142 for positioning the tube. The units of dollars tube 1156, the hundreds of dollars tube 1157, the tens of thousand dollars tube 1158 and the millions of dollars or overflow bank tube 1159 are also mounted on the shaft 1143 in nested formation while the tens of cents tube 1160, the tens of dollars tube 1161, the thousands of dollars tube 1162 and the hundreds of thousand dollars tube 1163 are mounted in nested formation on the shaft 1144. It will be apparent that the order of arrangement of the tubes on the pair of shafts 1143 and 1144 depends on the necessary location of the pinions 1142 and 1145 as determined respectively by the location of the controlling key banks, and the positions of the corresponding indicators with their related slides 1113 and 1114. It has been found that with the arrangement of the tubes and the spacing of other parts as shown in Fig. 87 the pinions may be located as required without offsetting more than one of the connecting pieces 1132 between the key-set differential slides 131 and their corresponding pinions 1142, and that connection need only be slightly offset. The offset connection is to the pinion on tube 1163 (Fig. 87). The tubes for the special tablets (Fig. 87) have only one pinion 1142 on each in mesh the related segments 1134 and one pinion 1145 on each in mesh with a positioning slide 1147. This single positioning slide 1147 for each positions a selecting slide 1113 which, as previously explained, lifts tablets for both front and rear indication of the special characters. The transaction tube 1164 and the department tube 1165 are mounted on the shaft 1143 while the clerk's tube 1166 is mounted on the shaft 1144. A general discussion of the operating sequence of the indicator parts described above will now be given.

At the very beginning of the operation of the machine the lifting plates 1088 (Fig. 85) are lowered, and carry with them the previously raised indicator tablets, the final portion of this movement resulting in the rocking of the pawls 1121 by engagement of pins 1154, with the extensions or shoulders 1153 to release the slides 1113 and 1114. These slides are then restored to the extreme left (Fig. 85) by the springs 1117 and are now ready to be again positioned to select a new tablet. For this purpose the special key differential mechanism (Fig. 23) acts first to effect the positioning of the selecting slides 1113 by means of the segments 1134, the tubes 1164, 1165 and 1166, (Fig. 87) and the positioning slides 1147 on which the pins 1152 are adapted to cooperate with the bent ends of the slide 1113. The amount selecting slides 1113 and 1114 are next positioned, by virtue of the movement of the complementary slides 131 upon the operation of the differential mechanism (Figs. 2 and 85) which is entirely positive in action in item entering operations and driven by spring levers 548 (Fig. 2) in totaling operations. The connections from the complementary slides for this purpose include the segments 1132, the related tubes on the shafts 1143 and 1144, and the positioning slides 1147 with their pins 1152 adapted to engage the bent ends of the selecting slides.

The selecting slides 1113 and 1114 being positioned in this manner are now ready to raise the new tablets. It will be observed that these slides would not remain in their new positions if the lifting plates 1088 were kept in their lowermost positions while the complementary slides 131 are being returned to their initial positions since the detents 1122 would still be held inactive. For this reason the plates 1088 are lifted slightly at about the midpoint in the operation of the machine after the complementary slides 131 have partaken of their full movement and are still stationary. This movement of the plates is sufficient to permit the springs 1124 (Fig. 85) to rock the pawls 1121 and lower the detent points 1122 into the adjacent notches 1123 of the selecting slides 1113 and 1114, thus holding the slides in their adjusted positions in spite of the subsequent return movement of the positioning slides 1147 during the last half of the operation of the machine. Toward the very end of the operation the plates 1088 are lifted further into their normal positions so that the lugs 1125, 1126 and 1127 on the selecting slides 1113 and 1114 cooperating with the offset portions 1090 of the selected tablets will lift the latter to their exposed positions.

It will be understood that the arrangement of the tablets in each group will be such that the offset portions 1090 will fall in appropriate sequence to be selected properly by the lugs 1125, 1126, and 1127. In connection with the amount indicators this necessitates consideration of the fact that for those controlled by the key banks the segments 1132 and slides 1147 will be adjusted in accordance with the complements of the keys depressed or of the amounts on the wheels whereas for the overflow groups of indicators the control over the segment 1132 and slides 147 will be from an element which moves in direct correspondence with the amount on the overflow wheel. This obviously will call for a different order of the indicators in the overflow groups from that in the other amount groups.

Preferably the surfaces 1153 on the positioning slides 1147 are of sufficient length to cooperate with the pins 1154 of the detent pawls regardless of the extent to which the slides are shifted. However, it will be observed that if the surfaces are too short for this purpose the mechanism will still function properly. The pawls 1121 will be permitted to rock into active engagement with the ratchet teeth 1123 earlier than otherwise, i. e. whenever the slides 1147 are given the larger extents of movement as for example more than five steps, however the further movement of the selecting slides 1113 and 1114 will not be interfered with but will result merely in an idle ratcheting action between the pawls and the teeth 1123.

*Drawer mechanism*

The machine is provided with two cash drawers, a drawer 1167 (Fig. 1) for cashier 1, and a drawer 1168 for cashier 2. These drawers are slidably mounted in the frame 25 and have attached thereto the usual ejecting springs 1169 (Fig. 2) cooperating with fixed cups 1170 secured in any suitable way to the frame. Since the drawers are alike in most particulars a description of one will apply also to the other.

Secured to the back plate of each drawer is a bracket 1171 (Fig. 88) which is adapted to be engaged by a pair of latches or hooks 1172 and 1173 in a manner that will presently be explained. The bracket 1171, in conjunction with a stud 1174 extending upwardly from the base plate 1175 of the frame 25, also acts as a back stop for the drawer. The two latches are pivoted on a stud 1176 mounted in a bracket 1177 secured to the base of the frame. The one latch 1172 is under control of the cashiers' locks 454 and 455 (Fig. 1), while the other latch 1173 provided with a separate hook element 1178 pivoted near the end 1179 of the latch is controlled by the operating mechanism of the machine. Both latches for both drawers may be simultaneously disengaged, however, by a separate manual means as by the turning of the reset total lock 474 (Fig. 3), thus disclosing the contents of both drawers to an authorized person without an operation of the machine.

The manner in which the cashier locks control the latches 1172 will now be described. With reference to Fig. 35 it has already been explained, how, turning of either of the locks 454 and 455 serves to move the plate 461, thereby turning the pinion 464 which is in mesh with rack slide 467. The turning of the upper lock 454 for cashier 1 will shift the slide 467 to the left, while turning of the lower lock 455 for cashier 2 will move the slide to the right. Referring to Fig. 88 it will be seen that slide 467, thru a lever 355, has its movement transmitted to a bar 468 which is located in the plane of the transaction bank of counters. A roller 1180 on the bar 468 is engaged by a slot or opening 1181 in a three armed rock plate 1182. This plate is fulcrumed on a stud 1183 carried by a lug 1184 provided beside a cut out portion 1185 in the base 24. Turning of the cashier 1 lock will rock the plate 1182 clockwise thereby depressing a link 1186 whose slotted lower end engages a stud 1187 on the rear arm of the latch 1172 for the upper drawer. The latch 1172 will thus have its forward end (Fig. 88) lifted until its hooked end 1188 clears the bracket 1171. At the same time another link 1189 pivoted on the left arm of the plate 1182 will have been lifted so that its slotted lower end will have moved idly on the stud 1190 of the latch 1172 for the lower drawer. Should the cashier 2 lock be turned the links would move reversely; thus link 1189 would move downward to disengage the latch 1172 for the lower drawer and link 1186 would move idly upward with no effect on the latch for the upper drawer. A spring 1191 tensioned between a stud on the latch 1172 and a stud on the bracket 1177 urges a stop stud 1192, carried by the latch 1172, against the forward edge of bracket 1177, thus maintaining latch 1172 in normal position.

In the operation of the second latch 1173, mechanism already provided in the machine for other purposes may be utilized in large part. Thus there may be mounted on a stud 1112 (Fig. 3), in the left side frame of the machine, a bell crank 1193 which carries on its forwardly extending arm a roller 1194, adapted to ride in the previously mentioned groove 527. This roller is so situated with respect to the groove that there will be a difference in phase of about 25 degrees from its previously mentioned action on the indicator raising segment 524, so that the bell crank 1193 will be practically idle for most of the operation of the machine, but toward the end of the operation the bell crank will be rocked counter-clockwise. From the downwardly extending arm of the bell crank a link 1195 is connected to an arm 1196 mounted on the sleeve 1197 suitably supported in the base 24. This sleeve extends from near the left side of the base (Fig. 5) over to the cut out portion 1185 (Fig. 88) under the transaction counter bank. At this end (Fig. 88) as the sleeve is rocked clockwise, an arm 1198 secured thereto depresses a link 1199 having pin and slot connections with the latches 1173 for both drawers. The upper ends of the slots 1200 provided for this purpose in contact with pins 1201 at this time rock both the upper and the lower latches 1173 clockwise and thus lift the hooks 1178 above the brackets 1171. As a result of this action that drawer which is freed by its cashier's lock controlled latch 1172 also, will be pushed forward.

The pivoted hooks 1178 are provided on the members 1173 in lieu of an integral hook in order to maintain a normal clearance between the latches 1172 and the brackets 1171, so that, the cashiers' locks will not be required to force these latches 1172 upwardly against the action of friction created by the pressure of the ejecting springs 1169. The hooks 1178 also aid, by their toggle like action, in engaging the latches 1173 with the brackets 1171 and imparting the required slight rearward movement to the two drawers. Since one or the other of the cashier's lock controlled latches 1172 remains stationary during all ordinary operations, the corresponding drawer will move only slightly forward until the normal small clearance is taken up and it engages the latch 1172 when the machine operated latch 1173 is rocked clockwise. Therefore, when this latch 1173 is urged counter-clockwise toward the end of the operation of the machine it must move the drawer slightly to the right (Fig. 88) to re-establish the clearance between the hook end 1188 on latch 1172 and the bracket 1171. This is accomplished by the rocking of the hook 1178 about a stud 1202 near the forward end of latch 1173. When the latch 1173 is rocked clockwise upon the operation of the machine the hook 1178 is also rocked clockwise about the stud 1202 by means of a spring 1203 connected between the hook 1178 and the latch 1173, until the hook is arrested by engagement of its upper arm with a stop pin 1204 extending from the latch. As the operation continues during about the last 25 degrees of movement of the shaft 37 the upper end of the slot 1200 of link 1199 is withdrawn from the pin 1201 and the latch 1173 is permitted to rock counter-clockwise under the influence of a heavy spring 1205 which is in the same relative position as the spring 1191 for the latch 1172 and is connected between the latch 1173 and the bracket 1177. As the hook 1178 descends with the forward end of the latch, a downwardly extending tail 1206 thereof abuts against a stud 1207 mounted in the base of the frame 25, so that upon the continued return movement of the latch 1173 the hook will be rotated about its pivot 1202. As the hook 1178 is rotated in this way the drawer will not only be latched but it will also be drawn slightly to the rear by this spring impelled lever action of the machine operated system.

Referring again to Fig. 3 it will be seen that the reset total lever 538 controlled by the lock 474 is provided with a rearwardly extending horizontal arm 1208 from which a link 1209 is extended down to an arm 1210 rigidly mounted on a shaft 1211. This shaft 1211 (Fig. 5) extends thru the entire length of the sleeve 1197 and has at its end, adjacent the cut out portion 1185 (Fig. 88), a rearwardly extending arm 1212. From the arm 1212 is suspended a bar 1213, guided in the frame 25 and having overturned lugs 1214 and 1215. These lugs co-act with the fingers 1216 on the latches 1172 and the fingers 1217 on the latches 1173. It is obvious that as the reset lock is turned the shaft 1211 will be rocked clockwise (Fig. 88) thereby depressing the bar 1213 and the fingers 1216 and 1217 thus raising the forward ends of all four of the latches 1172 and 1173, and releasing both drawers simultaneously.

If desired the drawer releasing operation by means of the reset lock could be dispensed with and a different method of operating the latches 1173 might be employed. Thus the slot 1200 could then be eliminated to provide a direct connection between the link 1199 and the latches 1173 so that spring 1205 would no longer be necessary, since both movements of the latch 1173 would then be made positive.

Timing chart

The timing chart (Fig. 89) illustrates graphically the sequence of operation of the major functions performed by the machine. The heavy lines used in this chart illustrate the period and duration of activity or movement of the operating parts while the light line portion of any circle designates the idle condition of the represented function. Sudden breaks in the heavy lines indicate points at which the operating members change their direction of movement.

Starting at 0°, circle 1, which designates the timing of the indicator parts, shows movement of certain of its parts up to 20°. This time is utilized to bring down the indicator supporting and lifting plates 1088 and the previously raised tablets themselves, thus destroying the previous setup and conditioning the indicator section for a new setup. The key locking bar 52 is released at this same time, 0° to 20° (circle 18), to hold all keys locked in either normal or depressed position. From 20° to 35°, circle 2, indicates operation of the differential units related to the special keys to select the proper totalizers, counters, and special indicator tablets according to the transaction, department and clerk keys depressed. The consecutive numbering mechanism is also operated during this period to set up the new number to be printed. From 35° to 45° the slides 370 holding out the totalizer engaging bails 364 are shifted to allow any of the bails, which have a series of notches in the bars 359, 472, 486 and 496 aligned below their cooperating fingers, to engage the related totalizer lifting frames preparatory to lifting them. During the interval from 45° to 60°, as shown by circles 4 and 5, the totalizers are lifted into mesh with the actuators when either a subtotal or a reset or grand total is being taken. Movement of the actuators to the positions represented by the keys or the selected totalizer under the action of the positive differential mechanism, or by the aid of the spring levers 548 on totaling operations, next takes place between 60° and 155° (circle 7). Meanwhile from the beginning of the operation up to about 155° (circle 15) the detail strip will have been shifted from autographic to printing position, while from 45° to 100° (circle 14) the check strip will have been fed to printing and perforating position. The hammer tripping operation (circle 10) is started at 145° but as this operation requires time for tensioning the hammer springs, actual tripping of the hammers will not occur until between 160° and 165°. If an item entering operation is being performed the totalizers are lifted into mesh with the actuators between 155° and 170° (circle 6). The printing hammers are reset by means of the bails 765 and 799 between 165° and 180° (circle 11); as the same operating means is used to operate the check knife, perforating will occur at about 175°, if a stub check is to be issued. The short period between 180° and 185° (circle 11) is used to provide a quick withdrawal of the perforating blade from the check. Further movement of this mechanism, between 185° and 250°, withdraws the restoring bail from the hammers and places the parts in their normal position while a still further movement in the same direction between 250° and 280° serves to sever the check.

If a reset total is being taken the totalizers will be carried out of mesh with the actuators between 175° to 185° (circle 4) while early during this period the rack detents (circle 9) will move in to keep the racks from jumping and will stay in this position while the racks are being restored. The detents engage the racks very quickly at about 178° before the totalizers are more than half out of mesh. The indicators are lifted slightly at this time, 175° to 185° (circle 1), to permit the detents 1121 to latch their selection bars 1113 and 1114 in position before the amount differential slides move back towards normal. During the interval between 170° and 190° the carrying and restoring mechanism (circle 8) is operated to move the restoring bars 198 in the direction to restore the transfer plates 194 to normal again. This action restores any of these transfer plates which may have been tripped by a totalizer wheel standing at nine when it goes into mesh with the actuators (between 45° and 60°) on totals. On adding operations this restoring of the carry plates is an idle operation because any tripped plates will merely follow the restoring bar in both directions inasmuch as the selected totalizers will be in raised position in engagement with the actuators throughout this time.

From 165° to 195° (circle 16) the check ejector wheels 928 will be rotated about 180° into a position wherein the flat or cut out portions 969 of the wheels are directly above the path of the check strip to permit passage between the upper and lower wheels of the check which is later fed into them during the time indicated by circle 14 (190° to 245°). After the check has been thus fed and is severed the grooved wheels make one complete revolution during the period from 280° to 335° (circle 16) thereby ejecting the check. The wheels then move in the initial or opposite direction, between 335° and 360° (circle 16), to carry the flat or cut out portions away from the ejecting slot into the normal position shown in Fig. 51 so that no check or slip can be inserted from the front for fraudulent operation of the printing devices.

The actuators and other parts of the differential mechanism are restored to normal during the interval between 190° and 280° (circle 7). The totalizer wheels are actuated by this return movement of the actuators on an adding or a sub-total operation. Between 280° and 285° (circle 13) the carrybar lock shaft 216 is turned for the purpose of holding the tripped carrybars in nines coupling position when the totalizers are subsequently lowered out of mesh; also the item counters are unlatched at this time in adding operations to permit them to rise and follow the totalizers in their subsequent movements. Immediately thereafter, 285° to 295° (circles 5 and 6), the totalizers and counters are taken out of mesh with the actuators and are engaged with the carry slides. On sub-totaling operations the subsequent bodily movements of the totalizers are unnecessary, but are permitted to take place in order to enable the use of a common cam groove for adding and sub-totaling.

From 295° to 305° (circle 8) a carry is effected by every carry slide which is coupled to the carry operating bail 198 or is nines coupled to such a slide. In a universal carry type of bank of totalizers or counters the transfer unit is put into corresponding orders of all nine of the universal accumulators. For this reason in the period from 305° to 315° (circle 6) the selected totalizers are again lifted out of mesh with the carry slides so that during the subsequent period (315°–320°) circle 8, the carrying slides may be restored to normal and thus subtract a unit from those of the universal totalizers (eight in each bank) that were not selected for operation. The movement of the restoring bail for this purpose, extends to and beyond normal position so that the coupling plates are lifted to their normal positions or slightly beyond and are held there. During the interval from 307° to 310° (circle 13) the item counter latches 442 are allowed to assume their latching positions so that they will serve to latch the item counters when they are again lowered; but this release of the latches does not occur until after the second lifting of the counters has begun so that this is not interfered with; at the same time the carrybar lock shaft 216 is turned to release the nines coupled carrybars. From 325° to 335° (circle 6) the totalizers and counters are brought down again into normal position and then in the period from 335° to 360° (circle 8) the carry operating and resetting bail 198 is moved back from its restoring position to normal position and thus permits the coupling plates to drop a slight amount to normal where they engage the appropriate shoulders on the retaining elements. The slides 370 for rocking the totalizer engaging bails 364 are shifted back to normal during the interval from 335° to 345° (circle 3), to carry the cross fingers 363 of the bails out of the notches in the selecting bars 359 below, thus allowing the selecting mechanism, in the period from 345° to 360° (circle 2), to restore these bars and connections controlled by the special keys to normal position.

During the last portion of the operation of the machine other mechanisms are operated to complete their functions. For example the detail strip is shifted, 205° to 360° (circle 15), from printing position to autographic position. The newly selected indicator tablets are lifted by upward movement of the plates 1088, 335° to 360° (circle 1) and are held exhibited behind glass windows at the front and rear of the machine. The depressed keys are released late in the operation, 345° to 360° (circle 12). If the machine is operated to take a total the rack detents 571 will be active, as already explained, and during the last ten degrees (circle 9) these will be lifted out of the teeth of the racks. The drawer release occurs also at a late period, 315° to 340° (circle 17), in the operation of the machine and the machine operated latches are restored to normal thereafter, from 340° to 360°. The devices for operating the consecutive numbering mechanism are restored to normal (circle 2) simultaneously with the restoration of the special key differential devices, 345° to 360°.

*Resumé*

One suitable form of the invention having thus been described in detail the coordination of the several operative features will now be more clearly set out by a brief description of an operation of the machine as a whole.

Assuming that a customer of the store in which the machine is located has previously purchased a Victrola and is now about to make a payment of $7.50 on account to clerk B while cashier number 2 is on duty, the machine, in the first place, will be conditioned by the turning of cashier 2's lock 455 (Fig. 1) to designate her responsibility for the items entered. Total controlling levers X and Y (Fig. 21) will be located in their item entering positions. The knobs 714 will have been adjusted at the beginning of the day to indicate the date on certain of the printed records. Upon receipt of the money the cashier will depress the proper amount keys representing $7.50 and also the proper special keys representing the "Received on account" transaction, the clerk "B" and the "Victrola" department, all of these keys being held depressed by the detents described. Proper adjustment of one of the cashier's locks and depression of a key in each of the special banks will serve to release the machine for operation by withdrawing the set of four independent locking pawls 589 (Fig. 35) which cooperate with the operating shaft 37. Before the machine is operated the installment card (Fig. 48) of the particular customer will have been taken from an appropriate file and inserted in the machine while the knob 990 will have been adjusted to cause duplicate printing.

The main operating parts of the machine may now be turned either by means of a motor or by the hand operated lever 33 (Fig. 1). Depression of the "Received on account" key will have served to shift the slide 306 (Fig. 23) of its bank downwardly a distance of two steps. The slide 306 carries the stud 323 which will have been thus carried down two steps from normal. Similarly the "B" clerk's key will have served to shift its slide 307 upwardly one and one half steps so that the adjacent slide 306 will have been shifted upwardly three steps, thru the gears 311 and 312, thereby carrying its stud 323 up three steps from normal. Depression of the "Victrola" department key will likewise have shifted its slide 307 up one and one half steps and the related slide 306 together with its stud 323 up three steps.

Now upon the operation of the main shaft of the machine the shaft 324 (Fig. 23) together with arms 325 will be rocked clockwise very early to carry the rod 326 and hence the cam plates 329 upwardly. The jaws 331 of the latter cooperating with the several studs 323 will have caused the segments 330 to rock and the rack bars 342 to slide and thereby turn the shafts 348, 349 and 350 to extents corresponding to the special keys depressed. These shafts through pinions 345, 346 and 347, will shift the racks 351, 352 and 353 (Fig. 9) and through the pivoted members 355 will adjust the totalizer selecting bars 359 in the several banks of totalizers. Similar selecting bars will have been positioned in certain of the totalizer banks under control of the two totaling levers and the cashiers' locks. The net result of the movement of all of these bars will be to align a series of notches or depressions in all in the path of the cross fingers of bails 364 related to the following totalizers (Fig. 10): "cashier 2 net cash," "total net cash," "cashier 2 money in" and "Received on account" as well as the bails related to the "Received on account" item counter, and cashier 2's item counter. For all other totalizers and counters there will be a high portion of at least one of the selecting bars in the path of the bails 364. In the left hand bank of totalizers the slides 395 and 414 (Figs. 16 and 18) controlled by the cam slots 406 and 409 in the forward extension 407 of the rack plate 408 will condition all of the totalizers for addition.

Now as the operation continues the series of cam slides 370 (Fig. 11) will be shifted toward the front of the machine and will permit the bails or latching plates 364 related to the particular totalizers and counters enumerated above to be rocked to engage their notches 374 with the rods 375 carried by the totalizer lifting toggle links 377. Upon the continued operation of the machine up to the mid point of the cycle the several bars 378 will be shifted toward the right (Fig. 11) and all of the toggle links 377 will be straightened out to a certain extent, thereby causing all of the rods 375 to be raised. Obviously those totalizers whose bails or latch plates have been rocked to engage their notches 374 with the rods will be lifted into mesh with the differential actuators 162. The corresponding mechanism for the item counters will have its series of springs 441 tensioned for operation but the lifting action will be deterred by means of the hooks 442 (Fig. 29) engaging lugs 444 on the bars 378.

Prior to the engaging movement of the totalizers, as explained, the differential operating frames 138 (Fig. 2) will begin to rock and through the gearing associated therewith will tend to cause the slides 130 to be moved upwardly and the slides 131 to be moved downwardly. In those banks where no keys have been depressed the slides 130 will be barred from any upward movement by means of the zero stops 120 while the complemental slides 131 will partake of the full nine steps of downward movement. In the dollars bank, however, the zero stop will have been raised and the slide 130 will be permitted to move upwardly 7 steps until the lug 134 engages the depressed 7 key while the complemental slide 131 will move downwardly 2 steps until its lug 135 engages the opposite side of the 7 key. Similarly the dimes slide 130 will move upwardly 5 steps while its complemental slide will move downwardly 4 steps. Subsequently, after the selected totalizers have been lifted into mesh with the actuators which have been shifted to the same extents as the slide 130, the frames 138 will be restored and will return the actuators 162 as well as the slides 130 and 131 to their normal positions.

This movement of the differential elements will have served to enter the $7.50 amount into those totalizers which were raised in the manner previously explained. In turning the pinions 168 (Fig. 11) of some of these totalizers, their transfer tripping teeth 174 will have engaged the transfer bars 184 or the arms 229, 260 or 285 and will have caused the corresponding plates 194, 236, 262 and 290 to drop either to nines coupling position or into full engagement with the transfer operating bars 198, 248, 263 or 292. Before the totalizers are lowered out of mesh with the actuators the locking detent rod 216 will be rocked to retain the transfer bars and arms in either normal or nines shifted position. At about the same time the counter retaining hooks 442 (Fig. 29) will have been rocked to permit the springs 441 to elevate the selected counters, which in this instance will be only the "Received on account" counter. This will serve to cause the disk 433 (Figs. 29 and 32) to raise the transfer bar 430 for the units order of the transaction group of counters and will cause any transfer tripping tooth 174 of any order wheel standing at nine to raise the related transfer bar. Now upon lowering of the selected totalizers and counter the transfer bars related to the totalizers will not change their relations nor will those related to the higher orders of the counter due to the action of the locking rod or shaft 216. However, the special units order transfer bar 430 for the counter will not be locked by the rod 216 in raised position but will be permitted to drop to cause the corresponding plate 419 to become latched to the transfer operating bar 432. The transfer operating shaft 200 (Fig. 11) will now be rocked clockwise to shift the various operating bars 198, 248, 263, 292 and 432 in the proper direction to effect carrying in those orders determined by the coupling plates and to add a unit to each of the transaction counters.

Subsequently the selected totalizers and counter will be lifted again out of mesh with the transferring racks or bars 171, 237, 261, 284 and 418 and the latter will all be restored to normal by the return movement of the operating shaft 200. Movement of the shaft and the operating bars associated therewith in this direction slightly beyond normal will serve to restore all of the tripped coupling plates. Upon the return movement of the transfer rack bars for the transaction group of totalizers and the transaction counters a unit will be substracted from each order of all totalizers and counters, except those designated "Received on account," in which a transfer unit had been inserted. The selected totalizers and counter will then again be lowered by shifting of the bars 378 to the left (Figs. 11 and 29). Finally by the shifting of the cam slides 370 to the right the bails 364 will be rocked to inactive positions thus carrying their cross-fingers 363 out of the notches in the selecting slides 359, 472, etc.

In the turning of the differential shafts 158, etc. (Fig. 9) in accordance with the movements of the slide 130, to operate the actuating racks 162 another series of pinions 663 will be turned to adjust the type carriers 672 and 664. These are each provided with seven sets of type to enable the printing of an item at seven different printing points. In addition to these carriers for the amount and special key character type there are provided special type carriers 703 and 693 (Fig. 52) adjustable under the control of the cashiers' locks, the total controlling levers and the reset lock 474 (Fig. 3). The series of knobs 714 (Fig. 81), furthermore, are adapted to adjust similar carriers 712 for the purpose of designating dates; these carriers, however, are not provided with type adjacent the detail strip printing point since it is not necessary to identify by date on this strip each of the large number of entries occurring on the same day. Still another group of type carriers 725 is adapted to consecutively number the transactions entered in the machine over a given period. The devices for controlling and resetting these members have been fully described and need not be discussed in further detail here.

After all of the carriers have been adjusted in accordance with their various controls and before the amount differentials start on their return movements the series of hammer operating slides 766 and 770 (Fig. 63) will be operated to effect printing. Prior to this, however, the detail strip will have been shifted by the sliding of the table 832 (Fig. 65) to carry the portion which normally stands beneath the autographic opening 813 to the printing point of the upper foremost group of printing hammers. In view of the nature of the transaction an installment sheet such as illustrated in Fig. 48 will have been inserted in the machine and the knob 990 (Fig. 1) will have been adjusted to predetermine the operation of only the front and rear sets of slip printing hammers. Through the action of the slip in preventing rising of the feeler finger 1010 (Fig. 51) the feed rollers 916, 917, 918, 919, and 925, 926 will remain inactive due to the fact that the frames 1002 and 1031 carrying broad toothed clutching pinions will not be rocked. At the same time the rear check printing hammers 762 will be disabled by the action of the bar or rib 1032 (Figs. 55 and 79) carried by the sleeve 1033 while the operation of the forward set of check printing hammers will be idle since no check strip will be in their paths.

Had no slip been inserted in the path of the feeler finger 1010 and had the check control knob 1001 been adjusted to its stub-check position then the frames 1002 and 1031 would have been rocked to couple up the feed rolls and the latter would have been operated once before the operation of the printing hammers and once after such operation. Under this condition of the machine the cutting and perforating blade 927 (Fig. 51) would have been rocked clockwise (Fig. 51) after the first feed to perforate the check, and then counter-clockwise after the second feed to sever the check. Immediately following this severing operation the ejecting rolls 928 and 929, which will have been previously turned to receive the check on its second feed, would be operated to eject the check.

Upon the return of the differential mechanisms to normal those type carriers which have been shifted thereby will likewise be returned to normal and during this period the hammers will be restored and the table 832 will be returned toward the left (Fig. 65) to shift the printed entry on the detail strip just beyond the autographic opening 813 and under the glass 814.

The detail strip is mounted on a frame comprising side plates 852 and 867 and may be removed bodily from the machine to facilitate the replacement of the supply and storage rolls if desired. In order to avoid the necessity of tracing out the course of the strip whenever a new roll is inserted the beginning of the latter may be pinned or otherwise fastened to the end of the previous roll and these ends may be fed through the machine in the usual way by manual operation of the lever 860 (Fig. 1.)

The operation of the indicator mechanism for designating which of the amount and special keys have been depressed is as follows: early in the operation of the machine the shaft 1102 (Fig. 85) is rotated by the connections from the sector 524 shown in Fig. 3, to lower the frames or lifting plates 1088 together with the previously exposed tablets. As these plates approach their lowered positions the pins 1154 on pawls 1121 engage the upward extensions 1153 of the slides 1147 and thereby release the selecting slides 1114 which are then shifted toward the left (Fig. 85) by their springs 1117. Now upon continued operation of the machine the special key differentials are adjusted in the manner indicated and as the segments 330 (Fig. 23) are rocked rollers 1135, carried thereby, cooperate with the cam slots in the members 1137 which through the segments 1134, pinions 1142 and slides 1147 serve to readjust the selecting slides 1114. Next as the amount differentials are operated and the complemental slides 131 (Fig. 2) are shifted toward the front the pins 1128 thereon, cooperating with the extensions of segments 1132, will cause the latter to rotate the corresponding pinions 1142 and sleeves 1156 and 1160 associated with the dollars and dimes banks (having reference to that $7.50 amount previously specified) to adjust the related slides 1147. These by cooperation of pins 1152 with the overturned lugs 1125 and 1126 of the selecting slides 1114 and 1113 will shift the latter until the lugs 1125 and 1127 are beneath the fingers 1090 of the new indicators to be lifted. At a suitable point in the operation of the machine, i. e., after the differential mechanisms have come to rest, the plates 1088 are lifted slightly to disengage the pins 1154 of pawls 1121 from the shoulders 1153 so that the selecting slides 1114 may be held in their new positions while the differential mechanisms are subsequently restored to normal. At a later point in the operation the plates 1088 will be lifted further to fully expose the selected indicators.

For the purpose of selectively releasing the cash drawers each is normally held by a pair of hooks 1178 and 1188 (Fig. 88). Operation of the cashiers' locks will serve to determine the position of the rock plate 1182 and through the links 1186 and 1189 will disengage one of the hooks 1188 and will leave the other engaged with its drawer. In the case of the entry suggested the plate 1182 will be rocked counter-clockwise to disengage the hook 1188 for the lowermost drawer. Now upon operation of the machine the arm 1198 and link 1199 will be operated to disengage both of the hooks 1178 from the drawers so that the lower one which has also been disengaged from its hook 1188 will be completely released and will be thrown open by spring 1169 (Fig. 2). On the return of the hook carrying arms 1179 at a later point in the operation of the machine the hook 1178 carried by the arm related to the drawer which was not fully released will through the cooperation of its arm 1206 with the stud 1207, serve to pull this drawer a slight distance toward the rear to provide the usual normal clearance between it and the hook 1188. Upon the return of the opened drawer both of the related hooks 1178 and 1188 will be rocked about the pivot 1176 by virtue of their cam faces and will be restored to active position by means of the springs 1191 and 1205.

If the transaction entered in the machine had been a "C. O. D. paid" item the cam slots 406 and 409 (Fig. 16) in the extension 407 of the transaction key controlled slide 408 for the adding and subtracting bank of totalizers would have rocked the arm 410 counter-clockwise to shift the slide 414 and the foremost one of the plates 278 until the opposite end of the slot 390 engaged the pin 391 while the slide 395 and the remaining plates 378 would not have been shifted so that the amount would have been added to the "total net cash" totalizer and one of the cashier's "net cash" totalizers but would have been subtracted from the C. O. D. totalizer.

When it is desired to take totals one of the levers X and Y (Fig. 21) must be shifted to some position depending upon the totalizer desired. If the total is to be taken from one of the totalizers in the three universal carry banks the slide 475 related to the lever X will be shifted one step up. This will rock the bail 614 (Fig. 35) clockwise to a slight extent by the connections shown in Fig. 3 for rocking the shaft 607 so that if any one of the pawls 589 should be rocked all four of the latter will be moved in unison. The purpose of this is to enable the release of the machine by depression of a single one of the special keys or turning of one of the cashiers' locks instead of requiring depression of a key in each bank and the turning of a cashier's lock as in item entering operations. At the same time the single-key frame 624 will be rocked to a position wherein it will prevent depression of more than a single one of the special keys or the corresponding turning of a cashier's lock.

Movement of the total lever as indicated will also serve to carry the stud 517 (Fig. 3) away from the lock 519 and will permit the latter to be rocked by spring 521 to place the shoulder 528 in the path of the lug 523 on the segment 524. Early in the operation of the machine this segment will be operated and will lift the link 519 thereby rocking the plate 529 and shifting the slide 510 part way toward the rear. Cam slot 508 in the latter serves to shift the sleeve 502 with attached arms 501 and 503 so that the rollers 504 (Fig. 39) and 505 will each extend only about half way into the cam grooves 511 and 512 of the disk 506. Now upon continued operation of the machine both of the cam grooves will be effective to control the period of engagement of the selected totalizer wheels and actuators. The selection of totalizers during totaling is dependent upon the position of the controlling slides 359, 372, 486 and 496 (Fig. 10) just as in item entering operations.

A link 560 (Fig. 3) extending upwardly from the plate 529 is connected at its opposite end to a cam plate 558. An extension of the latter is connected by a link 570 to an arm on shaft 72 to cause all of the zero stops 119 (Fig. 2) to be rocked by the action of pins 568 carried by arms 567 secured to the shaft.

At the same time the slot 557 in the plate 558 cooperates with the roller 556 to lower the series of spring tensioned arms 548 (Fig. 2) into engagement with the racks 162 so that the springs 550 may assist in the operation of the latter on totals. This is to insure operation of the slides 130 and racks 162 first, until these parts are arrested by the engagement of the single teeth 174 of the totalizer wheels with the shoulders 544 (Fig. 11), before the complemental slides 131 start their movement. The springs 550 are not normally under any considerable amount of tension but are given additional tension upon the operation of the machine when the latter is conditioned for totaling. For this purpose the arms 552 (Fig. 2) to which the springs are attached at their forward ends, are secured to the rock shaft 546 which is operated by the main operating mechanism whenever the hook 563 (Fig. 3) engages a pin 562 carried by the arm 561 secured to this shaft. Engagement of the hook and pin in this manner is permitted whenever the links 519 and 520 are raised by virtue of one of the latter being coupled to the segment 524 due to shifting of one of the total levers. The hook 563 is pivotally mounted on the rock plate 153 which is rocked by the driving cam 156 and serves also the function of rotating the differential operating shaft 137.

During an operation of the machine with the parts in the positions indicated the combined effect of the cam grooves 511 and 512 will be to cause engagement of the selected totalizer during both the forward and return movement of the actuating racks. As stated the determination of the particular totalizer to be engaged with the racks under these conditions is placed under the control of the selecting slides 359, 472, 486 and 496 (Fig. 10). For the type of total suggested, i. e., taken from a universal bank those of the slides that are controlled by the two of the special key banks in which no keys are depressed will remain in normal position while those related to the third bank will be shifted in accordance with the key depressed. The bars controlled by the cashiers' locks and the two total levers will assume positions determined by their respective controls.

The selected totalizer wheels will first be turned backwardly to their normal or zero positions by virtue of the action of the springs 550 (Fig. 2) and the regular differential mechanism. Their movement is arrested by the engagement of the long teeth 174 with the shoulders on the transfer controlling bars 184. At this time the amount formerly standing on the totalizer wheels will be set up on the type carriers 672 and 674 and may be printed at any one or more of the seven printing points. As the operation continues the racks will be restored and the amount previously on the wheels will be returned thereto and will also be set up on the indicator tablets 1086 (Fig. 1).

If the total standing on one of the item counters is desired the control lever X (Fig. 21) is shifted to the "Read counters" position with identically the same result as produced upon movement to the "Read" position except that the selecting bars 486 (Fig. 10) are shifted another step in each of the banks of totalizers and counters. This has the effect of determining the selection of a particular counter instead of a totalizer upon depression of a desired special key and subsequent operation of the machine.

Should the lever X be shifted to any of the remaining seven positions it will serve to shift the connected totalizer selecting slides 486 to such positions that only the particular totalizer corresponding to any definite position will be selected for engagement with the racks. At the same time such movement of the lever X will, due to the form of the slot 649 (Fig. 3) in the arm 647, serve to rock the shaft 607 and hence the bail 614 (Fig. 35) an additional amount which is sufficient to carry it to the bottom of the slots 619. In moving to this position the bail will serve to rock all of the locking pawls 589 to free the shaft 37 and at the same time it will be carried into the path of the arms 596 and hence will lock the special keys against depression and the cashiers' locks against turning. In other respects the operation of the machine will be substantially the same as when the lever X is placed in the "Read" position.

Movement of the lever Y to any of the nine positions away from normal will produce the same effect as explained above with respect to the seven last described positions of the lever X. For each of these positions there will be selected a definite totalizer for totaling purposes, the selection being effected under control of the selecting bars 496 (Fig. 10) and not being interfered with by any of the other selecting bars. Upon movement of the lever Y to any of its nine shifted positions the bail 614 (Fig. 35) will be rocked to release the shaft 37 from the four pawls 589 and to lock up all of the special keys and the cashiers' locks. Arms 518 (Fig. 41) of levers 516 cooperating with the arms 658 and 659 (Fig. 3) insure that only one of the levers X and Y may be shifted out of the "add" position.

If a grand or reset total is desired from any totalizer it is only necessary to turn the barrel of the lock 474 (Fig. 3) in addition to the appropriate movement of one of the levers X and Y. The primary effect of this turning of the lock 474 is to carry the pin 540 away from the rear edge of link 541 (Fig. 6) thereby permitting the spring 521 to engage the notch 542 of the latter with the square lug 523 on the segment 524. Notch 542 is of substantially the same width as the lug 523 so that no idle movement is provided by it such as is provided by the notches in the links 519 and 520. As a result the plate 529 is rocked to a greater extent upon movement of the segment 524 than during ordinary "Read" total operations and the slide 510 is likewise shifted further than for "Read" totals. The cam slot 508 in the slide accordingly shifts the pair of arms 501 to an extent sufficient to completely disengage the roller 505 (Fig. 39) from the cam groove 511 and to enter the roller 504 into the full depth of the groove 512. This places the period of engagement of the totalizers with the actuators entirely under the control of the deep portion of the cam groove 512 so that the selected totalizer will be engaged during the forward movement of the racks but not on their return, thus leaving the wheels at zero.

In order to prevent operation of the machine with the levers X and Y in their "add" positions and the lock 474 turned to reset position the special locking hook 652 (Fig. 3) comes into play upon turning of the lock. This prevents operation of the shaft 37 until the hook is again raised by the action of one of the arms 516 upon the pin 656 carried by the rear arm 657 of the hook whenever one of the levers X and Y is shifted.

While one admirable form of the present invention disclosing its many novel and improved features has been disclosed herein, it is to be understood that numerous modifications may be made in the specific constructions illustrated and described without departing from the spirit or scope of the invention. Not only is it contemplated that changes may be made in the specific mechanisms provided for the accomplishment of various functions but if desired parts may be omitted or rearranged to bring about variations in the results effected. It is not desired to be limited other than by the scope of the claims which follow.

What I claim is:

1. In a machine of the class described a totalizer having a frame, actuators for said totalizer, an engaging member pivoted to said frame, a movable rod, a plurality of notched slides and means cooperating with said slides and engaging member for causing said engaging member to engage said rod when a notch in each of said slides is aligned with said means and means for subsequently moving said rod to engage the totalizer with the actuators.

2. In a machine of the class described a totalizer, actuators therefor, means for moving said totalizer into engagement with said actuators, a plurality of members, each provided with notches and means dependent upon the alignment of a notch in each of said members for connecting said totalizer with said moving means.

3. In a machine of the class described a totalizer, actuators therefor, means for moving said totalizer into engagement with said actuators, a plurality of members, each provided with notches, a plurality of manipulative devices for controlling said members, and means dependent upon the alignment of a notch in each of said members for connecting said totalizer with said moving means.

4. In a machine of the class described a totalizer, actuators therefor, means for moving said totalizer into engagement with said actuators, a plurality of banks of keys, a notched member controlled by each of said banks of keys, an element cooperating with said members and adapted to connect said totalizer with said moving means under control of a plurality of said members, and means for rendering said element effective or ineffective.

5. In a machine of the class described a plurality of individually movable totalizers, a plurality of actuators common thereto, manipulative devices, a plurality of notched members controlled by said devices and common to said totalizers, operating means for shifting said totalizers into and out of engagement with said actuators, and means controlled by all of said notched members for connecting selected totalizers to said operating means.

6. In a machine of the class described a plurality of totalizers, actuators therefor, means for bringing said totalizers into cooperative relation with said actuators, a plurality of manipulative devices, a plurality of notched members adapted to be controlled by said devices, and a coupling element associated with each of said totalizers, said coupling elements cooperating with said notched members and being adapted to couple said totalizers to said first mentioned means under combined control of notches in each of said members, said members permitting the coupling of only predetermined ones of said totalizers with said first mentioned means.

7. In a machine of the class described a plurality of totalizers, actuators therefor, means for shifting selected totalizers into engagement with the actuators, a plurality of movable notched members for effecting selection of said totalizers by the alignment of a notch in each of said notched members, and manipulative means for controlling the movement of said members, said first mentioned means being effective to shift the selected totalizers simultaneously and positively into and out of engagement with the actuators.

8. In a machine of the class described a plurality of totalizers, actuators therefor, means for shifting selected totalizers into engagement with the actuators, a plurality of movable notched members for effecting selection of said totalizers, manipulative means for controlling the movement of said members, certain of said members being shifted directly by said manipulative means, and a main operating mechanism for shifting other of said members under control of said manipulative means.

9. In a machine of the class described a plurality of totalizers, actuators therefor, means for shifting selected totalizers into engagement with the actuators, a plurality of movable notched members for effecting selection of said totalizers, a main operating mechanism, keys for controlling the movement of certain of said members by said operating mechanism, and operation controlling levers for directly shifting other of said members.

10. In a machine of the class described a totalizer, an item counter for counting the entries in said totalizer, a series of racks adapted to cooperate with said totalizer, a second series of racks each of which is connected with a rack of the first series and adapted to cooperate with said counter, means for shifting said totalizer and said counter into cooperation with their respective racks, means for retarding the shifting of said counter by said last mentioned means, and means for rendering said retarding means ineffective.

11. In a machine of the class described a totalizer, an item counter for counting the entries in said totalizer, a series of racks adapted to cooperate with said totalizer, a second series of racks each of which is connected with a rack of the first series and adapted to cooperate with said counter, means for shifting said totalizer and said counter into cooperation with their respective racks, means for retarding the shifting of said counter by said last mentioned means, means for rendering said retarding means ineffective and means whereby either said totalizer or said counter may control its associated racks at will.

12. In a machine of the class described a plurality of totalizers, a corresponding plurality of counters, a series of actuating racks for said totalizers, a second series of racks adapted to cooperate with said counters, each rack of said second series being connected to a rack of the first series, means for moving said racks of both series, means under common control for selecting a totalizer and a counter for operation, means for engaging the selected totalizer and counter with said racks, said counter engaging means having a yielding connection with said counter, means for detaining said counter against movement, and means for releasing said detaining means while said selected totalizer is engaged with its racks, and after said racks have been moved.

13. In a machine of the class described a bank of keys, a slide adapted to be shifted upon operation of a key in said bank, a main operating mechanism, and a differentially adjustable rack adapted to be shifted by said operating mechanism under control of said slide, by means of a cam mechanism actuated by the main operating mechanism, connectible between said slide and rack, so constructed and arranged as to move said rack to a position to which said slide has been moved by the depression of said operated key.

14. In a machine of the class described a plurality of keys, a slide adapted to be positioned by said keys, a main operating mechanism, a differentially adjustable rack, a segment connected to said rack, and a cam plate mounted on said segment cooperating with said slide and adapted to be operated by said operating mechanism.

15. In a machine of the class described a bank of keys, a pair of slides adapted to be positioned by said keys, a differentially adjustable element, an operating mechanism, a cam plate for controlling said element and adapted to be rocked by said mechanism, and means carried by one of said slides to cooperate with said cam plate to control the latter.

16. In a machine of the class described a bank of keys, a pair of intergeared slides, one of said slides being always shifted twice as far as the other of said slides, certain of said keys cooperating directly with one of said slides and the other of said keys cooperating with the other of said slides, a differentially adjustable element and means carried by one of said slides for controlling said element.

17. In a machine of the class described a plurality of adding and subtracting totalizers, actuators therefor, means for shifting said totalizers into cooperation with said actuators, a plurality of manipulative devices, a plurality of independent members controlled by respective ones of said devices, means controlled by one of said members to determine the additive or subtractive condition of said totalizers, and means conjointly controlled by all of said members for selecting totalizers to be affected by said shifting means.

18. In a machine of the class described a plurality of totalizers, actuators therefor, said totalizers being adapted for a plurality of distinct types of operation, a plurality of manipulative devices, a plurality of differentially adjustable members controlled by said devices, and means controlled by said members for selecting the totalizers for operation and determining the type of operation.

19. In a machine of the class described a totalizer comprising intergeared adding and subtracting wheels, actuators for said wheels, a frame for supporting said wheels so constructed and arranged that it may be rocked upon a pivot and also moved in a straight line at a right angle to said actuators, means for rocking said frame to determine whether the adding or subtracting wheels shall be effective and means for moving said frame in said straight line to engage the active wheels with said actuators.

20. In a machine of the class described a totalizer comprising intergeared adding and subtracting wheels, actuators for said wheels, a rockable and liftable frame for supporting said wheels, means for rocking said frame to determine whether the adding or subtracting wheels shall be effective, means for lifting said frame to engage the active wheels with said actuators, a plurality of notched members adapted to control the lifting of said frame, and common means for rocking said frame and shifting one of said notched members.

21. In a machine of the class described a plurality of totalizers each comprising sets of adding wheels and subtracting wheels, actuators therefor, a rockable and shiftable frame for carrying the wheels of each of said totalizers, means for independently rocking said frames to determine the additive or subtractive condition of each of said totalizers, and common means for simultaneously shifting said frames to carry the effective wheels into engagement with said actuators.

22. In a machine of the class described a plurality of totalizers each comprising sets of adding wheels and subtracting wheels, actuators therefor, a rockable and liftable frame for carrying the wheels of each of said totalizers, means for independently rocking said frames to determine the additive or subtractive condition of each of said totalizers, a plurality of movable notched members for controlling the lifting of said frames, and pivoted elements carried by said frames and adapted to cooperate with said notched members to effect said control.

23. In a machine of the class described a totalizer comprising sets of adding and subtracting wheels, actuators therefor, an operating mechanism adapted to drive said actuators, a plurality of keys, a rockable and shiftable frame for supporting said totalizer wheels and means operated by said operating mechanism and controlled by said keys for rocking and shifting said frame.

24. In a machine of the class described a totalizer, an item counter, means common to said totalizer and counter for taking totals therefrom and means for determining whether a total is to be taken from said totalizer or said counter.

25. In a machine of the class described a totalizer, an item counter, means common to said totalizer and counter for taking totals therefrom, means for actuating said totalizer and counter during a single operation of the machine, and means for determining whether said totalizer and counter shall be actuated during an operation of the machine or a total is to be taken, said last mentioned means also determining whether a total is to be taken from said totalizer or said counter.

26. In a machine of the class described a totalizer, an item counter, means common to said totalizer and counter for taking totals therefrom, means for determining whether a total is to be taken from said totalizer or said counter and means cooperating with said last mentioned means for effecting resetting in conjunction with the total taking.

27. In a machine of the class described a totalizer, an item counter, means common to said totalizer and counter for taking totals therefrom, means for actuating said totalizer and counter during a single operation of the machine, a differentially adjustable element for determining whether said totalizer and counter shall be actuated during an operation of the machine or a total is to be taken, said element also determining whether a total is to be taken from said totalizer or said counter, and means cooperating with said element for effecting resetting in conjunction with the taking of a total from either said totalizer or said counter.

28. In a machine of the class described, a plurality of sets of totalizers, a main operating mechanism, differentially movable actuators for the totalizers operated by the main operating mechanism, means for determining the extent of differential movement of the actuators, selecting mechanism for controlling the engagement of the totalizers with the actuators, mechanism adapted to normally engage the totalizers with the actuators to effect an adding operation, devices for changing the time of engagement of the totalizers with the actuators and manipulative means which when in normal position holds said devices inoperative.

29. In a machine of the class described, a plurality of sets of totalizers, a main operating mechanism, differentially movable actuators for the totalizers operated by the main operating mechanism, means for determining the extent of differential movement of the actuators, selecting mechanism for controlling the engagement of the totalizers with the actuators, mechanism adapted to normally engage the totalizers with the actuators to effect an adding operation, devices for changing the time of engagement of the totalizers with the actuators and manipulative means which when in normal position holds said devices inoperative, and when shifted renders said devices operative as an incident to the selection of a totalizer.

30. In a machine of the class described a plurality of sets of totalizers, a main operating mechanism, differentially movable actuators for the totalizers operated by the main operating mechanism, means for determining the extent of differential movement of the actuators, selecting mechanism for controlling the engagement of the totalizers with the actuators, mechanism adapted to normally engage the totalizers with the actuators to effect an adding operation, devices for changing the time of engagement of the totalizers with the actuators and manipulative means which when in normal position holds said devices inoperative and when shifted renders said devices operative and conditions one set of totalizers for selection of any one of its totalizers.

31. In a machine of the class described a plurality of sets of totalizers, a main operating mechanism, differentially movable actuators for the totalizers operated by the main operating mechanism, means for determining the extent of differential movement of the actuators, selecting mechanism for controlling the engagement of the totalizers with the actuators, mechanism adapted to normally engage the totalizers with the actuators to effect an adding operation, devices for changing the time of engagement of the totalizers with the actuators, manipulative means which when in normal position holds said devices inoperative and when shifted renders said devices operative and conditions one set of totalizers for selection of any one of its totalizers, and means controlled by said manipulative means for preventing selection from other sets of totalizers.

32. In a machine of the class described a plurality of sets of totalizers, a main operating mechanism, differentially movable actuators for the totalizers operated by the main operating mechanism, means for determining the extent of differential movement of the actuators, mechanism for engaging the totalizers with the actuators, devices controlling the timing of the operation of said engaging mechanism, and manipulative means controlling said devices and simultaneously selecting a totalizer for engagement with the actuators.

33. In a machine of the class described a plurality of totalizers, a main operating mechanism, differentially movable actuators for the totalizers operated by the main operating mechanism, means for determining the extent of differential movement of the actuators, mechanism for engaging the totalizers with the actuators, controlling devices for said engaging mechanism, and manipulative means normally maintaining said controlling devices in inoperative position.

34. In a machine of the class described, a totalizer, a main operating mechanism, differentially movable actuators for the totalizer operated by the main operating mechanism, means for determining the extent of differential movement of the actuators, mechanism for engaging the totalizer with the actuators, devices for controlling the time of the operation of said engaging mechanism, for adding or total taking comprising a double-faced cam and a cam follower adapted to be shifted from engagement with one face of said cam into engagement with the opposite face of said cam and manipulative means for controlling the positioning of said cam follower.

35. In a machine of the class described a totalizer, a main operating mechanism, differentially movable actuators for the totalizer operated by the main operating mechanism, means for determining the extent of differential movement of the actuators, mechanism for engaging the totalizer with the actuators comprising a cam and a unitary cam follower, devices for moving said cam follower to differential extents to vary the time of engagement of the totalizers, and manipulative means for controlling said devices.

36. In a machine of the class described a plurality of totalizers, a main operating mechanism, differentially movable actuators for the totalizers operated by the main operating mechanism, means for determining the extent of differential movement of the actuators, mechanism for engaging the totalizers with the actuators, a plurality of elements so arranged as to singly or jointly control the operation of said engaging mechanism, devices for controlling the cooperation between said elements and said engaging mechanism, and manipulative means for controlling said devices.

37. In a machine of the class described a plurality of totalizers, a main operating mechanism, differentially movable actuators for the totalizers operated by the main operating mechanism, means for determining the extent of differential movement of the actuators, mechanism for engaging the totalizers with the actuators, devices for controlling the operation of said engaging mechanism, a plurality of manipulative means, and a plurality of members actuated by said manipulative means for controlling said devices.

38. In a machine of the class described, a plurality of totalizers, a main operating mechanism, differentially movable actuators for the totalizers operated by the main operating mechanism, means for determining the extent of differential movement of the actuators, mechanism for engaging the totalizers with the actuators, a plurality of elements operated by the main operating mechanism and so arranged as to singly or jointly control the operation of said engaging mechanism, devices for controlling the cooperation between said elements and said engaging mechanism, and manipulative means for controlling said devices.

39. In a machine of the class described a plurality of totalizers, a main operating mechanism, differentially movable actuators for the totalizers operated by the main operating mechanism, means for determining the extent of differential movement of the actuators, mechanism for engaging the totalizers with the actuators, a rotatable disk having a plurality of cam grooves, devices adapted to place the engaging mechanism under control of one or a plurality of said grooves, and manipulative means for engaging said devices with the main operating mechanism.

40. In a machine of the class described a plurality of totalizers, a main operating mechanism, differentially movable actuators for the totalizers operated by the main operating mechanism, means for determining the extent of differential movement of the actuators, mechanism for engaging the totalizers with the actuators, devices for moving said engaging mechanism differentially to vary the time of engagement of the totalizers, means having a single step of movement for engaging said devices with the main operating mechanism, and manipulative means for moving said last mentioned means.

41. In a machine of the class described, a plurality of totalizers, a main operating mechanism, differentially movable actuators for the totalizers operated by the main operating mechanism, means for determining the extent of differential movement of the actuators, mechanism for engaging the totalizers with the actuators, a plurality of devices each capable of controlling the timing of said engaging mechanism for sub-totaling, another device for controlling said engaging mechanism for grand totaling, and manipulative means cooperating with each device.

42. In a machine of the class described a totalizer, a main operating mechanism, differentially movable actuators for the totalizer operated by the main operating mechanism, means for determining the extent of differential movement of the actuators, mechanism for engaging the totalizer with the actuators, a rotatable disk having a plurality of cam grooves, devices adapted to place the engaging mechanism under control of one or a plurality of said grooves, and manipulative means for normally holding said devices inoperative.

43. In a machine of the class described a totalizer, a main operating mechanism, differentially movable actuators for the totalizer operated by the main operating mechanism, means for determining the extent of differential movement of the actuators, mechanism for engaging the totalizer with the actuators, devices for operating the engaging mechanism in a plurality of different timing arrangements, devices operated by the main operating mechanism adapted to shift the engaging mechanism differentially with respect to said operating devices to provide the different timings, and manipulative means for controlling said last mentioned devices.

44. In a machine of the class described a totalizer, a main operating mechanism, differentially movable actuators for the totalizer operated by the main operating mechanism, means for determining the extent of differential movement of the actuators, mechanism for engaging the totalizer with the actuators, devices for moving said engaging mechanism differentially to vary the time of engagement of the totalizer, means having a single step of movement for engaging said devices with the main operating mechanism, and manipulative means having a plurality of positions, movement to any one of which will operate said single step means.

45. In a machine of the class described a totalizer, actuators therefor, a main operating mechanism, connections therefrom for operating said actuators, additional devices normally disconnected from said actuators for operating the latter, and means for engaging said additional devices with the actuators.

46. In a machine of the class described a totalizer, actuators therefor, a main operating mechanism, connections therefrom for operating said actuators, additional devices normally disconnected from said actuators for operating the latter, and means for controlling the engagement of said totalizer and actuators, said means serving also to control the engagement of said devices with the actuators.

47. In a machine of the class described a totalizer, actuators therefor, a main operating mechanism, connections therefrom for operating said actuators, additional devices normally disconnected from said actuators for operating the latter, and a manipulative total controlling member for controlling the engagement between said totalizer and actuators and between said devices and said actuators.

48. In a machine of the class described a totalizer, actuators therefor, positive means for driving said actuators, yielding means for driving said actuators, and total controlling means for determining whether said actuators shall be positively or yieldingly driven.

49. In a machine of the class described a plurality of totalizers, a main operating mechanism, actuators for the totalizers, devices operated by the main operating mechanism for differentially moving the actuators, means for determining the extent of differential movement of the actuators, additional devices operated by the main operating mechanism for differentially moving the actuators, and mechanism operated by the main operating mechanism for engaging a totalizer and said additional devices with the actuators.

50. In a machine of the class described a plurality of totalizers, a main operating mechanism, actuators for the totalizers, devices operated by the main operating mechanism for differentially moving the actuators, means for determining the extent of differential movement of the actuators, additional devices operated by the main operating mechanism for differentially moving the actuators, totalizer engaging means, manipulative means for controlling the selection and engagement of a totalizer with the actuators, positioning means under control of the manipulative means and operated by the main operating means for positioning the totalizer engaging means for operation by the main operating mechanism, and connections from said positioning means for engaging said additional devices with the actuators.

51. In a machine of the class described a plurality of totalizers, a main operating mechanism, actuators for the totalizers, devices operated by the main operating mechanism for differentially moving the actuators, means for determining the extent of differential movement of the actuators, latches for holding the actuators in normal position, means operated by the main operating mechanism for engaging selected totalizers with the actuators, manipulative devices, and devices under control of the manipulative devices and operated by the main operating mechanism for releasing said latches and controlling the operation of said engaging means.

52. In a machine of the class described, a plurality of totalizers, a main operating mechanism, actuators for the totalizers, devices operated by the main operating mechanism for differentially moving the actuators, means for determining the extent of differential movement of the actuators, detents for the actuators, mechanism operated by the main operating mechanism for controlling the engagement of the totalizers and detents with the actuators, and manipulative means for conditioning said last mentioned mechanism for operation.

53. In a machine of the class described a plurality of totalizers, a main operating mechanism, actuators for the totalizers, devices operated by the main operating mechanism for differentially moving the actuators, means for determining the extent of differential movement of the actuators, additional devices for flexibly driving the actuators differentially, mechanism for controlling the engagement of a totalizer and the additional devices with the actuators and for controlling the operation of said additional devices by the main operating mechanism and manipulative means for controlling said totalizer engagement controlling mechanism.

54. In a machine of the class described a plurality of totalizers, a main operating mechanism, actuators for the totalizers, devices operated by the main operating mechanism for differentially moving the actuators, means for determining the extent of differential movement of the actuators, additional devices operated by the main operating mechanism for differentially moving the actuators, and mechanism for engaging a totalizer and said additional devices with the actuators.

55. In a machine of the class described a plurality of totalizers, a main operating mechanism, actuators for the totalizers, devices operated by the main operating mechanism for differentially moving the actuators, means for determining the extent of differential movement of the actuators, additional devices operated by the main operating mechanism for flexibly driving the actuators differentially, means adapted to be positioned for controlling the engagement of a totalizer with the actuators, means for engaging said additional devices with the actuators as an incident to the positioning of the totalizer engagement controlling mechanism, and manipulative means for controlling said totalizer engagement controlling mechanism.

56. In a machine of the class described a plurality of totalizers, a main operating mechanism, actuators for the totalizers, devices operated by the main operating mechanism for differentially moving the actuators, means for determining the extent of differential movement of the actuators, latches for holding the actuators in normal position, additional devices operated by the main operating mechanism for differentially moving the actuators, and mechanism for disengaging the latches and engaging a totalizer and said additional devices with the actuators.

57. In a machine of the class described a plurality of totalizers, a main operating mechanism, actuators for the totalizers, devices operated by the main operating mechanism for differentially moving the actuators, means for determining the extent of differential movement of the actuators, additional devices for differentially moving the actuators, manipulative means, and mechanism under control of said manipulative means for engaging said additional devices with the main operating mechanism.

58. In a machine of the class described a plurality of totalizers, a main operating mechanism, actuators for the totalizers, devices operated by the main operating mechanism for differentially moving the actuators, means for determining the extent of differential movement of the actuators, additional devices for differentially moving the actuators, manipulative means, and mechanism under control of said manipulative means for engaging said additional devices with the main operating mechanism and the actuators.

59. In a machine of the class described a bank of keys, a totalizer wheel, a differential mechanism, means for driving said differential mechanism under control of said keys, spring operated means for driving said differential mechanism under control of said totalizer wheel, and control means for determining driving of said differential mechanism by said key controlled means or by said spring operated means.

60. In a machine of the class described a bank of keys, a totalizer wheel, a rack adapted to drive said wheel, means for driving said rack under control of said keys, spring means for driving said rack at other times under control of said wheel, said spring means being normally ineffective, and means for making said spring means effective.

61. In a machine of the class described a plurality of keys, a totalizer wheel, a pair of complementally movable members, means for positively driving said members under control of said keys, spring operated means for driving one of said members under control of said totalizer wheel, and manipulated means determining which of said driving means is effective.

62. In a machine of the class described a bank of keys, a totalizer wheel, differential mechanism for operating said wheel, means for driving said mechanism under control of said keys, spring means for driving said mechanism under control of said totalizer wheel, said spring means being normally ineffective, and means for rendering said spring means effective, and said first driving means ineffective.

63. In a machine of the class described, a totalizer, actuators therefor, means for engaging the totalizer with the actuators, a shifting mechanism for said totalizer engaging means, a main operating mechanism, means adapted to connect said operating mechanism and said shifting mechanism, a total print controlling device, a totalizer resetting device, and means under the joint control of said total print and totalizer resetting devices for rendering said connecting means effective.

64. In a machine of the class described, a totalizer, actuators therefor, means for engaging the totalizer with the actuators, a main operating mechanism, a plurality of cams associated with said main operating mechanism, differentially adjustable connections from said cams for operating said engaging means, means operated by the main operating mechanism for adjusting said connections into complete engagement with one of said cams or into partial engagement with a plurality of said cams, and total controlling means for controlling the adjustment of said connections.

65. In a machine of the class described a bank of keys, a pair of complementally movable slides cooperating with said keys, a rack carried by one of said slides, a drive shaft, a pair of gears loosely mounted on said shaft, a frame secured to said shaft and provided with a pair of interengaging pinions, each of said pinions meshing with one of said gears, one of said gears meshing with said rack and connections between the other gear and said other slide for shifting the latter in the opposite direction and means for operating said shaft to rock said frame.

66. In a machine of the class described a bank of keys, a pair of complementally movable slides cooperating with said keys, a rack carried by each of said slides, a drive shaft, a pair of gears loosely mounted on said shaft, a frame secured to said shaft and provided with a pair of interengaging pinions, each of said pinions meshing with one of said gears, and an intermediate idler, one of said gears meshing with one of said racks and the other gear meshing with said intermediate idler which meshes with said other rack for shifting the latter in the opposite direction and means for operating said shaft to rock said frame.

67. In a machine of the class described, a plurality of banks of keys arranged in an inclined plane, a series of slides arranged in a plane substantially parallel thereto, one slide under each bank of keys and movable endwise under control of said bank of keys, a plurality of parallel totalizer driving racks disposed in a generally horizontal plane, all totalizers engageable with said driving racks and means for connecting said slides and said racks comprising a plurality of transversely disposed horizontal shafts carrying gears meshing with said racks, and a plurality of horizontally disposed rack plates meshing on the one hand with gears on said shafts and on the other hand with gears meshing with racks carried by said slides.

68. In a machine of the class described, a plurality of banks of keys arranged in an inclined plane, a series of slides arranged in a plane substantially parallel thereto, one slide under each bank of keys and movable endwise under control of said bank of keys, a plurality of parallel totalizer driving racks disposed in a generally horizontal plane, all totalizers engageable with said driving racks and means for connecting said slides and said racks comprising a plurality of transversely disposed horizontal shafts carrying gears meshing with said racks, and a plurality of horizontally disposed rack plates meshing on the one hand with gears on said shafts and on the other hand with gears meshing with racks on said slides, said last mentioned gears being of sufficient width to engage slides and racks located in different vertical planes.

69. In a machine of the class described, a plurality of banks of keys arranged in an inclined plane, a series of slides arranged in a plane substantially parallel thereto, one slide under each bank of keys and movable endwise under control of said bank of keys, a plurality of groups of parallel totalizer driving racks disposed in a generally horizontal plane, all totalizers engageable with said driving racks and means for connecting each of said slides with a corresponding rack in each of said groups of racks, comprising a plurality of transversely disposed shafts carrying gears meshing with corresponding racks in each of said groups and a plurality of rack plates meshing on the one hand with gears on said shafts and on the other hand with gears meshing with racks on said slides, said last mentioned gears being of sufficient width to engage slides and rack plates located in different vertical planes.

70. In a machine of the class described, a plurality of banks of keys arranged in an inclined plane, a series of slides arranged in the same plane as said keys, one slide under each bank of keys and movable endwise under control of said bank of keys, a plurality of substantially horizontal parallel totalizer driving racks and means for connecting said slides and said racks, comprising a plurality of transversely disposed horizontal shafts carrying gears meshing with said racks, and a plurality of parallel rack plates meshing on the one hand with gears on said shafts and on the other hand with gears meshing with racks carried by said slides, said last mentioned gears being of sufficient width to engage slides and racks located in different vertical planes.

71. In a machine of the class described, a plurality of groups of totalizers, differentially moved actuators therefor, a plurality of groups of notched members and means dependent upon alignment of notches in each of said members for determining the engagement with their actuators of one or more totalizers in one or more of said groups of totalizers.

72. In a machine of the class described, a plurality of totalizers, actuators therefor, a plurality of groups of manipulative devices, a plurality of movable notched members controlled by each said group, said members being controllable as to position by said devices, and means cooperating with the notches in each of said members and effective only when notches in all of said members are aligned for bringing a selected one or more of said totalizers into cooperative relation with said actuators.

73. In a machine of the class described a totalizer having a frame, an engaging member pivoted to said frame, a movable rod, a plurality of notched slides and means cooperating with said slides and said engaging member, means for causing said engaging member to engage said rod when a notch in each of said slides is aligned with said means, and a device for causing said means to be disengaged from said notches.

74. In a machine of the class described a plurality of individually movable totalizers, a plurality of actuators common thereto, manipulative devices, a plurality of notched members controlled by said devices and common to said totalizers, operating means for shifting said totalizers into and out of engagement with said actuators, means controlled by all of said notched members for connecting selected totalizers to said operating means, and a device for causing said means to be disengaged from said notched members.

75. In a machine of the class described a bank of keys, a main operating mechanism, a differentially movable member, differential mechanism operated by said operating mechanism for moving said member differentially under control of a key in said bank of keys, a rack connected for differential operation by said member, a shaft having three or more pinions attached thereto one of which meshes with said rack, a plurality of actuator racks parallel to each other and to said first mentioned rack each of which actuator racks meshes with one of the remaining pinions, whereby said actuator racks are moved differentially under control of one of said keys, and a plurality of totalizer wheels engageable with each of said actuator racks, whereby provision is made for the convenient operation of a large number of totalizer wheels located in a single plane.

76. In a machine of the class described a plurality of banks of keys, a main operating mechanism, a plurality of differentially movable members one for each bank of keys, differential mechanism operated by said operating mechanism for moving said members differentially each under control of a key in its respective bank, a plurality of racks each connected for differential operation by its respective member, a plurality of parallel shafts each having three or more pinions attached thereto one of which meshes with a respective one of said racks, a plurality of groups of actuator racks arranged parallel to each other and to said first mentioned racks the racks of each group being of the same denominational order and the racks of each group meshing each with one of the remaining pinions of the respective shaft, whereby the racks of each group of actuator racks are moved differentially under control of one of the keys of the respective bank, and a plurality of groups of totalizer wheels, the wheels of each group being engageable with the actuator racks of the respective denominational order, whereby provision is made for the convenient operation of a large number of groups of totalizer wheels located in a single plane.

77. Apparatus in accordance with claim 76 in which the shafts are all arranged on one side of said actuator racks and the totalizer wheels all arranged on the other side thereof.

78. Apparatus in accordance with claim 76 in which the differentially movable members are racks located under their respective banks of keys and connected by broad pinions with the racks which mesh with the first mentioned pinions on said shafts.

79. Apparatus as defined in claim 67 in which the totalizer driving rack actuating mechanism is located in the space between the inclined key set slides and the horizontal shaft driving racks.

80. In a machine of the class described, a plurality of groups of keys, a differentially movable member adapted to be shifted upon operation of a key of one of said groups of keys, a second differentially movable member adapted to be shifted upon operation of a key of another group, and means for connecting said differentially movable members for concomitant movement.

81. In a machine of the class described a plurality of groups of keys, a differentially movable member adapted to be shifted upon operation of a key of one of said groups of keys, a second differentially movable member adapted to be shifted upon operation of a key of another group, and gearing means for connecting said differentially movable members for concomitant movement.

82. In a machine of the class described a plurality of groups of keys, a differentially movable member adapted to be shifted upon operation of a key of one of said groups of keys, a second differentially movable member adapted to be shifted upon operation of a key of another group and means for connecting said differentially movable members for concomitant movement in such a manner that one of said members moves further than the other.

83. In a machine of the class described a plurality of groups of keys, a differentially movable member adapted to be shifted upon operation of a key of one of said groups of keys, a second differentially movable member adapted to be shifted upon operation of a key of another group and means for connecting said differentially movable members for concomitant movement in such a manner that one of said members moves twice as far as the other.

84. In a machine of the class described a group of keys, stop elements set by said keys, a differential element formed with cam surfaces having graded slopes against which said stop elements act to move said element differentially, and a stationary element formed with guide surfaces for supporting said stop elements against movement while said stop elements are moving said differential element.

85. In a machine of the class described a plurality of banks of keys, a main operating mechanism, a plurality of differentially movable members one for each bank of keys, differential mechanism operated by said operating mechanism for moving said members differentially each under control of a key in its respective bank, a plurality of racks each connected for differential operation by its respective member, a plurality of parallel shafts each having three or more pinions attached thereto one of which meshes with a respective one of said racks, a plurality of groups of actuator racks arranged parallel to each other and to said first mentioned racks the racks of each group being of the same denominational order and the racks of each group meshing each with one of the remaining pinions of the respective shaft, whereby the racks of each group of actuator racks are moved differentially under control of one of the keys of the respective bank, and a plurality of groups of totalizer wheels, the wheels of each group being engageable with the actuator racks of the respective denominational order, and a common means associated with the totalizers operated by a single group of actuator racks for selecting one or more of said totalizers for actuation whereby provision is made for the convenient selection and operation of a large number of groups of totalizer wheels located in a single plane.

WILLIAM S. GUBELMANN.